US 8,677,505 B2

(12) United States Patent
Redlich et al.

(10) Patent No.: US 8,677,505 B2
(45) Date of Patent: Mar. 18, 2014

(54) SECURITY SYSTEM WITH EXTRACTION, RECONSTRUCTION AND SECURE RECOVERY AND STORAGE OF DATA

(75) Inventors: Ron M. Redlich, Miami Beach, FL (US); Martin A. Nemzow, Miami Beach, FL (US)

(73) Assignee: Digital Doors, Inc., Miami Beach, FL (US)

( * ) Notice: Subject to any disclaimer, the term of this patent is extended or adjusted under 35 U.S.C. 154(b) by 900 days.

(21) Appl. No.: 11/829,207

(22) Filed: Sep. 6, 2007

(65) Prior Publication Data

US 2008/0222734 A1 Sep. 11, 2008

Related U.S. Application Data

(63) Continuation-in-part of application No. 10/998,365, filed on Nov. 26, 2004, now Pat. No. 7,546,334, and a continuation-in-part of application No. 10/277,196, filed on Dec. 31, 2002, now Pat. No. 7,322,047, and a continuation-in-part of application No. 10/155,192, filed on May 23, 2002, now Pat. No. 7,349,987, and a continuation-in-part of application No. 10/155,525, filed on May 23, 2002, now Pat. No. 7,191,252, said application No. 10/998,365 is a continuation-in-part of application No. 10/008,209, filed on Dec. 6, 2001, now Pat. No. 7,140,044, and a continuation-in-part of application No. 10/008,218, filed on Dec. 6, 2001, now Pat. No. 7,146,644, and a continuation-in-part of application No. 09/916,397, filed on Jul. 27, 2001, now Pat. No. 7,103,915.

(60) Provisional application No. 60/525,507, filed on Nov. 26, 2003, provisional application No. 60/400,062, filed on Aug. 2, 2002, provisional application No. 60/400,112, filed on Aug. 2, 2002, provisional application No. 60/400,406, filed on Aug. 2, 2002, provisional application No. 60/400,407, filed on Aug. 2, 2002, provisional application No. 60/260,398, filed on Jan. 9, 2001, provisional application No. 60/287,813, filed on May 2, 2001, provisional application No. 60/267,944, filed on Feb. 12, 2001, provisional application No. 60/247,242, filed on Nov. 13, 2000, provisional application No. 60/247,232, filed on Nov. 13, 2000.

(51) Int. Cl.
*H04L 29/06* (2006.01)

(52) U.S. Cl.
USPC .............. 726/27; 716/166; 716/193; 715/255

(58) Field of Classification Search
USPC ....................... 726/27; 713/166, 193; 715/255
See application file for complete search history.

(56) References Cited

U.S. PATENT DOCUMENTS

| | | | |
|---|---|---|---|
| 5,036,315 A | 7/1991 | Gurley | 340/721 |
| 5,485,474 A | 1/1996 | Rabin | 371/37.1 |
| 5,532,950 A | 7/1996 | Moses | 364/724.19 |
| 5,581,682 A | 12/1996 | Anderson et al. | 395/792 |
| 5,826,268 A * | 10/1998 | Schaefer et al. | 1/1 |
| 5,832,212 A | 11/1998 | Cragun et al. | 395/188.01 |
| 5,905,980 A | 5/1999 | Masuichi et al. | 707/1 |
| 5,933,498 A | 8/1999 | Schneck et al. | 380/4 |
| 5,960,080 A * | 9/1999 | Fahlman et al. | 380/252 |
| 5,960,808 A | 10/1999 | Ferguson et al. | 380/4 |
| 5,996,011 A | 11/1999 | Humes | 709/225 |
| 6,044,375 A | 3/2000 | Shmueli | 707/101 |
| 6,055,544 A | 4/2000 | DeRose et al. | 707/104 |
| 6,073,165 A | 6/2000 | Narasimhan et al. | 109/206 |
| 6,078,907 A | 6/2000 | Lamm | 705/40 |
| 6,094,483 A | 7/2000 | Fridrich et al. | 380/28 |
| 6,148,342 A | 11/2000 | Ho | 709/225 |
| 6,178,243 B1 * | 1/2001 | Pomerantz et al. | 380/243 |
| 6,192,472 B1 | 2/2001 | Garay et al. | 713/165 |
| 6,253,203 B1 | 6/2001 | O'Flaherty et al. | 707/9 |
| 6,266,159 B1 * | 7/2001 | Otsuka et al. | 358/405 |
| 6,301,668 B1 | 10/2001 | Gleichauf | 713/201 |
| 6,324,541 B1 * | 11/2001 | de l'Etraz et al. | 1/1 |
| 6,389,542 B1 | 5/2002 | Flyntz | 713/201 |
| 6,463,417 B1 * | 10/2002 | Schoenberg | 705/2 |
| 6,487,538 B1 | 11/2002 | Gupta | 705/24 |
| 6,598,161 B1 * | 7/2003 | Kluttz et al. | 713/166 |
| 6,602,298 B1 * | 8/2003 | Kirshenbaum | 715/234 |

Figure  extraction in process

| | | | |
|---|---|---|---|
| 6,662,189 B2 | 12/2003 | Oyanagi | 707/102 |
| 6,691,231 B1* | 2/2004 | Lloyd et al. | 726/5 |
| 6,711,575 B1* | 3/2004 | Applewhite et al. | 1/1 |
| 6,714,977 B1 | 3/2004 | Fowler | 709/224 |
| 6,771,290 B1 | 8/2004 | Hoyle | 345/745 |
| 6,845,448 B1 | 1/2005 | Chaganti | 713/166 |
| 6,907,529 B1* | 6/2005 | Hirose | 726/5 |
| 6,922,696 B1 | 7/2005 | Lincoln | 707/101 |
| 6,941,459 B1 | 9/2005 | Hind | 713/167 |
| 6,954,532 B1* | 10/2005 | Handley et al. | 380/54 |
| 7,010,681 B1* | 3/2006 | Fletcher et al. | 713/154 |
| 7,031,961 B2 | 4/2006 | Pitkow | 707/4 |
| 7,032,030 B1* | 4/2006 | Codignotto | 709/246 |
| 7,085,927 B1* | 8/2006 | Kohli | 713/164 |
| 7,089,428 B2 | 8/2006 | Farley | 370/231 |
| 7,133,845 B1* | 11/2006 | Ginter et al. | 705/51 |
| 7,188,107 B2 | 3/2007 | Moon | 707/5 |
| 7,260,724 B1* | 8/2007 | Dickinson et al. | 713/182 |
| 7,373,654 B1* | 5/2008 | Reid | 726/1 |
| 2002/0073313 A1* | 6/2002 | Brown et al. | 713/165 |
| 2002/0116641 A1 | 8/2002 | Mastrianni | 713/201 |
| 2003/0196108 A1* | 10/2003 | Kung | 713/200 |
| 2004/0049700 A1* | 3/2004 | Yoshida | 713/201 |
| 2004/0054630 A1 | 3/2004 | Ginter | 705/53 |
| 2006/0005234 A1* | 1/2006 | Birk et al. | 726/9 |
| 2006/0085837 A1* | 4/2006 | Pesati et al. | 726/1 |

FOREIGN PATENT DOCUMENTS

| | | |
|---|---|---|
| CA | 2 345 148 | 6/2000 |
| WO | WO 00/75779 | 12/2000 |

OTHER PUBLICATIONS

"Processing of confidential information in distributed systems by fragmentation" by J. Fabre, Computer Communications vol. 20, pp. 177-188 (1997).
"Secure External References in Multimedia Email Messages" B. Wiegel, ACM, pp. 11-18, Mar. 14, 1996.
"Element-Wise XML Encryption" H. Maruyama et al., IBM Research, Tokyo Res. Lab. Apr. 19, 2000.
"Secure External References in Multimedia Email Messages" by B. Wiegel, German National Research Center, Mar. 14, 1996.
"Process of Confidential Information in Distributed Systems by Fragmentation" by J. Fabre, Computer Communications 20:177-188, 1997.
Canadian Patent Publication by S. Lanis, CA 2345148, Apr. 6, 2000.
MIMEsweeper—Content Security for E-mail, Web Browsing & Webmail, Nov. 12, 2001.
Cisco IDS Host Sensor Product, Oct. 16, 2001.
Ingrian i100, Content Security Appliance (1 pages).
Element-Wise XML Encryption, Hiroshi Maruyama and Takeshi Imamura, IBM Research, Tokyo Research Laboratory (4 pages).
Survival Information Storage Systems by Jay J. Wylie, Michael W. Brigrigg, John D. Strunk, Gregory R. Ganger, Han Kiloccote Pradeep K. Khosla (8 pages).
ZD Net Interactive Week—IBS—SAP: XML to Boost Security Integration (1 page).
Myers, A.C. "Mostly-Static Decentralized Information Flow Control" M.I.T. Doctoral Thesis Jan. 1999.
The 1996 book, Applied Cryptography, by Schneier.
The Uniform Resource Locator article "FOLD OC".
Microsoft Word "Learning Microsoft Word 7.0".

* cited by examiner

*Primary Examiner* — Michael Pyzocha
(74) *Attorney, Agent, or Firm* — Robert C. Kain, Jr.

(57) ABSTRACT

The method for securing data includes establishing a group of security sensitive items, filtering data and extracting and separating the security items from remainder data. The filtered data are separately stored (locally on a PC or on another computer in a LAN or WAN or on the Internet.) A map may be generated. The filter and/or map may be destroyed or stored. The data input, extracted data and remainder data may be deleted from the originating computer. Encryption may be utilized to enhance security (including transfers of data, filter and map). Reconstruction of the data is permitted only in the presence of a predetermined security clearance. A plurality of security clearances may be used to enable a corresponding plurality of partial, reconstructed views of the plaintext (omitting higher security words).

19 Claims, 74 Drawing Sheets

Figure   Extraction in progress showing extractions only.

FIG. 3
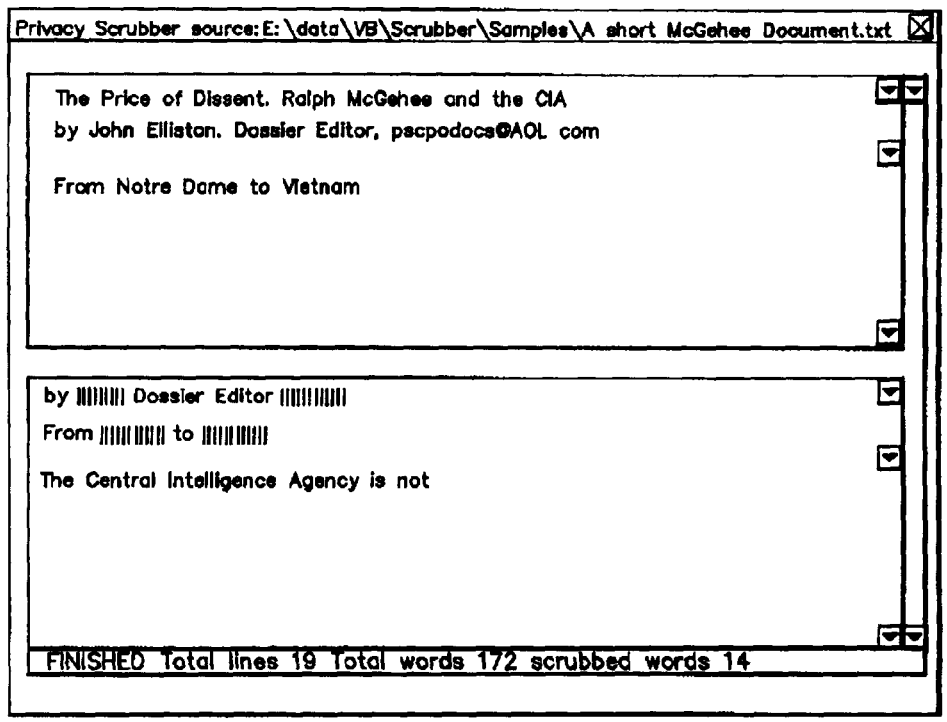
Figure   Sample automatically extraction of sensitive data.
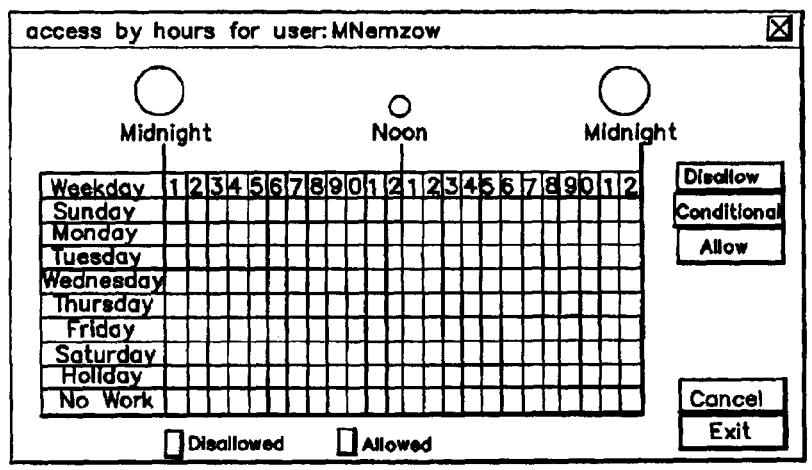
Figure   Time access control
FIG. 4

Figure ..Time Access report

Figure .AntiCopy configuration

Figure   Identity Friend or Foe challenge.

Figure   File scrubbing status report.

Figure   Command and Control recent activity.

Figure  Network Resources Management

| Colors | ☑ |
|---|---|
| error | ☑ |
| common word | ☑ |
|  | ☑ |
|  | ☑ |
|  | ☑ |
| upper case | ☑ |
| initial capital | ☑ |
| address | ☑ |
| postal code | ☑ |
|  | ☑ |
|  | ☑ |
| location | ☑ |
|  | ☑ |
|  | ☑ |
|  | ☑ |
|  | ☑ |
|  | ☑ |
| date | ☑ |
|  | ☑ |
|  | ☑ |
|  | ☑ |
|  | ☑ |
|  | ☑ |
| punctuation | ☑ |
| non-word char | ☑ |
| numeric char | ☑ |
| letter lines | ☑ |
| telephone | ☑ |
|  | ☑ |
|  | ☑ |
|  | ☑ |
|  | ☑ |
| included | ☑ |
| excluded | ☑ |
| file name | ☑ |
| file property | ☑ |
| properties | ☑ |
| hidden/deleted | ☑ |
|  | ☑ |
|  | ☑ |
|  | ☑ |
| unknown | ☑ |
| Exit | |

FIG.11

Figure   Color coding of prioritized categories

Figure   Services and functions feature request form

FIG.13

Figure    Report of words that have been categorized but not extracted

Figure    E-Mail support form.

Figure - Minimized display of extractions in progress.

Figure   File management of extracted data streams

Figure  List of words to always exclude from the extraction process

Figure  Transport and shuffling control of streams

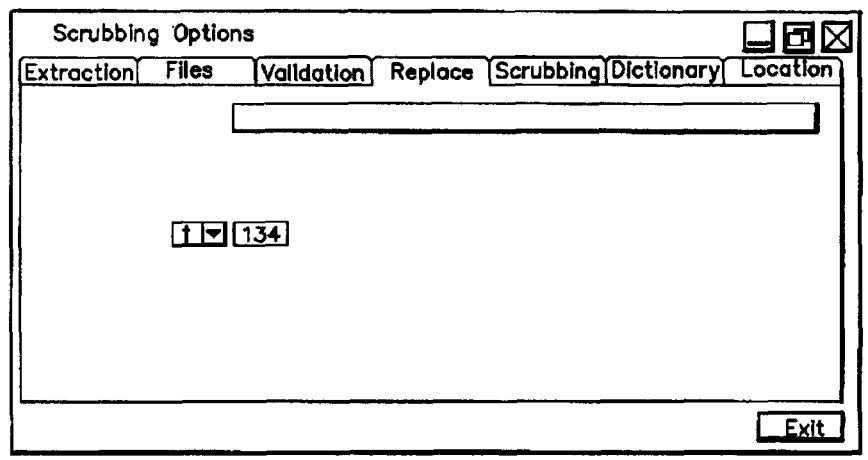
Figure   Output extrection display options       FIG. 20
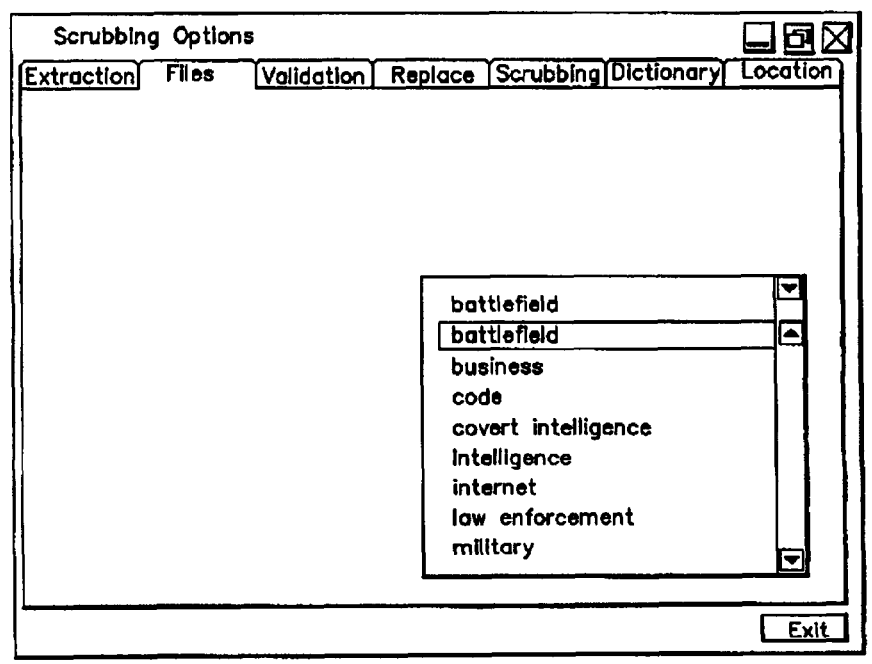
Figure   Supplemental dictionary and categorization
control for extration prioritzation.       FIG. 21

Figure    Reconstruction options

Figure  Source and output stream validation options

Figure  Reconstitution and security access options.

Figure    List of data objects removed from source stream.

Figure    Selection of placeholders for data objects

Figure    Statistics report

Figure  Command and Control local disk management in process

Figure    Previously processed data stream report and status.

Figure    Transport configuration options.

Figure 31. Storage services configuration options.

Figure    Security configuration options.

Figure  Automatic insertion of URL into a document

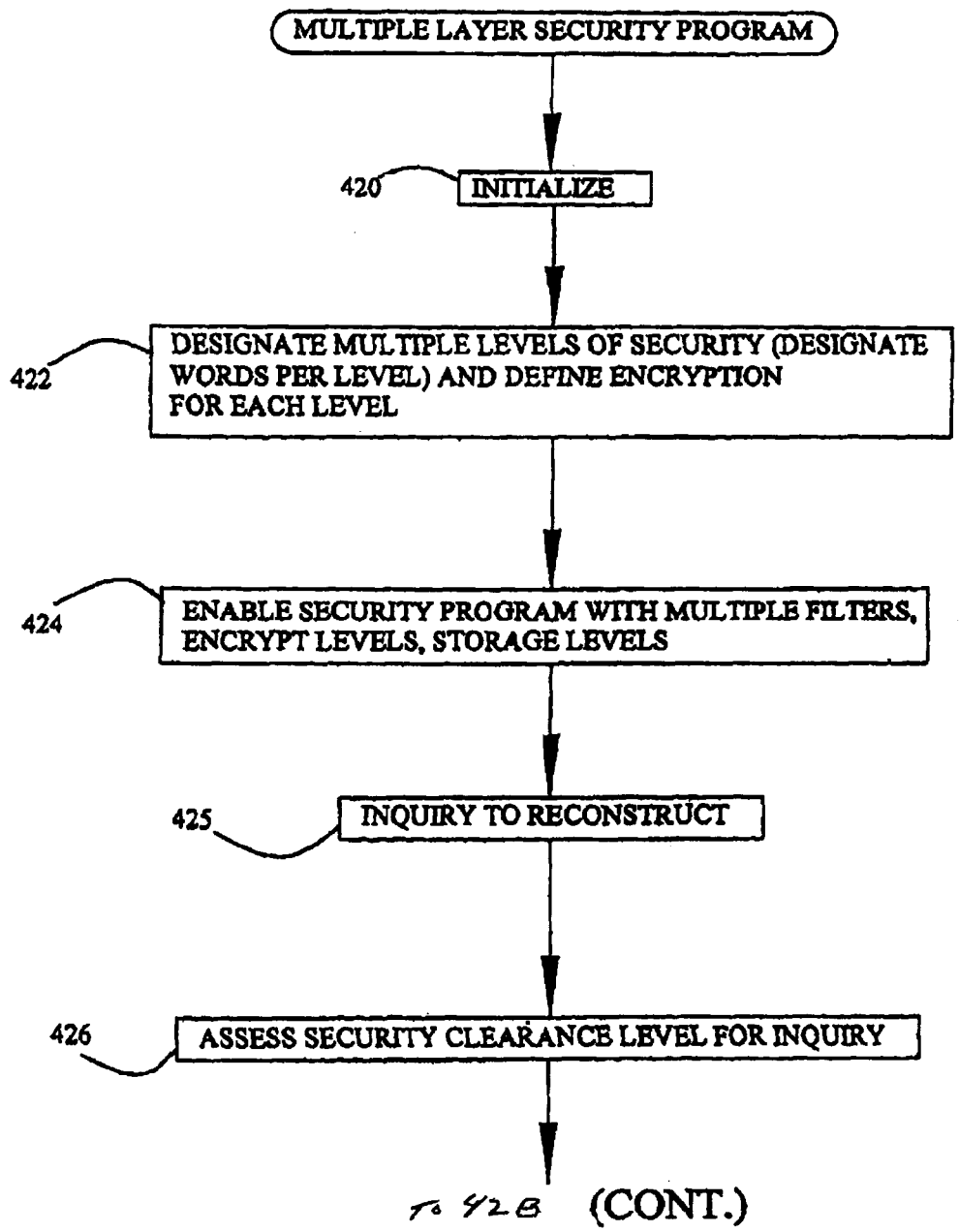

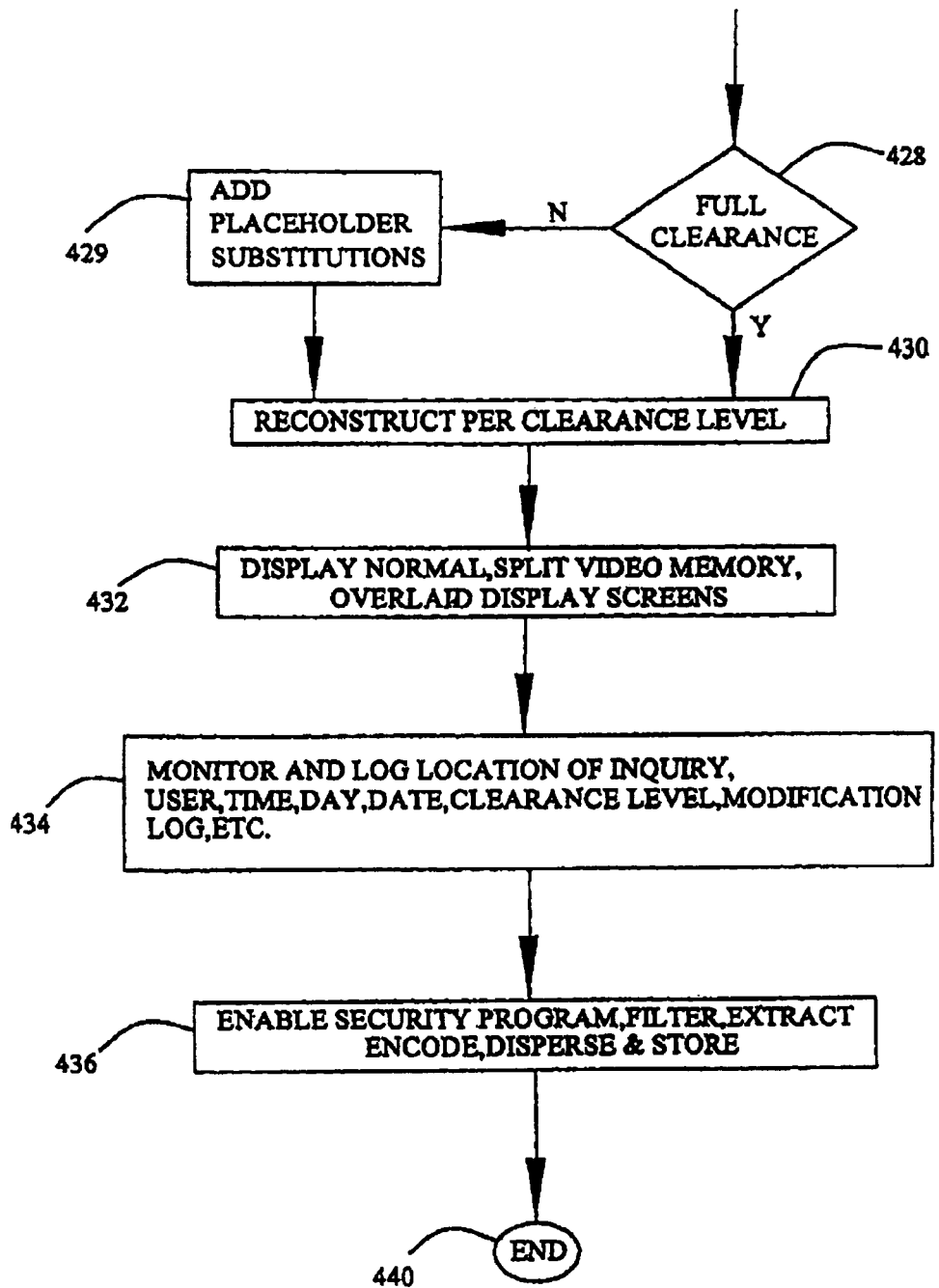

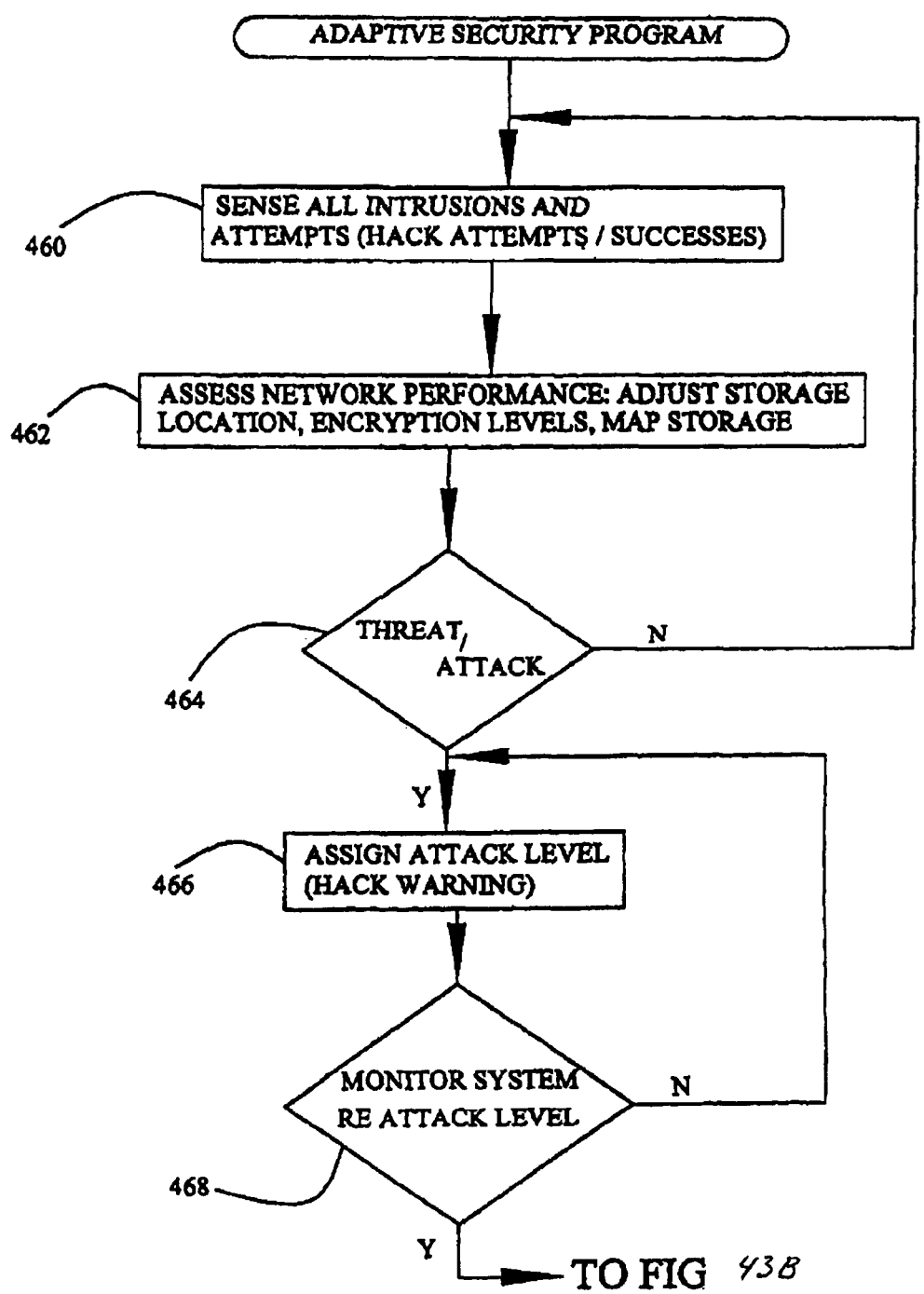

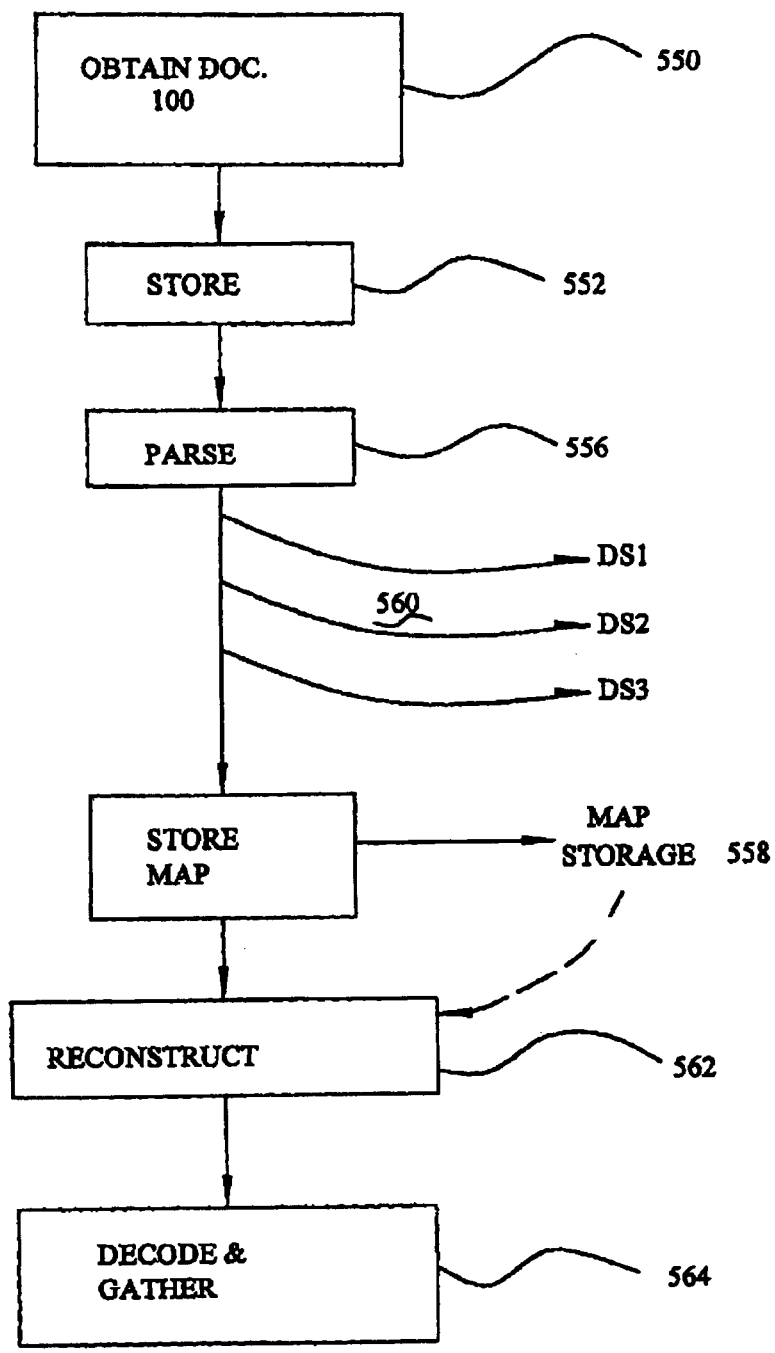

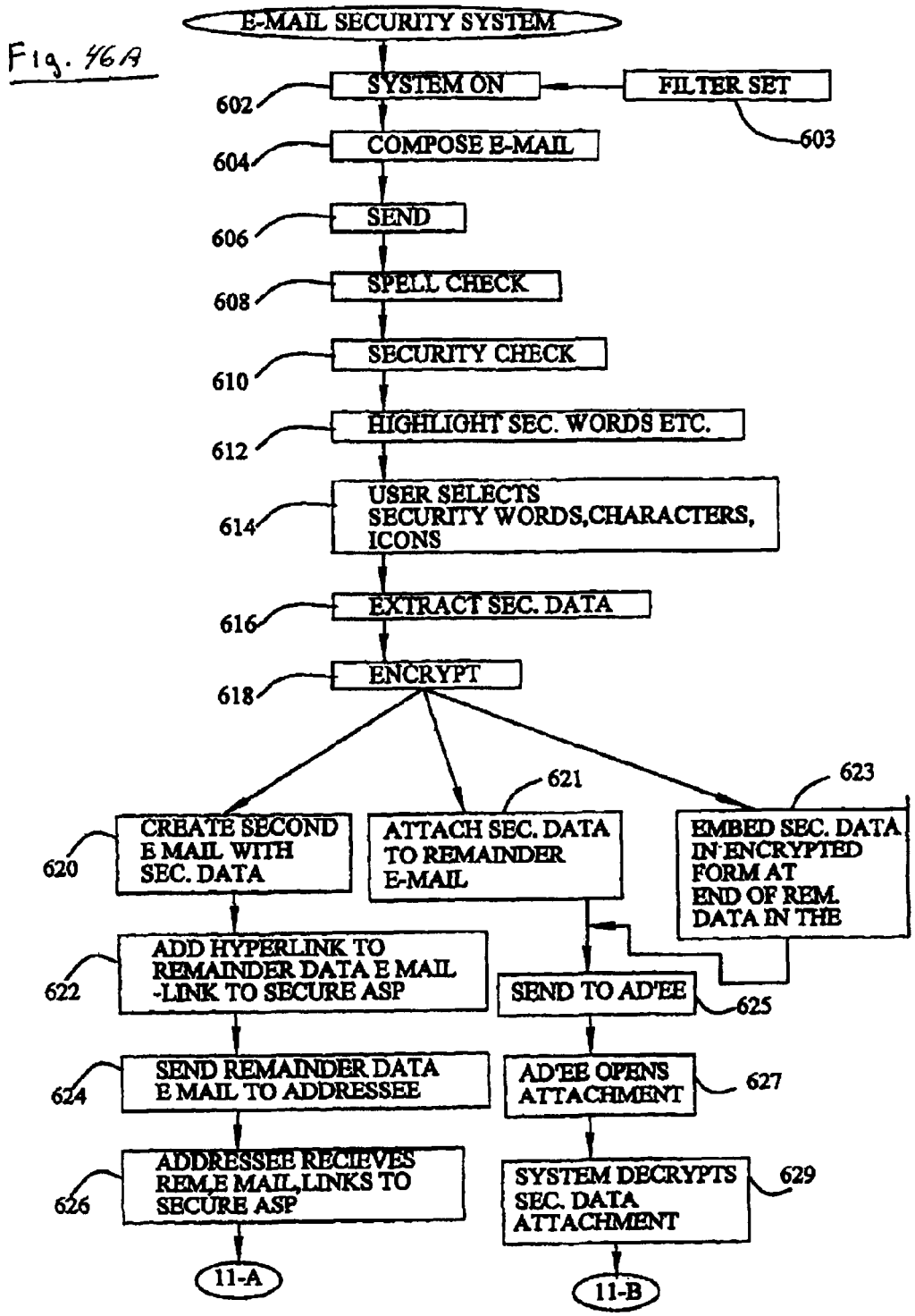

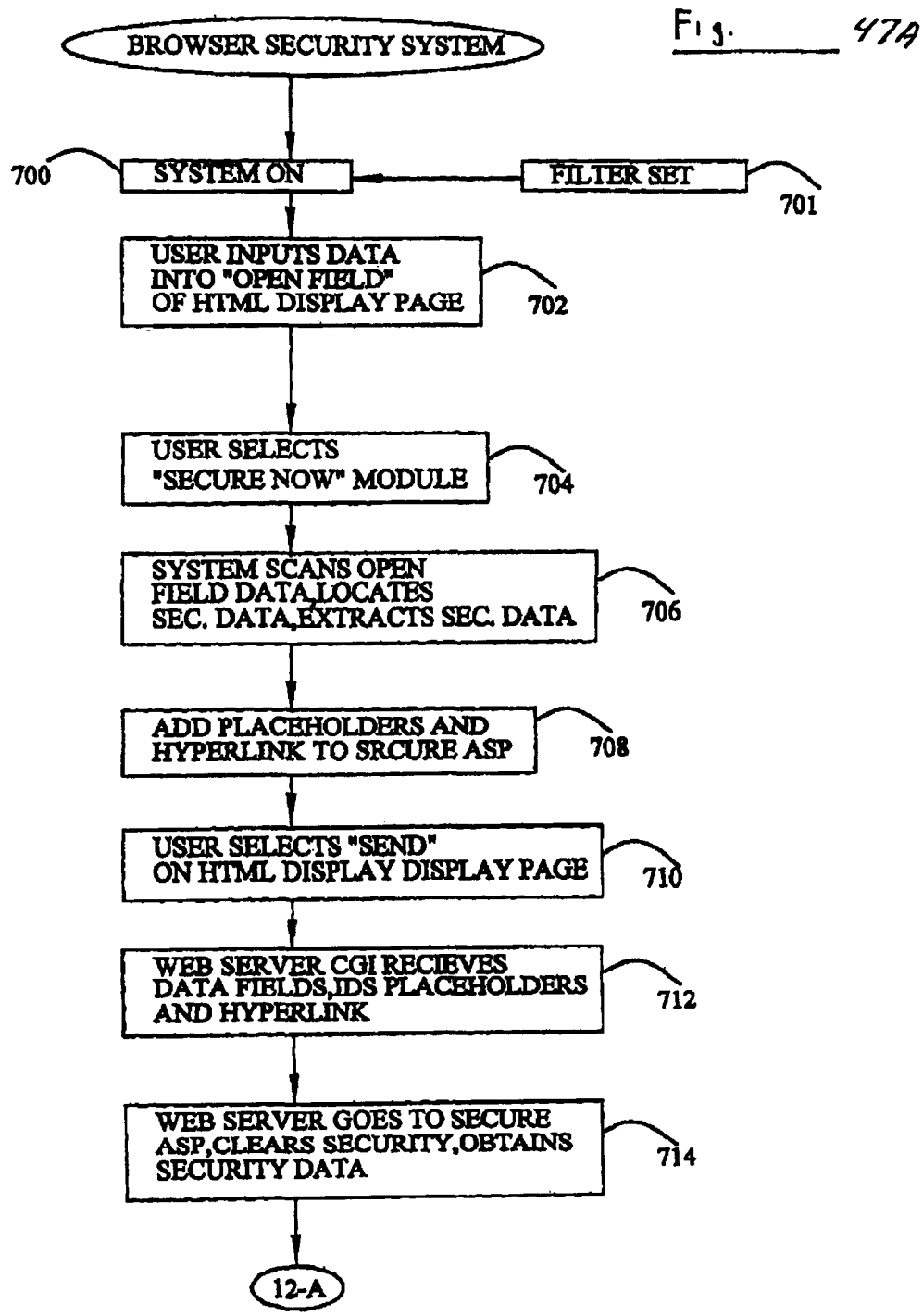

*DigitalDoors* Automatic Defenses Matrix

Active real-time defenses with inclusion of a module for intrusion detection triggering input:

- ■ Operation on regular basis
- ☑ Operation on emergency basis only

Standard Automatic Defenses Matrix.

| Mode | Normal | Threat | Attack |
|---|---|---|---|
| Encryption | Targeted Encryption | Full Encryption | Multi Type Encryption |
| Extraction | Plain-text Extraction | Extraction of encrypted | Extraction of Multi Type Encryption |
| Distributed Dispersion | Single Storage Location | Several Storage Locations | Many Storage Locations |
| Display | Single display | Color/Dither Protection | Multiple Displays |

Optional Automatic Defenses Matrix.

| Mode | Normal | Threat | Attack |
|---|---|---|---|
| Substitution Code Word | None | Partial | Many |
| Substitution of Misinformation | None | Partial | Many |
| Controlled Release Storage | Full | Partial | Conditional |
| | 2 | 4 | 10 or more |
| Time for Release | Anytime | Working Hours | Conditional |
| Authorized User | Many | Partial | Conditional |
| What to Release | All | Partial | Conditional |
| Secret Sharing | None | Two Users | As Configured |

| | Wizard | Regular Work Mode | | | | | | | | |
|---|---|---|---|---|---|---|---|---|---|---|
| | | Extraction | | | | Storage | | | | |
| | | Extract Im | Extract In | Extract En | Extract End c | Web | Offline | Remote | Removabl | Local |
| social security | | | | | | | | | | |
| credit card | | | | | | | | | | |
| included | | | | | | | | | | |
| last name | | | | | | | | | | |
| number | | | | | | | | | | |
| telephone | | x | x | | | | | x | | |
| name | | x | x | | | | | x | | |
| URL | | x | x | | | | | x | | |
| e-mail | | x | x | | | | | x | | |
| uppercase | | x | x | | | | | x | | |
| initial capital | | x | x | | | | | x | | |
| currency | | | x | | | | | | | x |
| postal code | | | x | | | | | | | x |
| address | | | x | | | | | | | x |
| location | | | x | | | | | | | x |
| date | | | x | | | | | | | x |

FIG. 53

| | Wizard | Regular Work Mode | | | | | | | |
|---|---|---|---|---|---|---|---|---|---|
| | | Extraction | | | | Storage | | | |
| | | Extract Im | Extract In | Extract En | Extract End c | Web | Offline | Remote Removabl | Local |
| social security | x | | | | | | | x | |
| credit card | x | | | | | | | x | |
| included | x | | | | | | | x | |
| last name | x | | | | | | | x | |
| number | x | | | | | | | x | |
| telephone | | x | | | | | | x | |
| name | | x | | | | | | x | |
| URL | | x | | | | | | x | |
| e-mail | | x | | | | | | x | |
| uppercase | | x | | | | | | x | |
| initial capital | | x | | | | | | x | |
| currency | | | x | | | | | | x |
| postal code | | | x | | | | | | x |
| address | | | x | | | | | | x |
| location | | | x | | | | | | x |
| date | | | x | | | | | | x |

FIG. 54

| Wizard | Regular Work Mode | | | | | | | | |
|---|---|---|---|---|---|---|---|---|---|
| | Extraction | | | | Storage | | | | |
| | Extract Im | Extract In | Extract En | Extract End c | Web | Offline | Remote | Removabl | Local |
| social security | x | | | | | | | x | |
| credit card | x | | | | | | | x | |
| included | x | | | | | | | x | |
| last name | x | | | | | | | x | |
| number | x | | | | | | | x | |
| telephone | x | | | | | | | | x |
| name | x | | | | | | | | x |
| URL | x | | | | | | | | x |
| e-mail | x | | | | | | | | x |
| uppercase | x | | | | | | | | x |
| initial capital | x | | | | | | | | x |
| currency | | x | | | | | | | x |
| postal code | | x | | | | | | | x |
| address | | x | | | | | | | x |
| location | | x | | | | | | | x |
| date | | x | | | | | | | x |

FIG. 55

Sample Transmission
"Top Secret"
Display of a Document with Validated Password Authorization and/or Biometric Identification Attention: Ross Anderson, CIA Afghanistan Desk
    Don Adams, Homeland Security
    Roy Manush, FBI
    Marvin Alen, FAA RE: New leads Pakistani intelligence located bin Laden 20 miles from Kabul. He is using the name Abu Turk, and dressed as a Taliban preacher. With him are his lieutenants, Omar Moad and Basher Tallman. He is communicating with the international media through Mr. Tom Parise, who resides at 320 Lincoln Drive, Alexandria, Virginia. Telephone is 878-9900 and Facsimile is 778-9854. Two individuals closely connected with Parise had planned to board a flight from Logan International Airport to Ronald Reagan International Airport on the morning of November 7. Amar Ladiyn is 42 years of age, a naturalized American citizen with social security number 255-78-7888. He resides (last known address) at 175-18 Riverside Drive, Manhattan, New York, phone 212 554-7896. He is a council member in the New York City Municipality. Bali Avood, a British citizen, 57 years old, is a former pilot with the resistance movement in Nicaragua, and is well-known to CIA handlers for his part in various funded operations. His residence is unknown. He might be related to the Avaod Family controlling the British Bank of Commerce.

Updates Will follow.

O. North
National Security Council

Notes: the source can be any data stream with any arbitrary freeform or structured format. This can include transactions, transactional records, database records, database structures, text, ASCII, EBCDIC, unitype, audio, image, video, or multimedia formats.

FIG. 56

Extraction of Critical and Important Data
Dispersal of Critical and Important Data Encrypted to Distributed Storage Locations with Substitution by Placeholders Attention: ███ ███, ███ ███ Desk
███ ███, Homeland Security
███ ███, ███
███ ███, ███

███: New leads

███ intelligence located ███ ███ ███ miles from ███. He is using the name ███ ███, and dressed as a ███ preacher. With him are his lieutenants, ███ ███ and ███ ███. He is communicating with the international media through Mr. ███ ███, who resides at ███ ███ ███, ███ ███. Telephone is ███ and Facsimile is ███. ███ individuals closely connected with ███ had planned to board a flight from ███ International Airport to ███ ███ International Airport on the morning of ███ 7. ███ ███ is ███ years of age, a naturalized American citizen with social security number ███. He resides (last known address) at ███ Riverside ███, ███, New ███, phone ███ ███. He is a council member in the New ███ ███ Municipality. ███ ███, a ███ citizen, ███ years old, is a former pilot with the resistance movement in ███, and is well-known to ███ handlers for his part in various funded operations. His residence is unknown. He might be related to the ███ Family controlling the ███ ███ of Commerce.

Updates ███ follow.

O. ███
███ Security ███

███/███/2001 22:44 Zulu

---

Explanation: the resulting sample freeform document (e-mail, MIME, S/MIME, text, teletype, facsimile, or immediate messaging) showing the extracted material replaced by numerical 3 of 9 barcodes (either random or sequential), a two pass process. The barcodes could as easily be any other barcode system, including all 2-D and 3-D methods.

Note that reconstitution works just fine. The recovery file(s) for reconstitution could be remotely stored, dispersed, and/or encrypted governed by numerous options on location, dispersion, encryption, and MultiCryption. The extended extraction system utilizing inclusion, exclusion, categorization, and syntactic rules has been used for this sample.

FIG. 57

Extraction of Critical and Important Data
Dispersal of Critical and Important Data Encrypted to Distributed Storage Locations with Substitution by Leveled-Access Placeholders

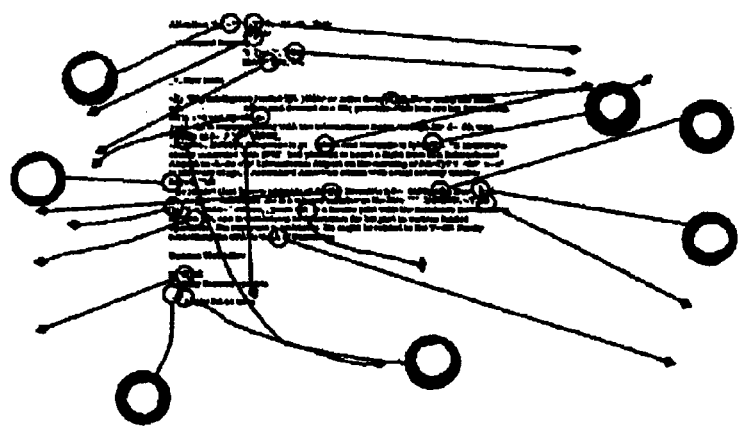

Explanation: each in-situ extraction is stored to different locations, each with a different encryption, different encryption method, and different key. By sequentially for each extraction combining method, key, and encryption, and reconstituting that result into the document, the source is restored in whole or in part. Part is controlled by various granular options.

FIG. 58

Extraction of Critical and Important Data
Dispersal of Critical and Important Data Encrypted to Distributed Storage Locations
with Substitution by Leveled-Access Placeholders Attention: [security level 4] [security level 4], [security level 4] [security level 4] Desk
    [security level 4] [security level 4], Homeland Security
    [security level 4], [security level 4]
    [security level 4] [security level 4], [security level 4]

RE: New leads

[security level 2] intelligence located [security level 4] 20 miles from [security level 4]. He is using the name [security level 4], and dressed as a [security level 4] preacher. With him are his lieutenants, [security level 4] and [security level 4]. He is communicating with the international media through Mr. [security level 4], who resides at [security level 3], [security level 4], [security level 4]. Telephone is [security level 1] and Facsimile is [security level 1]. Two individuals closely connected with [security level 4] had planned to board a flight from [security level 4] to [security level 4] on the morning of [security level 4] 7. [security level 4] is 42 years of age, a naturalized American citizen with social security number [security level 1]. He resides (last known address) at [security level 3], [security level 4], [security level 4], phone [security level 1]. He is a council member in the [security level 4] City Municipality. [security level 4], a British citizen, 37 years old, is a former pilot with the resistance movement in Nicaragua, and is well-known to [security level 4] handlers for his part in various funded operations. His residence is unknown. He might be related to the [security level 4] Family controlling the [security level 4] Bank of Commerce.

Updates [security level 4] follow.

O. [security level 4]
[security level 4] Security [security level 4]

---

Explanation: Granular hierarchical encryption (or MultiCryption) with remote and/or dispersed storage of recovery file(s).

FIG. 59

Extraction of Critical and Important Data
Dispersal of Critical and Important Data in Plain-Text to Distributed Storage Locations Attention: [_] [____], [_] [_____] Desk
  [_] [___], Homeland Security
  [_] [___], [_]
  [___] [___], [_]

[]: New leads

[_____] intelligence located [_] [___] [] miles from [___]. He is using the name [_] [_], and dressed as a [_____] 'preacher. With him are his lieutenants, [_] [___] and [____] [____]. He is communicating with the international media through Mr. [_] [___], who resides at [_]·[____] [___].
[____], [____]. Telephone is [_____] and Facsimile is [_____]. [_] individuals closely connected with [___] had planned to board a flight from [___] International Airport to [___] [___] International Airport on the morning of [____] 7. [_] [___] is [] years of age, a naturalized American citizen with social security number [_____]. He resides (last known address) at [_] Riverside [___], [____], New [_], phone [_] [____]. He is a council member in the New [_] [_] Municipality. [_] [_], a [____] citizen, [] years old, is a former pilot with the resistance movement in [_____], and is well-known to [_] handlers for his part in various funded operations. His residence is unknown. He might be related to the [___] Family controlling the [____] [_] of Commerce.

Updates [_] follow.

O. [___]
[_____] Security [_____]

[]/[]/[___] 22:44 Zulu

---

Explanation: the resulting sample freeform document (e-mail, MIME, S/MIME, text, teletype, facsimile, or immediate messaging) showing the extracted material replaced by delimiters. The replacement is shown at size rather than randomized in terms of length. Note that the recovery file(s) for reconstitution could be remotely stored, dispersed, and/or encrypted governed by numerous options on location, dispersion, encryption, and MultiCryption. The extended extraction system utilizing inclusion, exclusion, categorization, and syntactic rules has been used for this sample.

FIG. 60

Selection of Critical and Important Data
With Targeted Encryption In-Situ

Attention: ůq`« !~+}Ÿ˝Û, «B⁵ <'ô,; Desk
;8 ƒIÅѳ
, Homeland Security
"&. []~u:~, Ÿ@z
ŸJô, ð-L : New leads intelligence located TŸL )%åbr o⁺ miles from g[]Å[]. He is using the name &C# nÜ,ñ, and dressed as a $2( preacher. With him are his lieutenants, $Ü½ +°O and 9[]...ɸ⁹—
    He is communicating with the international media through Mr. å~ $O, who resides at < ÎÅÚCH.
, HØÜ⁴Qo. Telephone is g⁹^⁺pbvM and Facsimile is å⁵⁴q1[][ů. "E individuals closely connected with (Đ$F} had planned to board a flight from đån International Airport to    u «"4¹ International Airport on the morning of &Œ~[]⁷ ⁷."&5° -s+s° is xM years of age, a naturalized American citizen with social security number 5O[+%"åÑ
    He resides (last known address) at $©ŷ@ Riverside I[5+, sÒPĐĝÅ[]b, New Š>ð, phone    HÜΔmC. He is a council member in the New ¯¨¨ Muni⁹U¦<T. 9@ []y¨V, a f¶An~¨ citizen, , years old, is a former pilot with the resistance movement in m⁵VÑō¨œ, and is well-known to &⁷ handlers for his part in various funded operations. His residence is unknown. He might be related to the Ÿ⁺⁴Œ} Family controlling the HPÅⁿb %⁴ÌÅ of Commerce.

Updates Ÿò⁰ follow.

0.
        Security {ɡo°©la

Explanation: Granular hierarchical encryption (or MultiCryption) with remote and/or dispersed storage of recovery file(s) showing in situ display of encryption and/or MultiCryption.

FIG. 62

New technology for security based on data semantics, extraction, hiding, dispersion, and delivery that replaces or augments the tradition encryption methods

Single File Delivery FIG. 63

From: ↑↑↑↑↑ ↑↑↑↑↑↑↑↑ ↑↑↑↑↑↑ ↑↑↑↑↑↑ Bank New York To: New ↑↑↑↑↑ ↑↑↑↑↑↑↑↑ ↑↑↑↑↑
We will execute three-day repurchase agreements to infuse cash at ↑↑↑↑↑ to the following New York ↑↑↑↑↑↑ ↑↑↑↑↑ ↑↑↑↑↑↑↑↑↑ ↑↑↑↑↑↑↑ ↑↑↑↑↑
↑↑↑↑↑↑↑↑ ↑↑↑↑↑↑↑↑↑ contact ↑↑↑ ↑↑↑↑↑ ↑↑↑↑↑↑↑↑↑↑↑

↑↑↑↑ ↑↑↑↑↑↑↑↑↑ announced this morning that the ↑↑↑ would supply today ↑↑↑↑↑↑↑↑↑↑↑ liquidity. contact ↑↑↑ ↑↑↑↑↑ ↑↑↑ ↑↑↑↑↑↑↑

Lending to New York Stock Exchange specialists and California brokers must resume at ↑↑↑↑↑ to enable stock markets liquidity. E-mail ↑↑↑
↑↑↑↑↑ at ↑↑↑↑↑↑↑↑↑↑↑↑↑↑↑↑↑
Chicago banks should not take puts as collateral for next ↑↑↑ days. Be selective in loans to Chicago arbitrageurs. ↑↑↑ rule ↑↑↑↑↑ permits ↑↑↑
margin lending to customers of members. ↑↑↑ will not support such action today.
↑↑↑↑↑ Option lost ↑↑↑↑↑↑↑↑↑↑↑ in option trading today; do not support ↑↑↑↑↑ Option. E-mail legal department at ↑↑↑↑↑↑↑↑↑↑↑↑↑↑↑↑↑↑

↑↑↑↑↑↑ ↑↑↑↑↑↑ is requested by Clearing Company to deliver ↑↑↑↑↑↑↑↑↑↑ in margin calls. Need additional ↑↑↑↑↑↑↑↑↑↑ loans by ↑↑↑↑↑↑
Contact ↑↑↑ ↑↑↑↑↑ at ↑↑↑ ↑↑↑↑↑↑↑↑↑
From: ↑↑↑↑↑ ↑↑↑↑↑↑↑↑ ↑↑↑↑↑↑ ↑↑↑↑↑↑ Bank New York To: New ↑↑↑↑↑ ↑↑↑↑↑↑↑↑ ↑↑↑↑↑
We will execute three-day repurchase agreements to infuse cash at ↑↑↑↑↑ to the following New York ↑↑↑↑↑↑ ↑↑↑↑↑ ↑↑↑↑↑↑↑↑↑ ↑↑↑↑↑↑↑ ↑↑↑↑↑
↑↑↑↑↑↑↑↑ ↑↑↑↑↑↑↑↑↑ contact ↑↑↑ ↑↑↑↑↑ ↑↑↑↑↑↑↑↑↑↑↑

↑↑↑↑ ↑↑↑↑↑↑↑↑↑ announced this morning that the ↑↑↑ would supply today ↑↑↑↑↑↑↑↑↑↑↑ liquidity. contact ↑↑↑ ↑↑↑↑↑ ↑↑↑ ↑↑↑↑↑↑↑

Lending to New York Stock Exchange specialists and California brokers must resume at ↑↑↑↑↑ to enable stock markets liquidity. E-mail ↑↑↑
↑↑↑↑↑ at ↑↑↑↑↑↑↑↑↑↑↑↑↑↑↑↑↑
Chicago banks should not take puts as collateral for next ↑↑↑ days. Be selective in loans to Chicago arbitrageurs. ↑↑↑ rule ↑↑↑↑↑ permits ↑↑↑
margin lending to customers of members. ↑↑↑ will not support such action today.
↑↑↑↑↑ Option lost ↑↑↑↑↑↑↑↑↑↑↑ in option trading today; do not support ↑↑↑↑↑ Option. E-mail legal department at ↑↑↑↑↑↑↑↑↑↑↑↑↑↑↑↑↑↑

↑↑↑↑↑↑ ↑↑↑↑↑↑ is requested by Clearing Company to deliver ↑↑↑↑↑↑↑↑↑↑ in margin calls. Need additional ↑↑↑↑↑↑↑↑↑↑ loans by ↑↑↑↑↑↑
Contact ↑↑↑ ↑↑↑↑↑ at ↑↑↑ ↑↑↑↑↑↑↑↑↑

---BEGIN DigitalDoors BLOCK---

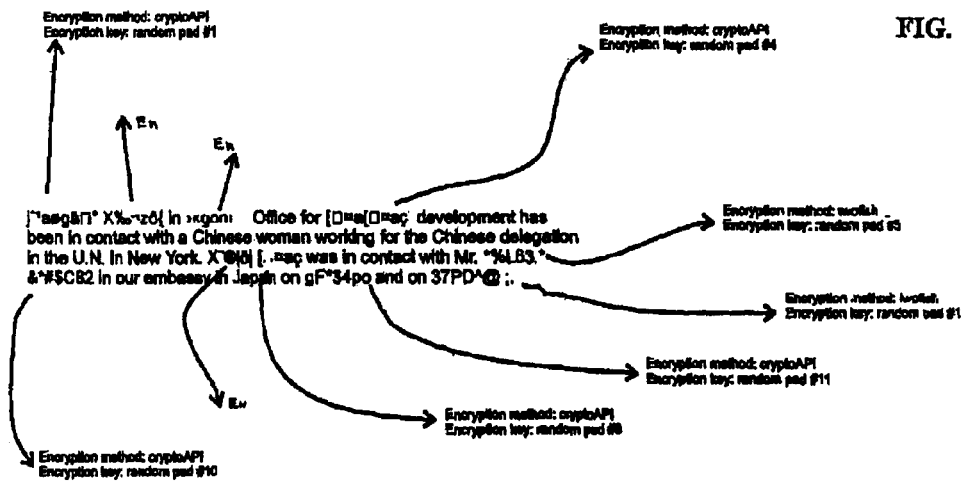
Figure: DigitalDoors multicryption sample with random selection of method and random one-time key generation.

FIG. 65A Encryption
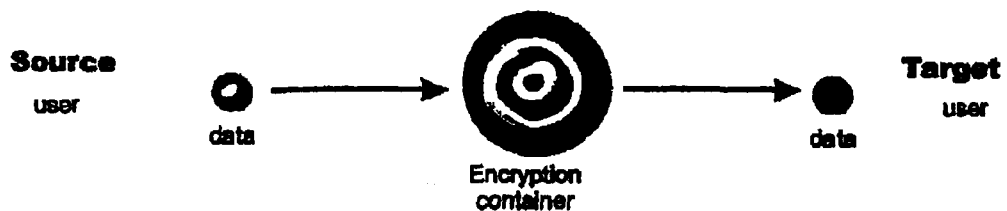
FIG. 65B Ciphering
FIG. 65C Steganography
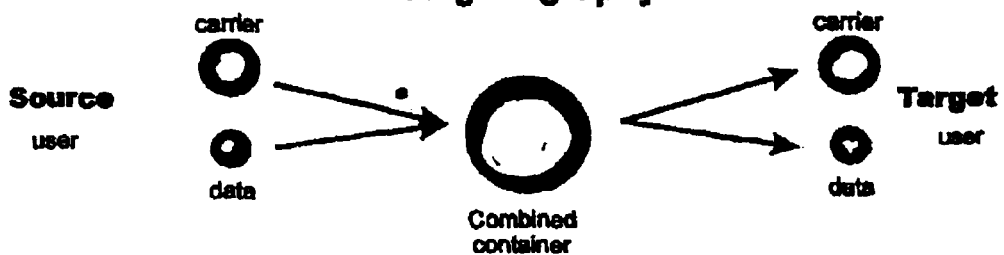
FIG. 65D Winnowing
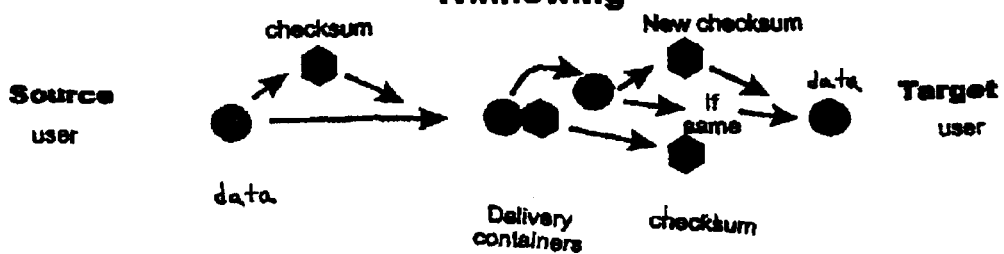

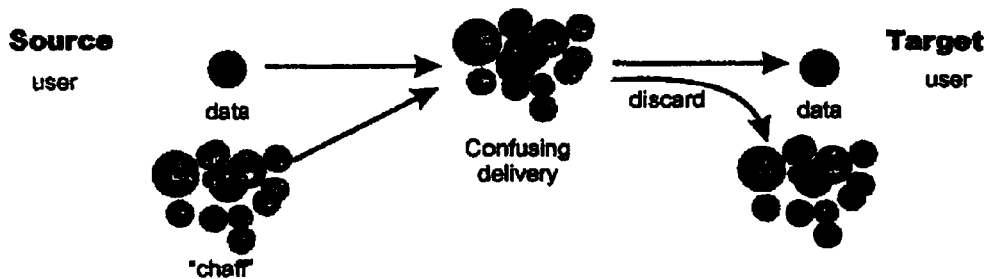
FIG. 65E Chaffing
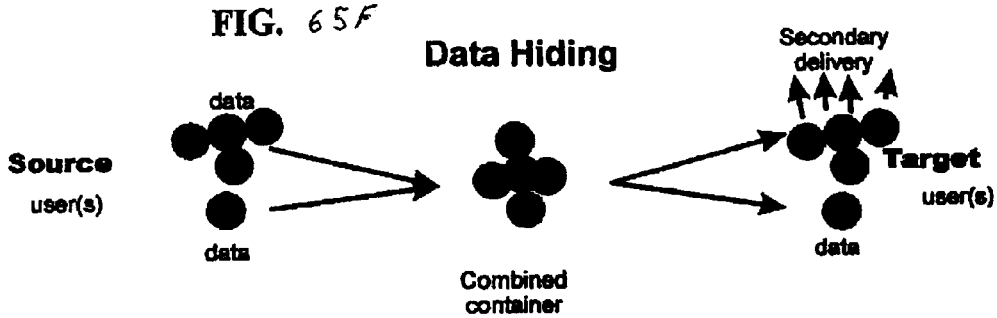
FIG. 65F Data Hiding
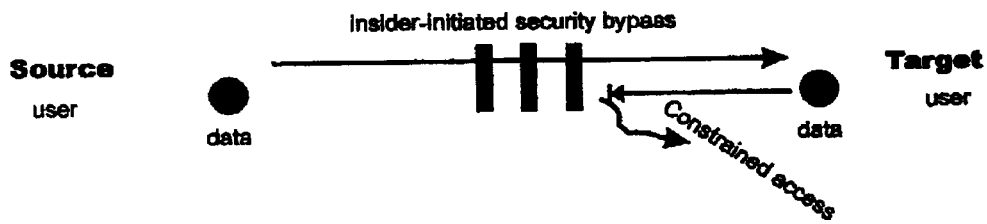
FIG. 65G Firewall

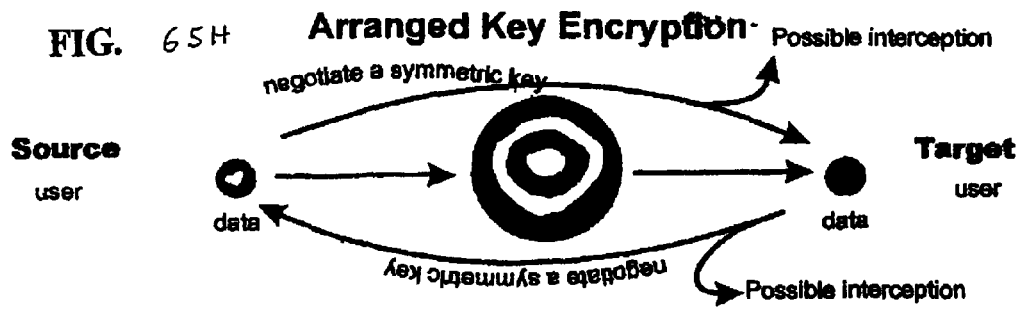
FIG. 65H Arranged Key Encryption
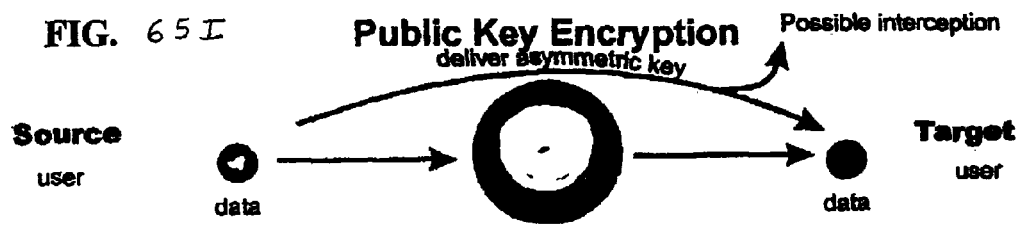
FIG. 65I Public Key Encryption
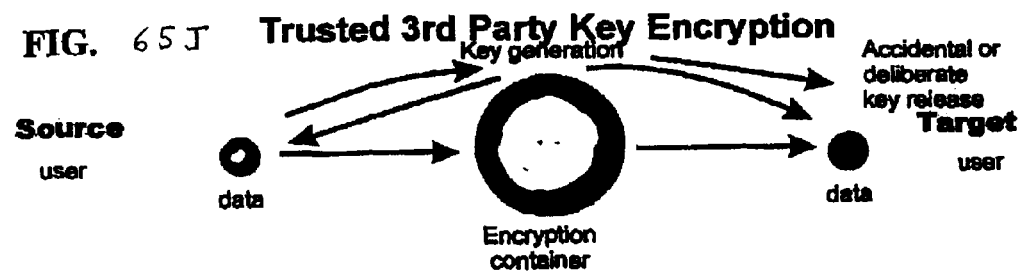
FIG. 65J Trusted 3rd Party Key Encryption
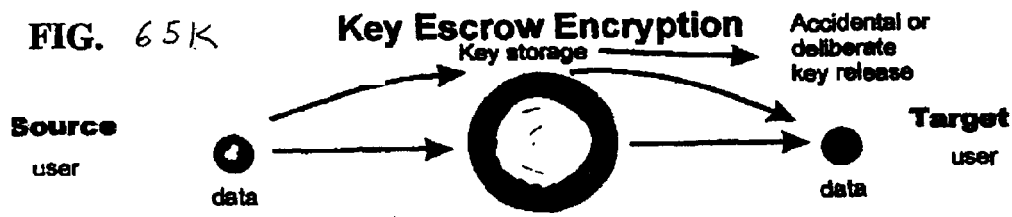
FIG. 65K Key Escrow Encryption FIG. 65L  Data Dispersion
FIG. 65M  Data Sharing
FIG. 65N  Diasporagraphy
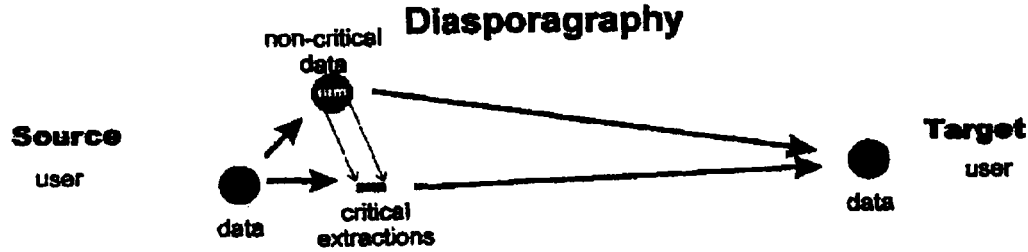

FIG. 72 *DIGITALDOORS* Process

The process of validating the user is multi-level security.

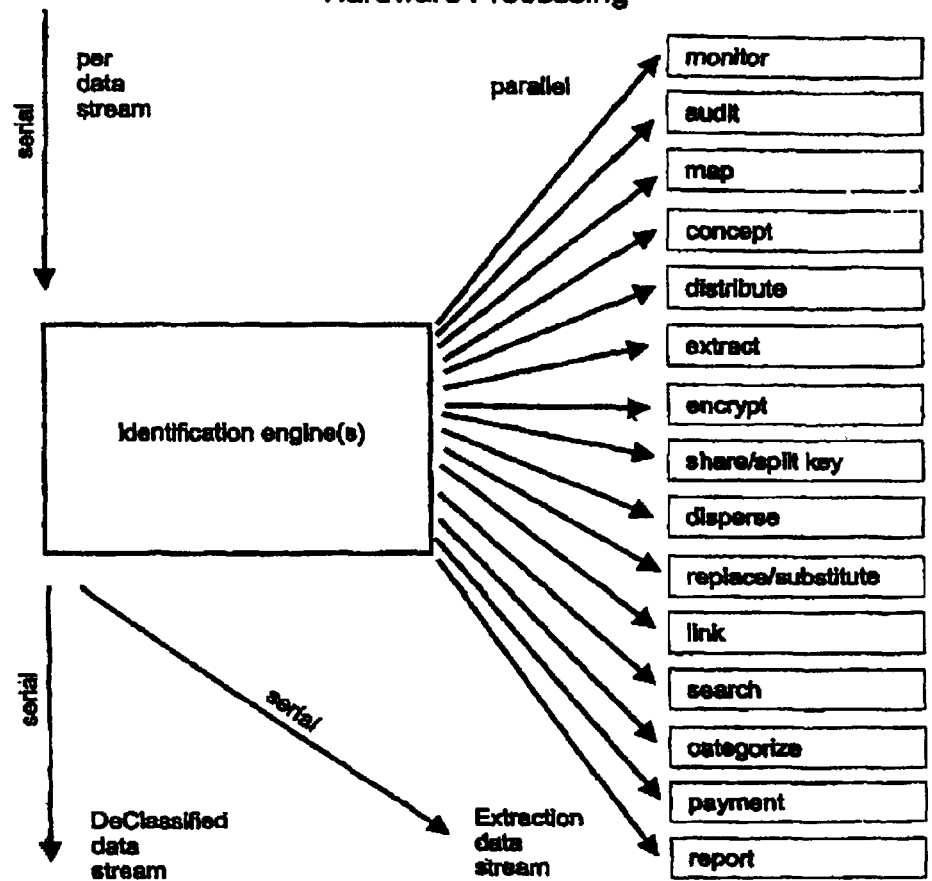

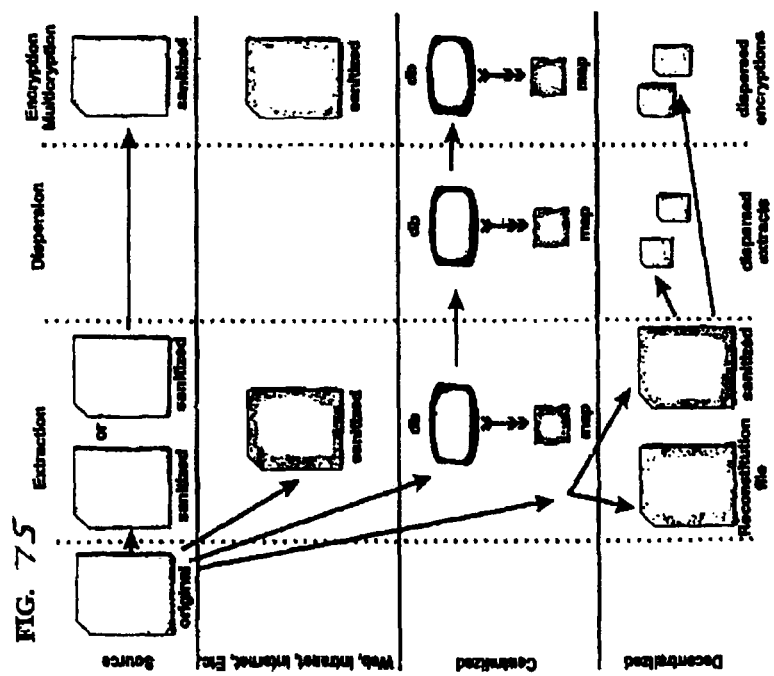

SECURITY SYSTEM WITH EXTRACTION, RECONSTRUCTION AND SECURE RECOVERY AND STORAGE OF DATA

This is a continuation-in-part of patent application Ser. No. 10/998,365 filed on Nov. 26, 2004, now pending, which was a regular patent application based upon and claiming the benefit of provisional patent application No. 60/525,507, filed Nov. 26, 2003, and is a continuation-in-part of patent application Ser. No. 10/277,196 filed on Dec. 31, 2002, and patent application Ser. No. 10/155,192 filed on May 23, 2002 and Ser. No. 10/155,525 filed on May 23, 2002, now U.S. Pat. No. 7,146,644, and which was a regular patent application claiming the benefit of provisional patent application No. 60/400,062 filed on Aug. 2, 2002, 60/400,112 filed on Aug. 2, 2002, 60/400,406 filed on Aug. 2, 2002, and 60/400,407 filed on Aug. 2, 2002, and is a continuation-in-part of patent application Ser. No. 10/008,209 filed on Dec. 6, 2001, now U.S. Pat. No. 7,140,044, and Ser. No. 10/008,218 filed on Dec. 6, 2001, now U.S. Pat. No. 7,146,644 and is a continuation-in-part of patent application Ser. No. 09/916,397 filed Jul. 27, 2001, now U.S. Pat. No. 7,103,915, which is a regular patent application is based upon provisional patent application No. 60/260,398, filed Jan. 9, 2001; application No. 60/287,813, filed on May 2, 2001; application No. 60/267,944, filed Feb. 12, 2001; application No. 60/247,242, filed Nov. 13, 2000 and application No. 60/247,232, filed Nov. 13, 2000. The contents of these references, claimed as priority herein, are incorporated herein by reference thereto.

The present invention relates to a Security System with Extraction, Reconstruction and Secure Recovery and Storage of Data. Sections describe various aspects of the invention.

The Objects of the Inventions are discussed in each section.

BRIEF DESCRIPTION OF THE DRAWINGS

FIG. 3 shows sample automatically extraction of sensitive data.

FIG. 4 shows time access control.

FIG. 11 shows color coding of prioritized categories.

FIG. 13 shows services and functions feature request form.

FIG. 20 shows output extraction display options.

FIG. 21 shows supplemental dictionary and categorization control for extraction prioritization.

FIG. 38A diagrammatically illustrates interleaving distinct data into different memory locations in a video memory.

FIGS. 42A-42B diagrammatically illustrate a flowchart showing the key component steps for the multiple layer security program for the community of users.

FIGS. 43A, 43B diagrammatically illustrate a flowchart showing the key components of an adaptive security program adaptable to various levels of electronic attacks, hacker or hack attacks.

FIG. 45 diagrammatically illustrates a chart showing the key components of the parsing, dispersion, multiple storage and reconstruction (under security clearance) of data.

FIGS. 46A and 46B diagrammatically illustrate a flowchart showing the key components of one embodiment of the e-mail security system (jump points 11-A and 11-B link the flow charts).

FIGS. 47A and 47B diagrammatically illustrate a flowchart showing the key components of one embodiment of the invention implements the security system on a web browser (jump point 12-A links the flow charts).

FIG. 51 shows Digitaldoors automatic defenses matrix.

FIG. 52 shows regular work mode.

FIG. 53 shows threat mode.

FIG. 54 shows attack mode.

FIG. 55 shows sample transmission—top secret—display of a document with validated password authorization and/or biometric identification.

FIG. 56 shows extraction of critical and important data—dispersal of critical and important data encrypted to distributed storage locations with substitution by placeholders.

FIG. 57 shows extraction of critical and important data—dispersal of critical and important data encrypted to distributed storage locations with substitution by leveled-access placeholders.

FIG. 58 shows extraction of critical and important data—dispersal of critical and important data encrypted to distributed storage locations with substitution by leveled-access placeholders.

FIG. 59 shows extraction of critical and important data—dispersal of critical and important data in plain-text to distributed storage locations.

FIG. 60 shows selection of critical and important data.

FIG. 62 shows new technology for security based on data semantics, extraction, hiding, dispersion, and delivery that replaces or augments the tradition encryption methods.

FIG. 63 shows single file delivery.

FIG. 64 shows survivability and security technologies for the new century.

FIG. 65A shows encryption.

FIG. 65B shows ciphering.

FIG. 65C shows steganography.

FIG. 65D shows winnowing.

FIG. 65E shows chaffing.

FIG. 65F shows data hiding.

FIG. 65G shows firewall.

FIG. 65H shows arranged key encryption.

FIG. 65I shows public key encryption.

FIG. 65J shows trusted 3rd party key encryption.

FIG. 65K shows key escrow encryption.

FIG. 65L shows data dispersion.

FIG. 65M shows data sharing.

FIG. 65N shows diasporagraphy (a).

FIG. 74 shows hardware processing.

FIG. 75 shows extraction—dispersion—encryption multi-cryption.

Figure 1:
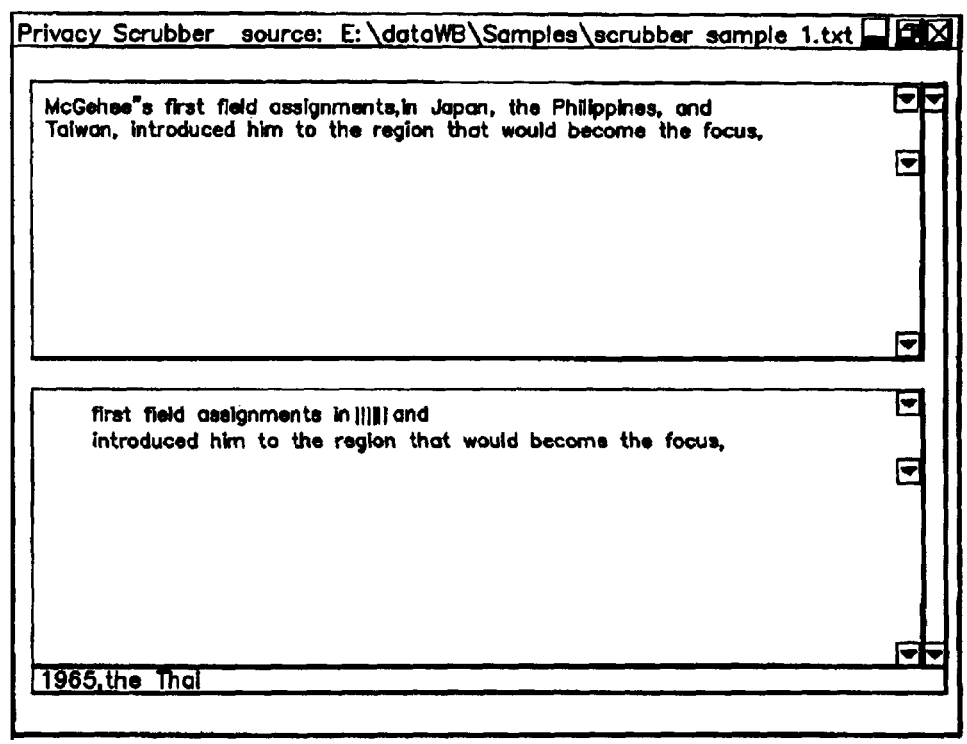
FIG. 1 shows extraction in progress

EXTRACTION AND CONTROLLED RELEASE OF INFORMATION SELECTION, EXTRACTION, TRANSPORTATION, STORAGE AND RECONSTITUTION

Conception

Circumstances

During the process of implementing a financial turnaround consulting business, we discovered the complexity of the business model and the obvious need to redefine and create new systems and methods for doing business. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.

Purposes and Advantages of Invention

The invention is a machine and process and its main purposes and advantages are as follows:

To automatically control selection of data objects within a data stream and release them in a controlled method only to authorized parties.

To automatically separate data objects within a data stream into two or more digital data streams according to the importance and categorization of contents, through extraction and removal of the prioritized content and its replacement by appropriate placeholders.

To automatically control selected contents in E-mail, and enable its release in a controlled method only to authorized parties.

To enable users to leverage the growth in computer and telecommunications connectivity and electronic commerce by reducing security risks.

To enable users to release documents, digital files, and data streams into closed and opened digital networks with the confidence that important, identifying, and critical contents in that documents, digital files, and data streams is secure and will be seen only by authorized parties.

To enable real time simultaneous customization and personalization of selected contents within a data stream to different parties, allowing instant display of the selected content or part of it based on, and tailored made to the status of the user or receiving party.

To secure the important and critical contents of a document or digital file by transporting said contents into a separated data stream and removing said data stream to a removed storage memory, while eradicating any copies, temporary caches, or traces of the removed extracts on the original computer or machine.

To enable instant return transfer to the display or to another display all or part of extracted content instantly with verification of authorized user.

To create a projection of the original document, digital file, data objects within a data stream, or variations of it through combined projection of the splinted data streams, while maintaining separation between the data streams.

To create an alternative method for security, instead of encryption, which is secure, cost effective, less time-consuming, and flexible.

To enable automatic timed removal of specific content items, automatically or manually selected from a document, digital file, or data objects within a data stream.

To enable an automatic timed reconstruction (reconstitution) of the said document, digital file, or data objects within a data stream.

The system and method creates a high level of security by automatic selection and removal of critical and prioritized contents from a data objects stream, whether it be a digital document, digital file, database, sound bite, video clip, other structured, or streaming data formats.

The system and method enables a controlled release of the extracted data objects, enabling instant display of the instantaneous returned contents, contingent on verification of user identity, access rights, time of operation, location of source and or user, destination of source and or user, and determine threat modes.

The system and method delivers high security by removal of the selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract can also be substituted on-the-fly to provide updated results, misinformation, disinformation, messages, alerts, links (to reports, data mining, search engines, web sites, and hyperlinks understood in the current art), advertisements, and personalization and customization. The said validation can be done instantly by password, challenge questions and answers, remote verification (phone, video, or personal contact with user), or by biometrics means.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including: security risk criteria of threats and attacks, sources, targets, users, policies, time of day, and threat modes.

The extracted data is transported to an online removable storage and under extreme security threats to an offline/off-network, digital or physical vaulted storage. Transport and shuttle is based on the level of security alert. The use and release of the vaulted extractions is controlled by a set of rules or organizational policy which includes the following options among others:

A vaulting of some, all, or specific data object extracts for long or short periods of time.

Release of extractions into a display, in which the extracted data objects will reconstitute with the modified original data stream, the original data objects stream or original document.

Release of extractions into a projection display in order to project with the modified data stream, the original document while maintaining complete separation of the modified source data stream (the source modified by the extraction of data objects and insertion of placeholders) and the extracted data object streams.

Release of extractions into a projection display in order to project a reconstitution of the original document, in other words to create altered versions of the original document, while maintaining complete separation of the modified data stream and the extracted streams.

In situations of high security threats, release of extractions into another projection display, PDA, floppy disk, paper document a wireless display, an overlay transparency while maintaining logical and physical separation of delivery streams. This will enable working with a representation of the initial source, but not the initial source itself, while understanding the prevalent, critical extracted information without comprising security to the initial source material by exposing sensitive, identifying, or critical information.

The distribution of sources, modified sources, or extracts to remote and distributed viewing devices.

Enable the ongoing operation of information delivery and display in defiance of known ongoing or unknown security flaws, breaches, or events compromising the general state of security.

The delivery of distinct and separate data streams, delivered on the same or different channels and media, each with minimal, limited, or even substantial usefulness in and by itself, that can be overlaid logically or physically to reconstitute the identifying data stream and display. Separate display devices can be used to create a composite image or they can be overlaid to physically separate display devices to reconstitute a useful composite display.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted storage. Competitors or hackers, who learn that a computer or network is protected by the system and method, might decide to attack another target instead. This is comparable to a situation in which a bank robber, who finds out that the bank vault is empty, will most probably look for another bank.

The system and method has a menu of different options including the ability to extract:

All existing databases on the computer or network.

All newly loaded, mounted, or integrated data to the computer or network.

All plug-in memory devices (temporary or permanent) containing data.

All new and imported data to the computer or network.

All new work and output created by the computer or network.

All data being transported in/out of the computer or network including electronic mail.

All data being transmitted in/out of the computer or network including electronic mail.

The system and method releases the extracted data streams, subject to a controlled-release mechanism and process. The release mechanism is contingent on parameters including; rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or hinder intruders. The system and method is very adaptable and flexible to provide additional layers of security, privacy, anonymity, redundancy, and backup through the selection, extraction, storage, transportation, and reconstruction processes. The dynamic architecture of the invention enables it to conduct an automatic real time configuration of its extraction/transport/recovery activities, in response to the challenge of attacks.

The invention's survivability modes enable:

Presetting of rules for computer or network functioning under attack or alert.

An automatic assessment of damage and automatic reaction to enable functionality of critical missions.

Another object of this invention is as a system and method for automatically creating customized and personalized versions of a document, data object, or data stream. In real time, simultaneous versions of the original are created and altered, then disseminated based on the status of the different users and their access privileges. The system and method enables content management and control by automatically locating content items prioritized by importance, transporting them to a secure memory, and releasing them under explicit controls or preset rules. Another object of the invention is as a system and method for control, analysis and management of important and prioritized information within documents, files, data object, and data streams. The system and method, enables the processing of all data objects at the time in which they are created or imported into the system. The said early stage processing, enables early stage inventorying of prioritized contents as well as early stage pattern recognition. Extracting critical information, such as credit card numbers, last names, first names, social security numbers, phones numbers, transaction dollar amounts and addresses, enables the system and method to aggregate data in categories and analyze the data in different optional methodologies including pattern recognition.

Another object of the invention is as a system and method for comprehensive monitoring of various activities including business activities in real time. With this level of detail, the system and method becomes a management information tool and information/data command and control center. The said system and method can include an alert system, which in effect creates a real time apparatus for command and control of the systems activities. In real time, and at any point in time, the user can get a comprehensive view of different activities including:

How many transactions are being processed, their content, their context, identity of the involved parties identity, their profiles, and the personnel involved.

How much money is being transacted.

When, in terms of dates, relevant to the transaction.

Where, in terms of geographical location, the transactions are taking place.

Where, in terms of geographical location, monies or goods are being transferred.

Which departments in the organization are involved.

Description

The invention is a machine consisting of the following elements. References to the "claims" herein only refer to a relation back feature.

1. A machine for automatically selecting, extracting data objects from an existing data objects stream, and automatically releasing selected extract data objects to a display, wherein said means comprising:
   A. A digital processing means for automatically selecting data object candidates for extraction from an existing data object stream located in a first memory.
   B. A digital processing means for automatically extracting selected data objects from an existing data object stream located in a fast memory.
   C. A digital means of transporting extracted data objects to a second memory.
   D. A digital means for controlled release of extracted data objects to a display and other outputs. Whereby automatically selected contents are separated and removed from original document, file and data stream, and thence transported to secured storage memory and controlled released based on security, preselected categories, rules and other triggers.
2. A machine for automatically selecting and extracting as defined in above in item 1, wherein said means comprising:
   A. A digital means for storing a first dictionary of characters and data objects.
   B. A digital means responsive to said dictionary for use as a filtering condition.
   C. A digital means for extracting data objects not mentioned in said dictionary.
3. A machine for automatically selecting and extracting defined in above in item 2, wherein said means comprising:
   A. A digital means for storing a second dictionary of characters and data objects.
   B. A digital means responsive to said second dictionary for use as a filtering condition.

C. A digital means for extracting any data object mentioned in said second dictionary.
4. A machine for automatically selecting and extracting defined in above in item 3, wherein said means comprising:
   A. A digital means for accepting additional data objects into dictionaries.
   B. A digital means enabling the adding of other dictionaries with said first and second dictionaries.
   C. Providing a digital means for customized dictionaries.
5. A machine for automatically selecting and extracting as defined in above in item 1, wherein said means comprising:
   A. A digital processing means for tagging and serializing derived selected data object extractions.
6. A machine for automatically selecting and extracting as defined in above in item 5, wherein said means comprising:
   A. digital filtering means for automatically sorting of said selected extracted data objects according to separate data objects categories.
   B. A digital processing means for labeling said sorted, selected data objects, with their respective categories.
7. A machine for automatically selecting and extracting as defined in above in item 1, wherein said means comprising:
   A. A digital processing means for automatically creating new data object categories, for the said sorting process.
8. A machine for automatically selecting and extracting as defined in above in item 1, wherein said means comprising:
   A. A digital means for substantially erasing, from all memories except second memory, all copies and links and traces of removed selected extracted digital objects.
9. A machine for automatically selecting and extracting as defined in above in item 1, wherein said means comprising:
   A. A digital means for substantially eradicating from all memories except for second memory, all links, copies, and traces, to separated and extracted data objects. Said eradication includes termination of related delivery means, defragmentation of associated files, overwriting relevant files, cleaning memories, and caches.
10. A machine for automatically selecting and extracting as defined in above in item 1, wherein said means comprising:
    A. A digital means for substituting the extracted selected data objects with other data objects.
11. A machine for automatically selecting and extracting as defined in above in item 1, wherein said means comprising:
    A. A digital means for substituting the extracted selected data objects with other data object placeholders including; serialization, characters, replacement of information with other information, messages, alerts, bar codes, links to other data, null sets, URLs, and web site addresses
12. A machine for automatically selecting and extracting as defined in above in item 1, wherein said means comprising:
    A. A digital processing means for configuring the scope of file selection in the automatic selecting and extracting process.
13. A machine for automatically selecting and extracting as defined in above in item 1, wherein said means comprising:
    A. A digital processing means for configuration of the scope of computer files selection for the automatic selecting and extracting process based on: file status, timing, preset rules and user's specific selection.
    B. A digital processing means for configuration of the scope of computer files selection for the automatically selecting and extracting process based on verifying of file existence, checking for recent activity, checking whether recent separation and extraction activity of data objects is up to date in accordance to modes and preferences.
14. A machine for automatically selecting and extracting as defined in above in item 1, wherein said means comprising:
    A. A digital processing means for establishing which computers, and digital machines in a network will be connected, accessible and interacting with said extracting machine.
15. A machine for automatically selecting and extracting as defined in above in item 1, wherein said means comprising:
    A. A digital processing means for initiating the selecting and extracting of data objects, triggered by preset rules for machine configuration.
16. A machine for automatically selecting and extracting as defined in above in item 1, wherein said means comprising:
    A. A digital processing means for initiating selecting and extracting of data objects, triggered by security alerts including threat mode and attack mode.
17. A machine for automatically selecting and extracting as defined in above in item 1, wherein said means comprising:
    A. A digital processing means for choosing the parameters for selecting and extracting of data objects, triggered by preset rules for machine configuration.
18. A machine for automatically selecting and extracting as defined in above in item 1, wherein said means comprising:
    A. A digital processing means for choosing the parameters for the selecting and extracting of data objects, triggered by security alerts including threat mode and attack mode.
19. A machine for automatically selecting and extracting as defined in above in item 1, wherein said means comprising:
    A. A digital processing means for interpreting the output of security intrusion detection means.
    B. A digital processing means triggering processing by said machine based on interpretation of output of security alerts and output of intrusion detection means.
20. A machine for automatically selecting and extracting as defined in above in item 1, wherein said means comprising:
    A. A digital means for removing from a data objects stream selected data objects including digital records, elements of records, characters
21. A machine for automatically selecting and extracting as defined in above in item 1, wherein said means comprising:
    A. A digital means for removing from a data objects stream selected data objects including: digital graphic images and segments of graphic images.
22. A machine for automatically selecting and extracting as defined in above in item 1, herein said means comprising:
    A. A digital means for removing from a data objects stream selected data objects including: digitized sound.
23. A machine for automatically selecting and extracting as defined in above in item 1, wherein said means comprising:
    A. A digital means for removing from a data objects stream selected data objects including: digitized video images and segments of video images.
24. A machine for automatically customizing, automatically selected content items, within in a data objects stream, wherein said means comprising:
    A. A digital data means for sorting extracted selected data objects into predefined contextual categories.
    B. A digital data means for assigning an extracted selected data objects a data objects category. Whereby items of the automatically selected content are sorted into prearranged defined categories such as: credit card numbers, social security numbers, last name first name addresses. Whereby the selected content items are sorted according to categories, and are available for release for display to users, according to user status and clearance.

25. A machine for automatically customizing selected content as defined in above in item 24, wherein said means comprising:
   A. A digital processing means for sorting extracted data objects into predefined categories.
   B. A digital processing means for identifying which extracted data objects should be released to a user.
      Whereby the selected content items are sorted according to categories, and are available for release for display to users, according to predefined rules set.
26. A machine for automatically customizing selected content, as defined in above in item 25, wherein said means comprising:
   A. A digital processing means enabling the altering of the selected data objects.
      Whereby different items of the automatic selected contents will be altered and available for display to users according to user status and clearance.
27. A machine for automatically customizing selected content as defined in above in item 26, wherein said means comprising:
   A. A digital processing means for enabling different extract data objects to be released to different users.
      Whereby different items of the automatic selected contents will be available for release to a user display according to a predefined rule set.
28. A machine for automatically customizing selected contents as defined in above in item 27, wherein said means comprising:
   A. A digital processing means for selecting which extracted data objects are targeted as descriptors for information searching.
   B. A digital processing means for presenting the targeted extracted data object contents to online search engines.
   C. A digital processing means for automatically presenting search results to authorized users. Whereby different items of the automatic selected contents are automatically targeted and presented to search engines and the search results and the items searched are available for display to users according to user status and clearance.
29. A machine for automatically customizing selected contents as defined in above in item 28, wherein said means comprising:
   A. A digital processing means for scoring and ranking contextual relevance of said search engine results.
   B. A digital processing means for presenting and linking, in a display, said scored and ranked search engines results with the extracted data objects
      Whereby search engine results are scored and ranked to achieve highest contextual relevance to the selected content items and available for display to users according to their status and clearance.
      Whereby there is no need for user to actively take any action like highlighting words, typing characters, the machine will automatically trigger searches for information and URL's relevant to the selected content items.
      Whereby there is no need for user to wait for search results relevant to the selected content items since the system automatically instructs said searches, at an early stage.
30. A machine for automatically customizing selected contents as defined in above in item 29, wherein said means comprising:
   A. A digital processing means enabling voice recognition and its presentation in a digitized form enabling the said machine to carry out its processes.
31. A machine for automatically customizing selected contents as defined in above in item 30, wherein said means comprising:
   A. A digital processing means for recognizing patterns of the selected and prioritized data objects within the data streams and assigning prioritization to various selected data content items.
32. A machine for automatically customizing selected contents as defined in above in item 31, wherein said means comprising:
   A. A digital processing means for submitting targeted selected extracts of data objects, to information search engines for display of relevant findings including: text, graphics, audio and video.
33. A machine for automatically customizing selected contents as defined in above in item 32, wherein said means comprising:
   A. A digital processing means for submitting targeted selected extracts to various machines and appliances for possible triggering of responses.
34. A machine for automatically transporting selected data objects to other memories and between memories for achieving higher level of security comprising:
   A. A digital processing means for selection of destination storage memory, triggered automatically by various preset criteria.
   B. A digital processing means for transport of said data objects to said selected storage memories, triggered automatically by various preset criteria and manually.
35. A machine for automatically transporting selected data objects as defined in above in item 34, wherein said means comprising:
   A. A remote memory storage media.
36. A machine for automatically transporting selected data objects as defined in above in item 35, wherein said means comprising:
   A. An offline memory storage media.
37. A machine for automatically transporting selected data objects as defined in above in item 36, wherein said means comprising:
   A. An Internet- and network-based memory storage media.
38. A machine for automatically transporting selected data objects as defined in above in item 37, wherein said means comprising:
   A. A copy and backup apparatus.
39. A machine for automatically transporting selected data objects as defined in above in item 38, wherein said means comprising:
   A. A digital means for encrypting and decrypting the data objects transported to storage memories.
40. A machine for automatically transporting selected data objects as defined in above in item 39, wherein said means comprising:
   A. A digital processing means for mapping the location and capabilities of the different connected and available memories.
   B. A digital processing means for mapping attacks, damage, and threats to the connected and available storage memories.
41. A machine for automatically transporting selected data objects as defined in above in item 40, wherein said means comprising:
   A. A digital means for triggering the bypass of damaged and threatened storage memories.
42. A machine for automatically transporting selected data objects as defined in above in item 41, wherein said means comprising:

A. A digital processing means for automatically configuring the hierarchy for connectivity between the data objects to be transported, and the storage memories according to user needs, preset rules, and security constraints.
43. A machine for automatically transporting selected data objects as defined in above in item 42, wherein said means comprising:
A. A digital processing means controlling the release of data objects from said storage memories based on user rights for access to the stored content.
B. A digital processing means controlling the release of data objects from said storage memories based on security constraints including intrusion threat and attack.
44. A machine for automatically transporting selected data objects as defined in above in item 43, wherein said means comprising:
A. A digital processing means for camouflaging data objects files by changing file identification structures.
45. A machine for automatically transporting selected data objects as defined in above in item 44, wherein said means comprising:
A. A digital processing means for camouflaging data objects files by removing root directory.
B. A digital processing means for camouflaging data objects files by removing name of file, links, references, shortcuts, and names of directory.
43. A machine for automatically controlled release of automatically selected extracted data objects, from a data object stream, into a display, wherein said means comprising:
A. A digital reading means for reading the selected extracted data object's assigned category.
B. A digital means for identifying user access rights to the specific selected extracted data objects based the data object category.
C. A digital processing means for synchronized controlled release of selected data objects from storage memory according to user access rights and privileges.
Whereby selected data objects are released from a memory into a user's display based on user's status and access privileges to such content.
44. A machine for automatically controlled release of extracted data objects, as defined in above in item 43, wherein said means comprising:
A. A digital processing means for controlled release of selected extracted data objects based on access time.
45. A machine for automatically controlled release of extracted data objects, as defined in above in item 44, wherein said means comprising:
A. A digital processing means for limiting the timed access to the selected extracted data objects.
46. A machine for automatically controlled release of selected data as defined in above in item 45 wherein said means, wherein said means comprising:
A. A digital processing means for release of altered extracted data objects to the user display.
47. A machine for automatically controlled release of selected data as defined in above in item 46, wherein said means, wherein said means comprising:
A. A digital means for release of selected extracted data objects with added data objects to the user display.
48. A machine for automatically controlled release of selected data as defined in above in item 47, wherein said means comprising:
A. A manual means for enabling and disabling the release of the selected extracted data objects.
49. A machine for automatically-controlled release of selected data as defined in above in item 48, wherein said means comprising:
A. A digital processing means enabling user to indicate desired data objects as candidates for extraction.
50. A machine for automatically-controlled release of physically separated data streams for projection as a combined data objects stream while maintaining full physical separation, wherein said means comprising:
A. A digital processing means for releasing data object streams into display means.
B. A digital processing means for releasing data object streams into projection means.
51. A machine for automatically-controlled release of logically separated data objects streams for projection as a combined data objects stream while maintaining full logical separation, wherein said means comprising:
A. A digital processing means for releasing data object streams into display means.
B. A digital processing means for releasing data object streams into projection means.
52. A machine for automatically display of prioritized extracted data objects in combination with the modified original data objects stream creating various displays, while maintaining substantial separation between the data streams, wherein said means comprising:
A. A digital processing means for automatically selecting data object candidates for extraction from an existing data objects stream located in a first memory.
B. A digital processing means for automatically extracting the selected data objects from an existing data objects stream located in a first memory.
C. Providing a digital means of transporting extracted data objects to a second memory.
D. A digital means for controlled release of extracted data objects to a display.
Whereby data objects in said modified original data stream and the separated, selected, extracts data stream are presented in a combination, to create various displays including, display like original data stream, while maintaining a desired level of separation between the data streams.
53. A machine for automatically display as defined in above in item 52, wherein said means comprising:
A. A digital process means for creating a total physical separation between selected extracts data objects stream and other streams, in said combined display process.
54. A machine for automatically display as defined in above in item 53, wherein said means comprising:
A. A digital process means for creating a total logical separation between selected extracts data objects stream and other data objects streams, in said combined projection and display process.
55. A machine for automatically display as defined in above in item 54, wherein said means comprising:
A. A digital display means for displaying released, selected, extracted data objects including a wireless display means.
56. A machine for automatically display as defined in above in item 55, wherein said means comprising:
A. A digital processing means for processing different, versions of the reconstructed original data stream, according to different user's classifications.
57. A machine for automatically display as defined in above in item 56, wherein said means comprising:

A. A digital processing means for processing real time, simultaneous, displays of different versions of reconstructed original data stream, according to different users' classifications.
58. A machine for automatically display as defined in above in item 57, wherein said means comprising:
   A. A digital display means to project together, the modified original data objects stream, with selected data objects in the extracted data streams to create a joint presentation, maintaining desired level of separation between the modified original data objects stream and the selected extracted data objects.
59. A machine for automatically display as defined in above in item 58, wherein said means comprising:
   A. A hardware apparatus to project a joint presentation of prioritized, selected, separated, extracted data objects streams, maintaining high level of separation between the modified original data objects stream and the prioritized extracted data objects.
60. A machine for automatically display as defined in above in item 59, wherein said means comprising:
   A. A Hardware apparatus for overlaying the output of said prioritized extracted data objects with the output of the modified original data object stream to create a joint presentation while maintaining high level of separation between the modified original data object stream and the prioritized extracted data objects.
61. A machine for automatically display defined in above in item 60, wherein said means comprising:
   A. A digital display in which said separate extracted data object streams can be jointly presented in real time while maintaining separation between the data streams.
   B. A wireless connected display in which said separate data streams can be presented separately and jointly presented while maintaining desired separation between the data streams.
62. A machine for automatically display defined in above in item 61, wherein said means comprising:
   A. A digital processing means for anticopying based on configuration of color contrasts in the display.
63. A machine for automatically display defined in above in item 62, wherein said means comprising:
   A. A digital processing means for anticopying based on configuration of font sizes.
64. A machine for automatically selecting, extracting, storing and releasing extracted data objects, with security alerts triggering, wherein said means comprising:
   A. A digital processing means for selecting and extracting data objects from a stream of digital data objects.
   B. A digital processing means for storing said selected data objects.
   C. A digital processing means for releasing said selected data objects in a controlled method.
   D. A set of rules enabling the automatic triggering of various said machine's functions in different situations.
65. A machine with security alerts triggering as defined in above in item 64, wherein said means comprising:
   A. A data processing means for receiving and automatically interpreting security alert inputs.
   B. A set of rules enabling the automatic triggering of various said machine functions in a threat working mode.
   C. A digital processing means for automatically triggering a higher level of said machine activities for increased security.
66. A machine with security alerts triggering as defined in above in item 65, wherein said means comprising:
   A. A data processing means for receiving and automatically interpreting security alert inputs.
   B. A set of rules enabling the automatic triggering of various said machine functions in an attack working mode.
   C. A digital processing means for automatically triggering the highest level of said machine activities for increased security.
67. A machine with security alerts triggering as defined in above in item 66, wherein said means comprising:
   A. A digital-processing audit means for tracing user access
68. A machine for automatically selecting and extracting as defined in above in item 1, wherein said means comprising:
   A. A physical hardware apparatus providing a physical layer of security, and protection against tampering.
69. A machine for automatically selecting and extracting as defined in above in item 1, wherein said means comprising:
   A. A digital processing means for reporting logins attempted, logins, logouts, terminations, and failures.
70. A machine for automatically selecting and extracting as defined in above in item 1, wherein said means comprising:
   A. A digital processing means for mapping and reporting location and history of data object streams and selected data object extract s streams processed by said machine.
71. A machine for automatically selecting and extracting as defined in above in item 1, wherein said means comprising:
   A. A digital processing means for intrusion detection determining intrusion based on various file changes.
72. A machine for automatically selecting and extracting as defined in above in item 1, wherein said means comprising:
   A. A digital processing means enabling providing said applications and services as a third party provider over networks and Internet.
73. A machine for automatically selecting and extracting as defined in above in item 1, wherein said means comprising:
   A. A digital processing means enabling providing said applications and services for electronic commerce over networks and Internet.
74. A machine for automatically selecting and extracting as defined in above in item 1, wherein said means comprising:
   A. A digital processing means enabling providing said applications and services for electronic mail between computers, networks, and Internet.
75. A machine for automatically selecting and extracting as defined in above in item 1, wherein said means comprising:
   A. A digital processing means enabling providing said applications and services for electronic mail between computers, networks, and Internet.
   B. A digital processing means enabling receiver of electronic mail to receive the selected extracted data object stream by using an additional identifying means.
76. A machine for automatically selecting and extracting as defined in above in item 1, wherein said means comprising:
   A. A digital processing means for presenting information and charging payment for release of data object extracts.
77. A machine for automatically selecting and extracting as defined in above in item 1, wherein said means comprising:
   A. A digital processing means for presenting information and releasing of selected data object extracts predicated upon fulfillment of specific conditions.
78. A machine for automatically selecting and extracting as defined in above in item 1, wherein said means comprising:
   A. A digital processing means enabling overriding of machine processes by authorized users.
79. A machine for automatically selecting and extracting as defined in above in item 1, wherein said means comprising:
   A. A digital processing means for adding encryption to output data objects streams.

80. A machine for automatically selecting and extracting as defined in above in item 1, wherein said means comprising:
   A. A digital processing means for enabling manual selection of said machine processing including: automatic machine processing.
   B. A digital processing means for enabling manual selection of said machine processing
   C. Including: semi-automatic machine processing with capability to influence the machine's processing by moving tools such as levers, bars, buttons, check boxes, sliders, drag and drop, and voice enablement.
   D. A digital processing means for enabling manual selection of said machine processing including manual control of said machine processing.

81. A machine for automatically selecting and extracting as defined in above in item 1, wherein said means comprising:
   A. A digital processing means for controlling access to said machine and its various outputs based on user identification.

82. A machine for automatically selecting and extracting as defined in above in item 1, wherein said means comprising:
   A. A digital processing means for controlling access to said machine and its various outputs based on user identification through biometrics authentication.

83. A machine for automatically selecting and extracting as defined in above in item 1, wherein said means comprising:
   A. A digital processing means for controlling access to said machine and its various outputs based on timed challenge questions validating user identity.

84. A machine for automatically selecting and extracting as defined in above in item 1, wherein said means comprising:
   A. A digital processing means for allowing continuing access to said machine and its various outputs based on timed challenge questions validating user identity.

85. A machine for automatically selecting and extracting as defined in above in item 1, wherein said means comprising:
   A. A digital processing means for controlling access to said machine and its various outputs based on identify friend or foe validating user identity.

86. A machine for automatically selecting and extracting as defined in above in item 1, wherein said means comprising:
   A. A digital processing means for allowing continuing access to said machine and its various outputs based on identify friend or foe validating user identity.

87. A machine for automatically selecting and extracting as defined in above in item 1, wherein said means comprising:
   A. A digital processing means for limiting different users access to said machine for specific time periods.

88. A machine for automatically selecting and extracting as defined in above in item 1, wherein said means comprising:
   A. A digital processing means for limiting users access to data object extracts for specific time periods.

89. A machine for automatically selecting and extracting as defined in above in item 1, wherein said means comprising
   A. A digital processing means for limiting users access to different machine functions at specific time periods.

The invention is also a process and a business method comprising:

90. A process for automatically selecting and extracting data objects from an existing data object stream where automatically releasing selected extract data objects to a display, wherein said means comprising:
   A. Providing a digital processing means for automatically selecting data objects candidates for extraction from an existing data objects stream located in a first memory.
   B. Providing a digital processing means for automatically extracting selected data objects from an existing data objects stream located in a first memory.
   C. Providing a digital means of transporting extracted data objects to a second memory
   D. Providing a digital means for controlled release of extracted data objects to a display.
      Whereby automatically selected contents can be separated and removed from original document, file or data stream, transported to secured storage memory and controlled released based on security, preselected categories, rules and other triggers 91. A process for automatically selecting and extracting as defined in above in item 90, wherein said means comprising:
   A. Providing a digital means for storing a first dictionary of, characters and data objects
   B. Providing a digital means responsive to said dictionary for use as a filtering condition
   C. Providing a digital means for extracting data objects not mentioned in said dictionary 92. A process for automatically selecting and extracting defined in above in item 91, wherein said means comprising:
   A. Providing a digital means for storing a second dictionary of, characters and data objects
   B. Providing a digital means responsive to said second dictionary for use as a filtering condition
   C. Providing a digital means for extracting any data object mentioned in said second dictionary.

93. A process for automatically selecting and extracting defined in above in item 92, wherein said means comprising:
   A. Providing a digital means for accepting additional data objects into dictionaries.
   B. Providing a digital means enabling the adding of other dictionaries with said first and second dictionaries.
   C. Providing a digital means for customizing dictionaries for specific content fields.

94. A process for automatically selecting and extracting as defined in above in item 93, wherein said means comprising:
   A. Providing a digital processing means for tagging and serializing derived selected data object extractions 95. A process for automatically selecting and extracting as defined in above in item 94, wherein said means comprising:
   A. Providing a digital filtering means for automatically sorting of said selected extracted data objects according to separate data objects categories.
   B. Providing a digital processing means for labeling said sorted, selected data objects, with their respective categories 96. A process for automatically selecting and extracting, as defined in above in item 95, wherein said means comprising:
   A. Providing a digital processing means for automatically creating new, data object categories for the said sorting, process.

97. A process for automatically selecting and extracting as defined in above in item 96, wherein said means comprising:
   A. Providing a digital means for substantially erasing, from all memories except second memory, all copies and links and traces of removed selected extracted digital objects.

98. A process for automatically selecting and extracting as defined in above in item 97, wherein said means comprising:
   A. Providing a digital means for substantially eradicating from all memories except second memory, all links, copies, traces, to separated and extracted data objects. Said eradication includes: termination of related delivery means, defragmenting associated files, overwriting relevant files, cleaning memories, and cashes.
99. A process for automatically selecting and extracting as defined in above in item 98, wherein said means comprising:
   A. Providing a digital means for substituting the extracted selected data objects with other data objects placeholders.
100. A process for automatically selecting and extracting as defined in above in item 99, wherein said means comprising:
   A. Providing a digital means for substituting the extracted selected data objects with other data objects placeholders including: serialization characters, replacement of information, bar codes null sets, URL's, and web site addresses.
101. A process for automatically selecting and extracting as defined in above in item 100, wherein said means comprising:
   A. Providing a digital processing means for configuration of the scope of computer files selection for the automatic selecting and extracting process.
102. A process for automatically selecting and extracting as defined in above in item 101, wherein said means comprising:
   A. Providing a digital processing means for configuration of the scope of computer files selection for the automatic selecting and extracting process based on file status, timing, preset rules and user-specific selection.
   B. Providing a digital processing means for configuration of the scope of computer file selection for the automatically selecting and extracting process based on verifying of file existence, checking for recent activity, checking whether recent separation and extraction activity of data objects is up to date in accordance to modes and preferences.
103. A process for automatically selecting and extracting as defined in above in item 102, wherein said means comprising:
   A. Providing a digital processing means for establishing which computers, and digital process in a network will be connected, accessible and interacting with said extracting process.
104. A process for automatically selecting and extracting as defined in above in item 103, wherein said means comprising:
   A. Providing a digital processing means for initiating the selecting and extracting of data objects, triggered by preset rules for process configuration.
105. A process for automatically selecting and extracting as defined in above in item 104, wherein said means comprising:
   A. Providing a digital processing means for initiating selecting and extracting of data objects, triggered by security alerts including threat mode and attack mode.
106. A process for automatically selecting and extracting as defined in above in item 90, wherein said means comprising:
   A. Providing a digital processing means for choosing the parameters for the selecting and extracting of data objects, triggered by preset rules for process configuration.
107. A process for automatically selecting and extracting as defined in above in item 90, wherein said means comprising:
   A. Providing a digital processing means for choosing the parameters for the selecting and extracting of data objects, triggered by security alerts including threat mode and attack mode.
108. A process for automatically selecting and extracting as defined in above in item 90, wherein said means comprising:
   A. Providing a digital processing means for interpreting the output of security intrusion detection means.
   B. Providing a digital processing means triggering processing by said process based on interpretation of output of security alerts and output of intrusion detection means.
109. A process for automatically selecting and extracting as defined in above in item 90, wherein said means comprising
   A. Providing a digital means for removing from a data object stream selected data objects including: digital records, elements of records, characters.
110. A process for automatically selecting and extracting as defined in above in item 90, wherein said means comprising:
   A. Providing a digital means for removing from a data object stream selected data objects including digital graphic images and segments of graphic images.
111. A process for automatically selecting and extracting as defined in above in item 90, herein said means comprising:
   A. Providing a digital means for removing from a data object stream selected data objects including digitized sound.
112. A process for automatically selecting and extracting as defined in above in item 90, wherein said means comprising
   A. Providing a digital means for removing from a data object stream selected data objects including: digitized video images and segments of video images.
113. A process for automatically customizing, automatically selected content items, within in a data objects stream, wherein said means comprising:
   A. Providing a digital data means for sorting extracted selected data objects into predefined contextual categories.
   B. Providing a digital data means for assigning an extracted selected data objects to a data object category.
      Whereby items of the automatically selected content are sorted into prearranged defined categories such as: credit card numbers, social security numbers, last name first name addresses.
      Whereby the selected content items are sorted out according to categories, and are available for release for display to users, according to the user's status and clearance.
114. A process for automatically customizing selected content as defined in above in item 113, wherein said means comprising:
   A. Providing a digital processing means for sorting extracted data objects into predefined categories.
   B. Providing a digital processing means for identifying which extracted data objects should be released to which user.

Whereby the selected content items are sorted out according to categories, and are available for release for display to users, according to predefined rules set.

115. A process for automatically customizing selected content as defined in above in item 114, wherein said means comprising:
  A. Providing a digital processing means enabling the altering of the selected data objects Whereby different items of the automatic selected contents will be altered and available for display to users according to the user's status and clearance.

116. A process for automatically customizing selected content as defined in above in item 115, wherein said means comprising:
  A. Providing a digital processing means for enabling different extracted data objects to be released to different users.
    Whereby different items of the automatic selected contents will be available for release to user display according to a predefined rule set.

117. A process for automatically customizing selected contents as defined in above in item 116, wherein said means comprising:
  A. Providing a digital processing means for selecting which extracted data objects would be targeted as descriptors for information searching.
  B. Providing a digital processing means for presenting the targeted extracted data object contents to online search engines.
  C. Providing a digital processing means for automatically presenting search results to authorized users.
    Whereby different items of the automatic selected contents would be automatically targeted and presented to search engines and the search results and the items searched will be available for display to users according to the user's status and clearance.

118. A process for automatically customizing selected contents as defined in above in item 117, wherein said means comprising:
  A. Providing a digital processing means for scoring and ranking contextual relevance of said search engine results.
  B. Providing a digital processing means for presenting and linking, in a display, said scored and ranked search engines results with the extracted data objects
    Whereby search engine results are scored and ranked to achieve highest contextual relevance to the selected content items and available for display to users according to their status and clearance.
    Whereby there is no need for user to actively take any action like highlighting words, typing characters, the process will automatically trigger searches for information and URLs which are relevant to the selected content items.
    Whereby there is no need for user to wait for search results relevant to the selected content items because the system automatically instructs said searches, at an early stage.

119. A process for automatically customizing selected contents as defined in above in item 118, wherein said means comprising:
  A. Providing digital processing means enabling voice recognition and its presentation in a digitized form enabling the said process to carry out its processes.

120. A process for automatically customizing selected contents as defined in above in item 119, wherein said means comprising:
  A. Providing a digital processing means for recognizing patterns of the selected data content items and assigning prioritization to various selected data content items.

121. A process for automatically customizing selected contents as defined in above in item 120, wherein said means comprising:
  A. Providing a digital processing means for submitting targeted selected extracts of contents, to information search engines for display of relevant findings including: text, graphics, audio and video.

122. A process for automatically customizing selected contents as defined in above in item 121, wherein said means comprising:
  A. Providing a digital processing means for submitting targeted selected extracts of content to various process and appliances for possible triggering of various reactions.

123. A process for automatically transporting selected data objects to other memories, and between memories for achieving higher level of security, wherein said means comprising:
  A. Providing a digital processing means for selection of destination storage memories, triggered automatically by various preset criteria.
  B. Providing a digital processing means for transport of said data objects to said selected storage memories, triggered automatically by various preset criteria and manually 124. A process for automatically transporting selected data objects as defined in above in item 123, wherein said means comprising:
  A. Providing a remote memory storage media.

125. A process for automatically transporting selected data objects as defined in above in item 124, wherein said means comprising:
  A. Providing an offline memory storage media.

126. A process for automatically transporting selected data objects as defined in above in item 125, wherein said means comprising:
  A. Providing an Internet and network based memory storage media 127. A process for automatically transporting selected data objects as defined in above in item 126, wherein said means comprising:
  A. Providing a copy and backup apparatus.

128. A process for automatically transporting selected data objects as defined in above in item 127, wherein said means comprising:
  A. Providing a digital means for encrypting and decrypting the data objects transported to storage memories.

129. A process for automatically transporting selected data objects as defined in above in item 128, wherein said means comprising:
  A. Providing a digital processing means for mapping the location and capabilities of the different connected and available memories.
  B. Providing a digital processing means for mapping damage and threats to the connected and available storage memories.

130. A process for automatically transporting selected data objects as defined in above in item 129, wherein said means comprising:
  A. Providing a digital means for triggering bypassing of damaged and threatened storage memories.

131. A process for automatically transporting selected data objects as defined in above in item 130, wherein said means comprising:

A. Providing a digital processing means for automatically configuring the hierarchy for connectivity between the data objects to be transported, and the storage memories according to user needs, preset rules, and security constraints.

132. A process for automatically transporting selected data objects as defined in above in item 131, wherein said means comprising:
    A. Providing a digital processing means controlling the release of data objects from said storage memories based on user's rights of access to the stored content.
    B. Providing a digital processing means controlling the release of data objects from said storage memories based on security constraints, including intrusion threat and attack.

133. A process for automatically transporting selected data objects as defined in above in item 132, wherein said means comprising:
    A. Providing a digital processing means for camouflaging data object file identity.

134. A process for automatically transporting selected data objects as defined in above in item 133, wherein said means comprising:
    A. Providing a digital processing means for camouflaging data objects files by removing file's root directory.
    B. Providing a digital processing means for camouflaging data objects files by removing name of file, links, references, shortcuts, and name of directory.

135. A process for automatically controlled release of automatically selected extracted data objects, from a data object stream, into a display, wherein said means comprising:
    A. Providing a digital reading means for reading the selected extracted data object's assigned category.
    B. Providing a digital means for identifying user access rights to the specific selected extracted data object items based the data object category.
    C. Providing a digital processing means for synchronized controlled release of selected data objects from storage memory according to user access rights and privileges. Whereby selected data objects are released from a memory into a user's display based on user status and access privileges to such content.

136. A process for automatically controlled release extracted data objects as defined in above in item 135, wherein said means comprising:
    A. Providing a digital processing means for controlled release of selected extracted data objects based on access time.

137. A process for automatically controlled release of extracted data objects as defined in above in item 136, wherein said means comprising:
    A. Providing a digital processing means for limiting the timed access to the selected extracted data objects.

138. A process for automatically controlled release of selected data as defined in above in item 137, wherein said means comprising:
    A. Providing a digital processing means for release of altered extracted data objects to user display.

139. A process for automatically controlled release of selected data as defined in above in item 138, wherein said means, wherein said means comprising:
    A. Providing a digital means for release of selected extracted data objects with added data objects to user display.

140. A process for automatically controlled release of selected data as defined in above in item 139, wherein said means comprising:
    A. Providing a manual means for enabling and disabling the release of the selected extracted data objects.

141. A process for automatically controlled release of selected data as defined in above in item 140, wherein said means comprising:
    A. Providing a digital processing means enabling user to highlight desired data objects as candidates for extraction.

142. A process for automatically release of physically separated data objects streams for projection as a combined data objects stream while maintaining full physical separation comprising:
    A. Providing a digital processing means for releasing data object streams into display means.
    B. Providing a digital processing means for releasing data object streams into projection means.

143. A process for automatically release of logically separated data objects streams for projection as a combined data objects stream while maintaining full logical separation, wherein said means comprising:
    A. Providing a digital processing means for releasing data object streams into display means.
    B. Providing a digital processing means for releasing data object streams into projection means.

144. A process for automatically display of selected separated extracted data objects in combination with the modified original data objects stream creating various displays, while maintaining substantial separation between the data streams comprising:
    A. Providing a digital processing means for automatically selecting data object candidates for extraction from an existing data objects stream located in a first memory.
    B. Providing a digital processing means for automatically extracting the selected data objects from an existing data objects stream located in a first memory.
    C. Providing a digital means of transporting extracted data objects to a second memory.
    D. Providing a digital means for controlled release of extracted data objects to a display
        Whereby data objects in said modified original data stream and the separated, selected, extracts data stream are presented in a combination, to create various displays including, display like original data stream, while maintaining a desired level of separation between the data streams.

145. A process for automatically display as defined in above in item 144, wherein said means comprising:
    A. Providing a digital process means for creating a total physical separation between selected extracts data objects stream and other streams, in said combined display process.

146. A process for automatically display as defined in above in item 145, wherein said means comprising:
    A. Providing a digital process means for creating a total logical separation between selected extracts data objects stream and other data objects streams, in said combined projection and display process.

147. A process for automatically display as defined in above in item 146, wherein said means comprising
    A. Providing a digital display means for displaying released, selected, extracted data objects including a wireless display means.

148. A process for automatically display as defined in above in item 147, wherein said means comprising:

A. Providing a digital processing means for processing different, versions of the reconstructed original data stream, according to different user's classifications.
149. A process for automatically display as defined in above in item 148, wherein said means comprising:
  A. Providing a digital processing means for processing real time, simultaneous, displays of different versions of reconstructed original data stream, according to different user classifications.
150. A process for automatically display as defined in above in item 1,49 wherein said means comprising:
  A. Providing a digital display means to project together, the modified original data objects stream, with selected data objects in the extracted data streams to create a joint presentation, maintaining desired level of separation between the modified original data objects stream and the selected extracted data objects.
151. A process for automatically display as defined in above in item 150, wherein said means comprising:
  A. Providing a hardware apparatus to project a joint presentation of separated, selected, extracted data objects streams, maintaining high level of separation between the modified original data objects stream and the selected extracted data objects.
152. A process for automatically display as defined in above in item 151, wherein said means comprising:
  A. Providing a hardware apparatus for overlaying the output of said selected extracted data objects with the output of the modified original data object stream to create a joint presentation while maintaining high level of separation between the modified original data object stream and the selected extracted data objects.
153. A process for automatically display defined in above in item 152, wherein said means comprising:
  A. Providing a digital display in which said separate extracted data object streams can be jointly presented in real time while maintaining separation between the data streams.
  B. Providing a wireless connected display in which said separate data streams can be presented separately and jointly presented while maintaining desired separation between the data streams.
154. A process for automatically display defined in above in item 153, wherein said means comprising
  A. Providing a digital processing means for anticopying based on configuration of color contrasts in the display.
155. A process for automatically display defined in above in item 154, wherein said means comprising:
  A. Providing a digital processing means for anticopying based on configuration of font sizes.
156. A process for automatically selecting, extracting, storing and releasing extracted data objects, with security alerts triggering, wherein said means comprising:
  A. Providing a digital processing means for selecting and extracting data objects from a stream of digital data objects.
  B. Providing a digital processing means for storing said selected data objects.
  C. Providing a digital processing means for releasing said selected data objects in a controlled method.
  D. Providing a set of rules enabling the automatic triggering of various said process functions in different situations.
157. A process with security alerts triggering as defined in above in item 156, wherein said means comprising:
  A. Providing a data processing means for receiving and automatically interpreting security alert inputs.
  B. Providing a set of rules enabling the automatic triggering of various said process functions in a threat working mode.
  C. Providing a digital processing means for automatically triggering a higher level of said activities for increased security.
158. A process with security alerts triggering as defined in above in item 157, wherein said means comprising:
  A. Providing a data processing means for receiving and automatically interpreting security alert inputs.
  B. Providing a set of rules enabling the automatic triggering of various said process functions in an attack working mode.
  C. Providing a digital processing means for automatically triggering the highest level of said process activities for increased security.
159. A process with security alerts triggering as defined in above in item 158, wherein said means comprising:
  A. Providing a digital-processing audit means for tracing user access
160. A process for automatically selecting and extracting as defined in above in item 90, wherein said means comprising:
  A. Providing a physical hardware apparatus providing a physical layer of security, and protection against tampering.
161. A process for automatically selecting and extracting as defined in above in item 90, wherein said means comprising:
  A. Providing a digital processing means for reporting logins attempted, logins, terminations, logouts, and failures.
162. A process for automatically selecting and extracting as defined in above in item 90, wherein said means comprising:
  A. Providing a digital processing means for mapping and reporting location and history of data object streams and selected data object extract s streams processed by said process.
163. A process for automatically selecting and extracting as defined in above in item 90, wherein said means comprising:
  A. Providing a digital processing means for intrusion detection determining intrusion based on various file changes.
164. A process for automatically selecting and extracting as defined in above in item 90, wherein said means comprising:
  A. Providing a digital processing means enabling providing said applications and services as a third party provider over networks and Internet.
165. A process for automatically selecting and extracting as defined in above in item 90, wherein said means comprising:
  A. Providing a digital processing means enabling providing said applications and services for electronic commerce over networks and Internet.
166. A process for automatically selecting and extracting as defined in above in item 90, wherein said means comprising:
  A. Providing a digital processing means enabling providing said applications and services for electronic mail between computers, networks and Internet.
167. A process for automatically selecting and extracting as defined in above in item 90, wherein said means comprising:

A. Providing a digital processing means enabling providing said applications and services for electronic mail between computers, networks and Internet.
B. Providing a digital processing means enabling receiver of electronic mail to receive the selected extracted data object stream by using an additional identifying means.
168. A process for automatically selecting and extracting as defined in above in item 90, wherein said means comprising:
A. Providing a digital processing means for presenting information and charging payment for release of selected data object extracts.
169. A process for automatically selecting and extracting as defined in above in item 90, wherein said means comprising:
A. Providing a digital processing means for presenting information and releasing of selected data object extracts predicated upon fulfillment of specific conditions.
170. A process for automatically selecting and extracting as defined in above in item 90, wherein said means comprising:
A. Providing a digital processing means enabling overriding of process processes by authorized users.
171. A process for automatically selecting and extracting as defined in above in item 90, wherein said means comprising:
A. Providing a digital processing means for adding encryption to output data object streams.
172. A process for automatically selecting and extracting as defined in above in item 90, wherein said means comprising:
A. Providing a digital processing means for enabling manual selection of said process processing including automatic process processing.
B. Providing a digital processing means for enabling manual selection of said process processing
173. A process for automatically selecting and extracting as defined in above in item 90, wherein said means comprising:
A. Providing a digital processing means for controlling access to said process and its various outputs based on user identification.
174. A process for automatically selecting and extracting as defined in above in item 90, wherein said means comprising:
A. Providing a digital processing means for controlling access to said process and its various outputs based on user identification through biometrics authentication.
175. A process for automatically selecting and extracting as defined in above in item 90, wherein said means comprising:
A. Providing a digital processing means for controlling access to said process and its various outputs based on timed challenge questions validating user's identity.
176. A process for automatically selecting and extracting as defined in above in item 90, wherein said means comprising:
A. Providing a digital processing means for allowing continuing access to said process and its various outputs based on timed challenge questions validating user identity.
177. A process for automatically selecting and extracting as defined in above in item 90, wherein said means comprising:
A. Providing a digital processing means for controlling access to said process and its various outputs based on identify friend or foe validating user identity.
178. A process for automatically selecting and extracting as defined in above in item 90, wherein said means comprising:
A. Providing a digital processing means for allowing continuing access to said process and its various outputs based on identify friend or foe validating user identity.
179. A process for automatically selecting and extracting as defined in above in item 90, wherein said means comprising:
A. Providing a digital processing means for limiting different users access to said process for specific time periods.
180. A process for automatically selecting and extracting as defined in above in item 90, wherein said means comprising:
A. Providing a digital processing means for enabling limiting different users access to data object extracts for specific time periods.
181. A process for automatically selecting and extracting as defined in above in item 90, wherein said means comprising:
A. Providing a digital processing means for limiting different users access to different process functions at specific time periods.

Sketches

See Building and Testing for samples.

Ramifications

The invention is a system and a method for automatically selecting, extracting, secure storing and controlled releasing of specific targeted contents within a digital data objects stream, digital document or digital file. The system and method automatically identifies specific content items to be extracted and removed, out of a data objects stream, document or a digital file. The extracted data objects are transferred to a removed secure storage memory, selected, based on preset rules and various security triggers. An automatic release of the extracted contents, from the removed storage to a display, can take place instantly contingent upon validation of identity and access rights of an authorized party The invention is also a system and method for automatically management and dissemination of documents or digital files with varied contents control levels. The system and method enables content management and control by automatically locating contents of prioritized importance in a document, thereafter allowing real time, simultaneous parallel, customization and personalization of the document and its dissemination to different parties based on their authorization and access status.

The invention enables control over specific important content items within the general contents of documents or digital files in a computer or within a network. The possible immediate controlled release of those important content items according to specific identification and access criteria proactively safeguards the security and the value of documents or digital files. The said content control enables broad dissemination of the digital file in closed networks as well as open networks including the internet, with out compromising the security of the critical information in the digital file. The Internet and communication advances have opened up many new markets but the opportunities are constrained by many and different security threats. The invention enables maximizing of the new revolutionary connectivity by enabling the general content of a document or digital file to be distributed throughout an organization, its employees, partners, suppliers and customers while securing and controlling the most important content elements. The invention releases the important contents only to the validated authorized parties through an automatic and possible manual controlled release mechanism.

The invention also enables real time parallel customization and personalization of a digital file to different users. Through a process of filtering and reverse filtering and through a process of sorting, the selected important content items are categorized in various categories. The controlled release mechanism releases the important content items to the various authorized receivers based on their preset rights to access the different categories.

The system delivers top security, privacy and anonymity capabilities by scrubbing and extracting identifying critical information from documents. The system transfers the extracted critical information to an off site secured storage, and enables authorized parties, leveled release of extracted information upon request. Any unauthorized party accessing the documents will find them totally useless since the critical information has been removed. The system also enables the sharing of documents within an organization where upon critical information is extracted from documents and access to that critical information is permitted to selected individuals, with prioritized varying levels of releases of extracted information.

The Current Art

Although there are various security and privacy products in the market, none of them give total security. The existing security and privacy products are imperfect and do not give enough security, in a way those are added patches to an already patched up universe. In his book One of the Intel's top security architects described the existing security products as building a vaulted door to a cardboard box. A Senior Vice President at Symantec, Inc., a security and anti-virus company stated recently that "after a secure firewall is in place, companies have about 28 days before things change and the firm is vulnerable again."

Currently many network defenses in major organizations are inadequately maintained. There is a need for 2-4 employees to operate firewalls in a large organization. There is a need to constantly update the intrusion detection systems. The high cost involved with maintaining the system is a major obstacle to their successful deployment.

Many of the existing security systems create major barriers to their organization's productivity. The complexity and the added security steps needed to do business, slow the flow of documents within the organizations and in many instances cause a total bypass of the security defenses The most critical deficiency in the current security systems is there inability to stop or substantially minimize insider security damage. According to various studies 75 to 90% of the damage is done by insiders. According to a study of the Industrial Computers Association the average outsider damage is $70,000 while the average insiders damage is $2,700,000. The system extracts and stripes out identifying and critical information from designated documents. The classic information the Scrubber can extract is: credit card numbers, names, addresses, dates, social security numbers, driver's license, transaction dollar amounts, etc. The market for the system is substantial and includes organizations, individuals and companies that need a high level of data security including governments and various defense organizations. The system is based on a new pioneering architecture of security/privacy/anonymity technology. With the spreading of mobile/cellular/satellite communications, the threats to security and privacy are much stronger and the probability of security breaching is much higher. The system enables the continuity of regular business flows, survivability, in both regular and mobile environments. It assures that when an intruder or rogue employee accesses the documents, the documents will be useless.

As electronic commerce grows rapidly, more companies are transforming their closed networks into more open environments allowing customers to connect through the internet to their front end as well as enabling suppliers and partners to connect through the internet to their the back end.

The security threats and risks of such networks grow in direct correlation to the network's growth in connectivity. With the new openness and as companies embrace the Internet and use it for many of their functions, the security risk grows exponentially.

The internet is a public collection of computer networks with a many diverse entry points for hackers who can, among other things, penetrate a company's website, and throughout it enter the company's networks to steal information or money.

As security is becoming a more strategic priority to slow the operations of the networks and cause organizations substantial money losses. Although there are various security measures and firewalls and systems to protect networks, security has been breached dramatically. Currently, insiders within the company and its firewalls do 75% to 90% of the damage. Furthermore, the existing firewalls are susceptible to many false alarms because of triggers of false intrusions into the networks, which radically In summary, the existing computer and network security products, are not achieving needed security tasks. They do not give enough security and in essence are added patches to an already very patched up environment of computers and computer networks. The present invention answers the said unanswered needs by providing a system that defends in different methods from external as well as internal intruders. Furthermore the system encourages and enables a much needed freer flow of documents and digital files within and out of organizations while automatically protecting the automatically and manually selected important information items. The system also enables survivability of the network while it is being attacked, by allowing the transfer of needed documents in a protected method, thereby accomplishing the network's critical missions.

The system incorporates a scrubbing/extracting process in which words, numbers or characters of strategic importance are removed from a document or digital file as soon as they are created or imported into the computer or network.

The extracted data is transported immediately to a removed storage memory possibly, off-line/off-network, digital or physical vaulted storage. The extracted data may be returned immediately to the user's display based on validation of his identity and access rights. The use of the vaulted extractions is controlled by company policy or set of rules which might include the following options among others:

A vaulting of extractions for along/short period of time.

Release of extractions to create a projection display of the original document or digital file.

Release of extractions or part of them to create a projection display of variations of the original document or digital file.

Release of extractions enabling projection of original or reconstituted document while maintaining complete separation between the modified digital data stream and the extracts data streams. The said is achieved through the use of hardware devises like, another screen display, or a wireless PDA, screening projector, 3d glasses, overlay transparency, or printing of the extracts on a paper The system's objective is to create a last line of defense for the computer/network. Furthermore the objective is to create a major deterrent. If an intruder penetrates successfully all the computer/network's, firewalls and other security systems, he will end up with documents/files, which will be useless to him since the critical strategic information was exported to a vaulted storage. Competitors or hackers, who learn that a computer/network is protected by the system, might decide to chase another target instead. This is comparable to a situation in which a bank robber, who finds out that the bank vault is empty, will most probably look for another bank to rob.

The system has a manual of different options including the ability to scrub/extract:

All existing data texts and databases on the computer/network.

All new imported data to the computer/network.

All new work/output created by the computer/network.

All data being transported in/out of the computer/network.

The system is designed to protect a network of computers or severs as well as an independent computer or component of a network Closest Known Art None found in this specific context.

The Figures supporting the foregoing descriptions are described as follows:

FIG. 1 shows extraction in progress.

Figure 2:
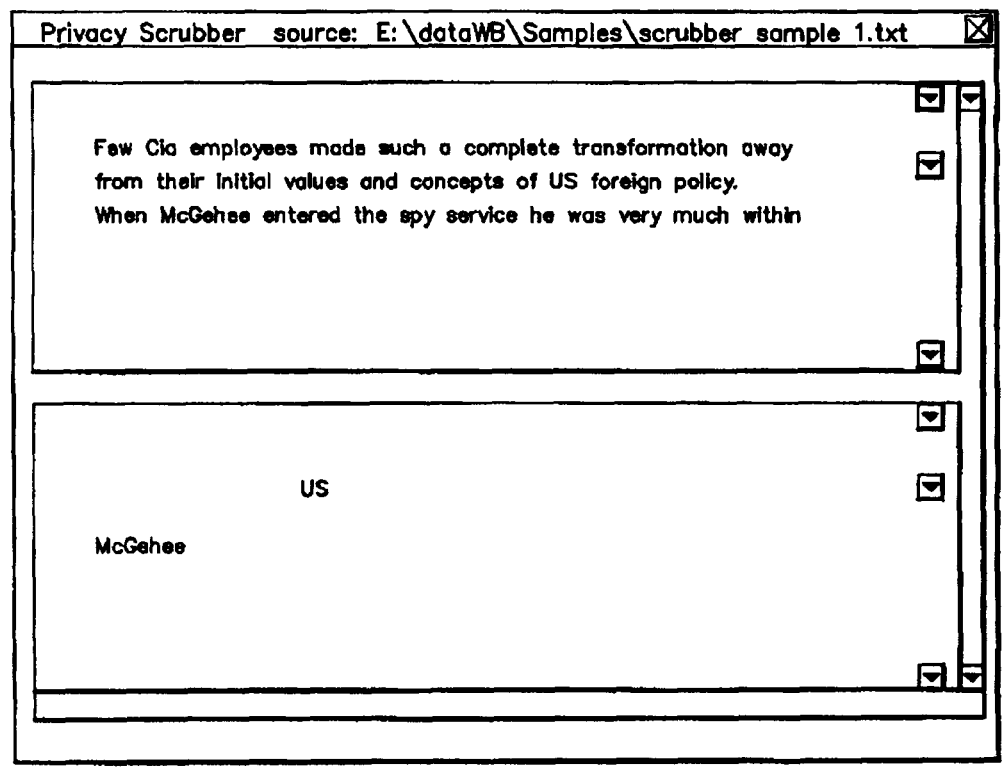
FIG. 2 shows extraction in progress showing extractions only.

FIG. 2 shows extraction in progress showing extractions only.

FIG. 3 shows sample automatically extraction of sensitive data.

FIG. 4 shows time access control.

Figure 5:
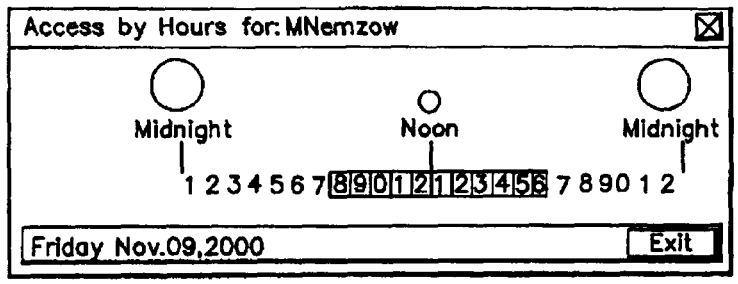
FIG. 5 shows time access report.

FIG. 5 shows time access report.

Figure 6:
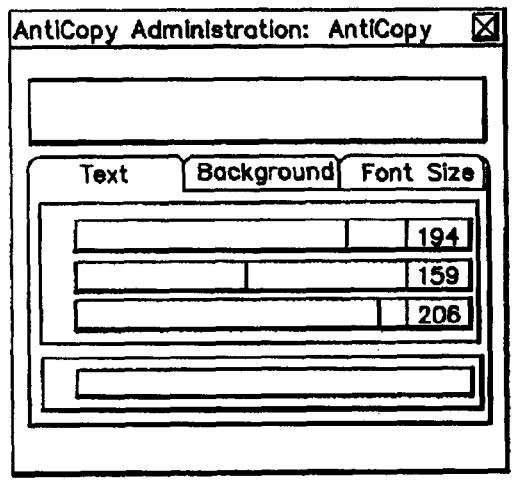
FIG. 6 shows anticopy configuration.

FIG. 6 shows anticopy configuration.

Figure 7:
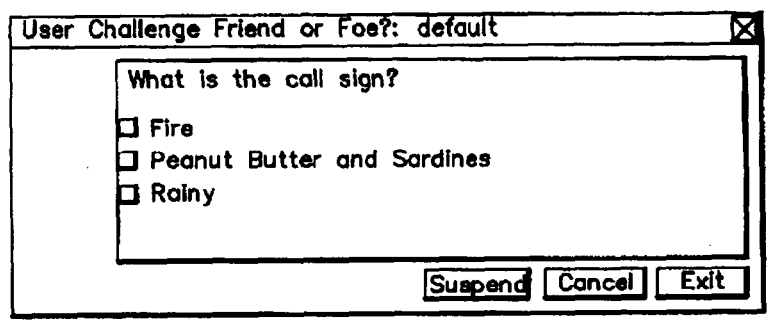
FIG. 7 shows identify friend or foe challenge.

FIG. 7 shows identify friend or foe challenge.

Figure 8:
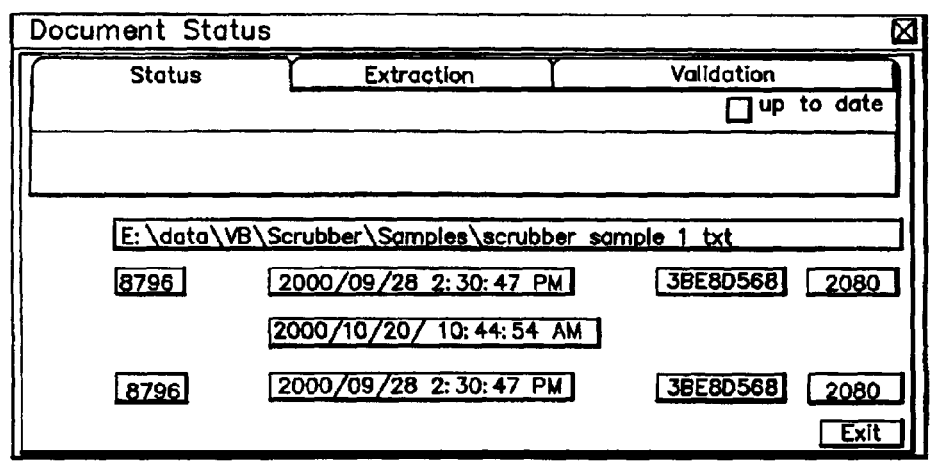
FIG. 8 shows file scrubbing status report.

FIG. 8 shows file scrubbing status report.

Figure 9:
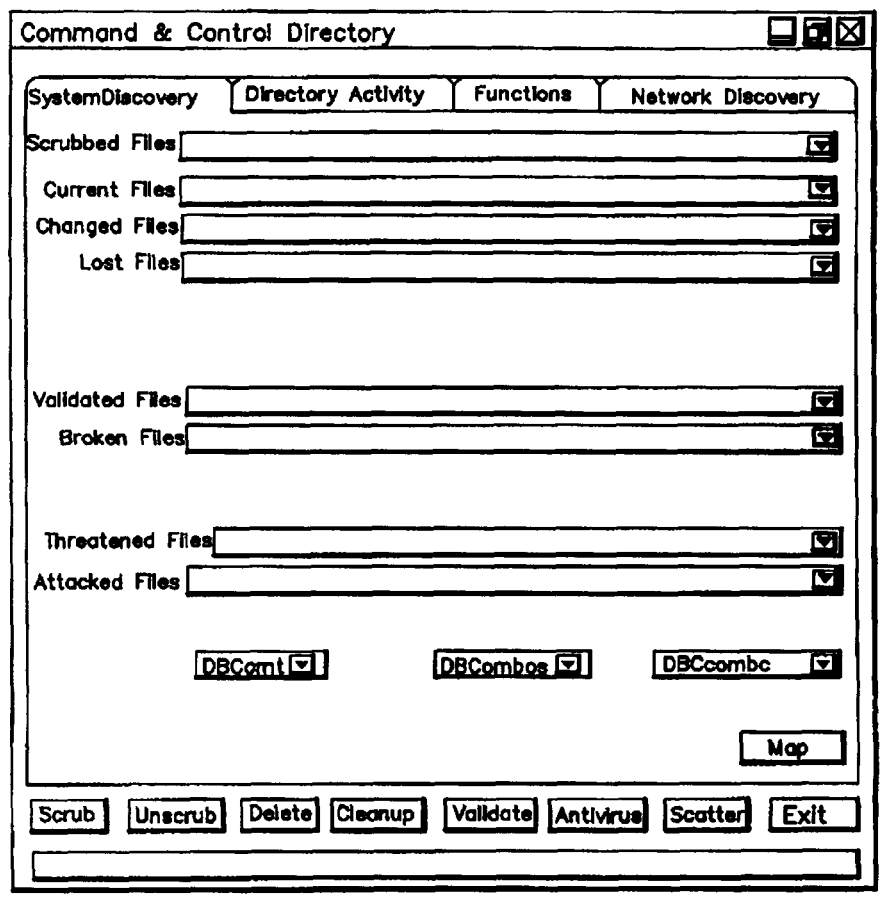
FIG. 9 shows command and control recent activity.

FIG. 9 shows command and control recent activity.

Figure 10:
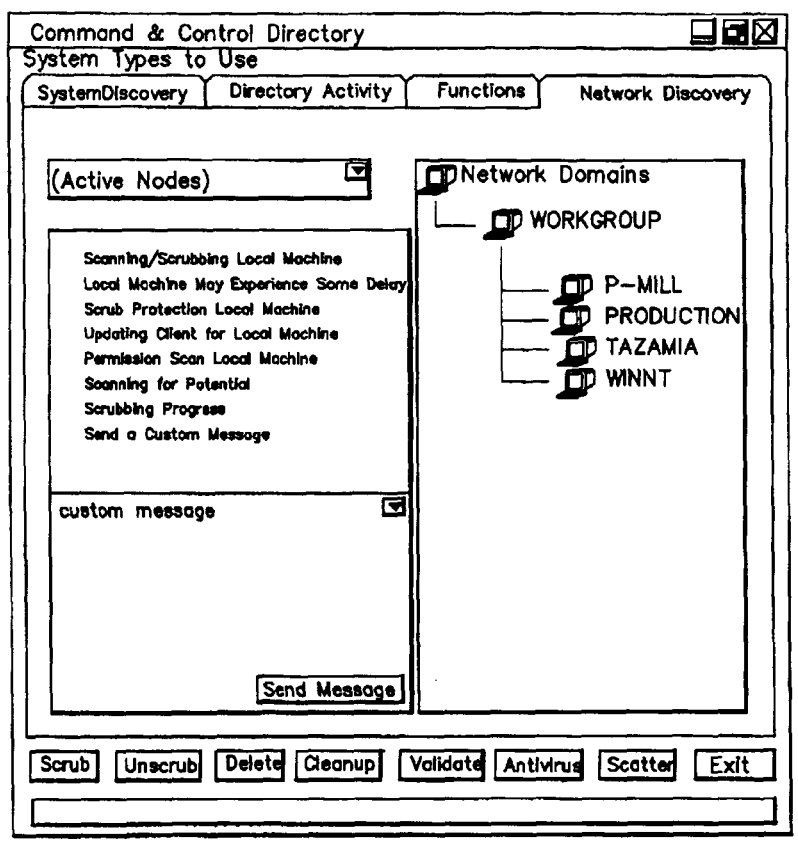
FIG. 10 shows network resources management.

FIG. 10 shows network resources management.

FIG. 11 shows color coding of prioritized categories.

Figure 12:
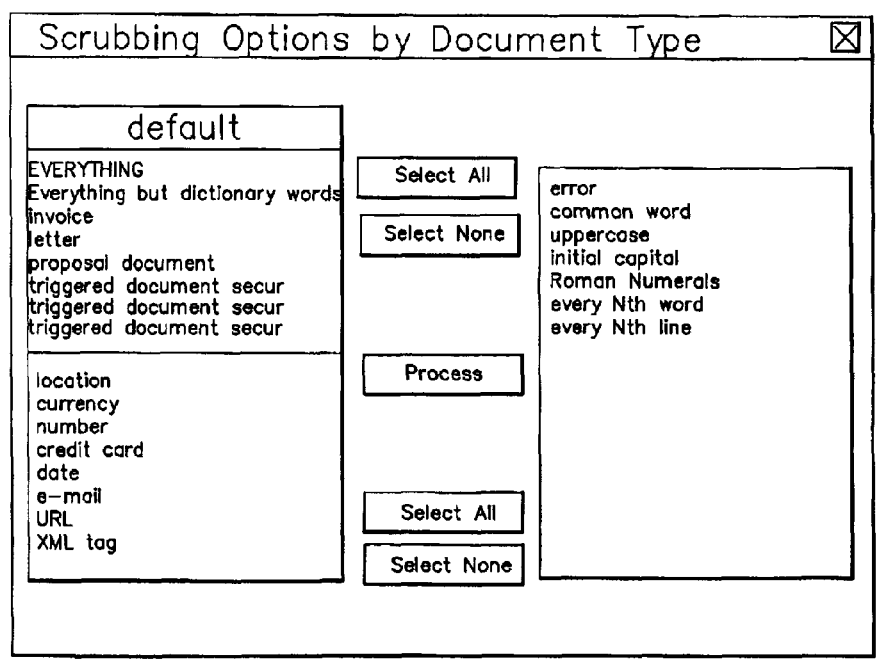
FIG. 12 shows selection of categories for document type scrubbing.

FIG. 12 shows selection of categories for document type scrubbing.

Figure 13:
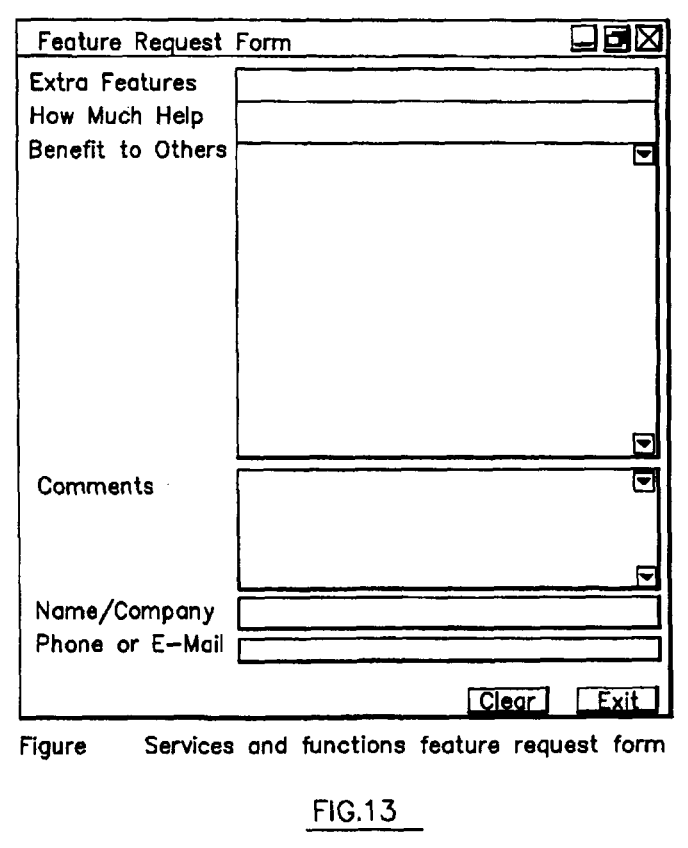

FIG. 13 shows services and functions feature request form.

Figure 14:
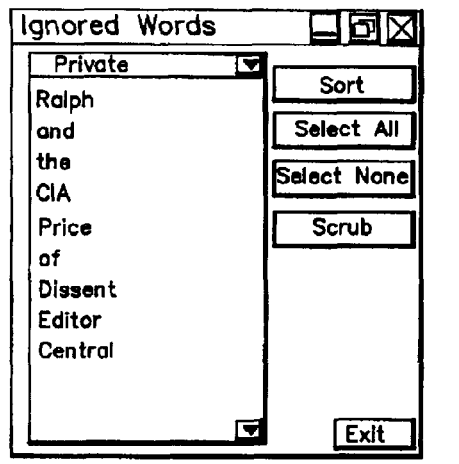
FIG. 14 shows report of words that have been categorized by not extracted.

FIG. 14 shows report of words that have been categorized by not extracted.

Figure 15:
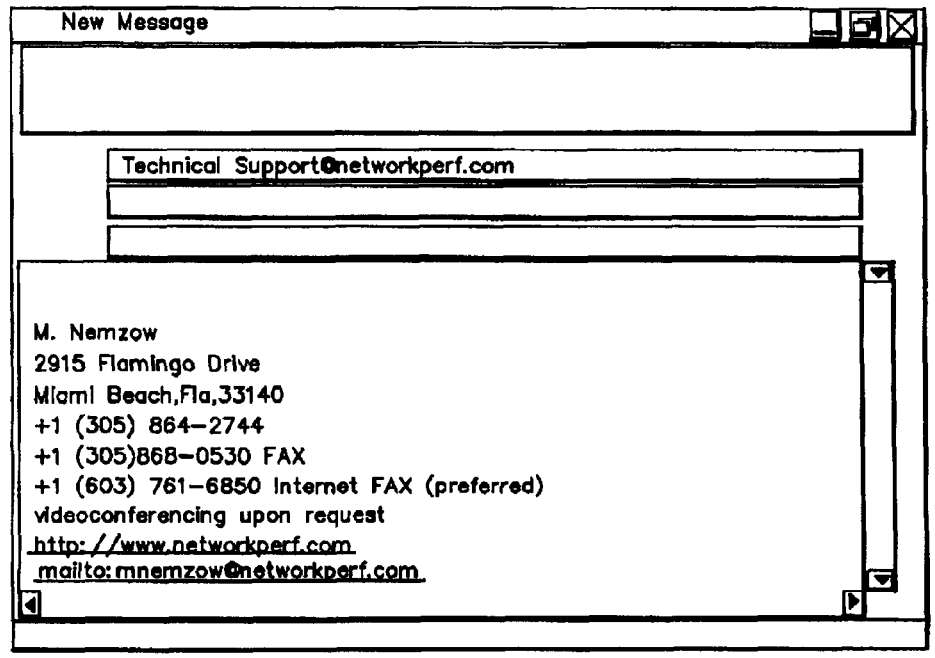
FIG. 15 shows e-mail support form.

FIG. 15 shows e-mail support form.

Figure 16:
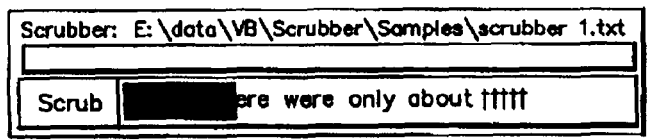
FIG. 16 shows minimized display of extractions in progress.

FIG. 16 shows minimized display of extractions in progress.

Figure 17:
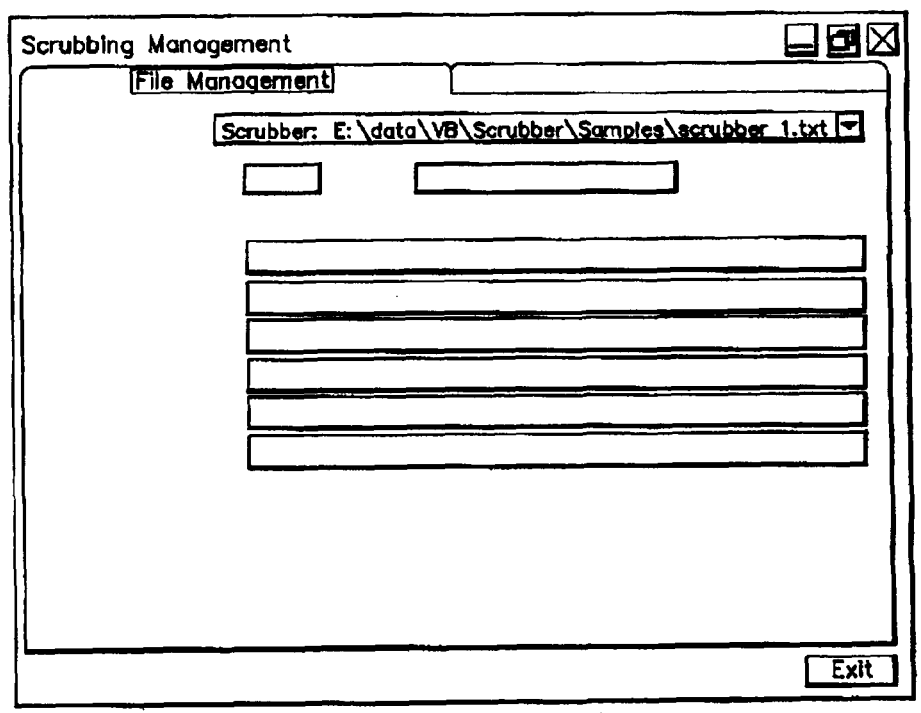
FIG. 17 shows file management of extracted data streams.

FIG. 17 shows file management of extracted data streams.

Figure 18:
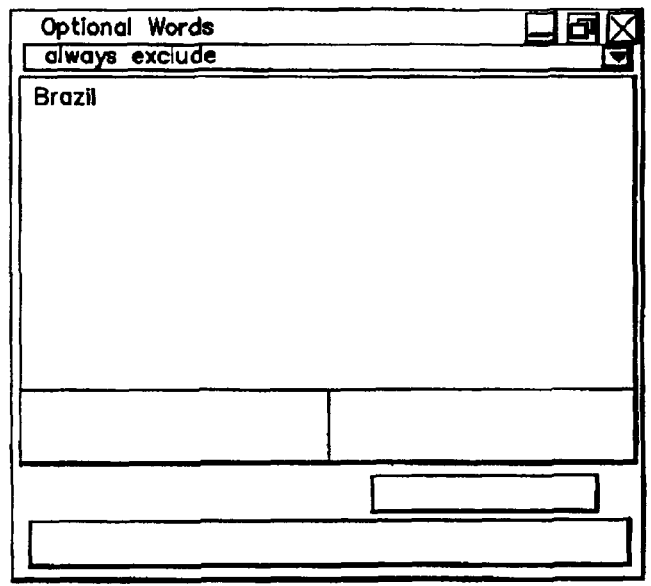
FIG. 18 shows list of words to always exclude from extraction process.

FIG. 18 shows list of words to always exclude from extraction process.

Figure 19:
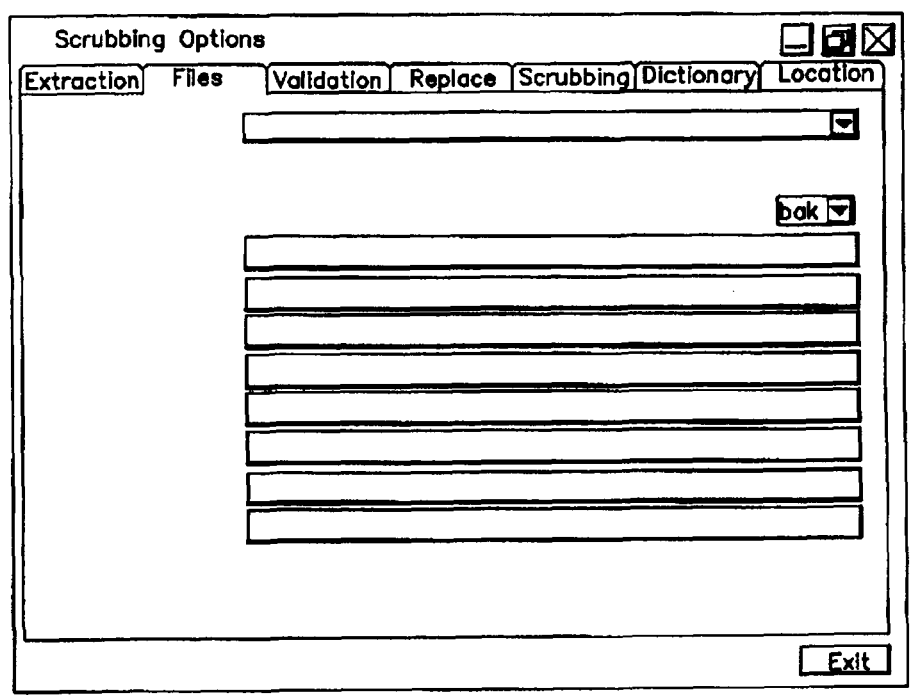
FIG. 19 shows transport and shuffling control of output streams.

FIG. 19 shows transport and shuffling control of output streams.

FIG. 20 shows output extraction display options.

FIG. 21 shows supplemental dictionary and categorization control for extraction prioritization.

Figure 22:
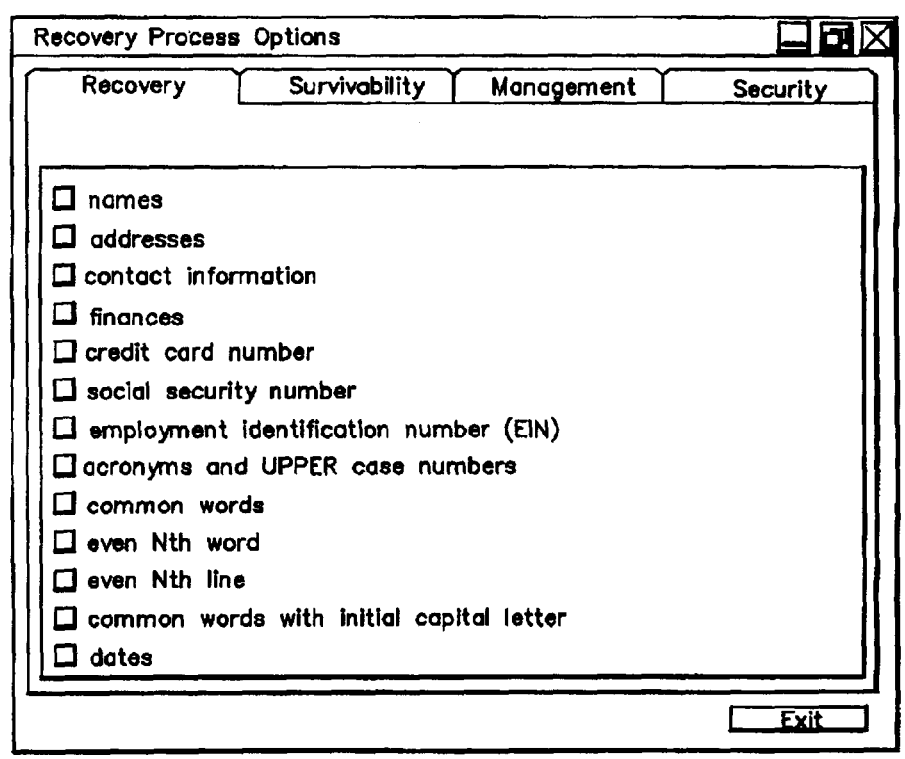
FIG. 22 shows reconstitution options.

FIG. 22 shows reconstitution options.

Figure 23:
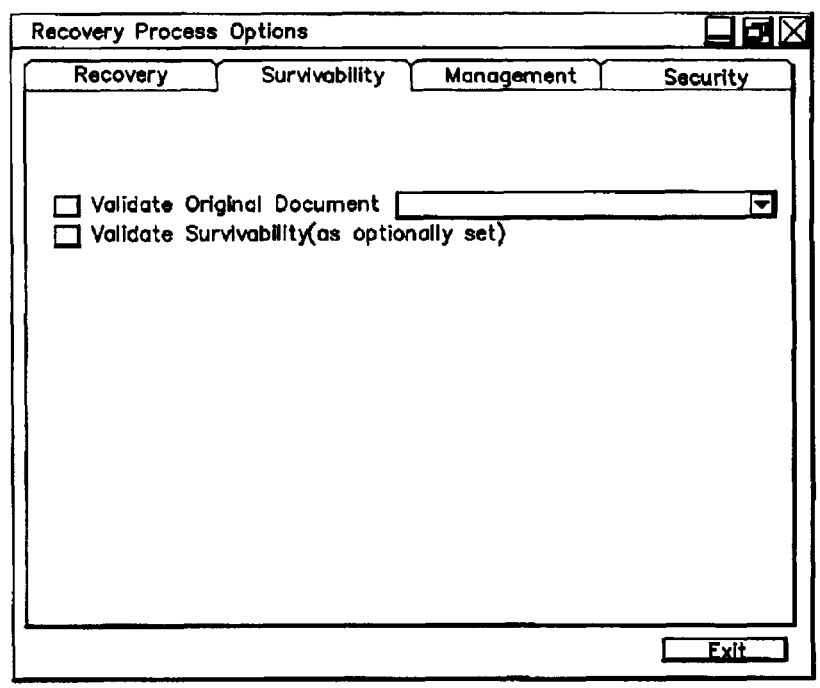
FIG. 23 shows source and output stream validation options.

FIG. 23 shows source and output stream validation options.

Figure 24:
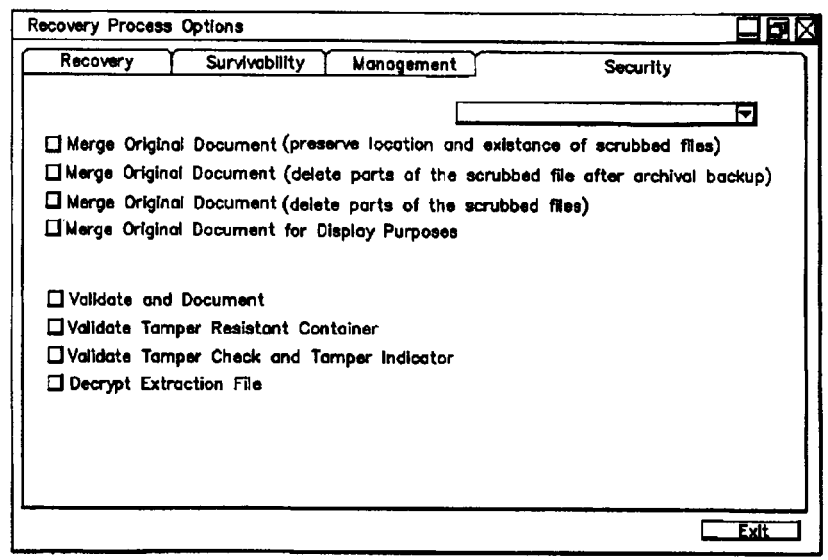
FIG. 24 shows reconstitution and security access options.

FIG. 24 shows reconstitution and security access options.

Figure 25:
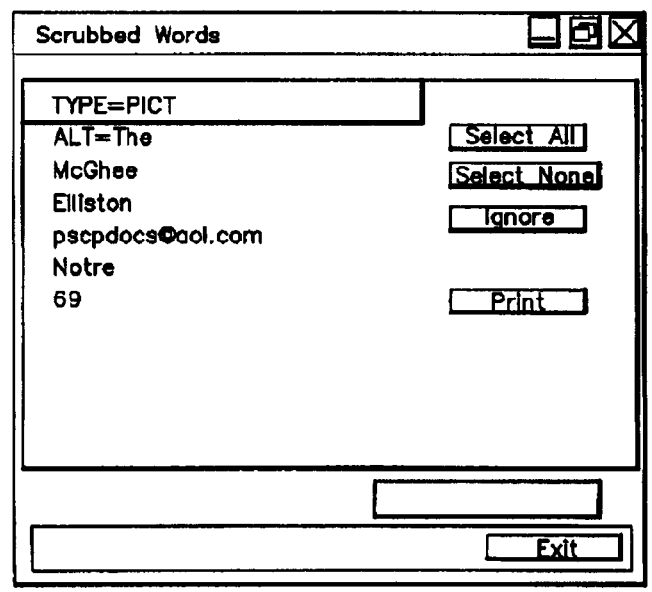
FIG. 25 shows list of data objects removed from source stream.

FIG. 25 shows list of data objects removed from source stream.

Figure 26:
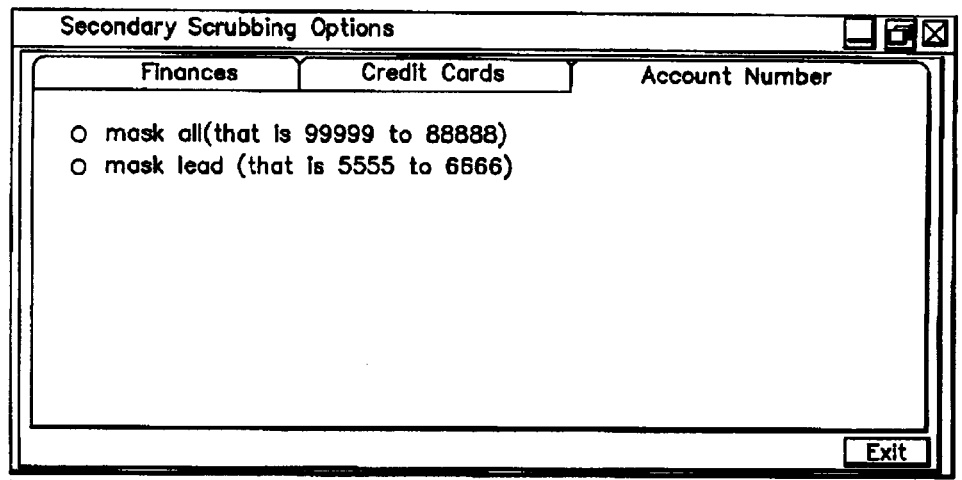
FIG. 26 shows selection of placeholders for data objects.

FIG. 26 shows selection of placeholders for data objects.

Figure 27:
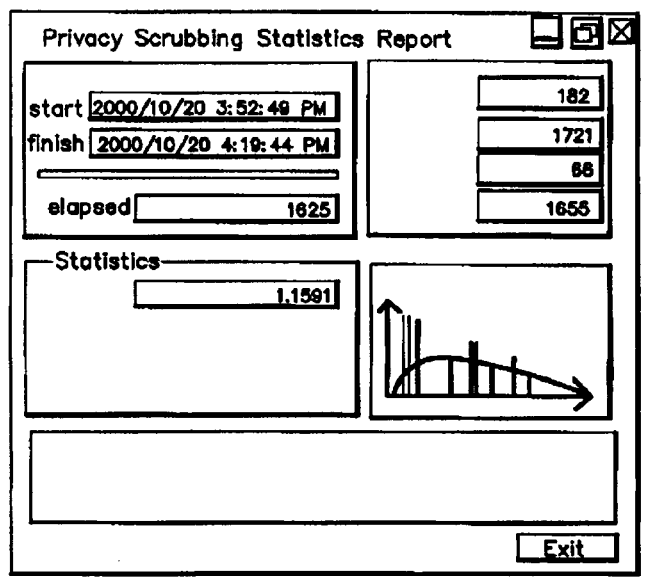
FIG. 27 shows statistics report.

FIG. 27 shows statistics report.

Figure 28:
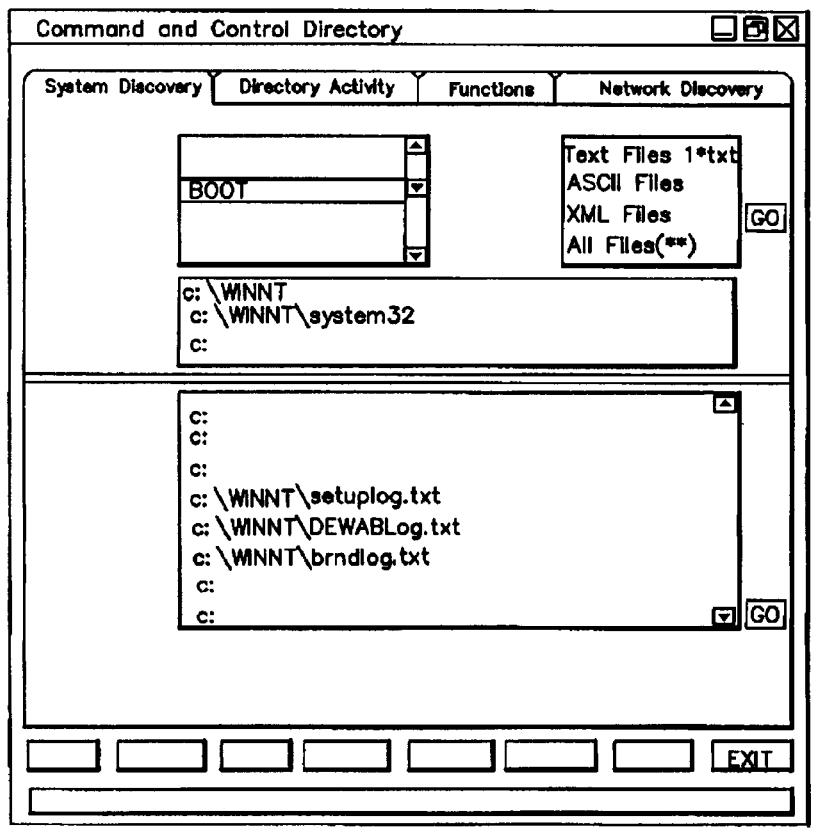
FIG. 28 shows command and control local disk management in process.

FIG. 28 shows command and control local disk management in process.

Figure 29:
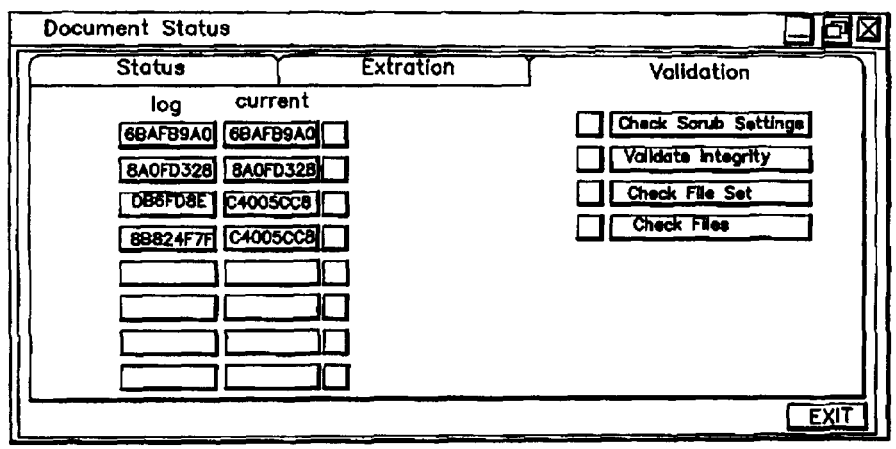
FIG. 29 shows previously process data stream report and status.

FIG. 29 shows previously process data stream report and status.

Figure 30:
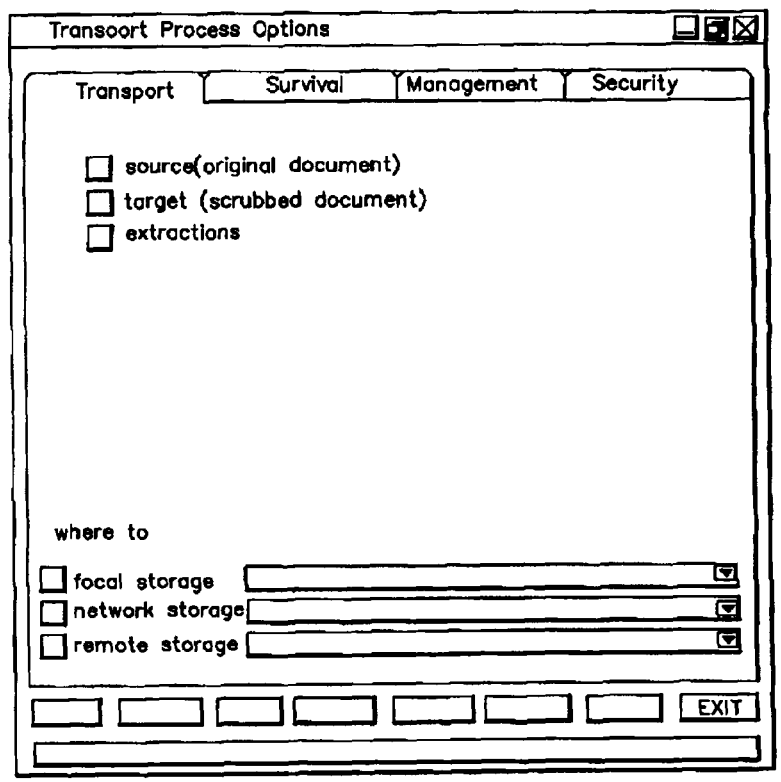
FIG. 30 shows transport configuration options.

FIG. 30 shows transport configuration options.

Figure 31:
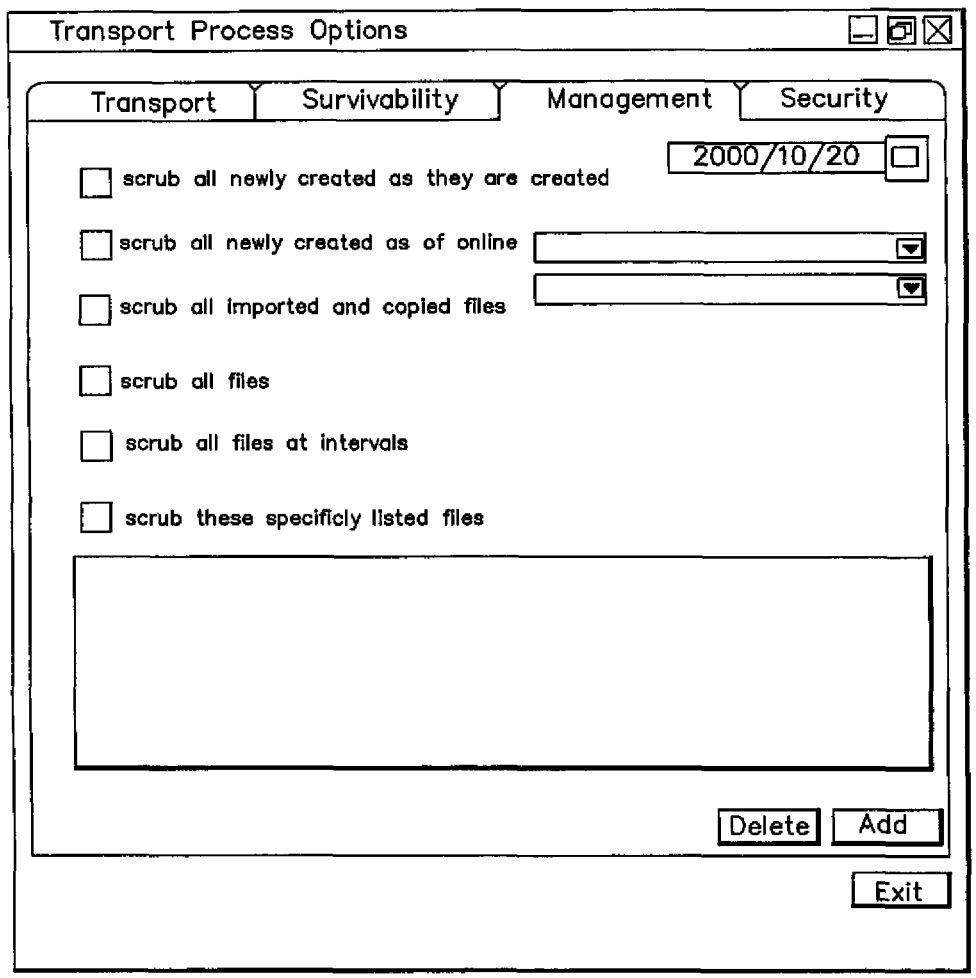
FIG. 31 shows storage services configuration options.

FIG. 31 shows storage services configuration options.

Figure 32:
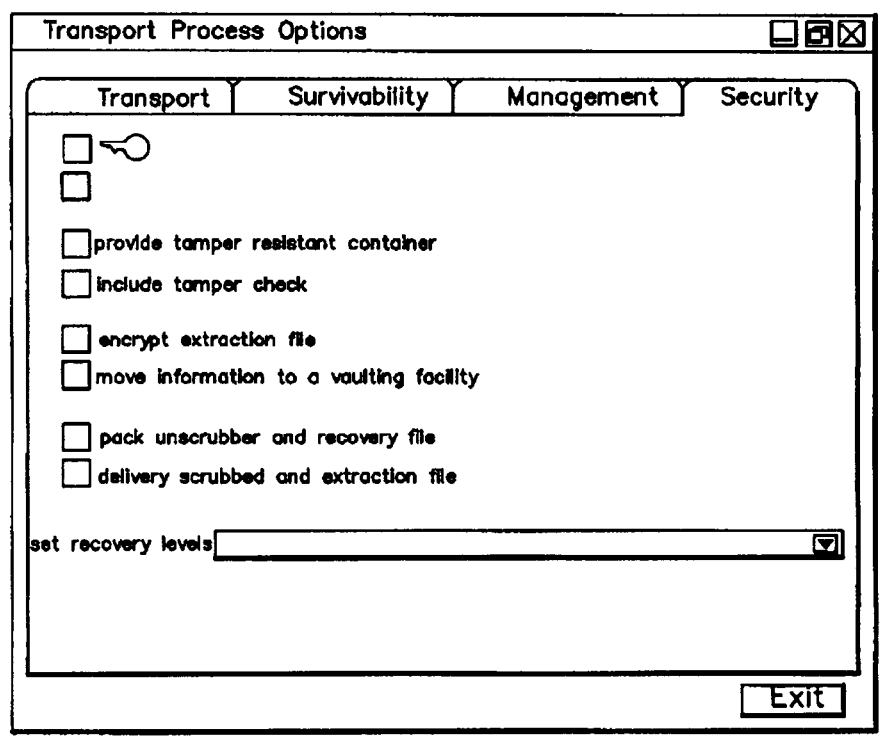
FIG. 32 shows security configuration options.

FIG. 32 shows security configuration options.

Information Doors and Data Doors

Conception and Circumstances

During the process of developing security technologies for defending critical infrastructure, we discovered the complexity of the business model and the obvious need to redefine and create new systems and methods for doing business. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.

Purposes and Advantages of Invention

The invention is a machine and process; its main purposes and advantages are as follows:

The creation of information doors and data doors in existing data objects streams, to enable a linking to other relevant data objects streams in batch or real-time. The doors are in situ links to other data sources, replacements, access to processes and services, other resources, and standard URL links. The purposes for the linking can include in addition to other purposes:

1. Infusion of linked digital data for enhancement of information and content.
2. Infusion of linked digital data for updating purposes including updating financial information, currency, date, time, location, and names, et cetera.
3. Infusion of linked digital data for communication purposes including messages and e-mail.
4. Infusion of linked digital data for alerting.
5. Infusion of linked digital data for triggering actions.
6. Infusion of linked digital data for transactional purposes including payment for linked services.
7. Infusion of linked digital data for commercial purposes including banner, interstitial, and externally linked advertisements.

A machine and process for automatically creating the said information doors and data doors in a data object streams to enable linking to other relevant data streams.

The selection of various prioritized data objects within object data streams, processing them to enable the creation of localized doors to other relevant data object streams.

The selection of various prioritized data objects within object data streams, processing them to enable the creation of localized doors to relevant storage memories.

The selection of various prioritized data objects within object data streams, processing them to enable the creation of localized doors secondary to triggering actions.

The selection of various prioritized data objects within object data streams, processing them to enable the creation of localized doors secondary to supporting procedures.

The selection of various prioritized data objects within object data streams, processing them to enable the creation of localized doors secondary to payment services.

The selection of various prioritized data objects within object data streams, processing them to enable the creation of localized doors secondary to in situ messaging and advertising.

The selection of various prioritized data objects within object data streams, processing them to enable the creation of localized doors secondary to in situ language translation.

The selection of various prioritized data objects within object data streams including digital documents, processing them in order to enable the creation of localized doors to other relevant data objects streams and data objects memories.

The selection of various prioritized data objects within objects data streams including video, processing them in order to enable the creation of localized doors to other relevant data objects streams and data objects memories The selection of various prioritized data objects within object data streams including audio, processing them in order to enable the creation of localized doors to other relevant data objects streams and data objects memories.

The creation of doors to search engines including web enabled search engines.

The creation of doors to translations in other forms and formats of the source data object streams, such as HTML, XML, databases, and other data streams.

The transport of data streams to other local and external data storage.

The creation of doors to data object streams and digital documents within the same digital system, the local network, other systems, and any extended and external network infrastructure.

The creation of doors to Internet sites, URLs, and hyperlinks.

The creation of doors to systems updating information.

The creation of doors to link to contact information, addresses, phone numbers, sales information, and user-defined promotional materials.

The creation of doors to manned and automated services including various information services including news services and financial services.

The creation of doors to manual and automated services including various informational services, involving payment or other considerations, such as presentment of advertisements.

The creation of doors to data objects from various messaging systems.

The creation of doors to data objects from various alerting systems and mechanisms.

Supplemental linked information accessible through a data door might be displayed as part of or as an overlay to the source data stream.

The purposes include the following business models and technical implementations. The selection of data objects for creation of doors, can be done both manually as well as automatically. The invention enables a created doorway that creates a point of payment, permitting access to a linked data objects stream following payment or other consideration. The invention also enables the creation of doors for transporting selected data objects from a data stream and a document into a secured storage (local and external). The invention also enables the creation of doors for replacing the prioritized selected data objects with various placeholders. The invention optionally enables customization of the different links for each specific user. By incorporating the optional invention's access module, each user is identified and profiled and links relevant to this user will be presented. Optionally, users could be assigned varying levels of access. In such situations, users will have access to links of documents with a higher confidentiality level. Some users might be allowed to access links to pay for information services, while others would not.

Description

The innovation is a system and method for automatic selection of prioritized data objects within data object streams. After specific data objects have been identified and selected as data doors, digital placeholders are automatically (and optionally through manual methods too) inserted within the data streams. The placeholders serve as the links to other data streams and storage memory, secured display of information, and as messages and advertisements in their own right. The placeholders might include censorship, substitutions, URLs, addresses of files, links to data streams, addresses of directories, messages, advertisements, encrypted information, links to encrypted information, and the process to reconstitute the original data objects removed from the data streams.

The system scans, as part of the selection process, for data objects within the data streams, searching for candidates that become data doors. The scanning process takes place within data streams, within computers; within computer networks, within communication devices, personal wireless devices, as well as electronic mail systems. The selection of prioritized data objects includes words, characters, numbers, and images, sounds, video, and selected digital data packets.

The data object selection process comprises the following:
1. Creating a first dictionary of prioritized data objects for selection.
2. Providing a digital means responsive to said dictionary for use as a filtering condition.
3. Providing a means for selecting any data objects in said first dictionary.

The invention includes the following:
1. Creating a second dictionary of data objects not to be selected.
2. Providing a digital means responsive to second dictionary for use as a filtering condition.
3. Providing a digital means for selecting data objects not mentioned in the second dictionary.
4. Providing a filtering means for automatic sorting of said selected data objects according to separate predefined data objects categories.

The insertion of placeholders, placeholders comprising keys, codes, links, doors, processes, addresses, encryption, in place and beside the selected data objects, by a process that comprises the following:
1. Providing an automatic means for sorting and defining into which predefined categories each selected data object fits.
2. Providing a digital means for matching selected data objects with placeholders relevant to said predefined category.
3. Providing a digital processing means to automatically place the matched placeholder with the selected data object.

4. A digital means for scoring and ranking links in accordance to their contextual relevance to selected data objects to achieve the highest contextual relevance and also provide all contextual references.

The invention includes the following optional modes:
1. Controlled access to links.
2. Information doors and data doors would be accessible only to approved users with appropriate classification, under predefined situations and modes. The doors are released to secondary information only after user had been approved by the system.
3. Information doors and data doors would be accessible only to approved users with appropriate classification, under predefined situations and modes. The doors are released for reconstitution of original data objects for insertion in the object data streams only after user had been approved by the system.
4. Information doors and data doors would be accessible only to approved users with appropriate classification, under predefined situations and modes. The doors are released for access to secondary processes, only after user had been approved by the system.
5. Doors can be closed and prevented from reopened immediately, at any future times, or permanently according to access rules, threats, and modes. Any links are inherently transient.

The invention includes the following optional mode:
1. Leveled access to different links.
2. Users might access different links according to their classification. For example links of confidential nature might be accessible to users with high classification.

Sketches

Figure 33:
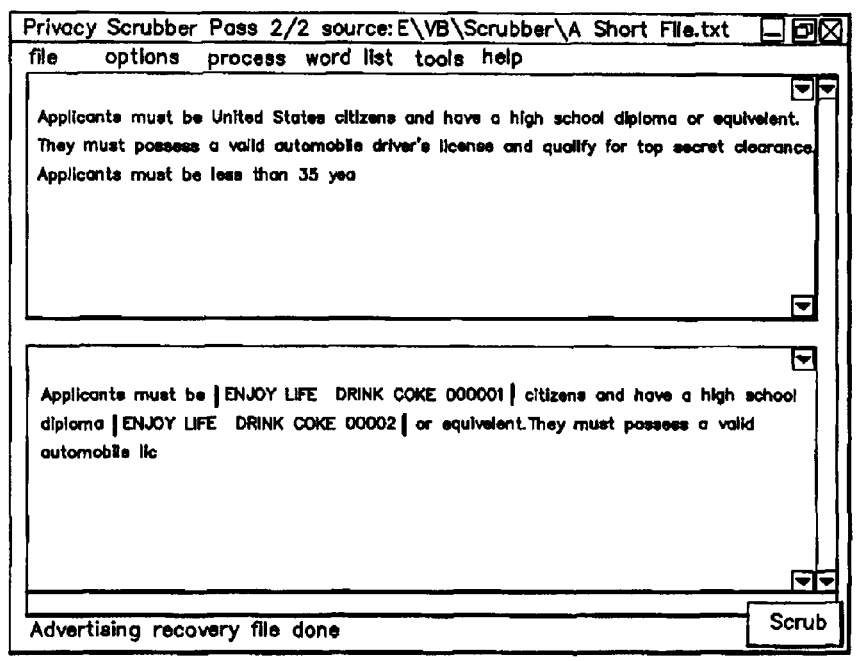
FIG. 33 shows runtime sample of interstitial advertisement insertion.

FIG. 33 runtime sample of interstitial advertisement insertion

Figure 34:
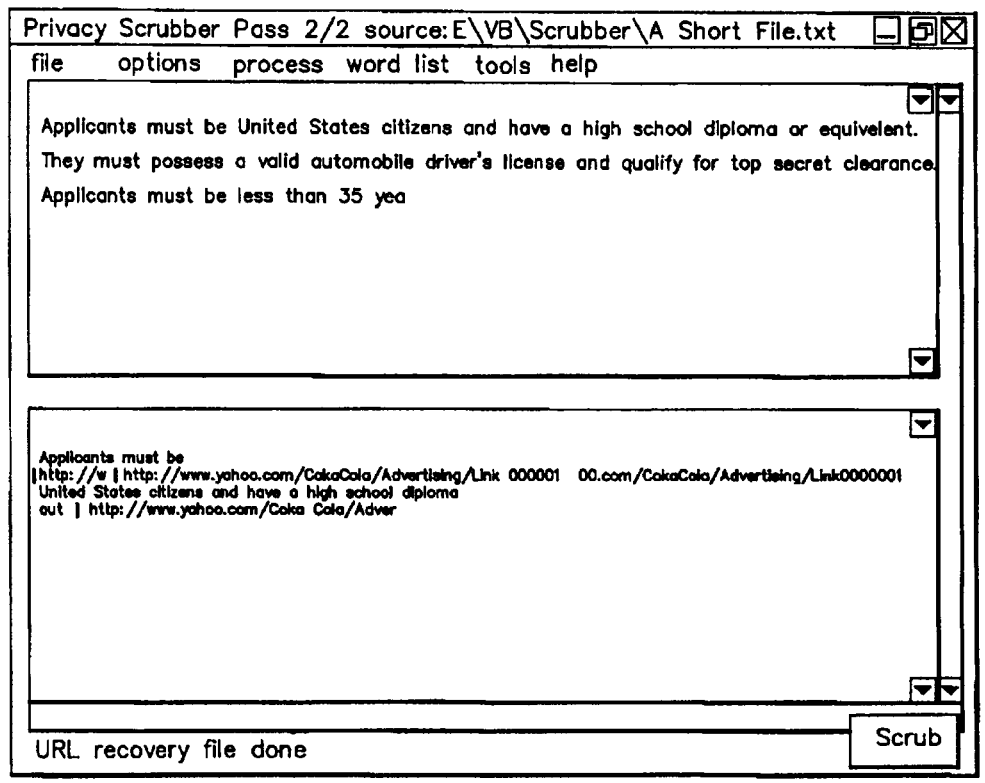
FIG. 34 shows automatic insertion of url into test document.

FIG. 34 automatic insertion of url into test document

Ramifications

The invention will enable the transformation of common data object streams which primarily serve as digital data repositories into empowering tools because the selected information (doors) becomes active and linked on a location, user, system, time, and situational basis. In essence a digital computer document would be automatically turned into a tool enabling various activities through its imported links:
1. The invention facilitates new ways of interacting with digital systems.
2. The invention empowers users by automatically presenting important contents customized and personalized automatically.
3. Because links are inherently transient, links are flexible, conveniently reflect and update changes within informational databases or resources, provide access security, and mobility of security by the plurality and transformation of the links.
4. The links are customizable by user, times, location, systems, threats, or modes.
5. The links can serve as secondary or supplemental storage.
6. Because links are many, transient, and mobile, this provides an inherent security advantage by precluding access to sensitive and identifying information.

The invention enables digital documents to automatically create links and activate those links to relevant content, link to secondary sources, messages, services, transactions, advertisements, alert with needed information. The invention also enables a user to view relevant content automatically without the need to point a mouse, other mechanical or digital device, voice-enable, or build tables of related content. Another ramification of the invention is the automatic delivery of different data streams including digital, audio, and video content without the involvement of the user or designer. The said delivery of data streams into a document can be automatically customized to the specific user profile based on his access classification, time of day, system, location, threats, and modes. Furthermore the importation of data streams into a document enables the transaction of payment for information and service providers. This technology alters and infuses new information within the context of the existing historical data. The invention is focused on automatic creation of links in object data streams. Furthermore the invention deals with all data objects streams and not only Internet or web related hyperlinks but linkages among a diverse basis of data objects and data streams.

Closest Known Art

The closest known art is represented by hyperlinks and relational databases. Hyperlinks, used in connection to the Internet and the World Wide Web, alter the basis of original source data streams and do not provide restitution to original formats. In addition, links for multiple resources must be specified in sequential multiples. The existing technology exposes the link and any inherent information within that link, thereby exposing security vulnerability.

Relational databases, both table-driven and object-oriented, require and demand the prior establishment of referential integrity rather than an ad hoc, after-the-fact assignment of importance, relevance, and functional relationships. The existing data extraction, data mining, data warehousing, and report writing are used to create statistical or keyword relationships within large volumes of historical data.

The Figures which illustrate the Information Doors and Data Doors concepts described hereinabove are:

FIG. 33 shows runtime sample of interstitial advertisement insertion

FIG. 34 shows automatic insertion of url into test document

Critical Data Centers and Operational Survivability
Data Centers Management System Critical Data
Selection, Separation, and Protection Conception and Circumstances During the process of developing security technologies for defending critical infrastructure, we discovered the complexity of the business model and the obvious need to redefine and create new systems and methods for doing business. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.

Purposes and Advantages of Invention

The invention is a machine and process and its main purposes and advantages are as follows: A system for management of data centers with primary focus on management of the critical data of an organization.

The invention presents a technological capability to automatically locate critical and important information within documents, files and servers and then optionally:

Copy only the critical data and transfer it to secured storage as backup or other ongoing business uses Extract only the critical data and transfer it to remote secured storage with reconstitution under controlled release to authorized parties Extract the critical data, retain it locally or and transfer it to remote secured storage and transfer non critical data to a secondary storage for lower cost storage, network distribution, and consumption by other parties The process could occur locally at the source. The process could also occur at the site of service provider. Results could then be maintained at the site of the service provider or delivered to other service providers or sites. There is a clear distinction between critical documents, critical files, critical servers and critical data within documents, files or servers. The data center management system relates primarily to management of critical data and important data within documents files and servers. The issue is not the identification of files or processes but rather specific data units within the structured data streams, documents, files, or processes.

The focus on critical data enables granular protection and heretofore unavailable methods for management and control over the important organizational data assets, in other words, a focus on locating and securing the organizational "Crown Jewels."

The capability to automatically locate the critical data enables:

Higher grade security and protection to the critical assets

Cost saving by reallocating data within storage to other storage facilities to benefit from cost differential, in other words, applying high grade security for critical data while lower grade or unsecured security for non-critical data Safekeeping of critical data assets to enable critical missions under emergency Assurance for the survivability of the organization through vaulting critical data assets and access to critical and non-critical data with reconstruction during or post emergency According to Dataquest Research, (Jun. 12, 1999), "studies repeatedly show that CIOs and IT management are reluctant to store their critical corporate data at a remote location like the Internet data center where it could potentially reside on the same Redundant Arrays of Independent Disks (RAID) as their competitor's data."

The presented system enables the parsing (identification and extraction) of critical data, from documents, files and servers maintaining the critical data at the initial storage source while transferring the non-critical data to other storage locations, which might be less costly or less secure. The presented data center management system would be ideally utilized by organizations providing managed data storage, web hosting, or other application services. Specifically, a user of such services maintain a local data center could automatically identify and extract the critical data assets and either:

Maintain the critical data locally.

Remove the critical data to highly protected data centers/survivability centers.

Remove the non-critical data to other locations.

Specifically, the purposes and the advantages of the system are:

To automatically control selection of data objects within a data stream and release them in a controlled method only to authorized parties.

To automatically separate data objects within a data stream into two or more digital data streams according to the importance and categorization of contents, through extraction and removal of the prioritized content and its replacement by appropriate placeholders.

To automatically control selected contents in E-mail, and enable its release in a controlled method only to authorized parties.

To enable users to leverage the growth in computer and telecommunications connectivity and electronic commerce by reducing security risks.

To enable users to release documents, digital files, and data streams into closed and opened digital networks with the confidence that important, identifying, and critical contents in that documents, digital files, and data streams is secure and will be seen only by authorized parties.

To enable real time simultaneous customization and personalization of selected contents within a data stream to different parties, allowing instant display of the selected content or part of it based on, and tailored made to the status of the user or receiving party.

To secure the important and critical contents of a document or digital file by transporting said contents into a separated data stream and removing said data stream to a removed storage memory, while eradicating any copies, temporary caches, or traces of the removed extracts on the original computer or machine.

To enable instant return transfer to the display or to another display all or part of extracted content instantly with verification of authorized user.

To create a projection of the original document, digital file, data objects within a data stream, or variations of it through combined projection of the splinted data streams, while maintaining separation between the data streams.

To create an alternative method for security, instead of encryption, which is secure, cost effective, less time-consuming, and flexible.

To enable automatic timed removal of specific content items, automatically or manually selected from a document, digital file, or data objects within a data stream.

To enable an automatic timed reconstruction (reconstitution) of the said document, digital file, or data objects within a data stream.

The system and method creates a high level of security by automatic selection and removal of critical and prioritized contents from a data objects stream, whether it be a digital document, digital file, database, sound bite, video clip, other structured, or streaming data formats. The system and method enables a controlled release of the extracted data objects, enabling instant display of the instantaneous returned contents, contingent on verification of user identity, access rights, time of operation, location of source and or user, destination of source and or user, and determine threat modes. The system and method delivers high security by removal of the selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract can also be substituted on-the-fly to provide updated results, misinformation, disinformation, messages, alerts, links (to reports, data mining, search engines, web sites, and hyperlinks understood in the current art), advertisements, and personalization and customization. The said validation can be done instantly by password, challenge questions and answers, remote verification (phone, video, or personal contact with user), or by biometrics means.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including: security risk criteria of threats and attacks, sources, targets, users, policies, time of day, and threat modes.

The extracted data is transported to an online removable storage and under extreme security threats to an offline/off-network, digital or physical vaulted storage. Transport and shuttle is based on the level of security alert. The use and release of the vaulted extractions is controlled by a set of rules or organizational policy which includes the following options among others:

A vaulting of some, all, or specific data object extracts for long or short periods of time.

Release of extractions into a display, in which the extracted data objects will reconstitute with the modified original data stream, the original data objects stream or original document.

Release of extractions into a projection display in order to project with the modified data stream, the original document while maintaining complete separation of the modified source data stream (the source modified by the extraction of data objects and insertion of placeholders) and the extracted data object streams.

Release of extractions into a projection display in order to project a reconstitution of the original document, in other words to create altered versions of the original document, while maintaining complete separation of the modified data stream and the extracted streams.

In situations of high security threats, release of extractions into another projection display, PDA, floppy disk, paper document a wireless display, an overlay transparency while maintaining logical and physical separation of delivery streams. This will enable working with a representation of the initial source, but not the initial source itself, while understanding the prevalent, critical extracted information without comprising security to the initial source material by exposing sensitive, identifying, or critical information.

The distribution of sources, modified sources, or extracts to remote and distributed viewing devices.

Enable the ongoing operation of information delivery and display in defiance of known ongoing or unknown security flaws, breaches, or events compromising the general state of security.

The delivery of distinct and separate data streams, delivered on the same or different channels and media, each with minimal, limited, or even substantial usefulness in and by itself, that can be overlaid logically or physically to reconstitute the identifying data stream and display. Separate display devices can be used to create a composite image or they can be overlaid to physically separate display devices to reconstitute a useful composite display.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted storage. Competitors or hackers, who learn that a computer or network is protected by the system and method, might decide to attack another target instead. This is comparable to a situation in which a bank robber, who finds out that the bank vault is empty, will most probably look for another bank.

The system and method has a menu of different options including the ability to extract:

All existing databases on the computer or network

All newly loaded, mounted, or integrated data to the computer or network

All plug-in memory devices (temporary or permanent) containing data

All new and imported data to the computer or network

All new work and output created by the computer or network

All data being transported in/out of the computer or network including electronic mail All data being transmitted in/out of the computer or network including electronic mail The system and method releases the extracted data streams, subject to a controlled-release mechanism and process. The release mechanism is contingent on parameters including; rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or hinder intruders. The system and method is very adaptable and flexible to provide additional layers of security, privacy, anonymity, redundancy, and backup through the selection, extraction, storage, transportation, and reconstruction processes. The dynamic architecture of the invention enables it to conduct an automatic real time configuration of its extraction/transport/recovery activities, in response to the challenge of attacks.

The invention's survivability modes enable:

Presetting of rules for computer or network functioning under attack or alert

An automatic assessment of damage and automatic reaction to enable functionality of critical missions Another object of this invention is as a system and method for automatically creating customized and personalized versions of a document, data object, or data stream. In real time, simultaneous versions of the original are created and altered, then disseminated based on the status of the different users and their access privileges. The system and method enables content management and control by automatically locating content items prioritized by importance, transporting them to a secure memory, and releasing them under explicit controls or preset rules.

Another object of the invention is as a system and method for control, analysis and management of important and prioritized information within documents, files, data object, and data streams. The system and method, enables the processing of all data objects at the time in which they are created or imported into the system. The said early stage processing, enables early stage inventorying of prioritized contents as well as early stage pattern recognition. Extracting critical information, such as credit card numbers, last names, first names, social security numbers, phones numbers, transaction dollar amounts and addresses, enables the system and method to aggregate data in categories and analyze the data in different optional methodologies including pattern recognition.

Another object of the invention is as a system and method for comprehensive monitoring of various activities including business activities in real time. With this level of detail, the system and method becomes a management information tool and information/data command and control center. The said system and method can include an alert system, which in effect creates a real time apparatus for command and control of the systems activities. In real time, and at any point in time, the user can get a comprehensive view of different activities including:

How many transactions are being processed, their content, their context, identity of the involved parties identity, their profiles, and the personnel involved.

How much money is being transacted.

When, in terms of dates, relevant to the transaction.

Where, in terms of geographical location, the transactions are taking place.

Where, in terms of geographical location, monies or goods are being transferred.

Which departments in the organization are involved.

Description

The invention is a machine consisting of the following elements. Reference to "above in item s" herein is only for relation back purposes.

1. A machine for managing data centers which implements a process of automatically selecting, extracting data objects from an existing data objects stream, and automatically releasing selected extract data objects, wherein said means comprising:
   A. A digital processing means for automatically selecting data object candidates for extraction from an existing data object stream located in a first memory.
   B. A digital processing means for automatically extracting selected data objects from an existing data object stream located in a first memory.
   C. A digital means of transporting extracted data objects to a second memory.
   D. A digital means for controlled release of extracted data objects to a display and other outputs. Whereby automatically selected contents are separated and removed from original document, file and data stream, and thence transported to secured storage memory and controlled released based on security, preselected categories, rules and other triggers.
2. A machine for automatically selecting and extracting as defined in above in item 1, wherein said means comprising:
   A. A digital means for storing a first dictionary of characters and data objects.
   B. A digital means responsive to said dictionary for use as a filtering condition.
   C. A digital means for extracting data objects not mentioned in said dictionary.
3. A machine for automatically selecting and extracting defined in above in item 2, wherein said means comprising:
   A. A digital means for storing a second dictionary of characters and data objects.
   B. A digital means responsive to said second dictionary for use as a filtering condition.
   C. A digital means for extracting any data object mentioned in said second dictionary.
4. A machine for automatically selecting and extracting defined in above in item 3, wherein said means comprising:
   A. A digital means for accepting additional data objects into dictionaries.
   B. A digital means enabling the adding of other dictionaries with said first and second dictionaries.
   C. Providing a digital means for customized dictionaries.
5. A machine for automatically selecting and extracting as defined in above in item 1, wherein said means comprising:
   A. A digital processing means for tagging and serializing derived selected data object extractions.
6. A machine for automatically selecting and extracting as defined in above in item 5, wherein said means comprising:
   A. A digital filtering means for automatically sorting of said selected extracted data objects according to separate data objects categories.
   B. A digital processing means for labeling said sorted, selected data objects, with their respective categories.
7. A machine for automatically selecting and extracting as defined in above in item 1, wherein said means comprising:
   A. A digital processing means for automatically creating new data object categories, for the said sorting process.
8. A machine for automatically selecting and extracting as defined in above in item 1, wherein said means comprising:
   A. A digital means for substantially erasing, from all memories except second memory, all copies and links and traces of removed selected extracted digital objects.
9. A machine for automatically selecting and extracting as defined in above in item 1, wherein said means comprising:
   A. A digital means for substantially eradicating from all memories except for second memory, all links, copies, and traces, to separated and extracted data objects. Said eradication includes termination of related delivery means, defragmentation of associated files, overwriting relevant files, cleaning memories, and caches.

10. A machine for automatically selecting and extracting as defined in above in item 1, wherein said means comprising:
   A. A digital means for substituting the extracted selected data objects with other data objects.

11. A machine for automatically selecting and extracting as defined in above in item 1, wherein said means comprising:
   A. A digital means for substituting the extracted selected data objects with other data object placeholders including; serialization, characters, replacement of information with other information, messages, alerts, bar codes, links to other data, null sets, URLs, and web site addresses 12. A machine for automatically selecting and extracting as defined in above in item 1, wherein said means comprising:
   A. A digital processing means for configuring the scope of file selection in the automatic selecting and extracting process.

13. A machine for automatically selecting and extracting as defined in above in item 1, wherein said means comprising:
   A. A digital processing means for configuration of the scope of computer files selection for the automatic selecting and extracting process based on: file status, timing, preset rules and user's specific selection.
   B. A digital processing means for configuration of the scope of computer files selection for the automatically selecting and extracting process based on verifying of file existence, checking for recent activity, checking whether recent separation and extraction activity of data objects is up to date in accordance to modes and preferences 14. A machine for automatically selecting and extracting as defined in above in item 1, wherein said means comprising:
   A. A digital processing means for establishing which computers, and digital machines in a network will be connected, accessible and interacting with said extracting machine.

15. A machine for automatically selecting and extracting as defined in above in item 1, wherein said means comprising:
   A. A digital processing means for initiating the selecting and extracting of data objects, triggered by preset rules for machine configuration.

16. A machine for automatically selecting and extracting as defined in above in item 1, wherein said means comprising:
   A. A digital processing means for initiating selecting and extracting of data objects, triggered by security alerts including threat mode and attack mode.

17. A machine for automatically selecting and extracting as defined in above in item 1, wherein said means comprising:
   A. A digital processing means for choosing the parameters for selecting and extracting of
   data objects, triggered by preset rules for machine configuration.

18. A machine for automatically selecting and extracting as defined in above in item 1, wherein said means comprising:
   A. A digital processing means for choosing the parameters for the selecting and extracting of data objects, triggered by security alerts including threat mode and attack mode.

19. A machine for automatically selecting and extracting as defined in above in item 1, wherein said means comprising:
   A. A digital processing means for interpreting the output of security intrusion detection means.
   B. A digital processing means triggering processing by said machine based on interpretation of output of security alerts and output of intrusion detection means.

20. A machine for automatically selecting and extracting as defined in above in item 1, wherein said means comprising
   A. A digital means for removing from a data objects stream selected data objects including digital records, elements of records, characters 21. A machine for automatically selecting and extracting as defined in above in item 1, wherein said means comprising:
   A. A digital means for removing from a data objects stream selected data objects including: digital graphic images and segments of graphic images.

22. A machine for automatically selecting and extracting as defined in above in item 1, herein said means comprising:
   A. A digital means for removing from a data objects stream selected data objects including: digitized sound.

23. A machine for automatically selecting and extracting as defined in above in item 1, wherein said means comprising
   A. A digital means for removing from a data objects stream selected data objects including: digitized video images and segments of video images.

24. A machine for automatically customizing, automatically selected content items, within in a data objects stream, wherein said means comprising:
   A. A digital data means for sorting extracted selected data objects into predefined contextual categories
   B. A digital data means for assigning an extracted selected data objects a data objects category. Whereby items of the automatically selected content are sorted into prearranged defined categories such as: credit card numbers, social security numbers, last name first name addresses. Whereby the selected content items are sorted according to categories, and are available for release for display to users, according to user status and clearance.

25. A machine for automatically customizing selected content as defined in above in item 24, wherein said means comprising:
   A. A digital processing means for sorting extracted data objects into predefined categories.
   B. A digital processing means for identifying which extracted data objects should be released to a user. Whereby the selected content items are sorted according to categories, and are available for release for display to users, according to predefined rules set.

26. A machine for automatically customizing selected content, as defined in above in item 25, wherein said means comprising:
   A. A digital processing means enabling the altering of the selected data objects. Whereby different items of the automatic selected contents will be altered and available for display to users according to user status and clearance.

27. A machine for automatically customizing selected content as defined in above in item 26, wherein said means comprising:
   A. A digital processing means for enabling different extract data objects to be released to different users. Whereby different items of the automatic selected contents will be available for release to a user display according to a predefined rule set.

28. A machine for automatically customizing selected contents as defined in above in item 27, wherein said means comprising:
   A. A digital processing means for selecting which extracted data objects are targeted as descriptors for information searching.
   B. A digital processing means for presenting the targeted extracted data object contents to online search engines.

C. A digital processing means for automatically presenting search results to authorized users. Whereby different items of the automatic selected contents are automatically targeted and presented to search engines and the search results and the items searched are available for display to users according to user status and clearance.

29. A machine for automatically customizing selected contents as defined in above in item 28, wherein said means comprising:
   A. A digital processing means for scoring and ranking contextual relevance of said search engine results.
   B. A digital processing means for presenting and linking, in a display, said scored and ranked search engines results with the extracted data objects
      Whereby search engine results are scored and ranked to achieve highest contextual relevance to the selected content items and available for display to users according to their status and clearance.
      Whereby there is no need for user to actively take any action like highlighting words, typing characters, the machine will automatically trigger searches for information and URL's relevant to the selected content items.
      Whereby there is no need for user to wait for search results relevant to the selected content items since the system automatically instructs said searches, at an early stage.

30. A machine for automatically customizing selected content s as defined in above in item 29, wherein said means comprising:
   A. A digital processing means enabling voice recognition and its presentation in a digitized form enabling the said machine to carry out its processes.

31. A machine for automatically customizing selected content s as defined in above in item 30, wherein said means comprising:
   A. A digital processing means for recognizing patterns of the selected and prioritized data objects
      within the data streams and assigning prioritization to various selected data content items.

32. A machine for automatically customizing selected content s as defined in above in item 31, wherein said means comprising:
   A. A digital processing means for submitting targeted selected extracts of data objects, to information search engines for display of relevant findings including: text, graphics, audio and video.

33. A machine for automatically customizing selected content s as defined in above in item 32, wherein said means comprising:
   A. A digital processing means for submitting targeted selected extracts to various machines and appliances for possible triggering of responses.

34. A machine for automatically transporting selected data objects to other memories and between memories for achieving higher level of security comprising:
   A. A digital processing means for selection of destination storage memory, triggered automatically by various preset criteria.
   B. A digital processing means for transport of said data objects to said selected storage memories, triggered automatically by various preset criteria and manually.

35. A machine for automatically transporting selected data objects as defined in above in item 34, wherein said means comprising:
   A. A remote memory storage media.

36. A machine for automatically transporting selected data objects as defined in above in item 35, wherein said means comprising:
   A. An offline memory storage media.

37. A machine for automatically transporting selected data objects as defined in above in item 36, wherein said means comprising:
   A. An Internet- and network-based memory storage media.

38. A machine for automatically transporting selected data objects as defined in above in item 37, wherein said means comprising:
   A. A copy and backup apparatus.

39. A machine for automatically transporting selected data objects as defined in above in item 38, wherein said means comprising:
   A. A digital means for encrypting and decrypting the data objects transported to storage memories.

40. A machine for automatically transporting selected data objects as defined in above in item 39, wherein said means comprising:
   A. A digital processing means for mapping the location and capabilities of the different connected and available memories.
   B. A digital processing means for mapping attacks, damage, and threats to the connected and available storage memories.

41. A machine for automatically transporting selected data objects as defined in above in item 40, wherein said means comprising:
   A. A digital means for triggering the bypass of damaged and threatened storage memories.

42. A machine for automatically transporting selected data objects as defined in above in item 41, wherein said means comprising:
   A. A digital processing means for automatically configuring the hierarchy for connectivity between the data objects to be transported, and the storage memories according to user needs, preset rules, and security constraints.

43. A machine for automatically transporting selected data objects as defined in above in item 42, wherein said means comprising:
   A. A digital processing means controlling the release of data objects from said storage memories based on user rights for access to the stored content.
   B. A digital processing means controlling the release of data objects from said storage memories based on security constraints including intrusion threat and attack.

44. A machine for automatically transporting selected data objects as defined in above in item 43, wherein said means comprising:
   A. A digital processing means for camouflaging data objects files by changing file identification structures.

45. A machine for automatically transporting selected data objects as defined in above in item 44, wherein said means comprising:
   A. A digital processing means for camouflaging data objects files by removing root directory.
   B. A digital processing means for camouflaging data objects files by removing name of file, links, references, shortcuts, and names of directory.

43. A machine for automatically controlled release of automatically selected extracted data objects, from a data object stream, into a display, wherein said means comprising:
   A. A digital reading means for reading the selected extracted data object's assigned category.

B. A digital means for identifying user access rights to the specific selected extracted data objects based the data object category.
C. A digital processing means for synchronized controlled release of selected data objects from storage memory according to user access rights and privileges.
   Whereby selected data objects are released from a memory into a user's display based on user's status and access privileges to such content.
44. A machine for automatically controlled release of extracted data objects, as defined in above in item 43, wherein said means comprising:
   A. A digital processing means for controlled release of selected extracted data objects based on access time.
45. A machine for automatically controlled release of extracted data objects, as defined in above in item 44, wherein said means comprising:
   A. A digital processing means for limiting the timed access to the selected extracted data objects.
46. A machine for automatically controlled release of selected data as defined in above in item 45 wherein said means, wherein said means comprising:
   A. A digital processing means for release of altered extracted data objects to the user display.
47. A machine for automatically controlled release of selected data as defined in above in item 46, wherein said means, wherein said means comprising:
   A. A digital means for release of selected extracted data objects with added data objects to the user display.
48. A machine for automatically controlled release of selected data as defined in above in item 47, wherein said means comprising:
   A. A manual means for enabling and disabling the release of the selected extracted data objects.
49. A machine for automatically-controlled release of selected data as defined in above in item 48, wherein said means comprising:
   A. A digital processing means enabling user to indicate desired data objects as candidates for extraction.
50. A machine for automatically-controlled release of physically separated data streams for projection as a combined data objects stream while maintaining full physical separation, wherein said means comprising:
   A. A digital processing means for releasing data object streams into display means.
   B. A digital processing means for releasing data object streams into projection means.
51. A machine for automatically-controlled release of logically separated data objects streams for projection as a combined data objects stream while maintaining full logical separation, wherein said means comprising:
   A. A digital processing means for releasing data object streams into display means.
   B. A digital processing means for releasing data object streams into projection means.
52. A machine for automatically display of prioritized extracted data objects in combination with the modified original data objects stream creating various displays, while maintaining substantial separation between the data streams, wherein said means comprising:
   A. A digital processing means for automatically selecting data object candidates for extraction from an existing data objects stream located in a first memory.
   B. A digital processing means for automatically extracting the selected data objects from an existing data objects stream located in a first memory.
   C. Providing a digital means of transporting extracted data objects to a second memory.
   D. A digital means for controlled release of extracted data objects to a display.
   Whereby data objects in said modified original data stream and the separated, selected, extracts data stream are presented in a combination, to create various displays including, display like original data stream, while maintaining a desired level of separation between the data streams.
53. A machine for automatically display as defined in above in item 52, wherein said means comprising:
   A. A digital process means for creating a total physical separation between selected extracts data objects stream and other streams, in said combined display process.
54. A machine for automatically display as defined in above in item 53, wherein said means comprising:
   A. A digital process means for creating a total logical separation between selected extracts data objects stream and other data objects streams, in said combined projection and display process.
55. A machine for automatically display as defined in above in item 54, wherein said means comprising:
   A. A digital display means for displaying released, selected, extracted data objects including a wireless display means.
56. A machine for automatically display as defined in above in item 55, wherein said means comprising:
   A. A digital processing means for processing different, versions of the reconstructed original data stream, according to different user's classifications.
57. A machine for automatically display as defined in above in item 56, wherein said means comprising:
   A. A digital processing means for processing real time, simultaneous, displays of different versions of reconstructed original data stream, according to different users' classifications.
58. A machine for automatically display as defined in above in item 57, wherein said means comprising:
   A. A digital display means to project together, the modified original data objects stream, with selected data objects in the extracted data streams to create a joint presentation, maintaining desired level of separation between the modified original data objects stream and the selected extracted data objects.
59. A machine for automatically display as defined in above in item 58, wherein said means comprising:
   A. A hardware apparatus to project a joint presentation of prioritized, selected, separated, extracted data objects streams, maintaining high level of separation between the modified original data objects stream and the prioritized extracted data objects.
60. A machine for automatically display as defined in above in item 59, wherein said means comprising:
   A. Hardware apparatus for overlaying the output of said prioritized extracted data objects with the output of the modified original data object stream to create a joint presentation while maintaining high level of separation between the modified original data object stream and the prioritized extracted data objects.
61. A machine for automatically display defined in above in item 60, wherein said means comprising:
   A. A digital display in which said separate extracted data object streams can be jointly presented in real time while maintaining separation between the data streams.

B. A wireless connected display in which said separate data streams can be presented separately and jointly presented while maintaining desired separation between the data streams.

62. A machine for automatically display defined in above in item 61, wherein said means comprising
   A. A digital processing means for anticopying based on configuration of color contrasts in the display.

63. A machine for automatically display defined in above in item 62, wherein said means comprising:
   A. A digital processing means for anticopying based on configuration of font sizes.

64. A machine for automatically selecting, extracting, storing and releasing extracted data objects, with security alerts triggering, wherein said means comprising:
   A. A digital processing means for selecting and extracting data objects from a stream of digital data objects.
   B. A digital processing means for storing said selected data objects.
   C. A digital processing means for releasing said selected data objects in a controlled method.
   D. A set of rules enabling the automatic triggering of various said machine's functions in different situations.

65. A machine with security alerts triggering as defined in above in item 64, wherein said means comprising:
   A. A data processing means for receiving and automatically interpreting security alert inputs.
   B. A set of rules enabling the automatic triggering of various said machine functions in a threat working mode.
   C. A digital processing means for automatically triggering a higher level of said machine activities for increased security.

66. A machine with security alerts triggering as defined in above in item 65, wherein said means comprising:
   A. A data processing means for receiving and automatically interpreting security alert inputs.
   B. A set of rules enabling the automatic triggering of various said machine functions in an attack working mode.
   C. A digital processing means for automatically triggering the highest level of said machine activities for increased security.

67. A machine with security alerts triggering as defined in above in item 66, wherein said means comprising:
   A. A digital-processing audit means for tracing user access 68. A machine for automatically selecting and extracting as defined in above in item 1, wherein said means comprising:
   A. A physical hardware apparatus providing a physical layer of security, and protection against tampering.

69. A machine for automatically selecting and extracting as defined in above in item 1, wherein said means comprising:
   A. A digital processing means for reporting logins attempted, logins, logouts, terminations, and failures.

70. A machine for automatically selecting and extracting as defined in above in item 1, wherein said means comprising:
   A. A digital processing means for mapping and reporting location and history of data object streams and selected data object extract s streams processed by said machine.

71. A machine for automatically selecting and extracting as defined in above in item 1, wherein said means comprising:
   A. A digital processing means for intrusion detection determining intrusion based on various file changes.

72. A machine for automatically selecting and extracting as defined in above in item 1, wherein said means comprising:
   A. A digital processing means enabling providing said applications and services as a third party provider over networks and Internet.

73. A machine for automatically selecting and extracting as defined in above in item 1, wherein said means comprising:
   A. A digital processing means enabling providing said applications and services for electronic commerce over networks and Internet.

74. A machine for automatically selecting and extracting as defined in above in item 1, wherein said means comprising:
   A. A digital processing means enabling providing said applications and services for electronic mail between computers, networks, and Internet.

75. A machine for automatically selecting and extracting as defined in above in item 1, wherein said means comprising:
   A. A digital processing means enabling providing said applications and services for electronic mail between computers, networks, and Internet.
   B. A digital processing means enabling receiver of electronic mail to receive the selected extracted data object stream by using an additional identifying means.

76. A machine for automatically selecting and extracting as defined in above in item 1, wherein said means comprising:
   A. A digital processing means for presenting information and charging payment for release of data object extracts.

77. A machine for automatically selecting and extracting as defined in above in item 1, wherein said means comprising:
   A. A digital processing means for presenting information and releasing of selected data object extracts predicated upon fulfillment of specific conditions.

78. A machine for automatically selecting and extracting as defined in above in item 1, wherein said means comprising:
   A. A digital processing means enabling overriding of machine processes by authorized users.

79. A machine for automatically selecting and extracting as defined in above in item 1, wherein said means comprising:
   A. A digital processing means for adding encryption to output data objects streams.

80. A machine for automatically selecting and extracting as defined in above in item 1, wherein said means comprising:
   A. A digital processing means for enabling manual selection of said machine processing including: automatic machine processing.
   B. A digital processing means for enabling manual selection of said machine processing
   C. Including: semi-automatic machine processing with capability to influence the machine's processing by moving tools such as levers, bars, buttons, check boxes, sliders, drag and drop, and voice enablement.
   D. A digital processing means for enabling manual selection of said machine processing including manual control of said machine processing.

81. A machine for automatically selecting and extracting as defined in above in item 1, wherein said means comprising:
   A. A digital processing means for controlling access to said machine and its various outputs based on user identification.

82. A machine for automatically selecting and extracting as defined in above in item 1, wherein said means comprising:
   A. A digital processing means for controlling access to said machine and its various outputs based on user identification through biometrics authentication.

83. A machine for automatically selecting and extracting as defined in above in item 1, wherein said means comprising:
   A. A digital processing means for controlling access to said machine and its various outputs based on timed challenge questions validating user identity.

84. A machine for automatically selecting and extracting as defined in above in item 1, wherein said means comprising:

A. A digital processing means for allowing continuing access to said machine and its various outputs based on timed challenge questions validating user identity.
85. A machine for automatically selecting and extracting as defined in above in item 1, wherein said means comprising:
   A. A digital processing means for controlling access to said machine and its various outputs based on identify friend or foe validating user identity.
86. A machine for automatically selecting and extracting as defined in above in item 1, wherein said means comprising:
   A. A digital processing means for allowing continuing access to said machine and its various outputs based on identify friend or foe validating user identity.
87. A machine for automatically selecting and extracting as defined in above in item 1, wherein said means comprising:
   A. A digital processing means for limiting different users access to said machine for specific time periods.
88. A machine for automatically selecting and extracting as defined in above in item 1, wherein said means comprising:
   A. A digital processing means for limiting users access to data object extracts for specific time periods.
89. A machine for automatically selecting and extracting as defined in above in item 1, wherein said means comprising
   A. A digital processing means for limiting users access to different machine functions at specific time periods.

The invention is also a process and a business method comprising:
90. A process for automatically selecting and extracting data objects from an existing data object stream where automatically releasing selected extract data objects to a display, wherein said means comprising:
   A. Providing a digital processing means for automatically selecting data objects candidates for extraction from an existing data objects stream located in a first memory.
   B. Providing a digital processing means for automatically extracting selected data objects from an existing data objects stream located in a first memory.
   C. Providing a digital means of transporting extracted data objects to a second memory
   D. Providing a digital means for controlled release of extracted data objects to a display.
      Whereby automatically selected contents can be separated and removed from original document, file or data stream, transported to secured storage memory and controlled released based on security, preselected categories, rules and other triggers
91. A process for automatically selecting and extracting as defined in above in item 90, wherein said means comprising:
   A. Providing a digital means for storing a first dictionary of, characters and data objects
   B. Providing a digital means responsive to said dictionary for use as a filtering condition
   C. Providing a digital means for extracting data objects not mentioned in said dictionary
92. A process for automatically selecting and extracting defined in above in item 91, wherein said means comprising:
   A. Providing a digital means for storing a second dictionary of, characters and data objects
   B. Providing a digital means responsive to said second dictionary for use as a filtering condition
   C. Providing a digital means for extracting any data object mentioned in said second dictionary.
93. A process for automatically selecting and extracting defined in above in item 92, wherein said means comprising:
   A. Providing a digital means for accepting additional data objects into dictionaries.
   B. Providing a digital means enabling the adding of other dictionaries with said first and second dictionaries.
   C. Providing a digital means for customizing dictionaries for specific content fields.
94. A process for automatically selecting and extracting as defined in above in item 93, wherein said means comprising:
   A. Providing a digital processing means for tagging and serializing derived selected data object extractions
95. A process for automatically selecting and extracting as defined in above in item 94, wherein said means comprising:
   A. Providing a digital filtering means for automatically sorting of said selected extracted data objects according to separate data objects categories.
   B. Providing a digital processing means for labeling said sorted, selected data objects, with their respective categories
96. A process for automatically selecting and extracting, as defined in above in item 95, wherein said means comprising:
   A. Providing a digital processing means for automatically creating new, data object categories for the said sorting, process.
97. A process for automatically selecting and extracting as defined in above in item 96, wherein said means comprising:
   A. Providing a digital means for substantially erasing, from all memories except second memory, all copies and links and traces of removed selected extracted digital objects.
98. A process for automatically selecting and extracting as defined in above in item 97, wherein said means comprising:
   A. Providing a digital means for substantially eradicating from all memories except second memory, all links, copies, traces, to separated and extracted data objects. Said eradication includes: termination of related delivery means, defragmenting associated files, overwriting relevant files, cleaning memories, and cashes.
99. A process for automatically selecting and extracting as defined in above in item 98, wherein said means comprising:
   A. Providing a digital means for substituting the extracted selected data objects with other data objects placeholders.
100. A process for automatically selecting and extracting as defined in above in item 99, wherein said means comprising:
   A. Providing a digital means for substituting the extracted selected data objects with other data objects placeholders including: serialization characters, replacement of information, bar codes null sets, URL's, and web site addresses.
101. A process for automatically selecting and extracting as defined in above in item 100, wherein said means comprising:
   A. Providing a digital processing means for configuration of the scope of computer files selection for the automatic selecting and extracting process.
102. A process for automatically selecting and extracting as defined in above in item 101, wherein said means comprising:
   A. Providing a digital processing means for configuration of the scope of computer files selection for the automatic selecting and extracting process based on file status, timing, preset rules and user-specific selection.
   B. Providing a digital processing means for configuration of the scope of computer file selection for the automatically selecting and extracting process based on verifying of file existence, checking for recent activity, checking whether recent separation and extraction activity of data objects is up to date in accordance to modes and preferences.
103. A process for automatically selecting and extracting as defined in above in item 102, wherein said means comprising:
   A. Providing a digital processing means for establishing which computers, and digital process in a network will be connected, accessible and interacting with said extracting process.
104. A process for automatically selecting and extracting as defined in above in item 103, wherein said means comprising:
   A. Providing a digital processing means for initiating the selecting and extracting of data objects, triggered by preset rules for process configuration.
105. A process for automatically selecting and extracting as defined in above in item 104, wherein said means comprising:
   A. Providing a digital processing means for initiating selecting and extracting of data objects, triggered by security alerts including threat mode and attack mode.
106. A process for automatically selecting and extracting as defined in above in item 90, wherein said means comprising:
   A. Providing a digital processing means for choosing the parameters for the selecting and extracting of data objects, triggered by preset rules for process configuration.
107. A process for automatically selecting and extracting as defined in above in item 90, wherein said means comprising:
   A. Providing a digital processing means for choosing the parameters for the selecting and extracting of data objects, triggered by security alerts including threat mode and attack mode.
108. A process for automatically selecting and extracting as defined in above in item 90, wherein said means comprising:
   A. Providing a digital processing means for interpreting the output of security intrusion detection means.
   B. Providing a digital processing means triggering processing by said process based on interpretation of output of security alerts and output of intrusion detection means.
109. A process for automatically selecting and extracting as defined in above in item 90, wherein said means comprising
   A. Providing a digital means for removing from a data object stream selected data objects including: digital records, elements of records, characters.
110. A process for automatically selecting and extracting as defined in above in item 90, wherein said means comprising:
   A. Providing a digital means for removing from a data object stream selected data objects including digital graphic images and segments of graphic images.
111. A process for automatically selecting and extracting as defined in above in item 90, herein said means comprising:
   A. Providing a digital means for removing from a data object stream selected data objects including digitized sound.
112. A process for automatically selecting and extracting as defined in above in item 90, wherein said means comprising
   A. Providing a digital means for removing from a data object stream selected data objects including: digitized video images and segments of video images.
113. A process for automatically customizing, automatically selected content items, within in a data objects stream, wherein said means comprising:
   A. Providing a digital data means for sorting extracted selected data objects into predefined contextual categories.
   B. Providing a digital data means for assigning an extracted selected data objects to a data object category.
      Whereby items of the automatically selected content are sorted into prearranged defined categories such as: credit card numbers, social security numbers, last name first name addresses. Whereby the selected content items are sorted out according to categories, and are available for release for display to users, according to the user's status and clearance.
114. A process for automatically customizing selected content as defined in above in item 113, wherein said means comprising:
   A. Providing a digital processing means for sorting extracted data objects into predefined categories.
   B. Providing a digital processing means for identifying which extracted data objects should be released to which user.
      Whereby the selected content items are sorted out according to categories, and are available for release for display to users, according to predefined rules set.
115. A process for automatically customizing selected content as defined in above in item 114, wherein said means comprising:
   A. Providing a digital processing means enabling the altering of the selected data objects Whereby different items of the automatic selected contents will be altered and available for display to users according to the user's status and clearance.
116. A process for automatically customizing selected content as defined in above in item 115, wherein said means comprising:
   A. Providing a digital processing means for enabling different extracted data objects to be released to different users.
      Whereby different items of the automatic selected contents will be available for release to user display according to a predefined rule set.
117. A process for automatically customizing selected contents as defined in above in item 116, wherein said means comprising:
   A. Providing a digital processing means for selecting which extracted data objects would be targeted as descriptors for information searching.
   B. Providing a digital processing means for presenting the targeted extracted data object contents to online search engines.
   C. Providing a digital processing means for automatically presenting search results to authorized users.
      Whereby different items of the automatic selected contents would be automatically targeted and presented to search engines and the search results and the items searched will be available for display to users according to the user's status and clearance.

118. A process for automatically customizing selected contents as defined in above in item 117, wherein said means comprising:
   A. Providing a digital processing means for scoring and ranking contextual relevance of said search engine results.
   B. Providing a digital processing means for presenting and linking, in a display, said scored and ranked search engines results with the extracted data objects
      Whereby search engine results are scored and ranked to achieve highest contextual relevance to the selected content items and available for display to users according to their status and clearance.
      Whereby there is no need for user to actively take any action like highlighting words, typing characters, the process will automatically trigger searches for information and URLs which are relevant to the selected content items.
      Whereby there is no need for user to wait for search results relevant to the selected content items because the system automatically instructs said searches, at an early stage.
119. A process for automatically customizing selected content s as defined in above in item 118, wherein said means comprising:
   A. Providing digital processing means enabling voice recognition and its presentation in a digitized form enabling the said process to carry out its processes.
120. A process for automatically customizing selected content s as defined in above in item 119, wherein said means comprising:
   A. Providing a digital processing means for recognizing patterns of the selected data content items and assigning prioritization to various selected data content items.
121. A process for automatically customizing selected content s as defined in above in item 120, wherein said means comprising:
   A. Providing a digital processing means for submitting targeted selected extracts of contents, to information search engines for display of relevant findings including: text, graphics, audio and video.
122. A process for automatically customizing selected content s as defined in above in item 121, wherein said means comprising:
   A. Providing a digital processing means for submitting targeted selected extracts of content to various process and appliances for possible triggering of various reactions.
123. A process for automatically transporting selected data objects to other memories, and between memories for achieving higher level of security, wherein said means comprising:
   A. Providing a digital processing means for selection of destination storage memories, triggered automatically by various preset criteria.
   B. Providing a digital processing means for transport of said data objects to said selected storage memories, triggered automatically by various preset criteria and manually
124. A process for automatically transporting selected data objects as defined in above in item 123, wherein said means comprising:
   A. Providing a remote memory storage media.
125. A process for automatically transporting selected data objects as defined in above in item 124, wherein said means comprising:
   A. Providing an offline memory storage media.
126. A process for automatically transporting selected data objects as defined in above in item 125, wherein said means comprising:
   A. Providing an Internet and network based memory storage media
27. A process for automatically transporting selected data objects as defined in above in item 126, wherein said means comprising:
   A. Providing a copy and backup apparatus.
128. A process for automatically transporting selected data objects as defined in above in item 127, wherein said means comprising:
   A. Providing a digital means for encrypting and decrypting the data objects transported to storage memories.
129. A process for automatically transporting selected data objects as defined in above in item 128, wherein said means comprising:
   A. Providing a digital processing means for mapping the location and capabilities of the different connected and available memories.
   B. Providing a digital processing means for mapping damage and threats to the connected and available storage memories.
130. A process for automatically transporting selected data objects as defined in above in item 129, wherein said means comprising:
   A. Providing a digital means for triggering bypassing of damaged and threatened storage memories.
131. A process for automatically transporting selected data objects as defined in above in item 130, wherein said means comprising:
   A. Providing a digital processing means for automatically configuring the hierarchy for connectivity between the data objects to be transported, and the storage memories according to user needs, preset rules, and security constraints.
132. A process for automatically transporting selected data objects as defined in above in item 131, wherein said means comprising:
   A. Providing a digital processing means controlling the release of data objects from said storage memories based on user's rights of access to the stored content.
   B. Providing a digital processing means controlling the release of data objects from said storage memories based on security constraints, including intrusion threat and attack.
133. A process for automatically transporting selected data objects as defined in above in item 132, wherein said means comprising:
   A. Providing a digital processing means for camouflaging data object file identity.
134. A process for automatically transporting selected data objects as defined in above in item 133, wherein said means comprising:
   A. Providing a digital processing means for camouflaging data objects files by removing file's root directory.
   B. Providing a digital processing means for camouflaging data objects files by removing name of file, links, references, shortcuts, and name of directory.
135. A process for automatically controlled release of automatically selected extracted data objects, from a data object stream, into a display, wherein said means comprising:
   A. Providing a digital reading means for reading the selected extracted data object's assigned category.

B. Providing a digital means for identifying user access rights to the specific selected extracted data object items based the data object category.
C. Providing a digital processing means for synchronized controlled release of selected data objects from storage memory according to user access rights and privileges. Whereby selected data objects are released from a memory into a user's display based on user status and access privileges to such content.

136. A process for automatically controlled release extracted data objects as defined in above in item 135, wherein said means comprising:
A. Providing a digital processing means for controlled release of selected extracted data objects based on access time.

137. A process for automatically controlled release of extracted data objects as defined in above in item 136, wherein said means comprising:
A. Providing a digital processing means for limiting the timed access to the selected extracted data objects.

138. A process for automatically controlled release of selected data as defined in above in item 137, wherein said means comprising:
A. Providing a digital processing means for release of altered extracted data objects to user display.

139. A process for automatically controlled release of selected data as defined in above in item 138, wherein said means, wherein said means comprising:
A. Providing a digital means for release of selected extracted data objects with added data objects to user display.

140. A process for automatically controlled release of selected data as defined in above in item 139, wherein said means comprising:
A. Providing a manual means for enabling and disabling the release of the selected extracted data objects.

141. A process for automatically controlled release of selected data as defined in above in item 140, wherein said means comprising:
A. Providing a digital processing means enabling user to highlight desired data objects as candidates for extraction.

142. A process for automatically release of physically separated data objects streams for projection as a combined data objects stream while maintaining full physical separation comprising:
A. Providing a digital processing means for releasing data object streams into display means.
B. Providing a digital processing means for releasing data object streams into projection means.

143. A process for automatically release of logically separated data objects streams for projection as a combined data objects stream while maintaining full logical separation, wherein said means comprising:
A. Providing a digital processing means for releasing data object streams into display means.
B. Providing a digital processing means for releasing data object streams into projection means.

144. A process for automatically display of selected separated extracted data objects in combination with the modified original data objects stream creating various displays, while maintaining substantial separation between the data streams comprising:
A. Providing a digital processing means for automatically selecting data object candidates for extraction from an existing data objects stream located in a first memory.
B. Providing a digital processing means for automatically extracting the selected data objects from an existing data objects stream located in a first memory.
C. Providing a digital means of transporting extracted data objects to a second memory.
D. Providing a digital means for controlled release of extracted data objects to a display
Whereby data objects in said modified original data stream and the separated, selected, extracts data stream are presented in a combination, to create various displays including, display like original data stream, while maintaining a desired level of separation between the data streams.

145. A process for automatically display as defined in above in item 144, wherein said means comprising:
A. Providing a digital process means for creating a total physical separation between selected extracts data objects stream and other streams, in said combined display process.

146. A process for automatically display as defined in above in item 145, wherein said means comprising:
A. Providing a digital process means for creating a total logical separation between selected extracts data objects stream and other data objects streams, in said combined projection and display process.

147. A process for automatically display as defined in above in item 146, wherein said means comprising
A. Providing a digital display means for displaying released, selected, extracted data objects including a wireless display means.

148. A process for automatically display as defined in above in item 147, wherein said means comprising:
A. Providing a digital processing means for processing different, versions of the reconstructed original data stream, according to different user's classifications.

149. A process for automatically display as defined in above in item 148, wherein said means comprising:
A. Providing a digital processing means for processing real time, simultaneous, displays of different versions of reconstructed original data stream, according to different user classifications.

150. A process for automatically display as defined in above in item 1,49 wherein said means comprising:
A. Providing a digital display means to project together, the modified original data objects stream, with selected data objects in the extracted data streams to create a joint presentation, maintaining desired level of separation between the modified original data objects stream and the selected extracted data objects.

151. A process for automatically display as defined in above in item 150, wherein said means comprising:
A. Providing a hardware apparatus to project a joint presentation of separated, selected, extracted data objects streams, maintaining high level of separation between the modified original data objects stream and the selected extracted data objects.

152. A process for automatically display as defined in above in item 151, wherein said means comprising:
A. Providing a hardware apparatus for overlaying the output of said selected extracted data objects with the output of the modified original data object stream to create a joint presentation while maintaining high level of separation between the modified original data object stream and the selected extracted data objects.

153. A process for automatically display defined in above in item 152, wherein said means comprising:

A. Providing a digital display in which said separate extracted data object streams can be jointly presented in real time while maintaining separation between the data streams.

B. Providing a wireless connected display in which said separate data streams can be presented separately and jointly presented while maintaining desired separation between the data streams.

154. A process for automatically display defined in above in item 153, wherein said means comprising:
A. Providing a digital processing means for anticopying based on configuration of color contrasts in the display.

155. A process for automatically display defined in above in item 154, wherein said means comprising:
A. Providing a digital processing means for anticopying based on configuration of font sizes.

156. A process for automatically selecting, extracting, storing and releasing extracted data objects, with security alerts triggering, wherein said means comprising:
A. Providing a digital processing means for selecting and extracting data objects from a stream of digital data objects.
B. Providing a digital processing means for storing said selected data objects.
C. Providing a digital processing means for releasing said selected data objects in a controlled method.
D. Providing a set of rules enabling the automatic triggering of various said process functions in different situations.

157. A process with security alerts triggering as defined in above in item 156, wherein said means comprising:
A. Providing a data processing means for receiving and automatically interpreting security alert inputs.
B. Providing a set of rules enabling the automatic triggering of various said process functions in a threat working mode.
C. Providing a digital processing means for automatically triggering a higher level of said activities for increased security.

158. A process with security alerts triggering as defined in above in item 157, wherein said means comprising:
A. Providing a data processing means for receiving and automatically interpreting security alert inputs.
B. Providing a set of rules enabling the automatic triggering of various said process functions in an attack working mode.
C. Providing a digital processing means for automatically triggering the highest level of said process activities for increased security.

159. A process with security alerts triggering as defined in above in item 158, wherein said means comprising:
A. Providing a digital-processing audit means for tracing user access 160. A process for automatically selecting and extracting as defined in above in item 90, wherein said means comprising:
A. Providing a physical hardware apparatus providing a physical layer of security, and protection against tampering.

161. A process for automatically selecting and extracting as defined in above in item 90, wherein said means comprising:
A. Providing a digital processing means for reporting logins attempted, logins, terminations, logouts, and failures.

162. A process for automatically selecting and extracting as defined in above in item 90, wherein said means comprising:
A. Providing a digital processing means for mapping and reporting location and history of data object streams and selected data object extract s streams processed by said process.

163. A process for automatically selecting and extracting as defined in above in item 90, wherein said means comprising:
A. Providing a digital processing means for intrusion detection determining intrusion based on various file changes.

164. A process for automatically selecting and extracting as defined in above in item 90, wherein said means comprising:
A. Providing a digital processing means enabling providing said applications and services as a third party provider over networks and Internet.

165. A process for automatically selecting and extracting as defined in above in item 90, wherein said means comprising:
A. Providing a digital processing means enabling providing said applications and services for electronic commerce over networks and Internet.

166. A process for automatically selecting and extracting as defined in above in item 90, wherein said means comprising:
A. Providing a digital processing means enabling providing said applications and services for electronic mail between computers, networks and Internet.

167. A process for automatically selecting and extracting as defined in above in item 90, wherein said means comprising:
A. Providing a digital processing means enabling providing said applications and services for electronic mail between computers, networks and Internet.
B. Providing a digital processing means enabling receiver of electronic mail to receive the selected extracted data object stream by using an additional identifying means.

168. A process for automatically selecting and extracting as defined in above in item 90, wherein said means comprising:
A. Providing a digital processing means for presenting information and charging payment for release of selected data object extracts.

169. A process for automatically selecting and extracting as defined in above in item 90, wherein said means comprising:
A. Providing a digital processing means for presenting information and releasing of selected data object extracts predicated upon fulfillment of specific conditions.

170. A process for automatically selecting and extracting as defined in above in item 90, wherein said means comprising:
A. Providing a digital processing means enabling overriding of process processes by authorized users.

171. A process for automatically selecting and extracting as defined in above in item 90, wherein said means comprising:
A. Providing a digital processing means for adding encryption to output data object streams.

172. A process for automatically selecting and extracting as defined in above in item 90, wherein said means comprising:

A. Providing a digital processing means for enabling manual selection of said process processing including automatic process processing.
B. Providing a digital processing means for enabling manual selection of said process processing
Including: semi-automatic process processing with capability to influence the processing by moving tools such as levers, sliders, drag and drop, buttons, check boxes, bars, and voice recognition.
C. Providing a digital processing means for enabling manual selection of said process processing including manual control of said process processing.

173. A process for automatically selecting and extracting as defined in above in item 90, wherein said means comprising:
A. Providing a digital processing means for controlling access to said process and its various outputs based on user identification.

174. A process for automatically selecting and extracting as defined in above in item 90, wherein said means comprising:
A. Providing a digital processing means for controlling access to said process and its various outputs based on user identification through biometrics authentication.

175. A process for automatically selecting and extracting as defined in above in item 90, wherein said means comprising:
A. Providing a digital processing means for controlling access to said process and its various outputs based on timed challenge questions validating user's identity.

176. A process for automatically selecting and extracting as defined in above in item 90, wherein said means comprising:
A. Providing a digital processing means for allowing continuing access to said process and its various outputs based on timed challenge questions validating user identity.

177. A process for automatically selecting and extracting as defined in above in item 90, wherein said means comprising:
A. Providing a digital processing means for controlling access to said process and its various outputs based on identify friend or foe validating user identity.

178. A process for automatically selecting and extracting as defined in above in item 90, wherein said means comprising:
A. Providing a digital processing means for allowing continuing access to said process and its various outputs based on identify friend or foe validating user identity.

179. A process for automatically selecting and extracting as defined in above in item 90, wherein said means comprising:
A. Providing a digital processing means for limiting different users access to said process for specific time periods.

180. A process for automatically selecting and extracting as defined in above in item 90, wherein said means comprising:
A. Providing a digital processing means for limiting different users access to data object extracts for specific time periods.

181. A process for automatically selecting and extracting as defined in above in item 90, wherein said means comprising:
A. Providing a digital processing means for limiting different users access to different process functions at specific time periods.

Sketches

See Building and Testing for samples.

Ramifications

The invention is a system and a method for management of data centers with primary focus on management of critical and important data assets within documents, files and servers.

The invention presents a technological capability to automatically locate critical and important information within documents, files and servers and then either, (1) copy only critical data and transfer it to a secured storage as backup or other uses or, (2) extract only critical data and transfer it to a removed secured storage with control release only to authorized parties.

There is a clear distinction between critical documents, critical files, critical servers and critical data within documents, files or servers. The data center management system relates primarily to management of critical data and important data within documents files and servers. The issue is not the identification of files or processes but rather specific data units within the structured data streams, documents, files, or processes.

The focus on critical data enables granular protection and heretofore unavailable methods for management and control over the important organizational data assets, in other words, a focus on locating and securing the organizational "Crown Jewels."

The capability to automatically locate the critical data enables assignment of high grade security and protection to the critical assets with cost saving with low grade security for non-critical data. Also, this machine enables safekeeping of critical data assets under emergency situations, and ongoing survivability. during or after the emergency. The invention is also a system and method for automatically managing and disseminating documents or digital files with contents under user control. The system and method enables content management and control by automatically locating contents of prioritized importance in a document, thereafter allowing real time, simultaneous parallel, customization and personalization of the document and its dissemination to different parties based on their authorization and access status.

The invention is a system for data center management focusing primarily on the management of critical content within documents, files and servers. The system enables control over specific important content items within the general contents of documents or digital files in a computer or within a network. The possible immediate controlled release of those important content items according to specific identification and access criteria proactively safeguards the security and the value of documents or digital files. The said content control enables broad dissemination of the digital file in closed networks as well as open networks including the internet, without compromising the security of the critical information in the digital file. The Internet and communication advances have opened up many new markets but the opportunities are constrained by many and different security threats. The invention enables maximizing of the new revolutionary connectivity by enabling the general content of a document or digital file to be distributed throughout an organization, its employees, partners, suppliers and customers while securing and controlling the most important content elements. The invention releases the important contents only to the validated authorized parties through an automatic and possible manual controlled release mechanism.

The invention also enables real time parallel customization and personalization of a digital file to different users. Through a process of filtering and reverse filtering and through a process of sorting, the selected important content items are categorized in various categories. The controlled release mechanism releases the important content items to the various authorized receivers based on their preset rights to access the different categories.

The system delivers top security, survivability, confidentiality, privacy and anonymity capabilities by scrubbing and extracting identifying critical information from documents. The system transfers the -extracted critical information to an off site secured storage, and enables authorized parties, leveled release of extracted information upon request. Any unauthorized party accessing the documents will find them totally useless since the critical information has been removed. The system also enables the sharing of documents within an organization where upon critical information is extracted from documents and access to that critical information is permitted to selected individuals, with prioritized varying levels of releases of extracted information.

The Current Art

Currently, data centers are primarily data storage facilities. The presented system turns a data center into a proactive data center. The presented system enables a data center to actively process all the data stored and transferred to it, in order to locate the critical and important data within its documents, files and servers.

The unprecedented growth in business increased dramatically the need for storage and skilled IT professionals. Organizations are constantly looking for data storage centers with top security as well as reasonable costs. The system capability automatically locate the critical data enables, (1) giving higher grade security and protection to the critical assets, (2) cost saving by paying for high grade security only for critical data while paying lower costs to secure the non critical data, (3) safekeeping of the organizations critical data assets to enable carrying on of critical missions under emergency situations, (4) assuring the survivability of the organization by vaulting its critical data assets and using them to continue or reconstruct the critical missions of the organization in an emergency.

Although there are various security and privacy products in the market, none give total security. The existing security and privacy products are imperfect. In a way, those are added patches to an already patched up universe. In his book One of the Intel's top security architects described the existing security products as building a vaulted door to a cardboard box. A Senior Vice President at Symantec, Inc., a security and antivirus company, stated recently that "after a secure firewall is in place, companies have about 28 days before things change and the firm is vulnerable again."

Currently, many network defenses in major organizations are inadequately maintained. There is a need for at least two and preferably more than four employees to operate firewalls in the typical organization. There is a need to constantly update the intrusion detection systems. The high cost involved with maintaining the system is a major obstacle to their successful deployment. Furthermore, many of the existing security systems create major barriers to their own organization's productivity. The complexity and the added security steps needed to protect the business actually slow the flow of documents within the organizations and in many instances cause a total bypass of the security defenses.

The most critical deficiency in the current security systems is there inability to stop or substantially minimize insider security damage. According to various studies 75 to 90% of the damage is done by insiders. According to a study of the Industrial Computers Association the average outsider damage is $70,000 while the average insiders damage is $2,700,000.

The system extracts and stripes out identifying and critical information from designated documents. The classic information the Scrubber can extract is: credit card numbers, names, addresses, dates, social security numbers, driver's license, transaction dollar amounts, etc. The market for the system is substantial and includes organizations, individuals and companies that need a high level of data security including governments and various defense organizations. The system is based on a new pioneering architecture of security/privacy/anonymity technology. With the spreading of mobile/cellular/satellite communications, the threats to security and privacy are much stronger and the probability of security breaching is much higher. The system enables the continuity of regular business flows, survivability, in both regular and mobile environments. It assures that when an intruder or rogue employee accesses the documents, the documents will be useless.

As electronic commerce grows rapidly, more companies are transforming their closed networks into more open environments allowing customers to connect through the Internet to their front end as well as enabling suppliers and partners to connect through the internet to their the back end.

The security threats and risks of such networks grow in direct correlation to the network's growth in connectivity. With the new openness and as companies embrace the Internet and use it for many of their functions, the security risk grows exponentially.

The internet is a public collection of computer networks with a many diverse entry points for hackers who can, among other things, penetrate a company's website, and throughout it enter the company's networks to steal information or money.

As security is becoming a more strategic priority to slow the operations of the networks and cause organizations substantial money losses. Although there are various security measures and firewalls and systems to protect networks, security has been breached dramatically. Currently, insiders within the company and its firewalls do 75% to 90% of the damage. Furthermore, the existing firewalls are susceptible to many false alarms because of triggers of false intrusions into the networks, which radically In summary, the existing computer and network security products, are not achieving needed security tasks. They do not give enough security and in essence are added patches to an already very patched up environment of computers and computer networks. The present invention answers the said unanswered needs by providing a system that defends in different methods from external as well as internal intruders. Furthermore the system encourages and enables a much needed freer flow of documents and digital files within and out of organizations while automatically protecting the automatically and manually selected important information items. The system also enables survivability of the network while it is being attacked, by allowing the transfer of needed documents in a protected method, thereby accomplishing the network's critical missions.

The system incorporates a scrubbing/extracting process in which words, numbers or characters of strategic importance are removed from a document or digital file as soon as they are created or imported into the computer or network.

The extracted data is transported immediately to a removed storage memory possibly, off-line/off-network, digital or physical vaulted storage. The extracted data may be returned immediately to the user's display based on validation of his identity and access rights. The use of the vaulted extractions is controlled by company policy or set of rules which might include the following options among others:

A vaulting of extractions for along/short period of time.

Release of extractions to create a projection display of the original document or digital file.

Release of extractions or part of them to create a projection display of variations of the original document or digital file.

Release of extractions enabling projection of original or reconstituted document while maintaining complete separation between the modified digital data stream and the extracts data streams. The said is achieved through the use of hardware devises like, another screen display, or a wireless PDA, screening projector, 3d glasses, overlay transparency, or printing of the extracts on a paper The system's objective is to create a last line of defense for the computer/network. Furthermore the objective is to create a major deterrent. If an intruder penetrates successfully all the computer/network's, firewalls and other security systems, he will end up with documents/files, which will be useless to him since the critical strategic information was exported to a vaulted storage. Competitors or hackers, who learn that a computer/network is protected by the system, might decide to chase another target instead. This is comparable to a situation in which a bank robber, who finds out that the bank vault is empty, will most probably look for another bank to rob.

The system has a manual of different options including the ability to scrub/extract:

All existing data texts and databases on the computer/network. All new imported data to the computer/network. All new work/output created by the computer/network. All data being transported in/out of the computer/network.

The system is designed to protect a network of computers or severs as well as an independent computer or component of a network

Building and Testing

The screen images in the figures section demonstrate the machine and process in action, automatically, selecting, extracting data objects from a file. Furthermore, the extracted data objects are transported to a removed memory, and automatically released into a display to recreate the file or versions of the file.

Previous Disclosure of Conception

See, three provisional patent applications by same inventors dated Jun. 27, 2000, Sep. 29, 2000, and Nov. 3, 2000. Nov. 11, 2000.

The Figures which show the features of the Critical Data Centers and Operational Survivability Data Centers Management System and Critical Data: Selection, Separation, and Protection discussed above in earlier section and are FIGS. 1-32.

Content Management Through Prioritized Content Selection, Management and Control, Inventorying, Auditing, Mapping, Automatic Response to Threats/opportunities, and Wealth Creation Conception and Circumstances During the process of implementing a financial turnaround business, we discovered the complexity of the business model and the obvious need to redefine and create new systems and methods for doing business. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.

Purposes and Advantages of Invention

The invention is a machine and process and its main purposes and advantages are as follows:

To automatically manage content within a document, file, database, structured or unstructured content sources, data objects streams, through the focusing on selection and processing of prioritized items within the content environment. Prioritized content is the key to control and manage content in an environment of explosive content growth. Prioritized content is defined as data objects, i.e. keywords or key characters and data objects, which do not match the integrated semantic dictionaries.

To automatically process every data object in a selected document, file, database, and data stream to automatically select the prioritized content.

To automatically identify the content needs of users and automatically deliver potential content options for their evaluation and pursuit.

To automatically present users assumed content needs to search engines and other enablers.

To automatically monitor the use of content by user.

To automatically monitor users content needs.

To automatically respond to users needs by presenting assumed sought after information, including financial reports, better pricing, locating expert in field, etc.

To automatically present users assumed content needs, in an anonymous, censored and extracted methods, for broadcasting within parts of the organization and when needed to outside parties through intranets, internet e-mail and other channels.

To integrate different sources of content into new content products for dissemination. The sources may include internal and external sources like databases, servers, e-mails, files, news services, and web sites.

To separate contents from different content platforms and combine the content into new content platforms which could be used and reused.

To communicate between parties information related to the content processed, and the tasks needed to follow through.

To create an automatic process wherein each prioritized data object would be categorized into pre existing categories (i.e. credit card numbers, last name, currency amount, and unrecognized data objects).

To create an inventory of prioritized data objects within a document, file, database, structured or unstructured content environment in a computer and network that will enable the system to define patterns, trends and behavior, which could be defined as a threat to the user and the organization.

To create an inventory of prioritized data objects within a document, file, database, structured or unstructured content environment in a computer and network that will enable to define patterns, trends and behavior, which could be defined as an opportunity to the user and the organization.

To create an inventory of prioritized data objects within a computer or a network that will enable a quick real-time response to opportunities and threats through management of content and its distribution to the right parties in a timely manner.

To create an inventory of prioritized data objects within a computer and a network that will enable to manage and react to such threats and opportunities in a secured and cost efficient way.

To audit the process of control and management of selected critical/prioritized data/data objects within a file, document database computer network and data center.

To audit and register users use of content management features and record usage history and change in usage.

To audit the integrity, functionality, and security of the process as described below, which may include among other things selection of critical/prioritized content/data objects, their copying, their extraction and reconstitution.

To audit the resulting output from the said process, which includes auditing of the selected data objects, their placement in the right categories and right storage locations with verification. This verification is enabled throughout the process and release of extracts with adherence to procedures and security guidelines. Appropriate data objects where selected and that the appropriate ones released from storage and reconstituted correctly. To audit the resulting output of the process and to measure the effectiveness of the process and its various functions and results on achieving the goals and objectives it was designed to accomplish To audit the resulting output of the process and to adjust the needed functions in order to achieve the goals and objectives it was designed to accomplish.

To create an open architecture for content management for users as well as a platform for collaboration inside and outside an organization.

To impact the profitability of the user and the organization by maximizing the value of their content.

To enable competitiveness through maximization of processing of content and delivery of results in a timely manner, in the right personalized format to the right user.

To enable economic benefits by management of content, exchange of content sale of content and collaboration on content.

To enable easy and fast access to content by bypassing data bottlenecks. To allow easy simplistic and seamless integration with different applications.

To enable automatic tagging of prioritized data as well as manual tagging by users.

To enable the following content searches: Broad subject searches, Narrow subject and relationship searches, On-going monitoring of a subject, Historical -use searching, Searching for a trend or pattern, Comparative searching.

To assess substance and relevance of content according to clustering of certain data objects in a specific contextual environment Another object of this invention is as a system and method for automatically creating customized and personalized versions of a document, data object, or data stream. In real-time, simultaneous versions of the original are created and altered, then disseminated based on the status of the different users and their access privileges. The system and method enables content management and control by automatically locating content items prioritized by importance, transporting them to a secure storage, and releasing them under explicit controls or preset rules.

Another object of the invention is as a system and method for control, analysis and management of important and prioritized information within documents, files, data object, and data streams. The system and method enables the processing of all data objects at the time in which they are created or imported into the system. The said early stage processing enables early stage inventorying of prioritized contents as well as early stage pattern recognition. Extracting critical information (such as credit card numbers, last names, first names, social security numbers, phone numbers, transaction dollar amounts, and addresses) enables the system and method to aggregate data in categories and analyze the data in different optional methodologies including pattern recognition.

Another object of the invention is as a system and method for comprehensive monitoring of various activities including business activities in real-time. With this level of detail, the system and method becomes a management information tool and information/data command and control center. The said system and method includes an alert system, which in effect creates a real-time apparatus for command and control of the systems activities. In real-time, and at any point in time, the user can get a comprehensive view of different activities including:

How many transactions are being processed, their content, their context, identity of the involved parties identity, their profiles, and the personnel involved.

How much money is being transacted.

When, in terms of dates, relevant to the transaction.

Where, in terms of geographical location, the transactions are taking place.

Where, in terms of geographical location, monies or goods are being transferred.

Which departments in the organization are involved.

The invention is also a system and method for automatically managing and disseminating documents or digital files with varied contents control levels. The system and method enables content management and control by automatically locating contents of prioritized importance in a document, thereafter allowing real-time simultaneous parallel, customization and personalization of the document and its dissemination to different parties based on their authorization and access status.

Other possible purposes and advantages of the machine and process are as follows:

To automatically control selection of data objects within a data stream and release them in a controlled method only to authorized parties To automatically separate data objects within a data stream into two or more digital data streams according to the importance and categorization of contents, through extraction and removal of the prioritized content and its replacement by appropriate placeholders To automatically control selected contents in E-mail, and enable its release in a controlled method only to authorized parties To enable users to leverage the growth in computer and telecommunications connectivity and electronic commerce by reducing security risks To enable users to release documents, digital files, and data streams into closed and opened digital networks with the confidence that important, identifying, and critical contents in that documents, digital files, and data streams is secure and will be seen only by authorized parties To enable real-time simultaneous customization and personalization of selected contents within a data stream to different parties, allowing instant display of the selected content or part of it based on, and tailored made to the status of the user or receiving party To secure the important and critical contents of a document or digital file by transporting said contents into a separated data stream and removing said data stream to a removed storage memory, while eradicating any copies, temporary caches, or traces of the removed extracts on the original computer or machine To enable instant return transfer to the display or to another display all or part of extracted content instantly with verification of authorized user To create a projection of the original document, digital file, data objects within a data stream, or variations of it through combined projection of the splinted data streams, while maintaining separation between the data streams To create an alternative method for security, instead of encryption, which is secure, cost effective, less time-consuming, and flexible To enable automatic timed removal of specific content items; automatically or manually selected from a document, digital file, or data objects within a data stream To enable an automatic timed reconstruction (reconstitution) of the said document, digital file, or data objects within a data stream The system and method creates a high level of security by automatic selection and removal of critical and prioritized contents from a data objects stream, whether it be a document, file, database, audio, video, other structured, or streaming data formats. The system and method enables a controlled release of the extracted data objects, enabling instant display of the instantaneous returned contents, contingent on verification of user identity, access rights, time of operation, location of source and or user, destination of source and or user, and determine threat modes. The system and method delivers high security by removal of selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract can also be substituted on-the-fly to provide updated results, misinformation, disinformation, messages, alerts, links (to reports, data mining, search engines, web sites, and hyperlinks understood in the current art), advertisements, and personalization and customization. The said validation can be done instantly by password, challenge questions and answers, remote verification (phone, video, or personal contact with user), or by biometrics means.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including security risk criteria of threats and attacks, sources, targets, users, policies, time of day, and threat modes.

The extracted data is transported to an online removable storage and under extreme security threats to an offline/off-network, digital or physical vaulted storage. Transport and shuttle is based on the level of security alert. The use and release of the vaulted extractions is controlled by a set of rules or organizational policy which includes the following options among others: A vaulting of some, all, or specific data object extracts for long or short periods of time. Release of extractions into a display, in which the extracted data objects will reconstitute with the modified original data stream, the original data objects stream or original document. Release of extractions into a projection display in order to project with the modified data stream, the original document while maintaining complete separation of the modified source data stream (the source modified by the extraction of data objects and insertion of placeholders) and the extracted data object streams. Release of extractions into a projection display in order to project a reconstitution of the original document, in other words to create altered versions of the original document, while maintaining complete separation of the modified data stream and the extracted streams. In situations of high security threats, release of extractions into another projection display, PDA, floppy disk, paper document a wireless display, an overlay transparency while maintaining logical and physical separation of delivery streams. This will enable working with a representation of the initial source, but not the initial source itself, while understanding the prevalent, critical extracted information without comprising security to the initial source material by exposing sensitive, identifying, or critical information. The distribution of source, modified sources, or extracts to remote and distributed viewing devices. Enable the ongoing operation of information delivery and display in defiance of known ongoing or unknown security flaws, breaches, or events compromising the general state of security. The delivery of distinct and separate data streams, delivered on the same or different channels and media, each with minimal, limited, or even substantial usefulness in and by itself, that can be overlaid logically or physically to reconstitute the identifying data stream and display. Separate display devices can be used to create a composite image or they can be overlaid to physically separate display devices to reconstitute a useful composite display. Enable partial or complete mitigation of sources after various attacks, breaches, security failures, or other natural and intended failures.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted storage. Competitors or hackers, who learn that a computer or network is protected by the system and method, might decide to attack another target instead. This is comparable to a situation in which a bank robber, who finds out that the bank vault is empty, will most probably look for another bank.

The system and method has a menu of different options including the ability to extract:

All existing databases on the computer or network

All newly loaded, mounted, or integrated data to the computer or network

All plug-in memory devices (temporary or permanent) containing data

All new and imported data to the computer or network

All new work and output created by the computer or network

All data being transported in/out of the computer or network including electronic mail All data being transmitted in/out of the computer or network including electronic mail The system and method releases the extracted data streams, subject to a controlled-release mechanism and process. The release mechanism is contingent on parameters including; rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or hinder intruders. The system and method is very adaptable and flexible to provide additional layers of security, privacy, anonymity, redundancy, and backup through the selection, extraction, storage, transportation, and reconstruction processes. The dynamic architecture of the invention enables it to conduct an automatic real-time configuration of its extraction/transport/recovery activities, in response to the challenge of attacks.

The invention's survivability modes enable:

Presetting of rules for computer or network functioning under attack or alert.

An automatic assessment of damage and automatic reaction to enable functionality of critical missions.

Description

The invention is a machine consisting of the following elements. Reference to "above in item" herein is made to refer back to earlier features.

1. A machine for selecting prioritized data objects from data streams creating a data objects inventory for managing mapping communicating and responding to opportunities and threats wherein said means comprising:
  A. A digital processing means for selecting prioritized data objects from data streams creating a data objects inventory for managing mapping and communicating opportunities and threats
  B. A digital processing means for selecting prioritized data objects from data streams creating a data objects inventory for mapping and combining of resources
  C. A digital processing means for selecting prioritized data objects from data streams that will enable reacting to said threats and opportunities 1 a. A machine for auditing the process of automatically selecting, copying, extracting data objects from an existing data objects stream, and automatically releasing selected extract data objects to a display, wherein said means comprising:
  A. A digital processing means for. auditing the process of control and management of selected critical/prioritized data/data objects within a file, document database computer network and data center.
  B. A digital processing means for auditing the integrity, functionality, and security of the process which includes among other things selection of critical/prioritized content/data objects, their extraction and reconstitution.
  C. A digital means for auditing the resulting out put from the said process which includes auditing the selected extracted data objects, their placement in the right categories and right storage.
  D. A digital means for verifying security throughout the process and verifying release of extracts is in adherence to procedures and security guidelines. Verifying that the appropriate data objects where selected and that the appropriate ones released from storage and reconstituted correctly.

2. A machine for auditing the selection and extraction process as defined in above in item 1a wherein said means comprising:
  A. A digital processing means To audit the resulting out put from the said process which includes auditing the selected extracted data objects, their placement in the right categories and right storage.
  B. A digital processing means for Verifying security throughout the process and verifying release of extracts is in adherence to procedures and security guidelines.
  C. A digital processing means for verifying that the appropriate data objects where selected and that the appropriate ones released from storage and reconstituted correctly.

2a. A machine for auditing the selection and extraction process as defined in above in item 2 wherein said means comprising:
  A. A digital processing means to audit the resulting output of the process and to measure the effectiveness of the process and its various functions and results on achieving the goals and objectives it was designed to accomplish B. A digital processing means to audit the resulting output of the process and to adjust the needed functions in order to achieve the goals and objectives it was designed to accomplish The purposes and advantages of the total machine and process are as follows:

2b. A machine for automatically selecting, extracting data objects from an existing data objects stream, and automatically releasing selected extract data objects to a display, wherein said means comprising:
- A. A digital processing means for automatically selecting data object candidates for extraction from an existing data object stream located in a first memory.
- B. A digital processing means for automatically extracting selected data objects from an existing data object stream located in a first memory.
- C. A digital means of transporting extracted data objects to a second memory.
- D. A digital means for controlled release of extracted data objects to a display and other outputs. Whereby automatically selected contents are separated and removed from original document, file and data stream, and thence transported to secured storage memory and controlled released based on security, previously selected categories, rules and other triggers.

2c. A machine for automatically selecting and extracting as defined in above in item 2b, wherein said means comprising:
- A. A digital means for storing a first dictionary of characters and data objects.
- B. A digital means responsive to said dictionary for use as a filtering condition.
- C. A digital means for extracting data objects not mentioned in said dictionary.

3. A machine for automatically selecting and extracting defined in above in item 2c, wherein said means comprising:
- A. A digital means for storing a second dictionary of characters and data objects.
- B. A digital means responsive to said second dictionary for use as a filtering condition.
- C. A digital means for extracting any data object mentioned in said second dictionary.

4. A machine for automatically selecting and extracting defined in above in item 3, wherein said means comprising:
- A. A digital means for accepting additional data objects into dictionaries.
- B. A digital means enabling the adding of other dictionaries with said first and second dictionaries.
- C. Providing a digital means for customized dictionaries.

5. A machine for automatically selecting and extracting as defined in above in item 2b, wherein said means comprising:
- A. A digital processing means for tagging and serializing derived selected data object extractions.

6. A machine for automatically selecting and extracting as defined in above in item 5, wherein said means comprising:
- A. A digital filtering means for automatically sorting of said selected extracted data objects according to separate data objects categories.
- B. A digital processing means for labeling said sorted, selected data objects, with their respective categories.

7. A machine for automatically selecting and extracting as defined in above in item 2b, wherein said means comprising:
- A. A digital processing means for automatically creating new data object categories, for the said sorting process.

8. A machine for automatically selecting and extracting as defined in above in item 2b, wherein said means comprising:
- A. A digital means for substantially erasing, from all memories except second memory, all copies and links and traces of removed selected extracted digital objects.

9. A machine for automatically selecting and extracting as defined in above in item 2b, wherein said means comprising:
- A. A digital means for substantially eradicating from all memories except for second memory, all links, copies, and traces, to separated and extracted data objects. Said eradication includes termination of related delivery means, defragmentation of associated files, overwriting relevant files, cleaning memories, and caches.

10. A machine for automatically selecting and extracting as defined in above in item 2b, wherein said means comprising:
- A. A digital means for substituting the extracted selected data objects with other data objects.

11. A machine for automatically selecting and extracting as defined in above in item 2b, wherein said means comprising:
- A. A digital means for substituting the extracted selected data objects with other data object placeholders including; serialization, characters, replacement of information with other information, messages, alerts, bar codes, links to other data, null sets, URLs, and web site addresses 12. A machine for automatically selecting and extracting as defined in above in item 2b, wherein said means comprising:
- A. A digital processing means for configuring the scope of file selection in the automatic selecting and extracting process.

13. A machine for automatically selecting and extracting as defined in above in item 2b, wherein said means comprising:
- A. digital processing means for configuration of the scope of computer files selection for the automatic selecting and extracting process based on: file status, timing, preset rules and user's specific selection.
- B. A digital processing means for configuration of the scope of computer files selection for the automatically selecting and extracting process based on verifying of file existence, checking for recent activity, checking whether recent separation and extraction activity of data objects is up to date in accordance to modes and preferences 14. A machine for automatically selecting and extracting as defined in above in item 2b, wherein said means comprising:
- A. A digital processing means for establishing which computers, and digital machines in a network will be connected, accessible and interacting with said extracting machine.

15. A machine for automatically selecting and extracting as defined in above in item 2b, wherein said means comprising:
- A. A digital processing means for initiating the selecting and extracting of data objects, triggered by preset rules for machine configuration.

16. A machine for automatically selecting and extracting as defined in above in item 2b, wherein said means comprising:

A. A digital processing means for initiating selecting and extracting of data objects, triggered by security alerts including threat mode and attack mode.
17. A machine for automatically selecting and extracting as defined in above in item 2b, wherein said means comprising:
   A. A digital processing means for choosing the parameters for selecting and extracting of data objects, triggered by preset rules for machine configuration.
18. A machine for automatically selecting and extracting as defined in above in item 2b, wherein said means comprising:
   A. A digital processing means for choosing the parameters for the selecting and extracting of data objects, triggered by security alerts including threat mode and attack mode.
19. A machine for automatically selecting and extracting as defined in above in item 2b, wherein said means comprising:
   A. A digital processing means for interpreting the output of security intrusion detection means.
   B. A digital processing means triggering processing by said machine based on interpretation of output of security alerts and output of intrusion detection means.
20. A machine for automatically selecting and extracting as defined in above in item 2b, wherein said means comprising:
   A. A digital means for removing from a data objects stream selected data objects including digital records, elements of records, characters
21. A machine for automatically selecting and extracting as defined in above in item 2b, wherein said means comprising:
   A. A digital means for removing from a data objects stream selected data objects including: digital graphic images and segments of graphic images.
22. A machine for automatically selecting and extracting as defined in above in item 1, herein said means comprising:
   A. A digital means for removing from a data objects stream selected data objects including: digitized sound.
23. A machine for automatically selecting and extracting as defined in above in item 2b, wherein said means comprising
   A. A digital means for removing from a data objects stream selected data objects including: digitized video images and segments of video images.
24. A machine for automatically customizing, automatically selected content items, within in a data objects stream, wherein said means comprising:
   A. A digital data means for sorting extracted selected data objects into predefined contextual categories
   B. A digital data means for assigning an extracted selected data objects a data objects category.
   Whereby items of the automatically selected content are sorted into prearranged defined categories such as: credit card numbers, social security numbers, last name first name addresses.
   Whereby the selected content items are sorted according to categories, and are available for release for display to users, according to user status and clearance.
25. A machine for automatically customizing selected content as defined in above in item 24, wherein said means comprising:
   A. A digital processing means for sorting extracted data objects into predefined categories.
   B. A digital processing means for identifying which extracted data objects should be released to a user.
   Whereby the selected content items are sorted according to categories, and are available for release for display to users, according to predefined rules set.
26. A machine for automatically customizing selected content, as defined in above in item 25, wherein said means comprising:
   A. A digital processing means enabling the altering of the selected data objects
   Whereby different items of the automatic selected contents will be altered and available for display to users according to user status and clearance.
27. A machine for automatically customizing selected content as defined in above in item 26, wherein said means comprising:
   A. A digital processing means for enabling different extract data objects to be released to different users.
   Whereby different items of the automatic selected contents will be available for release to a user display according to a predefined rule set.
28. A machine for automatically customizing selected contents as defined in above in item 27, wherein said means comprising:
   A. A digital processing means for selecting which extracted data objects are targeted as descriptors for information searching.
   B. A digital processing means for presenting the targeted extracted data object contents to online search engines.
   C. A digital processing means for automatically presenting search results to authorized users.
   Whereby different items of the automatic selected contents are automatically targeted and presented to search engines and the search results and the items searched are available for display to users according to user status and clearance.
29. A machine for automatically customizing selected contents as defined in above in item 28, wherein said means comprising:
   A. A digital processing means for scoring and ranking contextual relevance of said search engine results.
   B. A digital processing means for presenting and linking, in a display, said scored and ranked search engines results with the extracted data objects
   Whereby search engine results are scored and ranked to achieve highest contextual relevance to the selected content items and available for display to users according to their status and clearance.
   Whereby there is no need for user to actively take any action like highlighting words, typing characters, the machine will automatically trigger searches for information and URL's relevant to the selected content items.
   Whereby there is no need for user to wait for search results relevant to the selected content items since the system automatically instructs said searches, at an early stage.
30. A machine for automatically customizing selected content s as defined in above in item 29, wherein said means comprising:
   A. A digital processing means enabling voice recognition and its presentation in a digitized form enabling the said machine to carry out its processes.
31. A machine for automatically customizing selected content s as defined in above in item 30, wherein said means comprising:
   A. A digital processing means for recognizing patterns of the selected and prioritized data objects within the data streams and assigning prioritization to various selected data content items.

32. A machine for automatically customizing selected contents as defined in above in item 31, wherein said means comprising:
   A. A digital processing means for submitting targeted selected extracts of data objects, to information search engines for display of relevant findings including: text, graphics, audio and video.
33. A machine for automatically customizing selected contents as defined in above in item 32, wherein said means comprising:
   A. A digital processing means for submitting targeted selected extracts to various machines and appliances for possible triggering of responses.
34. A machine for automatically transporting selected data objects to other memories and between memories for achieving higher level of security comprising:
   A. A digital processing means for selection of destination storage memory, triggered automatically by various preset criteria.
   B. A digital processing means for transport of said data objects to said selected storage memories, triggered automatically by various preset criteria and manually.
35. A machine for automatically transporting selected data objects as defined in above in item 34, wherein said means comprising:
   A. A remote memory storage media.
36. A machine for automatically transporting selected data objects as defined in above in item 35, wherein said means comprising:
   A. An of line memory storage media.
37. A machine for automatically transporting selected data objects as defined in above in item 36, wherein said means comprising:
   A. An Internet- and network-based memory storage media.
38. A machine for automatically transporting selected data objects as defined in above in item 37, wherein said means comprising:
   A. A copy and backup apparatus.
39. A machine for automatically transporting selected data objects as defined in above in item 38, wherein said means comprising:
   A. A digital means for encrypting and decrypting the data objects transported to storage memories.
40. A machine for automatically transporting selected data objects as defined in above in item 39, wherein said means comprising:
   A. A digital processing means for mapping the location and capabilities of the different connected and available memories.
   B. A digital processing means for mapping attacks, damage, and threats to the connected and available storage memories.
41. A machine for automatically transporting selected data objects as defined in above in item 40, wherein said means comprising:
   A. A digital means for triggering the bypass of damaged and threatened storage memories.
42. A machine for automatically transporting selected data objects as defined in above in item 41, wherein said means comprising:
   A. A digital processing means for automatically configuring the hierarchy for connectivity between the data objects to be transported, and the storage memories according to user needs, preset rules, and security constraints.
43. A machine for automatically transporting selected data objects as defined in above in item 42, wherein said means comprising:
   A. A digital processing means controlling the release of data objects from said storage memories based on user rights for access to the stored content.
   B. A digital processing means controlling the release of data objects from said storage memories based on security constraints including intrusion threat and attack.
44. A machine for automatically transporting selected data objects as defined in above in item 43, wherein said means comprising:
   A. A digital processing means for camouflaging data objects files by changing file identification structures.
45. A machine for automatically transporting selected data objects as defined in above in item 44, wherein said means comprising:
   A digital processing means for camouflaging data objects files by removing root directory.
   A digital processing means for camouflaging data objects files by removing name of file, links, references, shortcuts, and names of directory.
43. A machine for automatically controlled release of automatically selected extracted data objects, from a data object stream, into a display, wherein said means comprising:
   A. A digital reading means for reading the selected extracted data object's assigned category.
   B. A digital means for identifying user access rights to the specific selected extracted data objects based the data object category.
   C. A digital processing means for synchronized controlled release of selected data objects from storage memory according to user access rights and privileges.
   Whereby selected data objects are released from a memory into a user's display based on user's status and access privileges to such content.
44. A machine for automatically controlled release of extracted data objects, as defined in above in item 43, wherein said means comprising:
   A. A digital processing means for controlled release of selected extracted data objects based on access time.
45. A machine for automatically controlled release of extracted data objects, as defined in above in item 44, wherein said means comprising:
   A. A digital processing means for limiting the timed access to the selected extracted data objects.
46. A machine for automatically controlled release of selected data as defined in above in item 45 wherein said means, wherein said means comprising:
   A. A digital processing means for release of altered extracted data objects to the user display.
47. A machine for automatically controlled release of selected data as defined in above in item 46, wherein said means, wherein said means comprising:
   A. A digital means for release of selected extracted data objects with added data objects to the user display.
48. A machine for automatically controlled release of selected data as defined in above in item 47, wherein said means comprising:
   A. A manual means for enabling and disabling the release of the selected extracted data objects.
49. A machine for automatically-controlled release of selected data as defined in above in item 48, wherein said means comprising:
   A. A digital processing means enabling user to indicate desired data objects as candidates for extraction.

50. A machine for automatically-controlled release of physically separated data streams for projection as a combined data objects stream while maintaining full physical separation, wherein said means comprising:
   A. A digital processing means for releasing data object streams into display means.
   B. A digital processing means for releasing data object streams into projection means.
51. A machine for automatically-controlled release of logically separated data objects streams for projection as a combined data objects stream while maintaining full logical separation, wherein said means comprising:
   A. A digital processing means for releasing data object streams into display means.
   B. A digital processing means for releasing data object streams into projection means.
52. A machine for automatically display of prioritized extracted data objects in combination with the modified original data objects stream creating various displays, while maintaining substantial separation between the data streams, wherein said means comprising:
   A. A digital processing means for automatically selecting data object candidates for extraction from an existing data objects stream located in a first memory.
   B. A digital processing means for automatically extracting the selected data objects from an existing data objects stream located in a first memory.
   C. Providing a digital means of transporting extracted data objects to a second memory.
   D. A digital means for controlled release of extracted data objects to a display.
   Whereby data objects in said modified original data stream and the separated, selected, extracts data stream are presented in a combination, to create various displays including, display like original data stream, while maintaining a desired level of separation between the data streams.
53. A machine for automatically display as defined in above in item 52, wherein said means comprising:
   A. A digital process means for creating a total physical separation between selected extracts data objects stream and other streams, in said combined display process.
54. A machine for automatically display as defined in above in item 53, wherein said means comprising:
   A. A digital process means for creating a total logical separation between selected extracts data objects stream and other data objects streams, in said combined projection and display process.
55. A machine for automatically display as defined in above in item 54, wherein said means comprising:
   A. A digital display means for displaying released, selected, extracted data objects including a wireless display means.
56. A machine for automatically display as defined in above in item 55, wherein said means comprising:
   A. A digital processing means for processing different, versions of the reconstructed original data stream, according to different user's classifications.
57. A machine for automatically display as defined in above in item 56, wherein said means comprising:
   A. A digital processing means for processing real-time, simultaneous, displays of different versions of reconstructed original data stream, according to different users' classifications.
58. A machine for automatically display as defined in above in item 57, wherein said means comprising:
   A. A digital display means to project together, the modified original data objects stream, with selected data objects in the extracted data streams to create a joint presentation, maintaining desired level of separation between the modified original data objects stream and the selected extracted data objects.
59. A machine for automatically display as defined in above in item 58, wherein said means comprising:
   A. A hardware apparatus to project a joint presentation of prioritized, selected, separated, extracted data objects streams, maintaining high level of separation between the modified original data objects stream and the prioritized extracted data objects.
60. A machine for automatically display as defined in above in item 59, wherein said means comprising:
   A. Hardware apparatus for overlaying the output of said prioritized extracted data objects with the output of the modified original data object stream to create a joint presentation while maintaining high level of separation between the modified original data object stream and the prioritized extracted data objects.
61. A machine for automatically display defined in above in item 60, wherein said means comprising:
   A. A digital display in which said separate extracted data object streams can be jointly presented in real-time while maintaining separation between the data streams.
   B. A wireless connected display in which said separate data streams can be presented separately and jointly presented while maintaining desired separation between the data streams.
62. A machine for automatically display defined in above in item 61, wherein said means comprising
   A. A digital processing means for anticopying based on configuration of color contrasts in the display.
63. A machine for automatically display defined in above in item 62, wherein said means comprising:
   A. A digital processing means for anticopying based on configuration of font sizes.
64. A machine for automatically selecting, extracting, storing and releasing extracted data objects, with security alerts triggering, wherein said means comprising:
   A. A digital processing means for selecting and extracting data objects from a stream of digital data objects.
   B. A digital processing means for storing said selected data objects.
   C. A digital processing means for releasing said selected data objects in a controlled method.
   D. A set of rules enabling the automatic triggering of various said machine's functions in different situations.
65. A machine with security alerts triggering as defined in above in item 64, wherein said means comprising:
   A. A data processing means for receiving and automatically interpreting security alert inputs.
   B. A set of rules enabling the automatic triggering of various said machine functions in a threat working mode.
   C. A digital processing means for automatically triggering a higher level of said machine activities for increased security.
66. A machine with security alerts triggering as defined in above in item 65, wherein said means comprising:
   A. A data processing means for receiving and automatically interpreting security alert inputs.
   B. A set of rules enabling the automatic triggering of various said machine functions in an attack working mode.
   C. A digital processing means for automatically triggering the highest level of said machine activities for increased security.

67. A machine with security alerts triggering as defined in above in item 66, wherein said means comprising:
   A. A digital-processing audit means for tracing user access 68. A machine for automatically selecting and extracting as defined in above in item 2b, wherein said means comprising:
   A. A physical hardware apparatus providing a physical layer of security, and protection against tampering.

69. A machine for automatically selecting and extracting as defined in above in item 2b, wherein said means comprising:
   A. A digital processing means for reporting logins attempted, logins, logouts, terminations, and failures.

70. A machine for automatically selecting and extracting as defined in above in item 2b, wherein said means comprising:
   A. A digital processing means for mapping and reporting location and history of data object streams and selected data object extract s streams processed by said machine.

71. A machine for automatically selecting and extracting as defined in above in item 1, wherein said means comprising:
   A. A digital processing means for intrusion detection determining intrusion based on various file changes.

72. A machine for automatically selecting and extracting as defined in above in item 2b, wherein said means comprising:
   A. A digital processing means enabling providing said applications and services as a third party provider over networks and Internet.

73. A machine for automatically selecting and extracting as defined in above in item 2b, wherein said means comprising:
   A. A digital processing means enabling providing said applications and services for electronic commerce over networks and Internet.

74. A machine for automatically selecting and extracting as defined in above in item 2b, wherein said means comprising:
   A. A digital processing means enabling providing said applications and services for electronic mail between computers, networks, and Internet.

75. A machine for automatically selecting and extracting as defined in above in item 1, wherein said means comprising:
   A. A digital processing means enabling providing said applications and services for electronic mail between computers, networks, and Internet.
   B. A digital processing means enabling receiver of electronic mail to receive the selected extracted data object stream by using an additional identifying means.

76. A machine for automatically selecting and extracting as defined in above in item 2b, wherein said means comprising:
   A. A digital processing means for presenting information and charging payment for release of data object extracts.

77. A machine for automatically selecting and extracting as defined in above in item 2b, wherein said means comprising:
   A. A digital processing means for presenting information and releasing of selected data object extracts predicated upon fulfillment of specific conditions.

78. A machine for automatically selecting and extracting as defined in above in item 2b, wherein said means comprising:
   A. A digital processing means enabling overriding of machine processes by authorized users.

79. A machine for automatically selecting and extracting as defined in above in item 2b, wherein said means comprising:
   A. A digital processing means for adding encryption to output data objects streams.

80. A machine for automatically selecting and extracting as defined in above in item 2b, wherein said means comprising:
   A. A digital processing means for enabling manual selection of said machine processing including: automatic machine processing.
   B. A digital processing means for enabling manual selection of said machine processing
   C. Including: semi-automatic machine processing with capability to influence the machine's processing by moving tools such as levers, bars, buttons, check boxes, sliders, drag and drop, and voice enablement.
   D. A digital processing means for enabling manual selection of said machine processing including manual control of said machine processing.

81. A machine for automatically selecting and extracting as defined in above in item 2b, wherein said means comprising:
   A. A digital processing means for controlling access to said machine and its various outputs based on user identification.

82. A machine for automatically selecting and extracting as defined in above in item 2b, wherein said means comprising:
   A. A digital processing means for controlling access to said machine and its various outputs based on user identification through biometrics authentication.

83. A machine for automatically selecting and extracting as defined in above in item 2b, wherein said means comprising:
   A. A digital processing means for controlling access to said machine and its various outputs based on timed challenge questions validating user identity.

84. A machine for automatically selecting and extracting as defined in above in item 2b, wherein said means comprising:
   A. A digital processing means for allowing continuing access to said machine and its various outputs based on timed challenge questions validating user identity.

85. A machine for automatically selecting and extracting as defined in above in item 2b, wherein said means comprising:
   A. A digital processing means for controlling access to said machine and its various outputs based on identify friend or foe validating user identity.

86. A machine for automatically selecting and extracting as defined in above in item 2b, wherein said means comprising:
   A. A digital processing means for allowing continuing access to said machine and its various outputs based on identify friend or foe validating user identity.

87. A machine for automatically selecting and extracting as defined in above in item 2b, wherein said means comprising:
   A. A digital processing means for limiting different users access to said machine for specific time periods.

88. A machine for automatically selecting and extracting as defined in above in item 2b, wherein said means comprising:
   A. A digital processing means for limiting users access to data object extracts for specific time periods.

89. A machine for automatically selecting and extracting as defined in above in item 2b, wherein said means comprising
   A. A digital processing means for limiting users access to different machine functions at specific time periods.

The invention is also a process and a business method comprising:

90. A process for selecting prioritized data objects from data streams creating a data objects inventory for managing mapping communicating and responding to opportunities and threats wherein said means comprising:
   A. Providing a digital processing means for selecting prioritized data objects from data streams creating a data objects inventory for managing mapping and communicating opportunities and threats
   B. Providing a digital processing means for selecting prioritized data objects from data streams creating a data objects inventory for mapping and combining of resources
   C. Providing a digital processing means for selecting prioritized data objects from data streams that will enable reacting to said threats and opportunities 90a. A process for auditing the process of automatically selecting, extracting data objects from an existing data objects stream, and automatically releasing selected extract data objects to a display, wherein said means comprising:
   A. Providing a digital processing means for auditing the process of control and management of selected critical/prioritized data/data objects within a file, document database computer network and data center.
   B. Providing a digital processing means for auditing the integrity, functionality, and security of the process which includes among other things selection of critical/prioritized content/data objects, their extraction and reconstitution.
   C. Providing a digital means for auditing the resulting out put from the said process which includes auditing the selected extracted data objects, their placement in the right categories and right storage.
   D. Providing a digital means for verifying security throughout the process and verifying release of extracts is in adherence to procedures and security guidelines. Verifying that the appropriate data objects where selected and that the appropriate ones released from storage and reconstituted correctly.

90b. A process for auditing the selection and extraction process as defined in above in item 90a wherein said means comprising:
   A. Providing a digital processing means to audit the resulting out put from the said process which includes auditing the selected extracted data objects, their placement in the right categories and right storage.
   B. Providing a digital processing means for verifying security throughout the process and verifying release of extracts is in adherence to procedures and security guidelines.

Page: 20
   C. Providing a digital processing means for verifying that the appropriate data objects where selected and that the appropriate ones released from storage and reconstituted correctly.

90c. A process for auditing the process of automatically selecting, extracting data objects from an existing data objects stream, and automatically releasing selected extract data objects to a display, wherein said means comprising:
   A. Providing a digital processing means for auditing the process of control and management of selected critical/prioritized data/data objects within a file, document database computer network and data center.
   B. Providing a digital processing means for auditing the integrity, functionality, and security of the process which includes among other things selection of critical/prioritized content/data objects, their extraction and reconstitution.
   C. Providing a digital means for auditing the resulting out put from the said process which includes auditing the selected extracted data objects, their placement in the right categories and right storage.
   D. Providing a digital means for verifying security throughout the process and verifying release of extracts is in adherence to procedures and security guidelines. Verifying that the appropriate data objects where selected and that the appropriate ones released from storage and reconstituted correctly.

90d. A process for auditing the selection and extraction process as defined in above in item 1 wherein said means comprising:
   A. Providing a digital processing means to audit the resulting out put from the said process which includes auditing the selected extracted data objects, their placement in the right categories and right storage.
   B. Providing a. digital processing means for verifying security throughout the process and verifying release of extracts is in adherence to procedures and security guidelines.
   C. Providing a digital processing means for verifying that the appropriate data objects where selected and that the appropriate ones released from storage and reconstituted correctly.

90e. A process for auditing the selection and extraction process as defined in above in item 90a wherein said means comprising:
   A. Providing a digital processing means to audit the resulting output of the process and to measure the effectiveness of the process and its various functions and results on achieving the goals and objectives it was designed to accomplish.
   B. Providing a digital processing means to audit the resulting output of the process and to adjust the needed functions in order to achieve the goals and objectives it was designed to accomplish.

90f. A process for automatically selecting and extracting data objects from an existing data object stream where automatically releasing selected extract data objects to a display, wherein said means comprising:
   A. Providing a digital processing means for automatically selecting data objects candidates for extraction from an existing data objects stream located in a first memory.
   B. Providing a digital processing means for automatically extracting selected data objects from an existing data objects stream located in a first memory.
   C. Providing a digital means of transporting extracted data objects to a second memory
   D. Providing a digital means for controlled release of extracted data objects to a display.
   Whereby automatically selected contents can be separated and removed from original document, file or data stream, transported to secured storage memory and controlled released based on security, previously selected categories, rules and other triggers 91. A process for automatically selecting and extracting as defined in above in item 90, wherein said means comprising:
   A. Providing a digital means for storing a first dictionary of, characters and data objects
   B. Providing a digital means responsive to said dictionary for use as a filtering condition
   C. Providing a digital means for extracting data objects not mentioned in said dictionary 92. A process for automatically selecting and extracting defined in above in item 91, wherein said means comprising:
   A. Providing a digital means for storing a second dictionary of, characters and data objects
   B. Providing a digital means responsive to said second dictionary for use as a filtering condition
   C. Providing a digital means for extracting any data object mentioned in said second dictionary.

93. A process for automatically selecting and extracting defined in above in item 92, wherein said means comprising:
   A. Providing a digital means for accepting additional data objects into dictionaries.
   B. Providing a digital means enabling the adding of other dictionaries with said first and second dictionaries.
   C. Providing a digital means for customizing dictionaries for specific content fields.

94. A process for automatically selecting and extracting as defined in above in item 93, wherein said means comprising:
   A. Providing a digital processing means for tagging and serializing derived selected data object extractions 95. A process for automatically selecting and extracting as defined in above in item 94, wherein said means comprising:
   A. Providing a digital filtering means for automatically sorting of said selected extracted data objects according to separate data objects categories.
   B. Providing a digital processing means for labeling said sorted, selected data objects, with their respective categories 96. A process for automatically selecting and extracting, as defined in above in item 95, wherein said means comprising:
   A. Providing a digital processing means for automatically creating new, data object categories for the said sorting, process.

97. A process for automatically selecting and extracting as defined in above in item 96, wherein said means comprising:
   A. Providing a digital means for substantially erasing, from all memories except second memory, all copies and links and traces of removed selected extracted digital objects.

98. A process for automatically selecting and extracting as defined in above in item 97, wherein said means comprising:
   A. Providing a digital means for substantially eradicating from all memories except second memory, all links, copies, traces, to separated and extracted data objects. Said eradication includes: termination of related delivery means, defragmenting, associated files, overwriting relevant files, cleaning memories, and caches.

99. A process for automatically selecting and extracting as defined in above in item 98, wherein said means comprising:
   A. Providing a digital means for substituting the extracted selected data objects with other data objects placeholders.

100. A process for automatically selecting and extracting as defined in above in item 99, wherein said means comprising:
   A. Providing a digital means for substituting the extracted selected data objects with other data objects placeholders including: serialization characters, replacement of information, bar codes null sets, URL's, and web site addresses.

101. A process for automatically selecting and extracting as defined in above in item 100, wherein said means comprising:
   A. Providing a digital processing means for configuration of the scope of computer files selection for the automatic selecting and extracting process.

102. A process for automatically selecting and extracting as defined in above in item 101, wherein said means comprising:
   A. Providing a digital processing means for configuration of the scope of computer files selection for the automatic selecting and extracting process based on file status, timing, preset rules and user-specific selection.
   B. Providing a digital processing means for configuration of the scope of computer file selection for the automatically selecting and extracting process based on verifying of file existence, checking for recent activity, checking whether recent separation and extraction activity of data objects is up to date in accordance to modes and preferences.

103. A process for automatically selecting and extracting as defined in above in item 102, wherein said means comprising:
   A. Providing a digital processing means for establishing which computers, and digital process in a network will be connected, accessible and interacting with said extracting process.

104. A process for automatically selecting and extracting as defined in above in item 103, wherein said means comprising:
   A. Providing a digital processing means for initiating the selecting and extracting of data objects, triggered by preset rules for process configuration.

105. A process for automatically selecting and extracting as defined in above in item 104, wherein said means comprising:
   A. Providing a digital processing means for initiating selecting and extracting of data objects, triggered by security alerts including threat mode and attack mode.

106. A process for automatically selecting and extracting as defined in above in item 90, wherein said means comprising:
   A. Providing a digital processing means for choosing the parameters for the selecting and extracting of data objects, triggered by preset rules for process configuration.

107. A process for automatically selecting and extracting as defined in above in item 90, wherein said means comprising:
   A. Providing a digital processing means for choosing the parameters for the selecting and extracting of data objects, triggered by security alerts including threat mode and attack mode.

108. A process for automatically selecting and extracting as defined in above in item 90, wherein said means comprising:

A. Providing a digital processing means for interpreting the output of security intrusion detection means.

B. Providing a digital processing means triggering processing by said process based on interpretation of output of security alerts and output of intrusion detection means.

109. A process for automatically selecting and extracting as defined in above in item 90, wherein said means comprising:

A. Providing a digital means for removing from a data object stream selected data objects including: digital records, elements of records, characters.

110. A process for automatically selecting and extracting as defined in above in item 90, wherein said means comprising:

A. Providing a digital means for removing from a data object stream selected data objects including digital graphic images and segments of graphic images.

111. A process for automatically selecting and extracting as defined in above in item 90, herein said means comprising:

A. Providing a digital means for removing from a data object stream selected data objects including digitized sound.

112. A process for automatically selecting and extracting as defined in above in item 90, wherein said means comprising A. Providing a digital means for removing from a data object stream selected data objects including: digitized video images and segments of video images.

113. A process for automatically customizing, automatically selected content items, within in a data objects stream, wherein said means comprising:

A. Providing a digital data means for sorting extracted selected data objects into predefined contextual categories.

B. Providing a digital data means for assigning an extracted selected data objects to a data object category.

Whereby items of the automatically selected content are sorted into prearranged defined categories such as: credit card numbers, social security numbers, last name first name addresses.

Whereby the selected content items are sorted out according to categories, and are available for release for display to users, according to the user's status and clearance.

114. A process for automatically customizing selected content as defined in above in item 113, wherein said means comprising:

A. Providing a digital processing means for sorting extracted data objects into predefined categories.

B. Providing a digital processing means for identifying which extracted data objects should be released to which user.

Whereby the selected content items are sorted out according to categories, and are available for release for display to users, according to predefined rules set.

115. A process for automatically customizing selected content as defined in above in item 114, wherein said means comprising:

A. Providing a digital processing means enabling the altering of the selected data objects Whereby different items of the automatic selected contents will be altered and available for display to users according to the user's status and clearance.

116. A process for automatically customizing selected content as defined in above in item 115, wherein said means comprising:

A. Providing a digital processing means for enabling different extracted data objects to be released to different users.

Whereby different items of the automatic selected contents will be available for release to user display according to a predefined rule set.

117. A process for automatically customizing selected contents as defined in above in item 116, wherein said means comprising:

A. Providing a digital processing means for selecting which extracted data objects would be targeted as descriptors for information searching.

B. Providing a digital processing means for presenting the targeted extracted data object contents to online search engines.

C. Providing a digital processing means for automatically presenting search results to authorized users.

Whereby different items of the automatic selected contents would be automatically targeted and presented to search engines and the search results and the items searched will be available for display to users according to the user's status and clearance.

118. A process for automatically customizing selected contents as defined in above in item 117, wherein said means comprising:

A. Providing a digital processing means for scoring and ranking contextual relevance of said search engine results.

A. Providing a digital processing means for presenting and linking, in a display, said scored and ranked search engines results with the extracted data objects. Whereby search engine results are scored and ranked to achieve highest contextual relevance to the selected content items and available for display to users according to their status and clearance.

Whereby there is no need for user to actively take any action like highlighting words, typing characters, the process will automatically trigger searches for information and URLs which are relevant to the selected content items.

Whereby there is no need for user to wait for search results relevant to the selected content items because the system automatically instructs said searches, at an early stage.

119. A process for automatically customizing selected content s as defined in above in item 118, wherein said means comprising:

A. Providing digital processing means enabling voice recognition and its presentation in a digitized form enabling the said process to may out its processes.

120. A process for automatically customizing selected content s as defined in above in item 119, wherein said means comprising:

A. Providing a digital processing means for recognizing patterns of the selected data content items and assigning prioritization to various selected data content items.

121. A process for automatically customizing selected content s as defined in above in item 120, wherein said means comprising:

A. Providing a digital processing means for submitting targeted selected extracts of contents, to information search engines for display of relevant findings including: text, graphics, audio and video.

122. A process for automatically customizing selected content s as defined in above in item 121, wherein said means comprising:

A. Providing a digital processing means for submitting targeted selected extracts of content to various process and appliances for possible triggering of various reactions.

123. A process for automatically transporting selected data objects to other memories, and between memories for achieving higher level of security, wherein said means comprising:
   A. Providing a digital processing means for selection of destination storage memories, triggered automatically by various preset criteria.
   B. Providing a digital processing means for transport of said data objects to said selected storage memories, triggered automatically by various preset criteria and manually 124. A process for automatically transporting selected data objects as defined in above in item 123, wherein said means comprising:
   A. Providing a remote memory storage media.

125. A process for automatically transporting selected data objects as defined in above in item 124, wherein said means comprising:
   A. Providing an offline memory storage media.

126. A process for automatically transporting selected data objects as defined in above in item 125, wherein said means comprising:
   A. Providing an Internet and network based memory storage media 127. A process for automatically transporting selected data objects as defined in above in item 126, wherein said means comprising:
   A. Providing a copy and backup apparatus.

128. A process for automatically transporting selected data objects as defined in above in item 127, wherein said means comprising:
   A. Providing a digital means for encrypting and decrypting the data objects transported to storage memories.

129. A process for automatically transporting selected data objects as defined in above in item 128, wherein said means comprising:
   A. Providing a digital processing means for mapping the location and capabilities of the different connected and available memories.
   B. Providing a digital processing means for mapping damage and threats to the connected and available storage memories.

130. A process for automatically transporting selected data objects as defined in above in item 129, wherein said means comprising:
   A. Providing a digital means for triggering bypassing of damaged and threatened storage memories.

131. A process for automatically transporting selected data objects as defined in above in item 130, wherein said means comprising:
   A. Providing a digital processing means for automatically configuring the hierarchy for connectivity between the data objects to be transported, and the storage memories according to user needs, preset rules, and security constraints.

132. A process for automatically transporting selected data objects as defined in above in item 131, wherein said means comprising:
   A. Providing a digital processing means controlling the release of data objects from said storage memories based on user's rights of access to the stored content.
   B. Providing a digital processing means controlling the release of data objects from said storage memories based on security constraints, including intrusion threat and attack.

133. A process for automatically transporting selected data objects as defined in above in item 132, wherein said means comprising:
   A. Providing a digital processing means for camouflaging data object file identity.

134. A process for automatically transporting selected data objects as defined in above in item 133, wherein said means comprising:
   A. Providing a digital processing means for camouflaging data objects files by removing file's root directory.
   B. Providing a digital processing means for camouflaging data objects files by removing name of file, links, references, shortcuts, and name of directory.

135. A process for automatically controlled release of automatically selected extracted data objects, from a data object stream, into a display, wherein said means comprising:
   A. Providing a digital reading means for reading the selected extracted data object's assigned category.
   B. Providing a digital means for identifying user access rights to the specific selected extracted data object items based the data object category.
   C. Providing a digital processing means for synchronized controlled release of selected data objects from storage memory according to user access rights and privileges.
   Whereby selected data objects are released from a memory into a user's display based on user status and access privileges to such content.

136. A process for automatically controlled release extracted data objects as defined in above in item 135, wherein said means comprising:
   A Providing a digital processing means for controlled release of selected extracted data objects based on access time.

137. A process for automatically controlled release of extracted data objects as defined in above in item 136, wherein said means comprising:
   A. Providing a digital processing means for limiting the timed access to the selected extracted data objects.

138. A process for automatically controlled release of selected data as defined in above in item 137, wherein said means comprising:
   A. Providing a digital processing means for release of altered extracted data objects to user display.

139. A process for automatically controlled release of selected data as defined in above in item 138, wherein said means, wherein said means comprising:
   A. Providing a digital means for release of selected extracted data objects with added data objects to user display.

140. A process for automatically controlled release of selected data as defined in above in item 139, wherein said means comprising:
   A. Providing a manual means for enabling and disabling the release of the selected extracted data objects.

141. A process for automatically controlled release of selected data as defined in above in item 140, wherein said means comprising:
   A. Providing a digital processing means enabling user to highlight desired data objects as candidates for extraction.

142. A process for automatically release of physically separated data objects streams for projection as a combined data objects stream while maintaining full physical separation comprising:
   A. Providing a digital processing means for releasing data object streams into display means.
   B. Providing a digital processing means for releasing data object streams into projection means.
143. A process for automatically release of logically separated data objects streams for projection as a combined data objects stream while maintaining full logical separation, wherein said means comprising:
   A. Providing a digital processing means for releasing data object streams into display means.
   B. Providing a digital processing means for releasing data object streams into projection means.
144. A process for automatically display of selected separated extracted data objects in combination with the modified original data objects stream creating various displays, while maintaining substantial separation between the data streams comprising:
   A. Providing a digital processing means for automatically selecting data object candidates for extraction from an existing data objects stream located in a first memory.
   B. Providing a digital processing means for automatically extracting the selected data objects from an existing data objects stream located in a first memory.
   C. Providing a digital means of transporting extracted data objects to a second memory.
   D. Providing a digital means for controlled release of extracted data objects to a display
   Whereby data objects in said modified original data stream and the separated, selected, extracts data stream are presented in a combination, to create various displays including, display like original data stream, while maintaining a desired level of separation between the data streams.
145. A process for automatically display as defined in above in item 144, wherein said means comprising:
   A. Providing a digital process means for creating a total physical separation between selected extracts data objects stream and other streams, in said combined display process.
146. A process for automatically display as defined in above in item 145, wherein said means comprising:
   A. Providing a digital process means for creating a total logical separation between selected extracts data objects stream and other data objects streams, in said combined projection and display process.
147. A process for automatically display as defined in above in item 146, wherein said means comprising:
   A. Providing a digital display means for displaying released, selected, extracted data objects including a wireless display means.
148. A process for automatically display as defined in above in item 147, wherein said means comprising:
   A. Providing a digital processing means for processing different, versions of there constructed original data stream, according to different user's classifications.
149. A process for automatically display as defined in above in item 148, wherein said means comprising:
   A. Providing a digital processing means for processing real-time, simultaneous, displays of different versions of reconstructed original data stream, according to different user classifications.
150. A process for automatically display as defined in above in item 1,49 wherein said means comprising:
   A. Providing a digital display means to project together, the modified original data objects stream, with selected data objects in the extracted data streams to create a joint presentation, maintaining desired level of separation between the modified original data objects stream and the selected extracted data objects.
151. A process for automatically display as defined in above in item 150, wherein said means comprising:
   A. Providing a hardware apparatus to project a joint presentation of separated, selected, extracted data objects streams, maintaining high level of separation between the modified original data objects stream and the selected extracted data objects.
152. A process for automatically display as defined in above in item 151, wherein said means comprising:
   A. Providing a hardware apparatus for overlaying the output of said selected extracted data objects with the output of the modified original data object stream to create a joint presentation while maintaining high level of separation between the modified original data object stream and the selected extracted data objects.
153. A process for automatically display defined in above in item 152, wherein said means comprising:
   A. Providing a digital display in which said separate extracted data object streams can be jointly presented in real-time while maintaining separation between the data streams.
   B. Providing a wireless connected display in which said separate data streams can be presented separately and jointly presented while maintaining desired separation between the data streams.
154. A process for automatically display defined in above in item 153, wherein said means comprising
   A. Providing a digital processing means for anticopying based on configuration of color contrasts in the display.
155. A process for automatically display defined in above in item 154, wherein said means comprising:
   A. Providing a digital processing means for anticopying based on configuration of font sizes.
156. A process for automatically selecting, extracting, storing and releasing extracted data objects, with security alerts triggering, wherein said means comprising:
   A. Providing a digital processing means for selecting and extracting data objects from a stream of digital data objects.
   B. Providing a digital processing means for storing said selected data objects.
   C. Providing a digital processing means for releasing said selected data objects in a controlled method.
   D. Providing a set of rules enabling the automatic triggering of various said process functions in different situations.
157. A process with security alerts triggering as defined in above in item 156, wherein said means comprising:
   A. Providing a data processing means for receiving and automatically interpreting security alert inputs.
   B. Providing a set of rules enabling the automatic triggering of various said process functions in a threat working mode.
   C. Providing a digital processing means for automatically triggering a higher level of said activities for increased security.
158. A process with security alerts triggering as defined in above in item 157, wherein said means comprising:
   A. Providing a data processing means for receiving and automatically interpreting security alert inputs.

B. Providing a set of rules enabling the automatic triggering of various said process functions in an attack working mode.
C. Providing a digital processing means for automatically triggering the highest level of said process activities for increased security.

159. A process with security alerts triggering as defined in above in item 158, wherein said means comprising:
A. Providing a digital-processing audit means for tracing user access 160. A process for automatically selecting and extracting as defined in above in item 90, wherein said means comprising:
A. Providing a physical hardware apparatus providing a physical layer of security, and protection against tampering.

161. A process for automatically selecting and extracting as defined in above in item 90, wherein said means comprising:
A. Providing a digital processing means for reporting logins attempted, logins, terminations, logouts, and failures.

162. A process for automatically selecting and extracting as defined in above in item 90, wherein said means comprising:
A. Providing a digital processing means for mapping and reporting location and history of data object streams and selected data object extract s streams processed by said process.

163. A process for automatically selecting and extracting as defined in above in item 90, wherein said means comprising:
A. Providing a digital processing means for intrusion detection determining intrusion based on various file changes.

164. A process for automatically selecting and extracting as defined in above in item 90, wherein said means comprising:
A. Providing a digital processing means enabling providing said applications and services as a third party provider over networks and Internet.

165. A process for automatically selecting and extracting as defined in above in item 90, wherein said means comprising:
A. Providing a digital processing means enabling providing said applications and services for electronic commerce over networks and Internet.

166. A process for automatically selecting and extracting as defined in above in item 90, wherein said means comprising:
A. Providing a digital processing means enabling providing said applications and services for electronic mail between computers, networks and Internet.

167. A process for automatically selecting and extracting as defined in above in item 90, wherein said means comprising:
A. Providing a digital processing means enabling providing said applications and services for electronic mail between computers, networks and Internet.
B. Providing a digital processing means enabling receiver of electronic mail to receive the selected extracted data object stream by using an additional identifying means.

168. A process for automatically selecting and extracting as defined in above in item 90, wherein said means comprising:
A. Providing a digital processing means for presenting information and charging payment for release of selected data object extracts.

169. A process for automatically selecting and extracting as defined in above in item 90, wherein said means comprising:
A. Providing a digital processing means for presenting information and releasing of selected data object extracts predicated upon fulfillment of specific conditions.

170. A process for automatically selecting and extracting as defined in above in item 90, wherein said means comprising:
A. Providing a digital processing means enabling overriding of process processes by authorized users.

171. A process for automatically selecting and extracting as defined in above in item 90, wherein said means comprising:
A. Providing a digital processing means for adding encryption to output data object streams.

172. A process for automatically selecting and extracting as defined in above in item 90, wherein said means comprising:
A. Providing a digital processing means for enabling manual selection of said process processing including automatic process processing.
B. Providing a digital processing means for enabling manual selection of said process processing
Including: semi-automatic process processing with capability to influence the processing by moving tools such as levers, sliders, drag and drop, buttons, check boxes, bars, and voice recognition.
C. Providing a digital processing means for enabling manual selection of said process processing including manual control of said process processing.

173. A process for automatically selecting and extracting as defined in above in item 90, wherein said means comprising:
A. Providing a digital processing means for controlling access to said process and its various outputs based on user identification.

174. A process for automatically selecting and extracting as defined in above in item 90, wherein said means comprising:
A. Providing a digital processing means for controlling access to said process and its various outputs based on user identification through biometrics authentication.

175. A process for automatically selecting and extracting as defined in above in item 90, wherein said means comprising:
A. Providing a digital processing means for controlling access to said process and its various outputs based on timed challenge questions validating user's identity.

176. A process for automatically selecting and extracting as defined in above in item 90, wherein said means comprising:
A. Providing a digital processing means for allowing continuing access to said process and its various outputs based on timed challenge questions validating user identity.

177. A process for automatically selecting and extracting as defined in above in item 90, wherein said means comprising:
A. Providing a digital processing means for controlling access to said process and its various outputs based on identify friend or foe validating user identity.

178. A process for automatically selecting and extracting as defined in above in item 90, wherein said means comprising:
   A. Providing a digital processing means for allowing continuing access to said process and its various outputs based on identify friend or foe validating user identity.
179. A process for automatically selecting and extracting as defined in above in item 90, wherein said means comprising:
   A. Providing a digital processing means for limiting different users access to said process for specific time periods.
180. A process for automatically selecting and extracting as defined in above in item 90, wherein said means comprising:
   A. Providing a digital processing means for limiting different users access to data object extracts for specific time periods.
181. A process for automatically selecting and extracting as defined in above in item 90, wherein said means comprising:
   A. Providing a digital processing means for limiting different users access to different process functions at specific time periods.

Sketches

See Building and Testing for samples.

Ramifications

The huge growth in information and content makes it much harder and more expensive to manage information. The invention allows management of large masses of information by focusing on prioritized and critical information. The system enables real-time monitoring of content and real-time data mining of content through the focus on prioritized and critical content. Prioritized content is predefined by individuals within the organization whereas critical content is predefined, matched against common words, phrases and meaning semantics, matched against dictionaries, semantic filtering, and any and all content which by default remains unmatched.

The underlying assumption is based on that raw data does not change and extracting the prioritized content will enable top quality data management as well as allow the flexibility to integrate different applications and future applications for retrieval and assessment of content. The intent is to build a strong and firm foundation of critical raw data which will be the basis for data management and creation of much added value. This methodology will improve the speed and integrity of concept monitoring and indexing. The system creates a methodology that enables merging results from several search systems. Through data fusion a virtual collection of prioritized content from different data sources could be combined and at that point weights could be reassigned based on the total virtual connection.

The system enables instant data mining at the initial document level (i.e. as soon as a document is typed/processed, imported, and/or before it is transferred to storage or to a data warehouse). The invention processes each character and each data object as it is inputted into the document or as soon as a document/file is imported into the user's workspace or logical desktop. It enables data mining at the earliest possible stage before any encryption or decryption takes place. The invention is a system and a method to create an inventory of prioritized data objects within a computer or a network that will enable to map, communicate manage and respond to user's needs as well as opportunities and threats:

To create an inventory of prioritized data objects within a computer or a network that will enable management and reaction to said threats and opportunities To audit the process of control and management of selected critical/prioritized data/data objects within a file, document database computer network and data center To audit the integrity, functionality, and security of the process as described below which includes among other things selection of critical/prioritized content/data objects, their extraction and reconstitution To audit the resulting out put from the said process which includes auditing the selected extracted data objects, their placement in the right categories and right storage locations.

To verify security throughout the process and verifying release of extracts is in adherence to procedures and security guidelines To verify that the appropriate data objects where selected and that the appropriate ones are released from storage and reconstituted correctly.

To audit the resulting output of the process and to measure the effectiveness of the process and its various functions and results on achieving the goals and objectives it was designed to accomplish.

To audit the resulting output of the process and to adjust the needed functions in order to achieve the goals and objectives it was designed to accomplish The purposes and advantages of the total machine auditing the process of automatically selecting, extracting, secure storing and controlled releasing of specific targeted contents within a data stream, digital document or digital file. The invention audits the integrity, functionality, and security of the process as described below which includes among other things selection of critical/prioritized content/data objects, their extraction and reconstitution.

The ramifications and advantages of the audited machine and process are as follows:

The system and method automatically identifies specific content items to be extracted and removed, out of a data objects stream, document or a digital file. The extracted data objects are transferred to a removed secure storage memory, selected, based on preset rules and various security triggers. An automatic release of the extracted contents, from the removed storage to a display, can take place instantly contingent upon validation of identity and access rights of an authorized party The invention is also a system and method for automatically management and dissemination of documents or digital files with varied contents control levels. The system and method enables content management and control by automatically locating contents of prioritized importance in a document, thereafter allowing real-time, simultaneous parallel, customization and personalization of the document and its dissemination to different parties based on their authorization and access status.

By processing every data object in a specific document (or data stream) and selecting the critical and prioritized content, the system is creating a real-time knowledge repository. In essence, the system is creating a growing database of important content elements forming the basis for processing of this specific document. Results can also be applied to other content in order to fill the users data mining and content needs. The basic assumption is that the selected raw prioritized content will be the foundation for various applications including data mining, automatic summarization, and other intelligent agents and intelligent systems. Initial processing of all data objects saves time and money to avoid repetition of effort.

Furthermore, the mapping of prioritized content in a systematic method can enable integration of various applications including transport messaging and triggering different operations. The focus on mapping of prioritized content at the very early stage enables speedy mapping of content as well as early stage alerting to threats and opportunities. In essence, the system creates real-time monitoring and response capabilities. The system can be plugged into a computer, a server, a network, or e-mail systems, both immediate and virtual. The system can assess prioritized content and alert to many situations, including changes in transactional behavior, intensified focus by a user on information deemed confidential, or any intensified processing, access to, deletion of, or other operations against any plain data source. The system maps interests of users as well as their close relationships. The system in real-time maps which users are processing specific transactions, and in addition, maps this with recipient or partnering parties, locations, and at prices or other users. The said information could be instantly analyzed, compared, and followed up with a response that will generate higher added value, such as with recommendation of higher priced products or different terms for a sale.

The selection of prioritized content enables automatic indexing and intelligent categorization and possible summarization of documents and files by pattern recognition and statistics. Furthermore, the invention enables creation of an inventory with prioritized data objects that will enable mapping, communications, management, response to opportunities and threats, and reaction to said threats and opportunities. Furthermore, the invention enables audits of the process and control and management of selected critical/prioritized data/data objects within a file, document database computer network and data center.

The invention enables audits of the resulting output, which includes auditing the selected extracted data objects, their placement in the categories and storage locations. The invention enables verifying security throughout the process and verifying release of extracts is in adherence to procedures and security guidelines. The invention enables verifying that the appropriate data objects where selected and that the appropriate ones released from storage and reconstituted correctly.

The invention enables audits of the resulting output of the process and to measure the effectiveness of the process and its various functions and results on achieving the goals and objectives it was designed to accomplish.

The invention enables auditing of resulting output of the process and adjusting the needed functions in order to achieve the goals and objectives it was designed to accomplish. The invention enables automatic translation of prioritized content, as well as the rest of the content into foreign languages and other monetary currencies. The system is capable of categorizing the prioritized data objects into many pre-existing contextual categories. If needed, the system can expand its reach and include in its categories different variants for a prioritized data object. For example John Smith can have variant names, such as "John W. Smith", "big boy", or "Boxer," but not "Jonathan Smith" or "John H. Smith", such variants will be categorized within the separate subcategories.

The system can point to various relationships and events by mapping the prioritized data objects.

The system enables filtering of documents according to selected prioritized data objects, it enables to monitor changes in documents and files as well as change in web sites.

The system also enables alerts in accordance with selected prioritized data objects and triggering response mechanisms.

The selection and extraction invention enables control over specific important content items within the general contents of documents or digital files in a computer or within a network. The possible immediately-controlled release of those important content items according to specific identification and access criteria proactively safeguards the security and the value of documents or digital files. The said content control enables broad dissemination of the digital file in closed networks as well as open networks including the internet, without compromising the security of the critical information in the digital file. The Internet and communication advances have opened up many new markets but the opportunities are constrained by many and different security threats. The invention enables maximizing of the new revolutionary connectivity by enabling the general content of a document or digital file to be distributed throughout an organization, its employees, partners, suppliers and customers while securing and controlling the most important content elements. The invention releases the important contents only to the validated authorized parties through an automatic and possible manual controlled release mechanism.

The invention also enables real-time parallel customization and personalization of a digital file to different users. Through a process of filtering and reverse filtering and through a process of sorting, the selected important content items are categorized in various categories. The controlled release mechanism releases the important content items to the various authorized receivers based on their preset rights to access the different categories.

The system delivers top security, privacy and anonymity capabilities by scrubbing and extracting identifying critical information from documents. The system transfers the extracted critical information to an off site secured storage, and enables authorized parties, leveled release of extracted information upon request. Any unauthorized party accessing the documents will find them totally useless since the critical information has been removed. The system also enables the sharing of documents within an organization where upon critical information is extracted from documents and access to that critical information is permitted to selected individuals, with prioritized varying levels of releases of extracted information.

The Current Art

There are no systems that automatically locate non-keyword data within data streams. The categorization of prioritized data objects according to different categories enables an assessment of key content assets and enables the process for defining and responding to threats and opportunities. The response to the opportunities and threats is enabled in various ways including pulling together of relevant data objects for presentation to relevant parties. This includes automatic presentation of relevant data objects to various applications including search engines to alert various parties or trigger various processes. Furthermore, the response can be an automated message pointing to information in a specific location or to a specific person or user with the relevant information.

There are no auditing systems and methods for processes that select and extract of critical/prioritized content/data objects. Furthermore, the following description of the selection and extraction machine and process will clarify the uniqueness of the machine and process and therefore the uniqueness of this auditing invention.

Although there are various security and privacy products in the market, none yield total security. The existing security and privacy products are imperfect and do not give enough security, in a way those are added patches to an already patched up universe. In his book, one of the Intel's top security architects described the existing security products as building a vaulted door to a cardboard box. A Senior Vice President at Symantec, Inc., a security and anti-virus company stated recently that "after a secure firewall is in place, companies have about 28 days before things change and the firm is vulnerable again."

Currently many network defenses in major organizations are inadequately maintained. There is a need for 2-4 employees to operate firewalls in a large organization. There is a need to constantly update the intrusion detection systems. The high cost involved with maintaining the system is a major obstacle to their successful deployment.

Many of the existing security systems create major barriers to their organization's productivity. The complexity and the added security steps needed to do business, slow the flow of documents within the organizations and in many instances cause a total bypass of the security defenses The most critical deficiency in the current security systems is there inability to stop or substantially minimize insider security damage. According to various studies 75 to 90% of the damage is done by insiders. According to a study of the Industrial Computers Association the average outsider damage is $70,000 while the average insiders damage is $2,700,000.

The system extracts and stripes out identifying and critical information from designated documents. The classic information the Scrubber can extract is: credit card numbers, names, addresses, dates, social security numbers, driver's license, transaction dollar amounts, etc. The market for the system is substantial and includes organizations, individuals and companies that need a high level of data security including governments and various defense organizations. The system is based on a new pioneering architecture of security/privacy/anonymity technology. With the spreading of mobile/cellular/satellite communications, the threats to security and privacy are much stronger and the probability of security breaching is much higher. The system enables the continuity of regular business flows, survivability, in both regular and mobile environments. It assures that when an intruder or rogue employee accesses the documents, the documents will be useless.

As electronic commerce grows rapidly, more companies are transforming their closed networks into more open environments allowing customers to connect through the internet to their front end as well as enabling suppliers and partners to connect through the Internet to their the back end.

The security threats and risks of such networks grow in direct correlation to the network's growth in connectivity. With the new openness and as companies embrace the Internet and use it for many of their functions, the security risk grows exponentially.

The internet is a public collection of computer networks with a many diverse entry points for hackers who can, among other things, penetrate a company's website, and throughout it enter the company's networks to steal information or money.

As security is becoming a more strategic priority to slow the operations of the networks and cause organizations substantial money losses. Although there are various security measures and firewalls and systems to protect networks, security has been breached dramatically. Currently, insiders within the company and its firewalls do 75% to 90% of the damage. Furthermore, the existing firewalls are susceptible to many false alarms because of triggers of false intrusions into the networks, which radically In summary, the existing computer and network security products, are not achieving needed security tasks. They do not give enough security and in essence are added patches to an already very patched up environment of computers and computer networks. The present invention answers the said unanswered needs by providing a system that defends in different methods from external as well as internal intruders. Furthermore the system encourages and enables a much needed freer flow of documents and digital files within and out of organizations while automatically protecting the automatically and manually selected important information items. The system also enables survivability of the network while it is being attacked, by allowing the transfer of needed documents in a protected method, thereby accomplishing the network's critical missions.

The system incorporates a scrubbing/extracting process in which words, numbers or characters of strategic importance are removed from a document or digital file as soon as they are created or imported into the computer or network.

The extracted data is transported immediately to a removed storage memory possibly, off-line/off-network, digital or physical vaulted storage. The extracted data may be returned immediately to the user's display based on validation of his identity and access rights. The use of the vaulted extractions is controlled by company policy or set of rules which might include the following options among others: A vaulting of extractions for along/short period of time. Release of extractions to create a projection display of the original document or digital file. Release of extractions or part of them to create a projection display of variations of the original document or digital file. Release of extractions enabling projection of original or reconstituted document while maintaining complete separation between the modified digital data stream and the extracts data streams. The said is achieved through the use of hardware devises like, another screen display, or a wireless PDA, screening projector, 3d glasses, overlay transparency, or printing of the extracts on a paper.

The system's objective is to create a last line of defense for the computer/network. Furthermore the objective is to create a major deterrent. If an intruder penetrates successfully all the computer/network's, firewalls and other security systems, he will end up with documents/files, which will be useless to him since the critical strategic information was exported to a vaulted storage. Competitors or hackers, who learn that a computer/network is protected by the system, might decide to chase another target instead. This is comparable to a situation in which a bank robber, who finds out that the bank vault is empty, will most probably look for another bank to rob.

The system has a manual of different options including the ability to scrub/extract: All existing data texts and databases on the computer/network. All new imported data to the computer/network. All new work/output created by the computer/network. All data being transported in/out of the computer/network.

The system is designed to protect a network of computers or severs as well as an independent computer or component of a network.

Building and Testing

The screen images in the figures section demonstrate the machine and process in action, automatically, selecting, extracting data objects from a file. Furthermore, the extracted data objects are transported to a removed memory, and automatically released into a display to recreate the file or versions of the file.

Attachments

An attachment is a detailed description of a specific system built in 2000/2001 as per specifications of this provisional patent.

An attachment is a detailed technical background of the specific system built in 2000/2001/02/08.

Previous Disclosure of Conception

Three provisional patent applications by same inventors dated Jun. 27, 2000, Sep. 29, 2000, Nov. 3, 2000, Nov. 7, 2000. And Feb. 8, 2001.

Multilevel Security through Sanitization with Reconstruction of Sanitized Content.

A multilevel security technology securing the targeted filtered content with extraction and dispersal to storage, bypassing the use of classification labels, In order to achieve stronger security Conception During the process of developing security technologies for defending critical infrastructure, we discovered the complexity of the business model and the obvious need to redefine and create new systems and methods for doing business. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.
Purposes and Advantages of Invention The invention is a method and process to establish a stronger multilevel security architecture and product, than is currently available. The invention introduces Multilevel security through sanitization of critical content of a document with the unique ability to reconstruct all or part of the original document in conformance to the classification level of the user. A user with top classification will view the entire document, while a user with a lower level classification will view a sanitized document, tailor made automatically for each persons security clearance level. The invention secures the targeted and filtered content of a document, file, or data stream, through extraction and dispersal to storage, bypassing the common use of classification Labels in order to achieve stronger security. The invention enables secure documents storage and secure message transfers between users and networks with different classification levels while protecting the information on a need to know basis.

Currently, multilevel security systems are using multiple desktop computers or displays for each user and using physically-separate systems for processing data at each classification level. This invention eliminates the need for the use of multiple computers. All the documents in the users' PC are automatically declassified. The classified granular content is dispersed to secure distributed storage locations. The classification level of a user will determine the right and ability to access and release the stored critical extracted content from the various storage locations for reconstruction. A user with top classification will view the entire document, while a user- with a lower level classification will view a sanitized document, tailor made automatically for his clearance level.

The invention creates a situation in which the user gets access rights to specific distributed storage locations, each can be classified with a different classification level. The documents in the user PC may be partially or wholly in terms of time in declassified formats. The declassified documents will be reconstituted through a controlled-release of the critical data from storage, and re-classified only when the user presents his identification and his classification level is being verified. The result is that the user's PC or workstation can operate in classified and unclassified modes. It is unclassified when the documents are declassified and when the documents are reconstituted the user is working in a classified mode. The invention introduces a new paradigm whereby computers that are classified as secret or top secret, in actuality will contain declassified documents much or all of the time. This capability strengthens substantially the security of such classified systems.

The inventions objective among others, is to overcome obstacles to intelligence sharing and data sharing between parties by enabling the parties to control release the electronic data and the electronic granular critical data into the documents they are sharing with other parties, while maintaining multilevel security. The rational behind e invention is that there are many obstacles for sharing intelligence and information.

There are even many more hurdles when it comes to sharing of raw intelligence. The invention creates a multilevel security environment, in which the different parties can share and exchange information according to their security level in order to achieve their objectives. The invention can resolve the major challenges facing government in enabling sharing of information between its different organizations in relationship to conducting military operations as well as fighting terrorism.

The invention for example can enable organizations connected to the Department of Defense (DoD) or the Homeland Security Department to search into data bases of various other government, state and local organizations, eliminating the fear of the organizations owning the documents that their proprietary data or granular critical data would be released without their specific permission.

The invention's mechanism of controlled release of the located document/data enables other parties to search their documents without the fear that sensitive information will be released to the searching party. This invention is designed to foster sharing of documentation between different parties, taking into consideration the need to limit the access of other parties to the total content of the owner's document.

The invention enables overcoming the obstacles of existing multiple-level security systems by enabling sharing of sensitive data, and granular data between parties in a much more flexible way which also enables much greater access to information not enabled by the current MLS systems. The invention includes a controlled release mechanism for release of data in conformance to benchmarks, which can include submitting of access identification, the giving of consideration, submitting of other information, etc.

The invention creates better collaboration between users and organizations based on a better flow of information. It enables better efficiency enabling easier communication between users and networks with different levels of classification while maintaining the highest levels of security. The invention enables a much better management of documents in storage and in transport including e-mail.

The invention introduces automation to the sanitization process and an automatic reconstruction process. The automation will avoid human error both intentionally as well as unintentionally. The automation will enable a substantial reduction in costs, furthermore the ability to create a multilevel security environment in one PC or workstation will save costs of purchasing operating and maintaining multiple machines, as is the current practice.

Overview of Multilevel Security

The challenge of many organizations is in getting mission critical and time sensitive information speedily to the users who need it. In many cases the needed non-classified or low-level classified information is stored in systems but is not provided to the user who needs it, because the information is in documents which are highly classified. This creates situations in which users are unable to access information, which they need to accomplish their tasks, because of a technological classification barrier. This over classification of information results in hampering critical tasks and activities, as well as creating system redundancies inefficiencies.

The DoD Multiple level security was based upon the Bell-Lapadula Model. Many believe their security model is superior to other models because the authors prove a "Basic security theorem". There is criticism on the model for various reasons. (see "A comment on the basic Security Theorem of Bell and LaPadula," by John Mclean). This invention's main concern with the Bell-Lapadula Model, and the existing MLS is the use of labels to classify users and subject matter. A professional attacker will use all his efforts to change or damage the labels in-order to compromise the machines secured information. DigitalDoors introduces an architecture whereby content is being recognized not by labels by automatically based on the semantic contents of the plain text The Need for Multiple Level Security According to DoD: "What is needed is a means by which the actual security level of the information can be maintained and information can be appropriately protected, processed, and distributed Users need also timely access to the data and various processing and communications resources that they require to accomplish their jobs." (Multilevel security in DoD: the basics)

"The security constraints imposed by the system—high mode of operation results in less than effective operations. DoD information systems often result to less than effective operations. For example. tape. disk. and paper copy output are often manually reviewed, downgraded, and transferred through time-consuming and labor-intensive procedures among systems operating at dif Brent security levels. This method of data transfer is often inefficient and ineffective. It can also result in the inefficient use of personnel and resources, a condition that challenges the current downsizing requirements facing many government organizations.

In addition, staff members need to access and fuse data and other resources currently available on several systems to perform their duties. Each system generally has its own interface (e.g., via a specific set of terminals or workstations), requiring multiple terminals that take valuable space in command centers, offices, and computer moms. Also, significant time and effort are needed to manually fuse data from different sources.

The maintenance of redundant data bases is another unfavorable condition that results from using separate systems for each security level. Often a separate data base must be created and maintained for each security level processed. The use of these multiple data bases presents several operational problems First, it fragments information. A collection of information regarding a specific event may be split across multiple systems of different security levels. Incomplete or misleading information may result unless pertinent data can be obtained from all related systems. Second, information of a lower classification may be unnecessarily upgraded in the higher level systems, resulting in its over-classification and consequent limited access. As a result, duplication and multiple classifications of the same information occurs. Third, the maintenance of multiple data bases is staff intensive and depletes other system resources. Because the data may change continually, updating data bases often results in inconsistent views of the current information across different levels. The constantly changing nature of the data, combined with human updating, often results in outdated information at one or more of the security levels.

Another difficulty when multiple systems operate at different security levels is the inability to share the computer and communication system infrastructures, such as cabling, network components, printers, workstations, and hosts. If sharing these resources were possible, equipment, operations, and maintenance Costs would decrease."

DoD's Solution: Multilevel Security

According to DoD Multilevel security, or MLSs, it is a capability that allows information with different sensitivities (i.e., classification and compartments) to be simultaneously stored and processed in an information system with users having different security clearances, authorizations, and needs to know, while preventing users from accessing information for which they are not cleared, do not have authorization, or do not have the need to know." The MLS is an enabling technology for command, control, communications, and intelligence systems because it enhances the availability of information while maintaining security.

In DoD's MIS, data of multiple security levels are processed and transferred by the system, which separates the varying security levels and controls access to the data. In the MLS system, some applications process only one level of data at a time, (for example, when a user edits a document with a word processing tool. the data in the document are treated as if they were a single level, the classification of the document itself). Other applications could be provided that treat individual data elements at their actual levels. For example, a word processor could enforce paragraph and page labels, or an MLS data bast could bring together data elements of different security levels to allow an analyst a multilevel view of the information.

DoD defines the following four modes of operation:
Dedicated
System high
Partitioned (or compartmented)
Multilevel.

In the dedicated mode, all users possess clearance levels greater than or equal to the highest level of data to be processed, all users have formal authorization, and all users have the need to know for the data) has the fewest security requirements, followed by system high, then partitioned and multilevel, which require the most security protection because there is an increasing risk that insufficiently cleared persons may gain access to data for which they lack authorization.

In the multilevel mode, allows data of two or more security levels to be processed simultaneously when not all users have the clearance, formal authorization, or need to know for all data handled by the system. The system is able to separate and protect the data according to these restrictions.

In the partitioned mode, also known as compartmented mode. Although similar concepts and solutions are involved for compartmented mode operations as are for the multilevel mode, there is also a key difference. In the compartmented mode, all users have clearances for all the data processed but may not have authorizations for all the data; whereas for multilevel mode, some users may not even be cleared for the highest level. Because the compartmented mode is often envisioned for the intelligence community, all such users would have Top Secret security clearances and often authorizations for one or more, but possibly not all, compartments in the system.

In general it should be pointed that most MLS products are built according to the DoD 5200.28-STD criteria. The MLS system has the following characteristics:

Sensitivity Label:

According to DoD all data must be properly labeled as to their classification and other handling restrictions if an MLS system is to properly control access to the data. In system-high operations, a user may create data (e.g., create a message on a word processor) that have security levels equal to or less than the system-high level, but all data must be protected at the system-high level until they are reliably reviewed for their actual classification and removed from the system In many MLS systems, users make decisions at login time as to the security level at which they want to operate, knowing that files created during the session will be labeled according to their session security level. In MLS systems with multi-level windowing capabilities, the user must also make conscious decisions as to the security level of data at the time of the data's creation, rather than afterwards. This type of decision needs to be made often, for example, when composing an electronic mail message, creating a document, entering data into a database, and creating graphs and charts.

In the partitioned or compartmented mode, information labels are companions to sensitivity labels. When sensitivity labels indicate the overall classification of a data container, such as a file or a window on the computer screen, information labels represent the actual security level of the data within the container.

Access control decisions (e.g., whether a user is allowed to access a file) are made based on sensitivity labels; information labels are referenced by users to determine the actual classification of the data viewed.

Multilevel Processing

The MLS systems offer users the ability to process and transfer data of more than one security level while maintaining control of the data according to their sensitivity. Users could, for example, edit a Secret document, then edit an Unclassified document as part of a continuous session. In other cases, users may access multilevel data bases and have access to the information contained in them according to their security level. For example, an uncleared user may have access to only the Unclassified portions of a data base, while a Secret-cleared user may have access to Secret portions in addition to the Unclassified portions. Users would be able to share more synchronous and consistent information when multilevel data bases allow currently segregated collections of data to be securely combined. In general, multilevel processing capabilities will allow access to multiple levels of data from a single work position and use of a common set of data processing tools (e.g., word processors, decision support tools, data base management systems).

The Vulnerabilities of MLS

The components in the MLS system contain the data in their memories and disks, and the data could be compromised if adequate physical security is not maintained. An attacker who gets access to the system might be able to locate the data or its copies.

According to DoD the future criteria for MLS development is as follows:

MLS Hosts: "An MLS host is the primary multiuser component of an MLS system. MLS hosts are the basic building blocks of MLS systems, and as such perform a variety of data processing and data transfer services, from functioning as file servers, mail servers, and print servers to serving as the platforms for system applications such as command and control systems, data base management systems, and decision support systems. MIS hosts are compositions of trusted operating systems running on any variety of hardware platforms, such as microcomputers, minicomputers, and mainframe computers. Several products have been evaluated by the NSA that can serve as MLS hosts and are currently available.

The operational value of MIS hosts derives from some high-assurance products available to serve MLS systems. High-assurance MLS hosts could be used to allow wide ranges of class(fed data and cleared users to access a system (e.g., up to Top Secret data with some users uncleared). Some products that could serve as MIS hosts, however, are not necessarily high assurance (e.g., some are B1 and B2 class products).

MLS Guards

MLS guards control the flow of information across security boundaries. They are often the initial step toward MIS because they can be relatively simple to achieve and can provide some of the interconnectivity required to bridge across the security boundaries of existing systems operating at different security levels. Several types of guards exist They might or might not involve human review of the data flow and might support data flow in one or both directions. Guards generally do not allow full-capability usage of a system on one side of the guard by users from the other side, but rather support only limited types of data transfers. As previously illustrated, MIS guards partially break through the well of security constraints that restrict the flow of data among systems operating at different security levels.

MIS guards can be implemented as one-way filters (e.g., allowing low-to-high or high-to-low data flow only) or as bidirectional filters for data traffic between systems. Low-to-high guards are available today and can be deployed with relatively low development risk Low-to-high guards allow data flow from a lower classified system to a higher classed system without data flow in the other direction. This capability is useful when users of high systems need data from lower systems in electronic form in a timely manner. One-way, low-to-high guards may need to prevent the transfer of malicious code (e.g., viruses), of forged identifiers, and of intentional network flooding attempts that could result in denial of service conditions on the high side. Some of these guards have been successfully operational in various DoD organizations for several years. However, the most effective use of a guard is bidirectional, because a two-way flow of data allows more robust communication protocols and provides more reliable data transfer. For example, a one-way guard provides no receipt or acknowledgment for data transfers because such a receipt would violate the security policy rule governing the one-way flow of data.

The rules for high-to-low data flow are often more complex than those for low-to-high data flow, because the guards are required to enforce complicated and sometimes dynamic security policy (e.g., classification rules). Guards can be implemented to check whether the data bound for the low system is classified at the low system's security level. This check could be executed in several ways, such as by ensuring that the data are of a spec* content or format, ensuring that the data do not contain any defined classed code words or phrases (e.g., "dirty words"), or even ensuring that the data have a spec* sensitivity label. If the checks pass, the guard downgrades the data and passes them to the low system.

Guards can also be implemented to actually change the data (e.g., sanitization or downgrading). The guard could accept data from the high system and apply specific processes to the data to reduce their security levels to that of the low system before it downgrades the information and passes it to the low system. A human may be called into the process at any point necessary to review specific data and make decisions when the computer is unable. For example, freeform text found in electronic mail is beyond the ability of computers to check for classification. Humans may be needed to review such data for classification before they are released to the low system.

The ideal guard would be capable of correctly reviewing or sanitizing any form and content of data without human intervention. We are, however, a long way from that ideal guard The technology that shapes the artificial intelligence necessary to review any given format, declare it safe, and assure the user that it was executed properly, is not currently available.

The DoD MLS Program is developing and deploying guards to partially meet common requirements for AILS in the near term. The Standard WWMCCS Guard provides a means for DoD organizations to extract Secret and less classified data from the Top Secret Worldwide Military Command and Control System (WWMCCS), which operates in the system-high mode, and to make that data available to users on Secret command and control systems. The guard reviews all data transfers according to the established classification rules to verify that the data passed are not classified Top Secret It handles a wide range of high-to-low and low-to-high data transfers, including Time Phased Force and Deployment Data, Status of Readiness and Training System data, electronic mail, and teleconference messages. The guard has been certified and accredited by the Joint Staffford use with WWMCCS.

The DoD MIS Program is also developing and deploying another standard guard to meet common operational requirements in the near term—the Standard Mall Guard. The guard allows users of existing Secret and Unclassified communities to securely exchange unclassified electronic mail. The guard relies on users to review messages before they send them to verify that only Unclassified data are exchanged between the Secret community and the Unclassified community.

MLS Workstations

A workstation is a user terminal with its own processing and storage capabilities. It can be linked to a local area network that can provide a number of services (e.g. electronic mail, word processing, computation, and remote file access). AILS workstations are workstations that can separate and protect data of different security levels. Compartmented mode workstations (CM19 are the predominate type of MLS workstation and specifically meet the requirements set forth by the Defense Intelligence Agency to support multilevel and compartmented mode operations of intelligence analysts. CMWs provide a multilevel, multi-windowing capability that permits users to have windows of different security levels open simultaneously on their computer screens. This trusted multi-windowing capability is a critical element in making MLS workstations operationally effective.

The initial goal of an MLS workstation is to allow a user to access systems operating at different security levels simultaneously from a single position. The concept involves the MIS workstation with two network connections, one for the high side, another for the low side. An MIS workstation provides improved capability over a guard because it supports full capability usage of both high and low existing systems from one workstation. An MIS workstation should not affect the existing systems themselves but should provide a user enhanced access to the systems. Several current development earls with MIS workstation technology meet these operational requirements.

In MLS workstations, the trusted multi-windowing capability can be used to support interaction with multiple systems or application software. The trusted workstations allow users to access systems and application software at different classation levels simultaneously and transfer data between security levels (lithe user has the appropriate authority). For example, information can be transferred from the Secret system to the Top Secret system. Information from the Top Secret system can be sanitized or downgraded. If necessary, and sent to the Secret system rifler review. The users can also alternate working with both systems through the multiple windows.

The DoD MIS Program is developing and deploying MIS workstations not only to bridge different security levels in a command and control infrastructure, but also to enhance the data communications between intelligence organizations and the commands that they support. Using MIS workstations and other network security techniques, the program developed the OPS/INTEL Interface to facilitate more interaction between intelligence analysts and the command staff The OPS/INTEL Interface provides capabilities to intelligence analysts to pull data from various intelligence resources, review and, f needed, sanitize the data, and electronically pass the data to collateral systems for further access and processing. The OPS/INTEL Interface also provides a means for requests for intelligence to be sent by command staff and electronically received by the intelligence analysts.

MLS Networks

A multilevel network is the logical next step to follow the installation of multilevel workstations. An MLS network can provide secure data communication services among components in information systems. MIS networks can interconnect single-level and multilevel components on a shared network infrastructure by providing sensitivity labels and network security services for the data transferred between systems. MIS networks do not need to have any MIS hosts or workstations on them to make them effective solutions; the MLS networks may simply allow single-level hosts and workstations of Afferent security levels to share a common infrastructure.

MLS network components are used for both local area networks and wide area networks, which are composed of numerous elements, such as cabling terminal servers, bridges.

routers, and gateways. In an MIS network several of these elements are trusted to enforce the security policy for the network

MLS Data Base Management Systems

MLS DBMSs provide the management, storage, and retrieval of multiple levels of related data, allowing users of different security levels to have access to a shared set of data according to their individual authorizations. For example, a DBMS server is accessible to both the Secret and Top Secret users. Top Secret cleared users have access to read the entire data base. Secret cleared users are restricted to reading and writing within the confines of the Secret portion of the data base. Security mechanisms are in place to enforce this policy, including sensitivity labels for various data base constructs like tables, views, and records. MIS DBMSs manage and control user queries according to the security levels of the data and the user clearances. They can eliminate duplication of information on separate systems, resulting in more timely, consistent, and accurate data. MLS DBMSs will serve as the foundation for many applications in MLS systems.

MLS Systems

The ultimate goal of MIS is not simply to interconnect existing single-level systems operating at different security levels, or even to allow users to perform office automation functions at multiple security levels (albeit maintaining separation of data of different levels). Rather, the goal is to foster a truly multilevel environment, whereby a user can process data of multiple levels in a more integral manner. Consider, for example, a multilevel document preparation system that allows a user to label individual paragraphs and section headings with their classifications. This system would accurately label pages according to the maximum classification of the paragraphs on the pages, and allow cutting and pasting among documents while still maintaining sensitivity labels and enforcing security rules so that more classified paragraphs are not included in less classified reports.

Another example involves a multilevel data base to direct and monitor military transportation, including points and times of embarkment and destination, transit route, crew information, and cargo information. This data base could be used to direct and track missions that are both unclassified and classified. However, because some information about the classified missions needs to be visible at the unclassified level, the MLS DBMS supporting this application would allow classified users to enter and retrieve both classified and unclassified data about the missions. By providing cover stories so that some information is available at the unclassified level, uncleared persons could coordinate for the arrival of aircraft requiring specific off-loading equipment. The unclassified users of this system could have, then, limited visibility into the various missions.

The goal MIS system combines the MLS hosts, workstations, DBMS:, networks, and other components with multilevel applications to comprise an integrated multilevel environment rather than only a lashing together of multiple single-level elements. These MIS systems could be applied to command and control. office automation, data fusion, decision support, and other uses throughout the DoD."

Multilevel Security Through Sanitization with Reconstruction of Sanitized Content The DoD Multiple level security was based upon the Bell-Lapadula Model. Many believe their security model is superior to other models because the authors prove a "Basic security theorem". There is criticism on the model for various reasons. (see "A comment on the "basic Security Theorem" of Bell and LaPadula" by John Mclean).

The inventors main concern with the Bell-Lapadula Model, and the existing MLS is the use of labels to classify users and subject matter. A professional attacker will use all his efforts to change or damage the labels in-order to compromise the machines secured information. DigitalDoors introduces an architecture whereby content is being recognized not by labels by automatically based on the semantic contents of the plain text.

Sanitization and Reconstitution

The invention sanitizes and enables reconstitution upon valid authentication. It is the only architecture and system which enables both sanitization and reconstitution according to user's verified access identification.

Maximum Access to Information

The conventional way of classifying documents with high classification, limits the low level clearance users from access substantial un-classified information which is in the classified document. Furthermore the invention enables maximum sharing of unclassified information which lies dormant in classified documents.

Security

Top security-secret information dispersed to distributed storage in many locations. The invention is designed to avoid any one point of failure.

The theory behind the architecture is the creation of substantial lines of defense in depth. The attacker will need to break through many obstacles before accessing all the dispersed data of the document

Additional Levels of Security with Multi Type Encryption

The system and process introduces the capability to encrypt different parts of a document with different types of encryption. Multi type encryption creates a major barrier to an attacker. Should he wish to break the encryption he would need few super computers. Should the attacker look for implementation mistakes, even if he fords few he will still not get access to the total plain text.

Flexibility

The system and process delivers flexibility to accommodate changing circumstances. By controlling the level of the granularity, the user can boost the level of security according to changing circumstances. For example, if a competitor becomes a partner the user enables him access to more storage locations, by changing the matrix)

Leveraging the Internet

The system and process integrates the Internet for dispersal and hiding of contents. If a party needs more information it could be released granularly. There is no need to release the whole secret document.

The Technology Difference

The system and process does not use labeling but rather extracts the critical to storage. The system avoids situations, in which, attackers may manipulate the labels or the labeling system.

Furthermore release of information is based on changing circumstances.(time, location-GPS, event)

The invention is a machine and process and its purposes and advantages may be as follows:

- To automatically control selection of data objects within a data stream and release them in a controlled method only to authorized parties.
- To automatically separate data objects within a data stream into two or more digital data streams according to the importance and categorization of contents, through extraction and removal of the prioritized content and its replacement by appropriate placeholders.
- To automatically control selected contents in E-mail, and enable its release in a controlled method only to authorized parties.
- To enable users to leverage the growth in computer and telecommunications connectivity and electronic commerce by reducing security risks.
- To enable users to release documents, digital files, and data streams into closed and opened digital networks with the confidence that important, identifying, and critical contents in that documents, digital files, and data streams is secure and will be seen only by authorized parties.
- To enable real time simultaneous customization and personalization of selected contents within a data stream to different parties, allowing instant display of the selected content or part of it based on, and tailored made to the status oldie user or receiving party.
- To secure the important and critical contents of a document or digital file by transporting said contents into a separated data stream and removing said data stream to a removed storage memory, while eradicating any copies, temporary caches, or traces of the removed extracts on the original computer or machine.
- To enable instant return transfer to the display or to another display all or part of extracted content instantly with verification of authorized user.
- To create a projection of the original document, digital file, data objects within a data stream, or variations of it through combined projection of the splinted data streams, while maintaining separation between the data streams.
- To create an alternative method for security, instead of encryption, which is secure, cost effective, less time-consuming, and flexible.
- To enable automatic timed removal of specific content items, automatically or manually selected from a document, digital file, or data objects within a data stream.
- To enable an automatic timed reconstruction (reconstitution) of the said document, digital file, or data objects within a data stream.

The system and method creates a high level of security by automatic selection and removal of critical and prioritized contents from a data objects stream, whether it be a digital document, digital file, database, sound bite, video clip, other structured, or streaming data formats. The system and method enables a controlled release of the extracted data objects, enabling instant display of the instantaneous returned contents, contingent on verification of user identity, access rights, time of operation, location of source and or user, destination of source and or user, and determine threat modes. The system and method delivers high security by removal of the selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract can also be substituted on-the-fly to provide updated results, misinformation, dis-information, messages, alerts, links (to reports, data mining, search engines, web sites, and hyperlinks understood in the current art), advertisements, and personalization and customization. The said validation can be done instantly by password, challenge questions and answers, remote verification (phone, video, or personal contact with user), or by biometrics means.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including: security risk criteria of threats and attacks, sources, targets, users, policies, time of day, and threat modes.

The extracted data is transported to an online removable storage and under extreme security threats to an offline/off-network, digital or physical vaulted storage. Transport and shuttle is based on the level of security alert. The use and release of the vaulted extractions is controlled by a set of rules or organizational policy which includes the following options among others:

1. A vaulting of some, all, or specific data object extracts for long or short periods of time.
2. Release of extractions into a display, in which the extracted data objects will reconstitute with the modified original data stream, the original data objects stream or original document.
3. Release of extractions into a projection display in order to project with the modified data stream, the original document while maintaining complete separation of the modified source data stream (the some modified by the extraction of data objects and insertion of placeholders) and the extracted data object streams.

4. Release of extractions into a projection display in order to project a reconstitution of the original document, in other words to create altered versions of the original document, while maintaining complete separation of the modified data stream and the extracted streams.
5. In situations of high security threats, release of extractions into another projection display, PDA, floppy disk, paper document a wireless display, an overlay transparency while maintaining logical and physical separation of delivery streams. This will enable working with a representation of the initial source, but not the initial source itself, while understanding the prevalent, critical extracted information without comprising security to the initial source material by exposing sensitive, identifying, or critical information.
6. The distribution of sources, modified sources, or extracts to remote and distributed viewing devices.
7. Enable the ongoing operation of information delivery and display in defiance of known ongoing or unknown security flaws, breaches, or events compromising the general state of security.
8. The delivery of distinct and separate data streams, delivered on the same or different channels and media, each with minimal, limited, or even substantial usefulness in and by itself, that can be overlaid logically or physically to reconstitute the identifying data stream and display. Separate display devices can be used to create a composite image or they can be overlaid to physically separate display devices to reconstitute a useful composite display.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted storage. Competitors or hackers, who learn that a computer or network is protected by the system and method, might decide to attack another target instead. This is comparable to a situation in which a bank robber, who finds out that the bank vault is empty, will most probably look for another bank.

The system and method has a menu of different options including the ability to extract:

All existing databases on the computer or network.

All newly loaded, mounted, or integrated data to the computer or network.

All plug-in memory devices (temporary or permanent) containing data.

All new and imported data to the computer or network.

All new work and output created by the computer or network.

All data being transported in/out of the computer or network including electronic mail.

All data being transmitted in/out of the computer or network including electronic mail.

The system and method releases the extracted data streams, subject to a controlled-release mechanism and process. The release mechanism is contingent on parameters including; rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or binder intruders. The system and method is very adaptable and flexible to provide additional layers of security, privacy, anonymity, redundancy, and backup through the selection, extraction, storage, transportation, and reconstruction processes. The dynamic architecture of the invention ambles it to conduct an automatic real time configuration of its extraction/transport/recovery activities, in response to the challenge of attacks.

The invention's survivability modes enable:

Presetting of rules for computer or network functioning under attack or alert.

An automatic assessment of damage and automatic reaction to enable functionality of critical missions.

Another object of this invention is as a system and method for automatically creating customized and personalized versions of a document, data object, or data stream. In real time, simultaneous versions of the original are created and altered, then disseminated based on the status of the different users and their access privileges. The system and method enables content management and control by automatically locating content items prioritized by importance, transporting them to a secure memory, and releasing them under explicit controls or preset rules.

Another object of the invention is as a system and method for control, analysis and management of important and prioritized information within documents, files, data object, and data streams. The system and method, enables the processing of all data objects at the time in which they are created or imported into the system. The said early stage processing, enables early stage inventorying of prioritized contents as well as early stage pattern recognition. Extracting critical information, such as credit card numbers, last names, first names, social security numbers, phones numbers, transaction dollar amounts and addresses, enables the system and method to aggregate data in categories and analyze the data in different optional methodologies including pattern recognition.

Another object of the invention is as a system and method for comprehensive monitoring of various activities including business activities in real time. With this level of detail, the system and method becomes a management information tool and information/data command and control center. The said system and method can include an alert system, which in effect creates a real time apparatus for command and control of the systems activities. In real time, and at any point in time, the user can get a comprehensive view of different activities including:

How many transactions are being processed, their content, their context, identity of the involved parties identity, their profiles, and the personnel involved.

How much money is being transacted.

When, in terms of dates, relevant to the transaction.

Where, in terms of geographical location, the transactions are taking place.

Where, in terms of geographical location, monies or goods are being transferred.

Which departments in the organization are involved.

Description

The invention is a multilevel security system that among other things enables parties to control release the electronic data and the electronic granular critical data into the documents they are sharing with other parties.

In general the invention may cover the following elements. Reference to the above in item s below is made simply as a relation back action.

1. A computer software product for securing data having one or more security sensitive words, characters or icons in a computer system with memories designated as a remainder store and an extract store, the computer product having instructions for a computer system for:

extracting said security sensitive words, characters or icons from said data to obtain extracted data and remainder data therefrom;

storing said extracted data and said remainder data in said extract store and said remainder store, respectively; and, permitting reconstruction of said data via said extracted data and remainder data only in the presence of a predetermined security clearance.

2. A computer software product for securing data as above in item above in item 1 operative on an email program or a browser program and including instructions for facilitating said storage of extracted data rather than storing said extracted data, forwarding said remainder data to an email addressee or a targeted destination and permitting retrieval of said extracted data only in the presence of said predetermined security clearance prior to reconstruction.

3. A computer software product for securing data as above in item ed in above in item 2 wherein said product operates in conjunction with the email program and includes instructions for encryption and decryption of one or all of the email, extracted data and remainder data.

4. A computer software product for securing data as above in item above in item 3 including encrypting said extracted data and either appending or including said encrypted extracted data with said remainder data to form a composite email; and emailing said composite email to an addressee.

5. A computer software product for securing data as above in item above in item s 1 for transparently establishing and managing the separation of user-based communities of interest based upon cryptographically separated security levels, said user-based communities of interest representing a plurality of users having a corresponding a plurality of security levels each with a respective security clearance, the computer product having instructions for the computer system for:

obtaining subsets of extracted data and remainder data;

storing said subsets of extracted data and said remainder data; and, permitting reconstruction of some or all of said data via one or more of said subsets of extracted data and remainder data only in the presence of a predetermined security clearance of said plurality of security levels.

6. A computer software product for securing data as above in item above in item 5 including encrypting said subsets of extracted data with said plurality of encryption types to obtain multiple level encryption in one document or data object; and, decrypting all or portions of said one document or data object with multiple level encryption only in the presence of a predetermined security clearance of said plurality of security levels.

7. A computer software product for securing data as above in item above in item 1, the data being secured against a plurality of computer events and used in connection with an electronic attack monitor generating a corresponding plurality of attack warnings, a plurality of users having a corresponding a plurality of security levels each with a respective security clearance, the computer product having instructions for the computer system for extracting data dependent upon respective ones of said plurality of attack warnings to obtain the extracted data and remainder data, the degree of extraction dependent upon respective ones of said plurality of attack warnings;

storing said extracted data and said remainder data based upon respective ones of said plurality of attack warnings; and, permitting reconstruction of some or all of said data via said extracted data and remainder data only in the presence of a predetermined security clearance of said plurality of security levels.

8. A computer software product for securing data as above in item above in item 7 wherein said plurality of computer events includes hacking attacks, power loss, environmental conditions adverse to said computer network, said electronic attack monitor including sensory systems responsive to said plurality of computer events to generate said plurality of attack warnings, and the filtering and storing responsive to said plurality of computer events which include said hacking attacks, power loss, environmental conditions adverse to said computer network.

9. A computer software product for securing data as above in item above in item 1-8 wherein said computer system is one of (i) a data input device interconnected and operable with another computer system having a processor and a memory having distributed memory segments; (ii) a single personal computer, (iii) a network of computer linked together; (iv) a plurality of computers operative over the global computer network or Internet.

10. A computer software product for securing data as above in item above in item 1-9 wherein said data is an electronic document, image, email, data from a browser program, audio or video file or a combination thereof.

11. A computer software product for securing data as above in item above in item 1-10 wherein said memories are floppy discs, flash memories, hard drive memories, ROMs, RAMs, CD ROM memories, integrated circuit memories, client computer memories, saver memories, computer memories coupled to client computers, computer memories coupled to server computers, or distributed memory systems in an interconnected communications network.

12. A computer software product for securing data as above in item above in item 1-11 wherein said software product is deployed over a client-server computer system and said server stores one or both of said extracted and remainder data and permits reconstruction only in the presence of a predetermined security clearance as a download to the client computer. 13. A computer software product for securing data as above in item above in item s 1-12 wherein the extracting operates on credit card data, financial data or account data.
14. A computer software product for securing data as above in item above in item 1-13 implemented on an information processing system.
15. A computer software product for securing data as above in item above in item 1-14 wherein the extraction utilizes a parsing algorithm without designation of said security sensitive words, characters or icons and said parsing algorithm based upon one or more of a bit count, a word, a word count, a page count, a line count, a paragraph count, an identifiable document characteristic, an identifiable word characteristic, an identifiable letter or number characteristic, an identifiable icon characteristic, an identifiable data object characteristic, capital letters, italics, and underline.
16. A computer software product for securing data as above in item above in item 1-15 including establishing a plurality of security levels each with a respective security clearance for subsets of said security sensitive words, characters or icons and including permitting either full or partial reconstruction in the presence of respective ones of said plurality of security clearance levels.
17. A computer software product for securing data as above in item above in item 1-16 including encrypting one or both of said extracted data and remainder data and decrypting during reconstruction as necessary and permitted based upon said security clearance.
18. A computer software product for securing data as above in item above in item 1-17 including instructions for deleting data, input into the software product, from a data input device after storing.
19. A computer software product for securing data as above in item above in item 1-18 including mapping said extract store and remainder store or plurality of extract stores, storing said map in a map store, and permitting access only in the presence of predetermined security clearance.
20. A computer software product for securing data as above in item above in item 1-19 including identifying said sensitive words, characters or icons prior to extraction.
21. A computer software product for securing data as above in item above in item 1-20 including utilizing placeholders in said remainder data representing non-reconstructed, extracted data during full or partial reconstruction, said placeholders being one from the group of characters, icons, substitute words, data objects, underline and blank space.
22. A computer software product for securing data as above in item above in item 1-21 including the use of one of an inference engine, neural network and artificial intelligence process to extract, store or permit reconstruction of said data.
23. A computer software product for securing data as above in item above in item 1-22 including one or multiple types of encryption and decryption of one or all of the extracted data and remainder data relative to the degree of security of said data.
24. A computer software product for securing data as above in item above in item 1-23 wherein the extraction and storing represents granular deconstruction and dispersal of said data.
25. A computer software product for securing data as above in item above in item 1-24 including displaying a vendor's advertisement prior to one or the other or both of said steps of extracting and permitting reconstruction and optionally displaying a link to a vendor's web site with said advertisement
26. A computer software product for securing data as above in item above in item 1-25 including associating a monetary charge for one or more of said extracting, storing or permitting reconstruction.
27. A computer software product for securing data as above in item above in item 1-26 including displaying said security sensitive words, characters or icons in a distinguishing manner prior to extracting.
28. A computer software product for securing data as above in item 1-27 wherein said software product is stored in a computer readable medium, CD ROM, in a network or in a singular or a distributed computer system.
29. A computer software product for securing data as above in item 1-27 wherein said computer system operable with the reconstruction portion of said software product includes a display fed from video memory having a plurality of frame memory segments, the reconstruction including interleaving extracted data and remainder data into respective ones of said plurality of frame memory segments.
30. A computer software product for securing data as above in item 1-27 wherein said computer system operable with the reconstruction portion of said software product includes a data display system with at least two separate but visually overlaid displays, the reconstruction including displaying said extracted data on one of said at least two displays and displaying said remainder data on another of said at least two displays.
31. A method of securing email data having one or more security sensitive words, characters or icons, the method used in conjunction with an addressee email device having a decryption routine, the method comprising:

extracting said security sensitive words, characters or icons from said email data to obtain extracted data and remainder data therefrom;

encrypting said extracted data and either appending or including said encrypted extracted data with said remainder data to form a composite email: and mailing said composite email to an addressee.

Sketches

See Building and Testing for samples.

Ramifications

The invention differs from the current implementations of multilevel security systems based on the Bell-Lapadula Model, using labels to classify users and subject matter. A professional attacker will use all his efforts to change or damage the labels in-order to compromise the machines secured information. DigitalDoors introduces an architecture whereby content is being recognized not by labels by automatically based on the semantic contents of the plain text.

The invention enables overcoming the obstacles of existing multiple-level security systems by enabling sharing of sensitive data, and granular data between parties in a much more flexible way which also enables much greater access to information not enabled by the current MLS systems. The invention includes a controlled release mechanism for release of data in conformance to benchmarks, which can include submitting of access identification, the giving of consideration, submitting of other information, etc.

The invention creates better collaboration between users and organizations based on a better flow of information. It enables better efficiency enabling easier communication between users and networks with different levels of classification while maintaining the highest levels of security. The invention enables a much better management of documents in storage and in transport including e-mail.

The invention introduces automation to the sanitization process and an automatic reconstruction process. The automation will avoid human error both intentionally as well as unintentionally. The automation will enable a substantial reduction in costs, furthermore the ability to create a multi-level security environment in one PC or workstation will save costs of purchasing operating and maintaining multiple machines as is the current practice.

Building and Testing

The screen images in the figure section demonstrate the machine and process in action, automatically, searching different storage locations for critical extracts/key words. The keywords have the identifier of the document they belong to. A user with the appropriate access security level will be able to retrieve based on his security clearance the following:
1. The entire document.
2. A declassified version of the document Attachments 1. DigitalDoors Architecture
2. DigitalDoors Defenses in Depth
3. Samples Extraction and Reconstruction
4. Samples multi type encryption in one document
5. Technical Background: DigitalDoors
6. DigitalDoors: A New Approach To Security And Survivability
7. DigitalDoors Architecture Process & Data Flow
8. The Security of Location Map and Recovery File
9. DigitalDoors Elements Necessary to Secure DigitalDoors Frequently Asked Questions
10. DigitalDoors Engines, CPU, Hardware Processing—

Drawings of the Architecture

Previous Disclosure of Conception

The following patent applications filed by inventors: Provisional patent application: Secured Sharing of information with dispersed data Mining and searching capabilities, Jul. 16, 2002; Data security system and method with parsing an dispersion techniques, May 23, 2002; Data security system and method adjunct to e-mail browser or telecom program, May 23, 2002; Data security system and method for separation of user communities; Data security system and method responsive to electronic attacks; Data security system and method Jul. 27, 2001

Index

1. DigitalDoors Architecture
2. DigitalDoors Defenses in Depth
3. Samples Extraction and Reconstruction
4. Samples multi type encryption in one document
5. Technical Background: DigitalDoors
6. DigitalDoors: A New Approach To Security And Survivability
7. DigitalDoors Architecture Process & Data Flow
8. The Security of Location Map and Recovery File
9. DigitalDoors Elements Necessary to Secure DigitalDoors Frequently Asked Questions
10. DigitalDoors Engines, CPU, Hardware Processing DigitalDoors Architecture DIGITALDOORS automatically sanitizes sensitive documents and messages with the unique capability of automatically reconstructing those messages upon validation of security clearance. The DIGITAL DOORS technology (600 patent above in item s in process) associates multiple receivers and their respective clearances with multiple variations of a document. This supports information exchange between trusted parties, parties that do not trust each other, and even parties unknown to each other. It is the basis for the currently functioning DIGITAL DOORS security system applying the architecture and processes that: select granular critical and important data within a data stream (document, data file, transaction, object, structured storage, record, field, document, etc.); extract that same critical and important data; substitute placeholders for that same critical and important data; disperse that same critical and important data extracts to remote distributed storage locations; release that same critical and important data extracts from storage through a controlled release process of granular access rights of each user through validation and authentication; reconstitute that same critical and important data extracts in whole or in part to reconstruct the original data stream (such as a e-mail message, report, or legal document).

In effect, the DIGITALDOORS technology hides information leveraging the distributed capability of the private and public communication channels, such as the Internet. This avoids single points of failure to establish an in-depth defenses through creation of numerous granularly-controlled obstacles to attackers. This technology secures against insider as well as external attacks. DIGITALDOORS can measure the security before and after the process for detailed metrics on the process, data integrity, and data security. This technology enables secured sharing of information on a need-to-know basis. Shared information can be distributed uniquely or en masse to internal or external organizations, with each user individually receiving information automatically tailored to each user's security clearance. When circumstances change, and for whatever reason, and after the fact of distribution, the sender can still control the release of critical and important information from distributed storage locations. DIGITALDOORS operation is transparent and automatic. User access is through access controls already established by organizational security policy.

DIGITALDOORS is in the process of conforming to DoD and other relevant standards. This includes encryption limited to AES and Rijndael. Furthermore, all communication links will be protected by SSL, optional point-to-point hardware encryption, and other technology. The objective is to house the primary subsystems in an insulated environment protected from unauthorized access. We support and will integrate with public key cryptosystems. Design was primarily implemented in UML, with automatic code generation in MS Visual Basic. We expect the port to C, Java, and other languages to be fairly straightforward. User interface issues are imbedded in flexible calling interface parameters supporting regeneration to any widget-based GUI.

The DIGITALDOORS extraction and dispersion architecture was conceived within the explosion of Internet and web-related services as a commercial off-the-shelf (COTS) utility toolkit and application suite. DIGITALDOORS supports and extends SAN and NAS storage service and leverages the benefits of those storage technologies. It is equally useful working with or extending the functionality of storage virtualization. As such, DIGITALDOORS was conceived as an open, accessible, and robust omni-platform solution to survivability, identity, privacy, confidentiality, and anonymity. In contrast to existing restrictive security technologies that work by excluding access to data, surrounding it with concentric walls, and searching it repetitively for embedded viruses, the DIGITAL DOORS system is envisioned to open data to wider access, enable information sharing, and effectively create a granular owner, organization, and supervisory multi-level access control over that data.

Architecture

For these reasons, DIGITALDOORS was structured as suite of utility tools, system functions, applications, add-ins, and an open integration platform in itself for flexibility. The core architecture is structured around reusable modules and functions which can be reused and rebuilt into various applications. Furthermore, these can and have been integrated into existing applications. In addition, we focus additional development on integration with existing technologies, systems, applications, work flows, and transaction processing. Specifically, we have built and integrated these engines among others into one functioning system: selection; extraction; dispersion; reconstitution; encryption; multiple-type encryption; validation; access control; GPS; PKI; IFF; Biometrics.

Applications are built from reusable components in as much as it is possible. Functions and features are segregated to enable module and code separation, rebundling, and reintegration as new and different functions. Core technology is separated into modules that can be distributed as .exe applications, as operating system dynamic link libraries, in process or out-of-process servers, distributed .OOXapplets and add-ins, or piped automated functions.

Although the primary prototyping language was UML, the prototyping implementation language was Prolog and Unix regular expressions with Visual Basic, the prototyping database was MS Access, all functions were designed with CORBA, RPC, pipes, unattended processing, and host-based environments as a primary distribution channel. Other more powerful artificial intelligence, heuristics, neural networks, and self-learning environments are available, most are mutually exclusive to each other, unavailable on widely-available desktop and server environments, require specialized coprocessors or machines, or require copious amounts of RAM, disk space, or CPU horsepower. Prolog was chosen because it is generic and widely available in Windows, Unix, and mainframe versions. Unix regular expressions—as a library—was chosen for its wide acceptance on platforms other than Unix and derivatives to solve a number of text, sound, image, and pattern matching needs in extraction selection.

Although the current Visual Basic runtime is apparently limited to a MS Windows platform, the choice of this development language and platform was chosen to accelerate graphic user interface design, workflow experimentation and optimization, and simplify demonstration packaging, distribution, testing, and change-order fulfillment. Core designs in UML are easily represented in the various modeling methodologies as part of the Rational Rose product line. Core code is structured for automated or machine-assisted translation into C, C++, assembly, Java, or other development languages. Support for the various MS Windows-specific and dab-bound Visual Basic controls is specifically and purposefully ignored for the most part in order to facilitate the efforts to port code to other platforms, operating systems, and code development languages.

Although ADO, DAO, FSO, Windows-specific API calls, and other data access libraries would have simplified code development, code distribution sizes, lines of code, and made programmers happy who are always looking for the neatest way to implement, emphasis was placed rather on repurposing designs, codes, modules, and configuration and administration utilities. The traditional concern over performance optimization (Carnegie-Mellon software development model stage 4 concerns) is moot as performance limitations are data-bound, database access bound, and constrained by remote network latencies. However, performance was experimentally proven to match or exceed 128-bit encryption times, and reconstitution times exceed decryption times by 4 to 5 magnitudes. In addition, reconstitution is asymmetrical, thereby yielding even greater network-wide efficiencies. And, we have still left the door open for code and performance optimization.

The performance, security, and intellectual property issues of Visual Basic P-code and runtime libraries is well known to this team. We understand the advantages and disadvantages. In fact, one of the team has experience with various VB discompilers and memory variable remapping tools, and in the creation of commercial VB object obfuscation utility. Although it is possible to alter the VB runtime libraries, this. security concern is identical to system hacking. The VB runtime is an extension of the Windows operating kernel in a .DLL format, and links to and calls most of the peripheral and core OS functions. The security problem of VB is an abstraction of system kernel, and is the same issue. The VS.Net edition raises new problems since it enables a uniform P-code infrastructure and linker maps, that openly expose IP trade secrets and allow simple virus construction and overlay diversions. This is frankly a Microsoft security issue that must be resolved at Microsoft and by Microsoft, as the problem is a platform distribution flaw. Note, we do not distribute VS.Net products, and do not intend this until such time as these new distribution flaws are resolved or disproved.

The user interface conforms to MS Windows compatibility standards, and as such, is easily rebuilt for other Unix, Linux, or other widget-oriented graphical user interfaces. Because most the of the core DIGITALDOORS technology embodies the processing of existing data objects, a text-based or even non-existent user interface is possible. In fact, it has been demonstrated in Windows-based messaging and as an MS Outlook add-in. Aspects of the user interface within Outlook that are indeed visible—pull down menus, toolbar buttons, and progress bars—were built to enable users and testers to see something visible, or to conceptualize that a graphical user interface could be created for popular commercial off-the-shelf (COTS) products.

For this same reason, MS Access as a database platform was selected. SQL, ODBC and JDBC, as well as more modem object-oriented relational databases or flat-file ISAM file structures are easily supported and in fact represent a straightforward automated export from MS Access. Support for the various MS Windows data access libraries is ignored for the most part in order to facilitate the efforts to port code to other platforms, operating systems, and code development languages. As with code, we have left the door open for performance optimization in data input and output. MS Access and SQL Server encryption is not applied since it is easily defeated. Instead, we apply any encryption library add-in, if so configured, to protect some or all of the mandatory or optional databases on a field, record, or table basis.

The field-specific encryption basis adds multi-level security and access granularity at the cost of administrative complexity and the traditional processing overhead of encryption and decryption.

For the most part—some limited code has been developed ad hoc and lacks the structure and rigor of traditional system design and analysis techniques—code is modular and structured into functional libraries. What code is not modular will be. It is on the agenda and represents a version 3.0 effort. This modularization is imperative for exploiting other security, data mining, and information processing opportunities. This means that a UML structure can be created from existing definition templates, link to the libraries, and generate the structure, user interface, and much of the detailed code for new utilities, add-ins, or applications, or administration control functions. Library functions include targeting, extraction, reconstitution, GPS services, IFF, biometric, access control, user management and administration, e-mail support, authentication, encryption, multicryption (AES and Rijndael plus eight others at last count are supported), SSL, and other functions and services. Many of these libraries represent an opportunity for component-only sales to corporate or government developers.

Data and Process Location

DIGITALDOORS was designed such that any or all of the data and any or all of the processes can exist anywhere. Local, remote, networked, distributed, dispersed, redundant, scattered, partitioned, piped, and other data storage and processing are supported currently with enhancements envisioned. User data, access databases, extractions, and partial or complete backups can exist on local computers or anywhere else, in whole or in parts. It is eminently suitable for software, hardware, chip, or other mechanical implementations. Hierarchies of databases add to the available security and enhance configuration and administration. The primary logical limitation is human ability and practicality.

OCX and DLL Components

Libraries are selected to create an add-in functionality. A stub for testing or as a sample for component-only sales was created to regression-test the functions, utility, and reliability. The sample code, as a stub, is intended to be sold in source form for development and documentation purposes. Within the current VB environment, compilation into .EXE, ActiveX EXE, Active OCX, in process DLL or out-of process DLL for RPC server-based processing is a simple matter of reconfiguring settings and dealing with some non-compliant code issues. Conversion into Java or C is straightforward because most components lack a user interface in favor of a calling array parameter structure. The user interface integrates on top of that structure, providing code portability.

Client

This represents all previously mentioned tools, utilities, functions, add-ins, and applications. It is an arbitrary designation more pertinent to specific language and platform issues than to DIGITALDOORS.

Client Server

Since location of data or processing is irrelevant for the most part other than exposure of data to transmission security risks, each user becomes a client and the server. Other server functions represent any interconnected server facility.

Server (In and Out of Process)

This represents all previously mentioned tools, utilities, functions, add-ins, and applications. It is an arbitrary designation more pertinent to specific development language and platform issues than to DIGITALDOORS software and process. However, it becomes important in terms of platform-specific resource and performance issues within Unix and Windows. Memory management, caching, and subtle performance issues are platform- and development language-specific. This is a development issue with some security issues, but mostly irrelevant to architecture issues. The security issues involve access to plain text (or other data formats) during the process, caching, temporary files, and artifacts, which could compromise security if mishandled. We are aware of these issues and control these issues on a per platform basis. When additional security is required, network transmissions can be encrypted with AES, PICT, PGP, SSL, other proprietary encryption toolkits, or encrypted with DIGITALDOORS versions of encryption or multicryption add-ins. The primary limitation is human ability and practicality.

Administration Server

This represents all previously mentioned tools, utilities, functions, add-ins, and applications. It is an arbitrary designation more pertinent to specific language and platform issues than to DIGITALDOORS. However, some significant administrative functions are reserved for special users designated as administrators. Access is controlled by all standard DIGITAL DOORS functions, with optional shared key access and GPS location controls.

Encryption and Authentication

Parameters passed to encryption and authentication modules enable each of these functions. These parameters are represented by check boxes in various administrative and user forms and typically stored in a tiered organization, workgroup, and user-level hierarchy of stored configuration settings. Authentication is applied to validate the integrity of information in whole or in part, at whatever granularity is desired. Authentication can be extended. Encryption can be applied to information in whole or in part, to specific fields, words, storage locations, or to entire records or databases. Encryption can be extended.

Encryption can be enabled in a number of ways. Private key methods and the attendant problems of administering keys and delivering the initial key can be overlaid to the DIGITALDOORS modules. In addition, one-time pads can be stored locally or globally and delivered in the clear or encrypted. The primary logical limitation is human ability and practicality.
Network Storage Issues (NAS and SAN)

We are aware of a number of storage encryption and network storage technologies. We endeavor to support each as necessary and/or on an ad hoc basis. However, note that DIGITALDOORS supports an infinitely finer granularity in terms of storage access and encryption. The issues for NFS, CFS, SFS, Kerberos, NASD, Petal, SNAD, and other security remote storage implementation persist within our implementation of those systems, but not necessary when DIGITAL- DOORS applies its native validation and encryption methods. This is a newer concept, and not necessarily fully comprehended.

Standards

DIGITALDOORS primarily applies security through extraction and dispersion. Encryption, biometrics, and access control are secondary. As such, few standards or formal recommendations apply to this technology. We prefer to integrate existing or commercial (COTS) technologies, relying solely on those technologies to conform to formal standards and generally accepted principles in security. In the near future, as implementations of Homeland Security, governmental agencies concepts for information sharing, and new understandings into dispersion and extraction as a fundamental and effective methodology, we do expect to work with standards bodies to develop rules and policies. We expect to codify the formal statistics behind extractions, forced reconstitution, attacks driven by Bayesian inference and external knowledge databases, HIPAA and other privacy regulations, and the random/quasi-random contextual relationships of extracted and dispersed information.

It is also important to note that many existing security standards and the generally accepted way of designing and implementing applications are irrelevant to DIGITAL-DOORS. They represent existing technology, assumptions that do not withstand rigorous intellectual analysis or mathematical theory, and methods which are not implemented, implemented as third party integration, or superceded by new paradigms. We specifically do not ignore existing standards, but research and conform to them where appropriate and as needed.

Note that the DIGITALDOORS technology is grounded into branches of statistical mathematics, queueing theory, random number theory, and NP-Complete or NP-Hard that are indeed well known if not widely known due to the relative contemporary nature of this field. It has only be 25 years since most of these fields were first published, and less than 20 years that a handful of commercial products have been released.

Extraction and Dispersion Standards

We expect to work with standards bodies to develop rules and policies. We expect to continue research and codify the statistics behind extractions, forced reconstitution, attacks driven by Bayesian inference and external knowledge databases, HIPAA and other privacy regulations, and the random/quasi-random contextual relationships of extracted and dispersed information. It is important to note that the technology of extraction and dispersion is based upon a sound and provable mathematical basis, which in turn infers a sound and provable mathematical basis for security and survivability of data, and the functional measurement of security and survivability in formal terms.

Establishing Trust and Information Sharing

The core philosophy in DIGITALDOORS is not to assume reliability at any stage in administration and processing or to trust any individual or organization. Multi-level granular release precludes utility from highly-processed data streams. As previously stated, this supports information exchange between trusted parties, parties that do not trust each other, and even parties unknown to each other. In other words, critical and important information might be casually distributed without meaning or context to any party as e-mail messages, HTML web pages, or documents.

This "apparently" open access precludes utility from the declassified or downgraded information. This is pertinent for information exchange applications and where transactions are bound by HIPAA, GLB, and other privacy-restrictive regulations. As trust is defined and established through access controls already established by organizational security policy and also through various supplemental DIGITALDOORS IFF, biometric, GPS, or virtualized verification to minimize man-in-the-middle attacks, the level of granular release might be increased to allow more details in the reconstituted document or e-mail message.

Some of the core problems with establishing trust, distributing decryption keys, providing network or data storage access is thus resolved with DIGITALDOORS workflows. As previously explained, when supplemental functions or commercial products, such as PKI, are integrated into DIGITAL DOORS these core problems are specific to these supplemental functions or commercial products only and not to DIGITALDOORS.

Hierarchy of Dispersed Backups

Wide availability of ISDN, xDSL, and SONET with an Internet sales model created the opportunities for Xdrive and similar vendors of remote backup. However, this technology represents a pattern of support similar to volume-mapped or sequential tape backups. Failure rates are high and recovery problems are common, often precluding a volume or system recovery but requiring reinstallation and manual selection of taped data sets. The core philosophy behind DIGITAL-DOORS storage and processing is too assume high rates of point failures and look to other places for mapped drive or non-sequential point set data. In effect, if Kansas has been wiped out or isolated, the transcontinental SONET matrix is not functioning, or if multiple storage locations have failed, DIGITALDOORS storage will seek reconstitution through additional sources. The primary logical limitation is human ability and practicality, as each additional whole or partial storage location entails overhead and management costs. DIGITALDOORS supports an infinite number of granular storage locations.

The following Figures illustrate the concepts in the Multi-level Security through Sanitization with Reconstruction of Sanitized Content.

Figure 35:
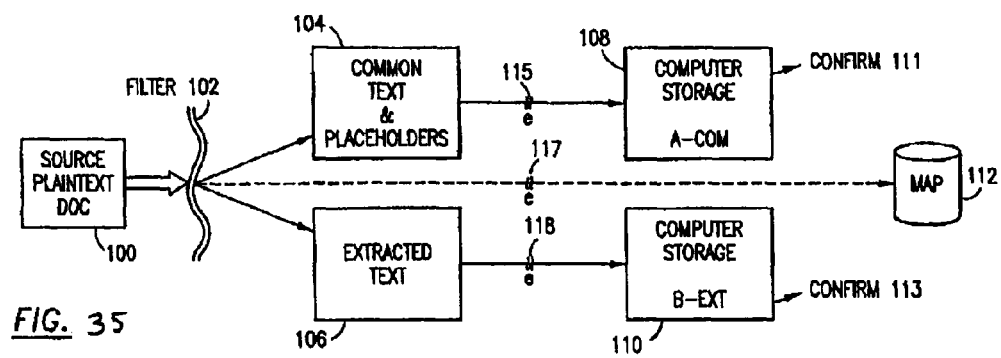
FIG. 35 diagrammatically illustrates a basic system diagram showing filtering and storing extracted data and remainder or common data and, in an enhanced embodiment, generating and storing a map.

FIG. 35 diagrammatically illustrates a basic system diagram showing filtering and storing extracted data and remainder or common data and, in an enhanced embodiment, generating and storing a map.

Figure 36:
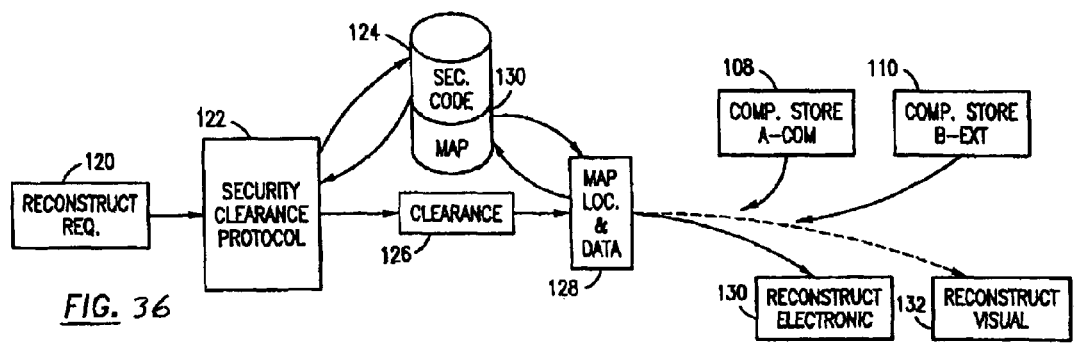
FIG. 36 diagrammatically illustrates a system diagram showing reconstruction of the data, various security clearances and both electronic reconstruction and visual reconstruction.

FIG. 36 diagrammatically illustrates a system diagram showing reconstruction of the data, various security clearances and both electronic reconstruction and visual reconstruction.

Figure 37:
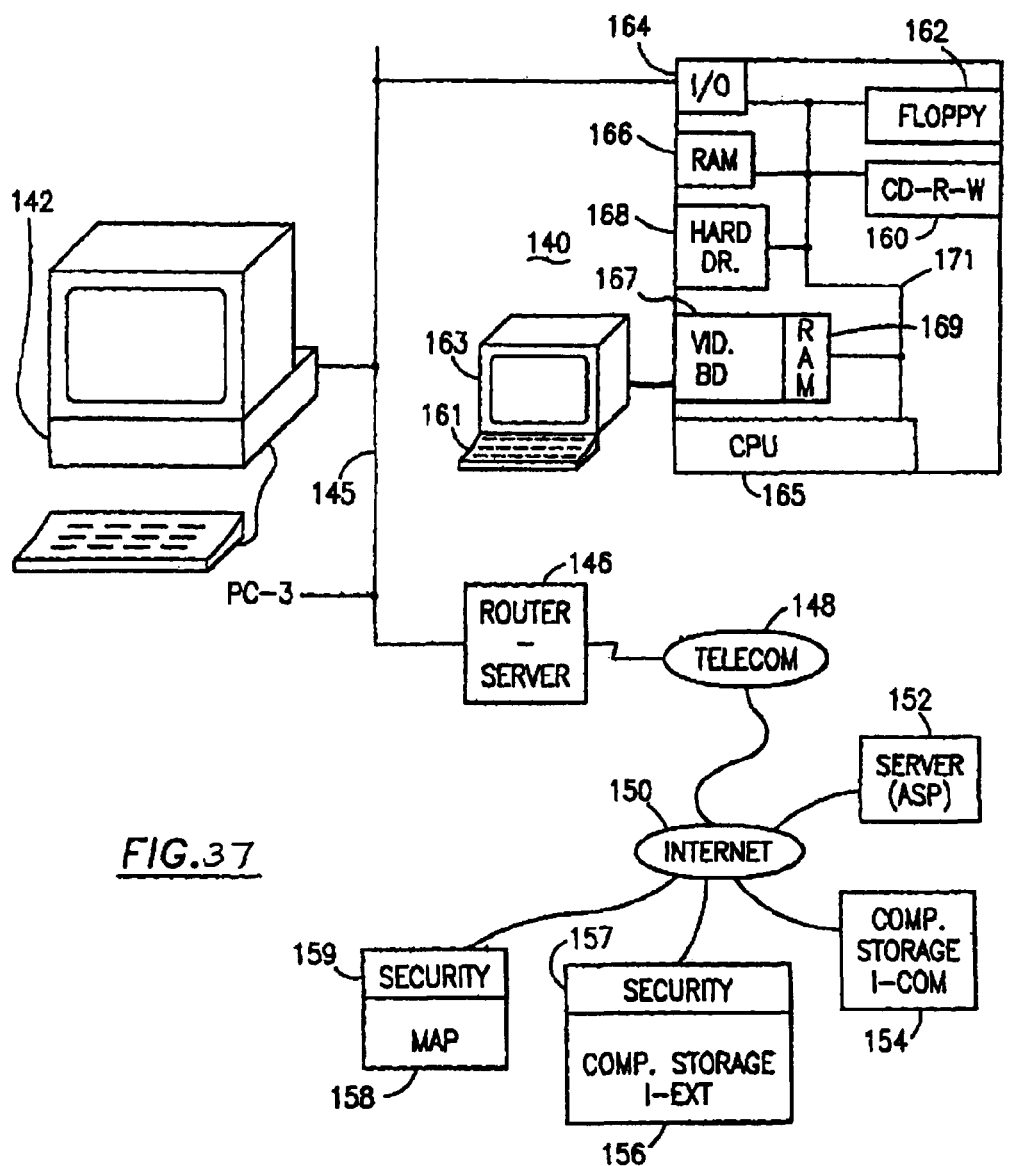
FIG. 37 diagrammatically illustrates a system showing major components of a single personal computer (PC) system, a networked system with several PCs (a LAN or WAN) and the network coupled to a telecommunications system and the Internet and shows the interconnection with a server and multiple, Internet-connected memory units.

FIG. 37 diagrammatically illustrates a system showing major components of a single personal computer (PC) system, a networked system with several PCs (a LAN or WAN) and the network coupled to a telecommunications system and the Internet and shows the interconnection with a server and multiple, Internet-connected memory units.

Figure 38:
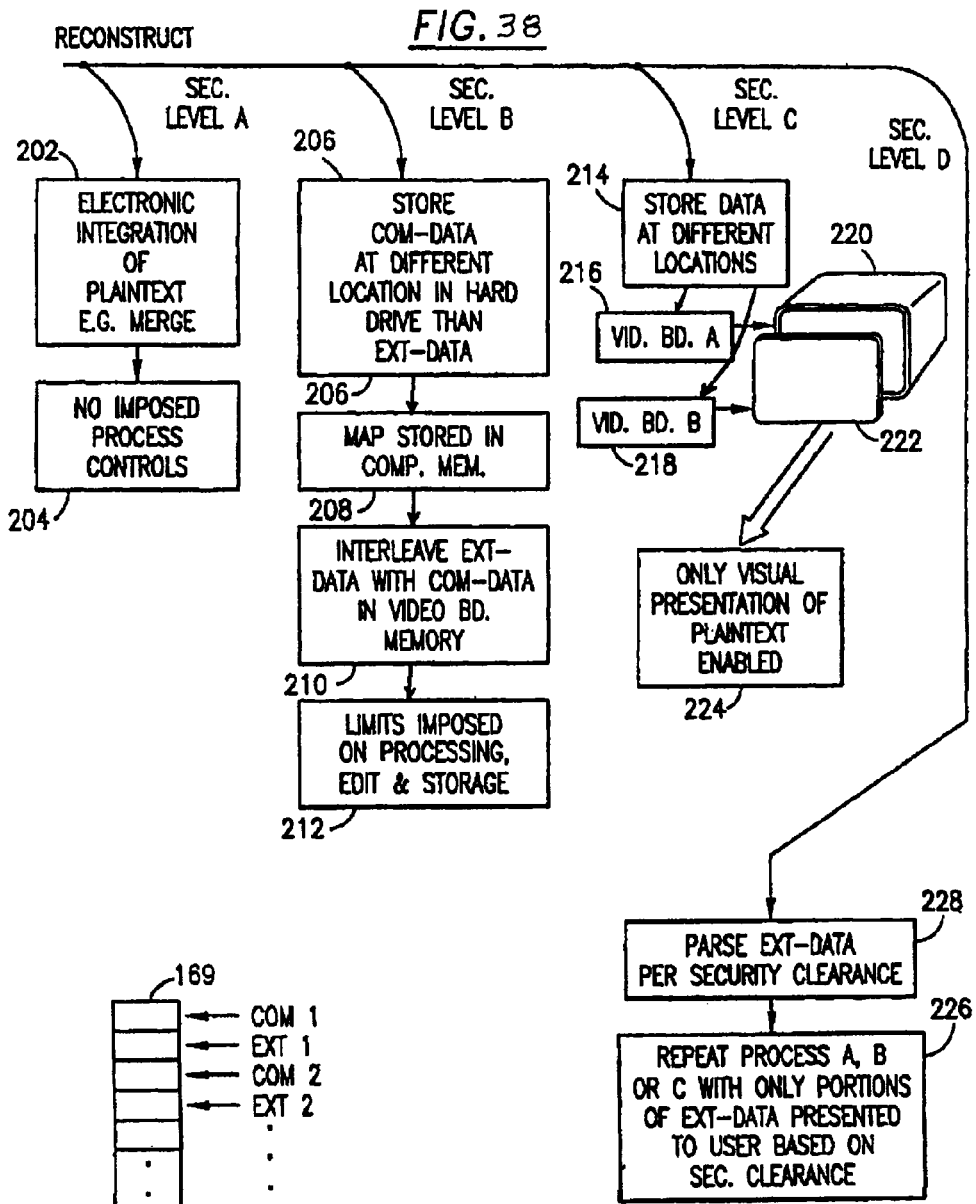
FIG. 38 diagrammatically illustrates a basic flowchart showing reconstruction for various security levels.

FIG. 38 diagrammatically illustrates a basic flowchart showing reconstruction for various security levels.

FIG. 38A diagrammatically illustrates interleaving distinct data into different memory locations in a video memory.

Figure 39:
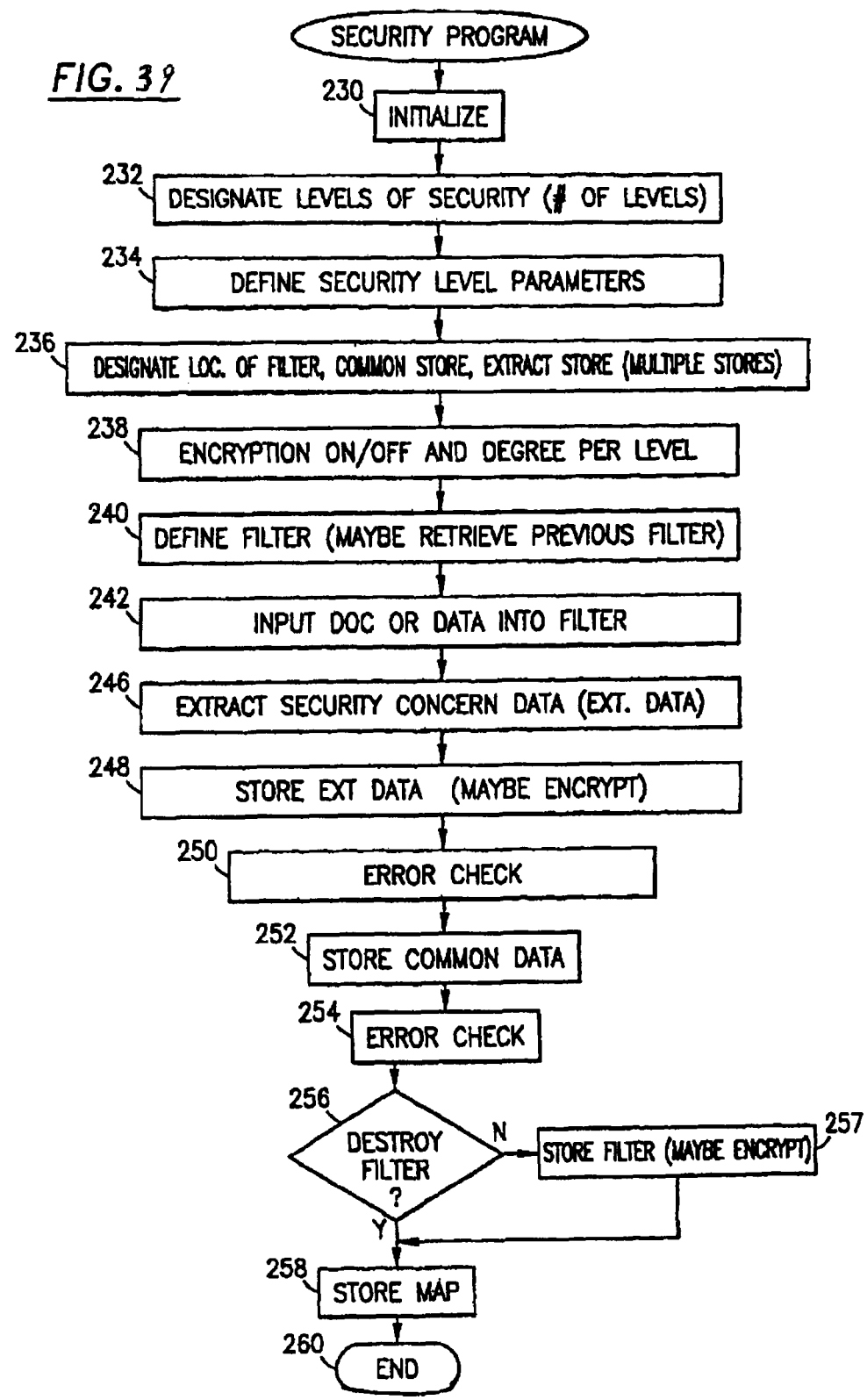
FIG. 39 diagrammatically illustrates a flowchart showing one embodiment of the principal portions of the data security program.

FIG. 39 diagrammatically illustrates a flowchart showing one embodiment of the principal portions of the data security program.

Figure 40:
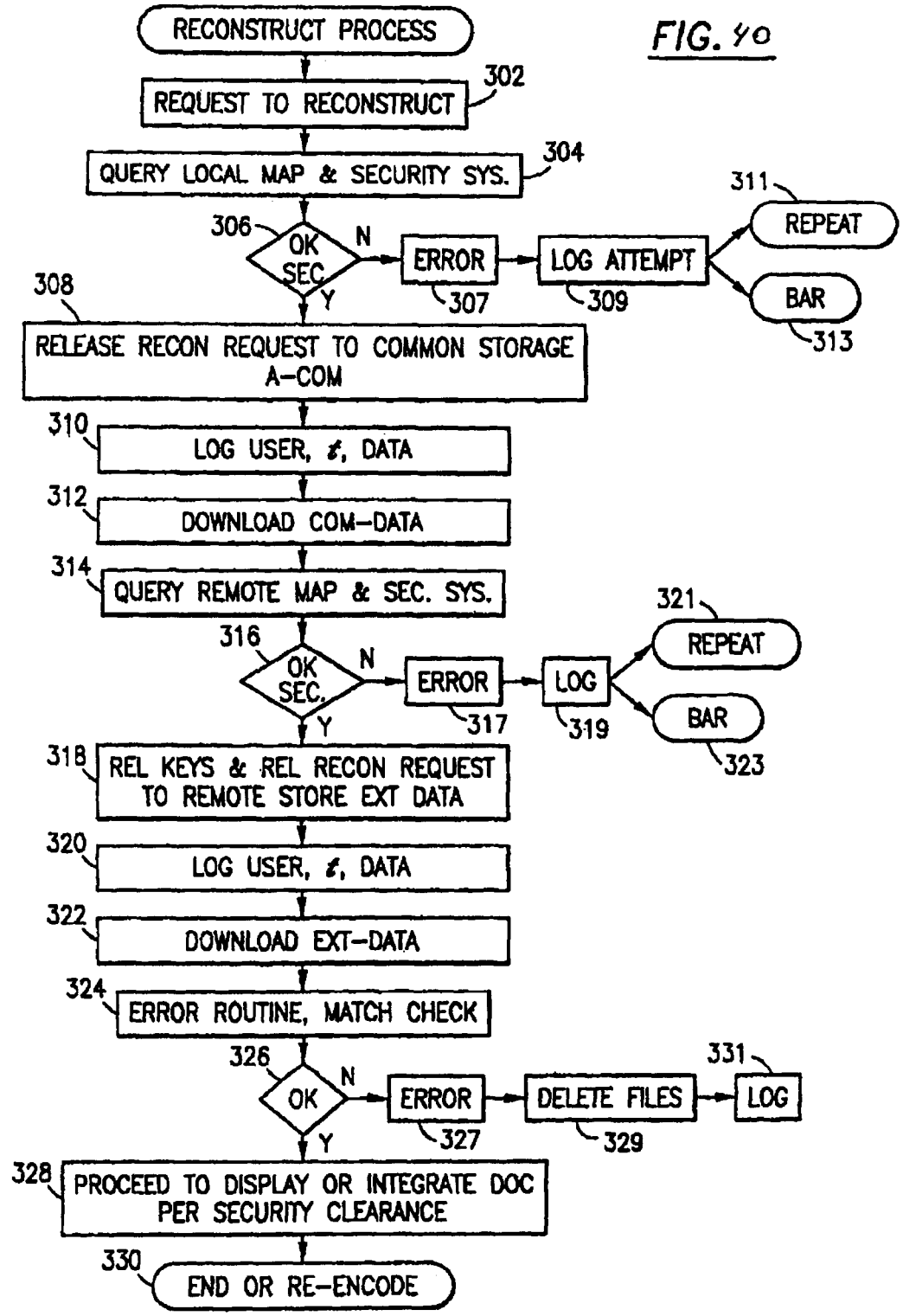
FIG. 40 diagrammatically illustrates a flowchart showing the basic elements of the reconstruction process for the data security program.

FIG. 40 diagrammatically illustrates a flowchart showing the basic elements of the reconstruction process for the data security program.

Figure 41:
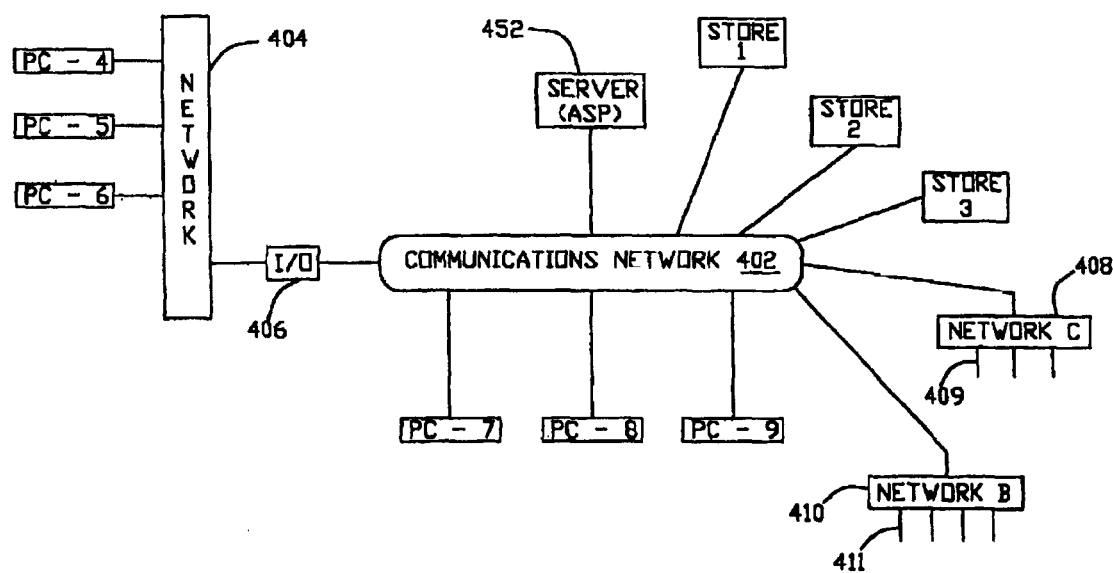
FIG. 41 is a computer network diagram showing various user communities.

FIG. 41 is a computer network diagram showing various user communities.

FIGS. 42A-42B diagrammatically illustrate a flowchart showing the key component steps for the multiple layer security program for the community of users.

Figure 42C:
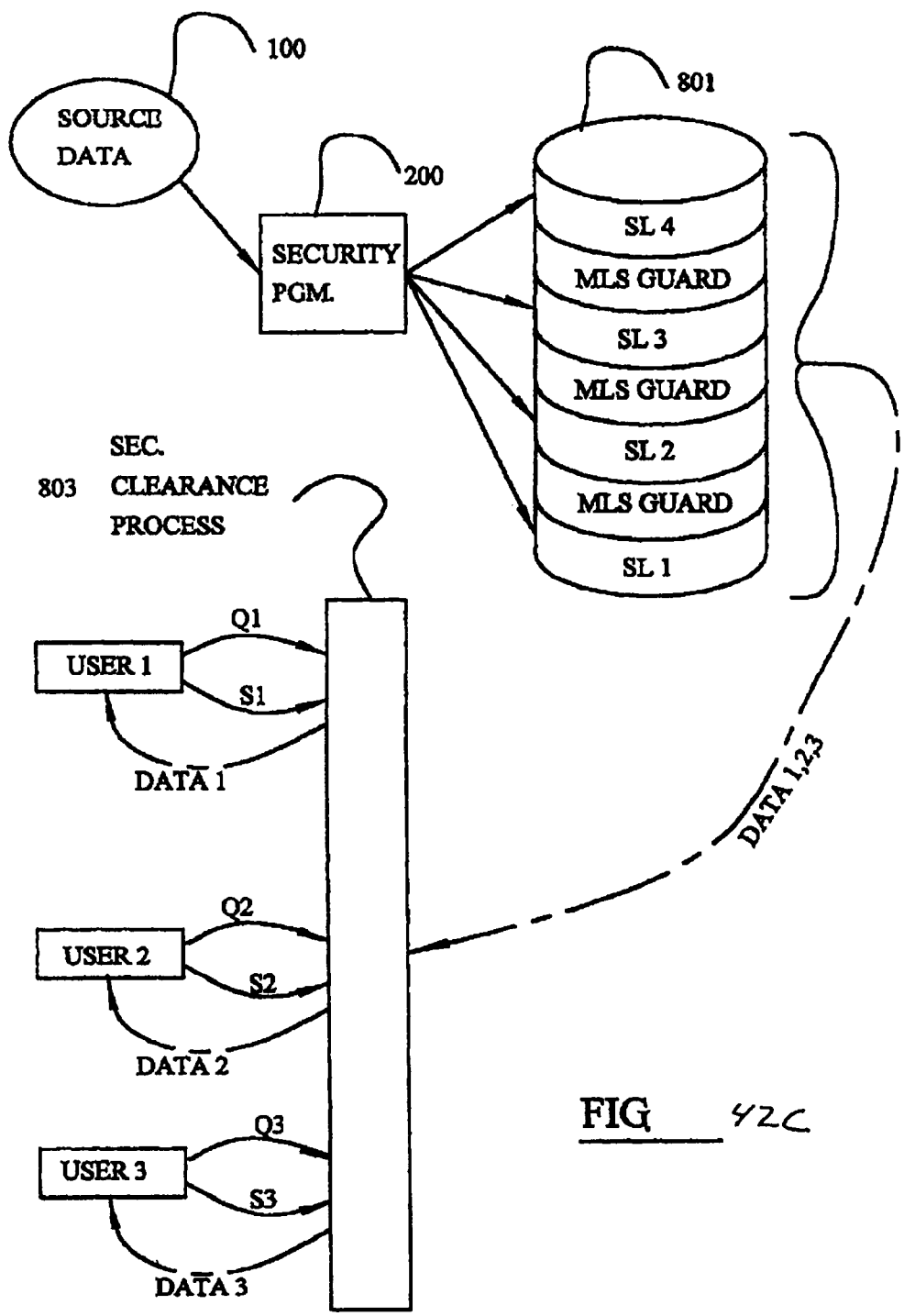
FIG. 42C diagrammatically illustrates a multiple level security system accessed by users having different security clearances (which also represents a data mining system and operation).

FIG. 42C diagrammatically illustrates a multiple level security system accessed by users having different security clearances (which also represents a data mining system and operation).

Figure 43B:
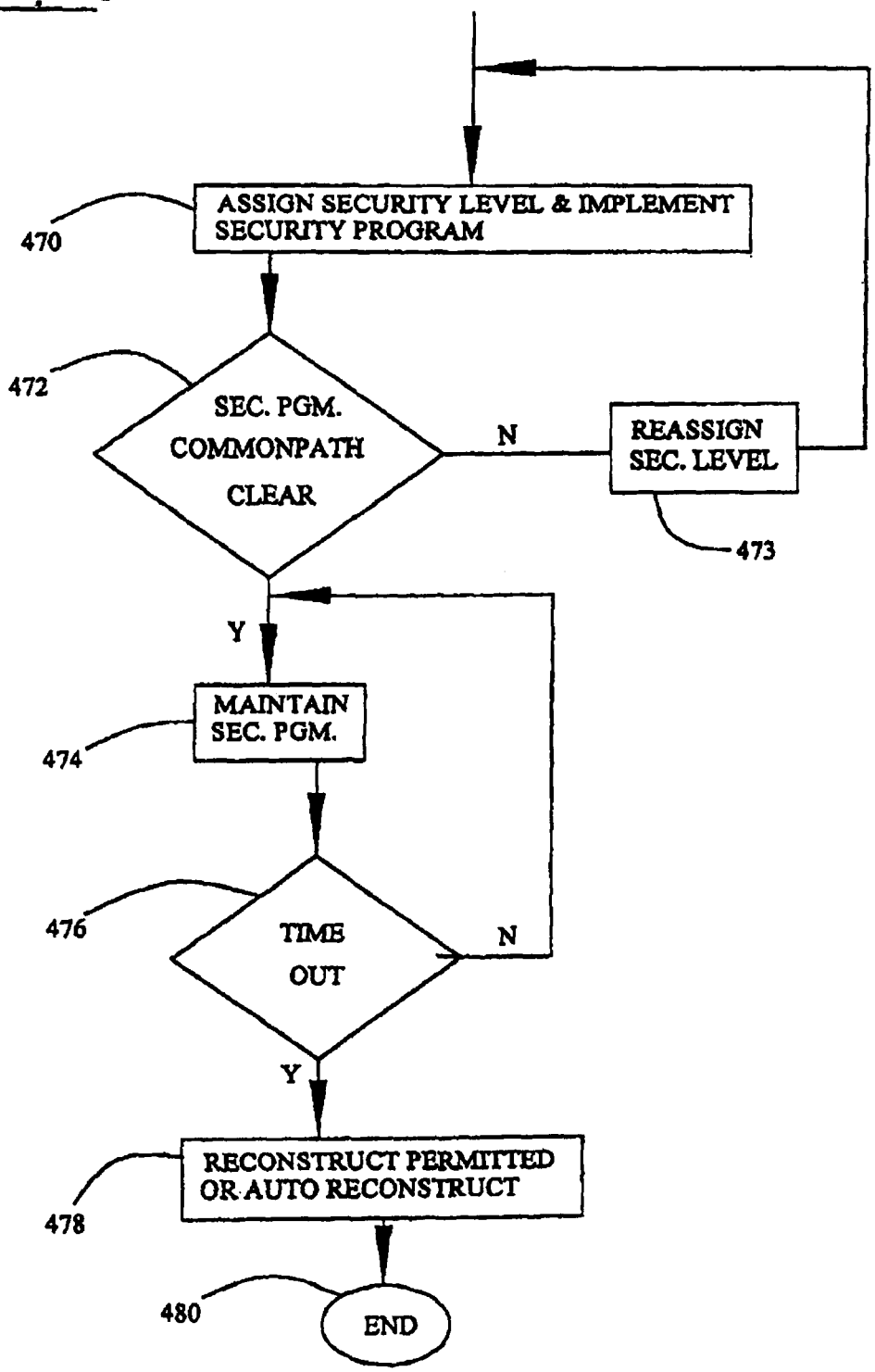

FIGS. 43A-43B diagrammatically illustrate a flowchart showing the key components of an adaptive security program adaptable to various levels of electronic attacks, hacker or hack attacks.

Figure 44:
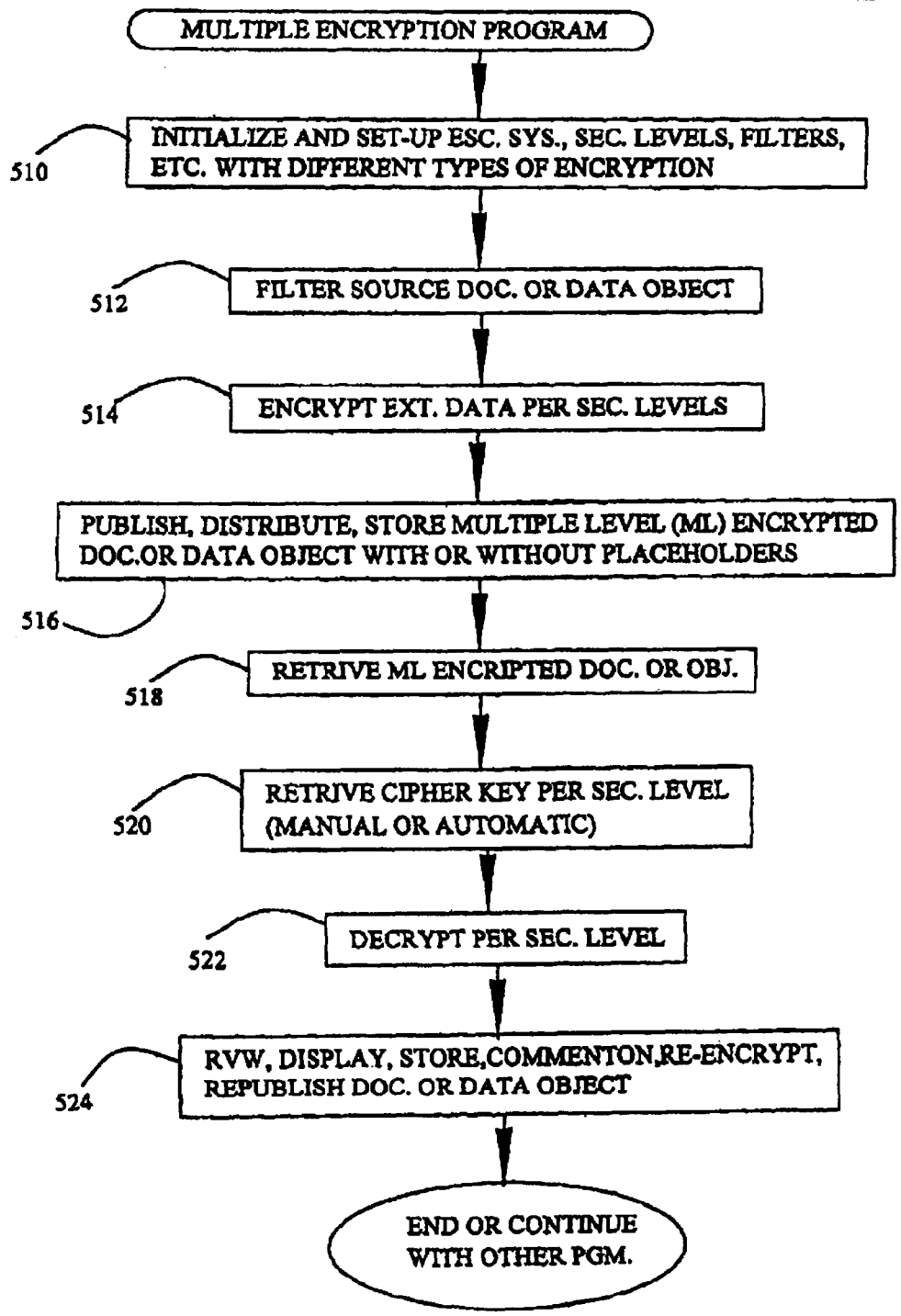
FIG. 44 diagrammatically illustrates a flowchart showing the key components of a multiple encryption program using multiple types of encryption in one document or data object.

FIG. 44 diagrammatically illustrates a flowchart showing the key components of a multiple encryption program using multiple types of encryption in one document or data object.

FIG. 45 diagrammatically illustrates a chart showing the key components of the parsing, dispersion, multiple storage and reconstruction (under security clearance) of data.

Figure 46B:
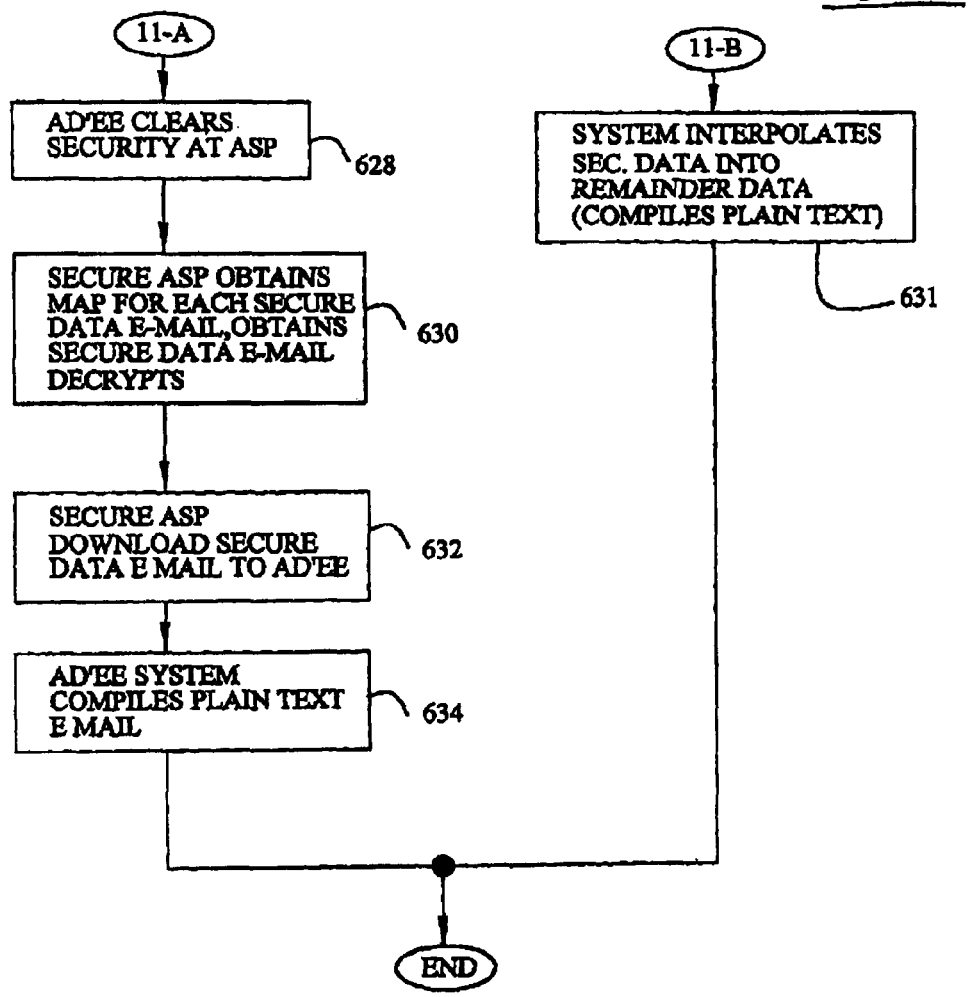

FIGS. 46A and 46B diagrammatically illustrate a flowchart showing the key components of one embodiment of the e-mail security system (jump points 11-A and 11-B link the flow charts).

Figure 47B:
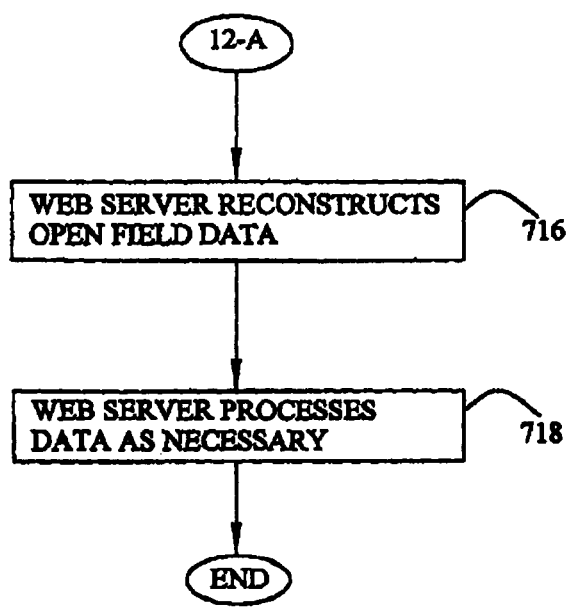

FIGS. 47A and 47B diagrammatically illustrate a flowchart showing the key components of one embodiment of the invention implements the security system on a web browser (jump point 12-A links the flow charts).

Figure 48:
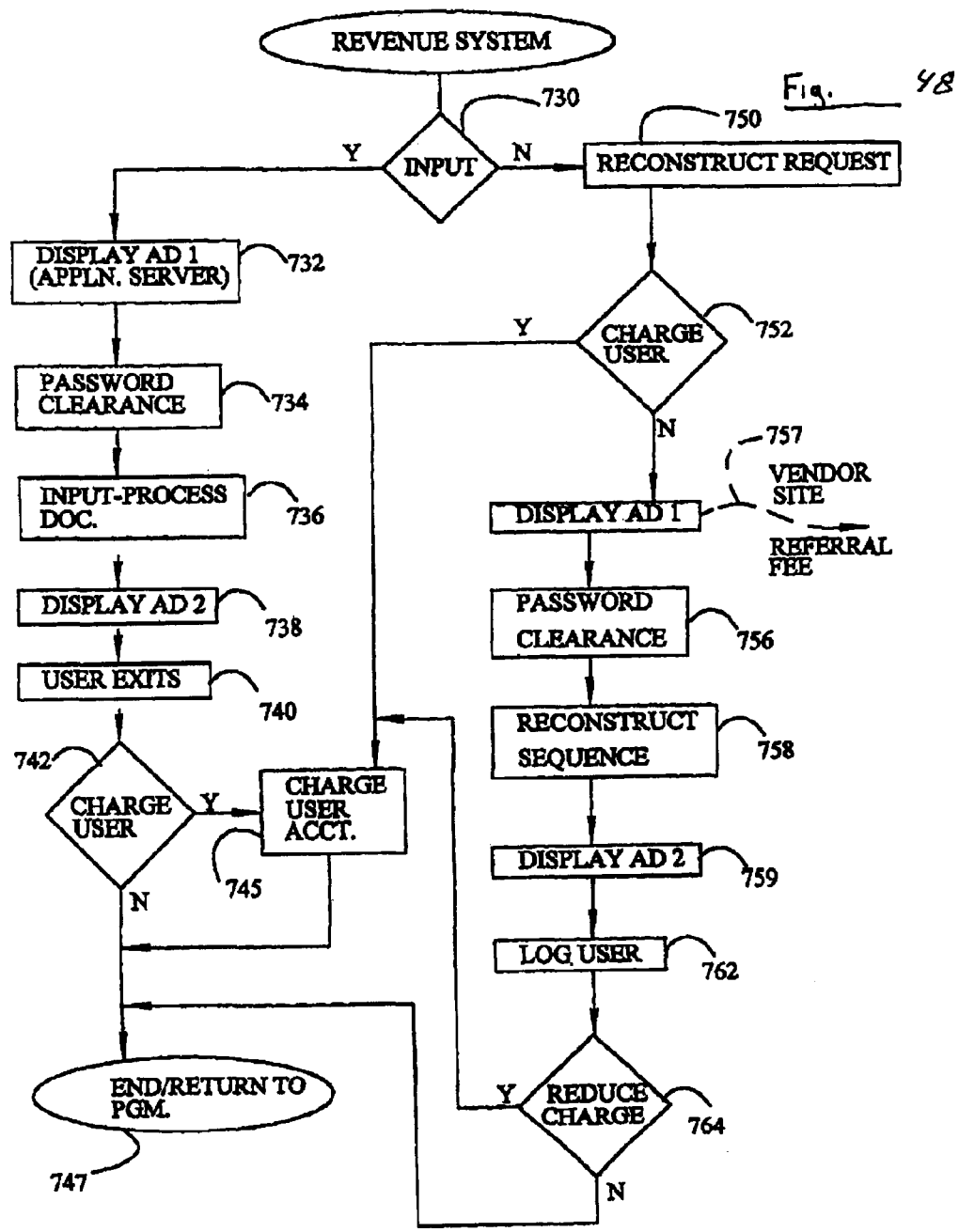
FIG. 48 diagrammatically shows several revenue systems which may be employed with the data security systems described herein.

FIG. 48 diagrammatically shows several revenue systems which may be employed with the data security systems described herein.

Figure 49:
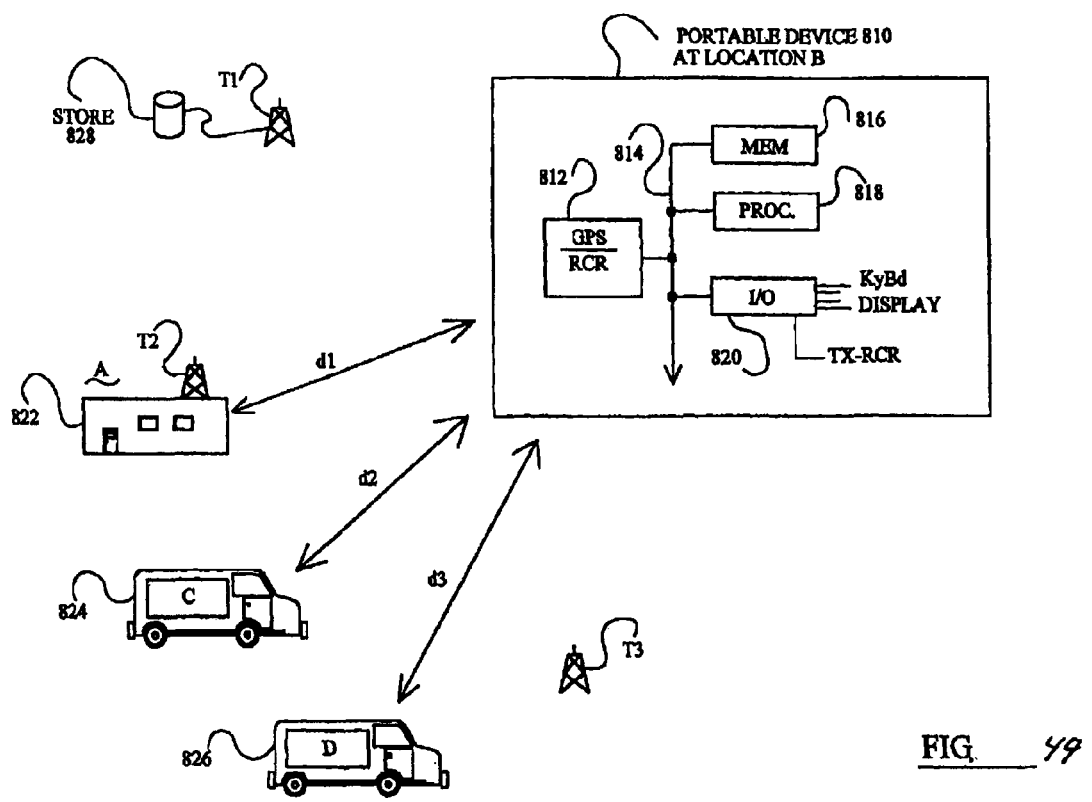
FIG. 49 diagrammatically illustrates a portable computing device (or the critical parts thereof, see FIG. 50 for further details) associated with the portable data security locator system and method.

FIG. 49 diagrammatically illustrates a portable computing device (or the critical parts thereof, see 50 for further details) associated with the portable data security locator system and method.

Figure 50:
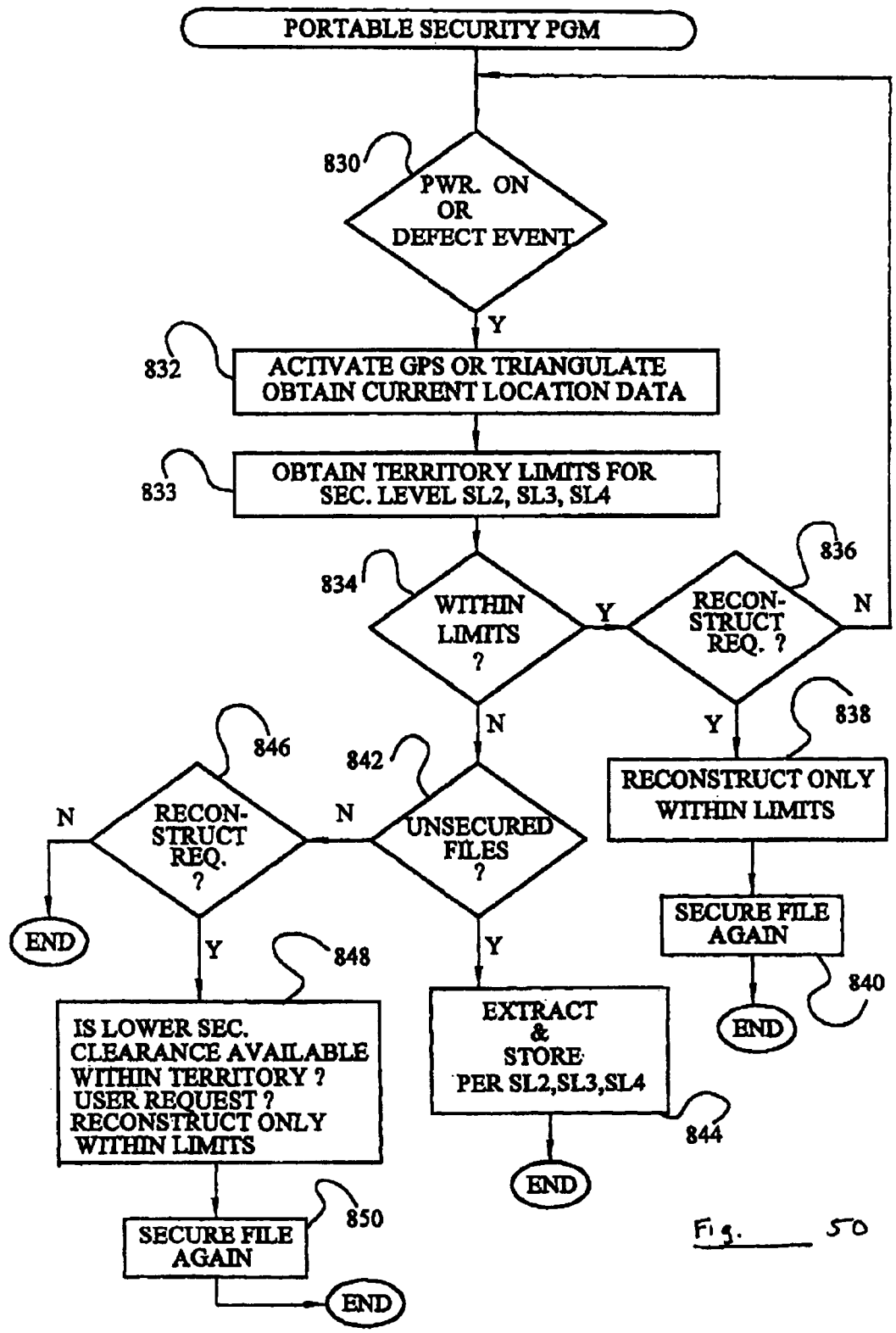
FIG. 50 diagrammatically illustrates a basic flow chart for the portable security system program in accordance with the basic principles of the present invention.
Figure 61:
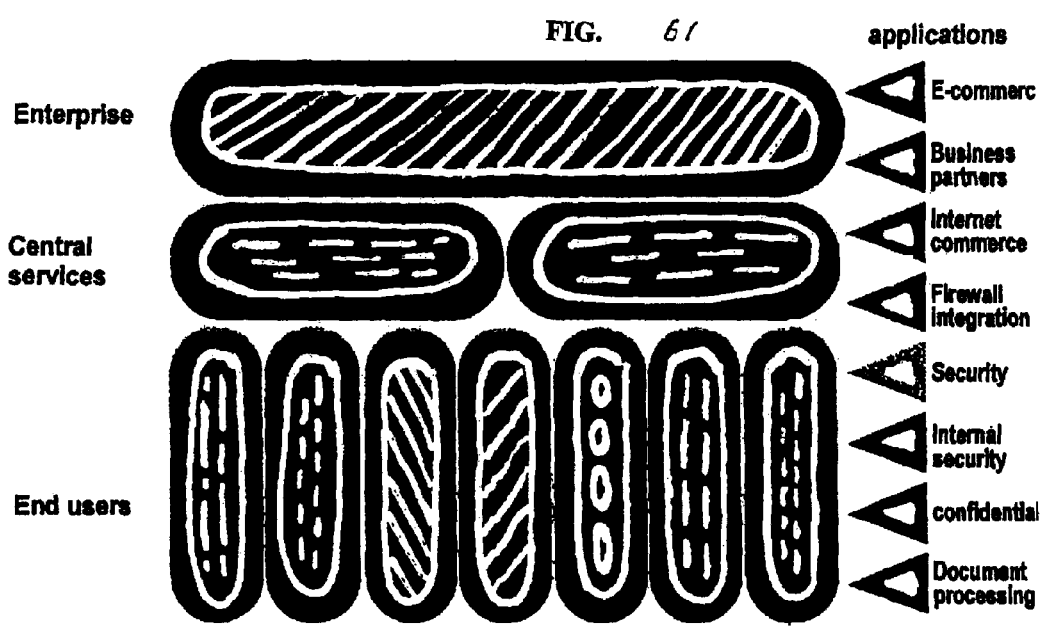
FIG. 61 shows applications
Figure 65O:
FIG. 65O shows diasporagraphy (b).
Figure 65P:
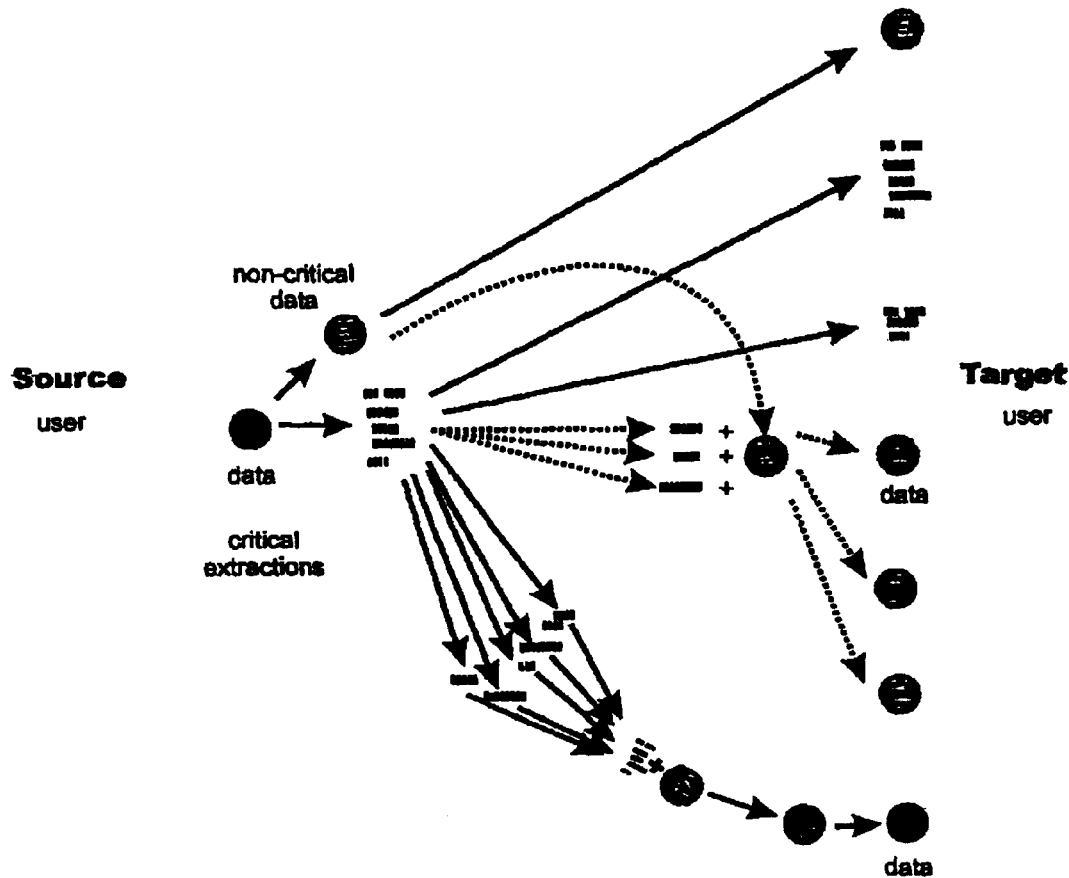
FIG. 65P shows diasporagraphy (optional tracks).
Figure 66:
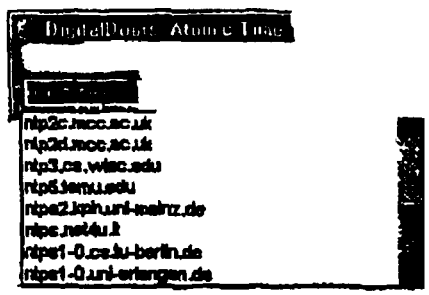
FIG. 66 shows atomic time.
Figure 67:
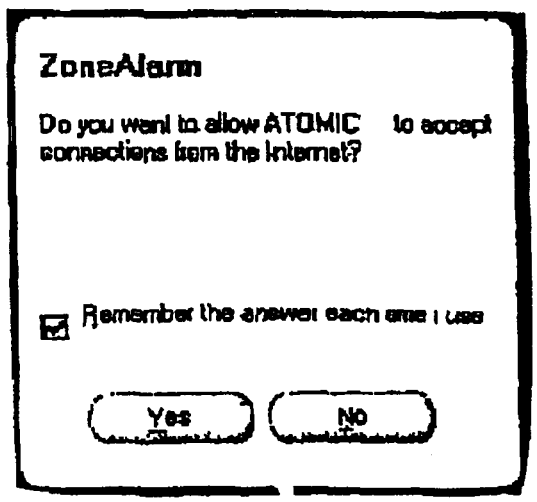
FIG. 67 shows zone alarm
Figure 68:
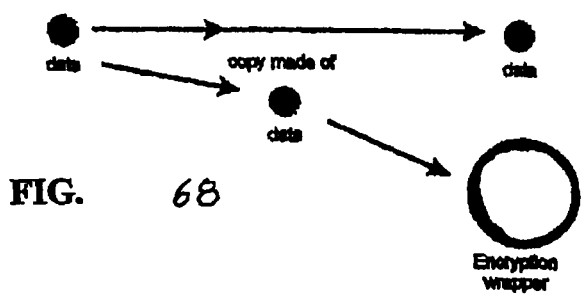
FIG. 68 shows encryption creates a copy for subsequent processing leaving the source as a potential security breach.
Figure 69:
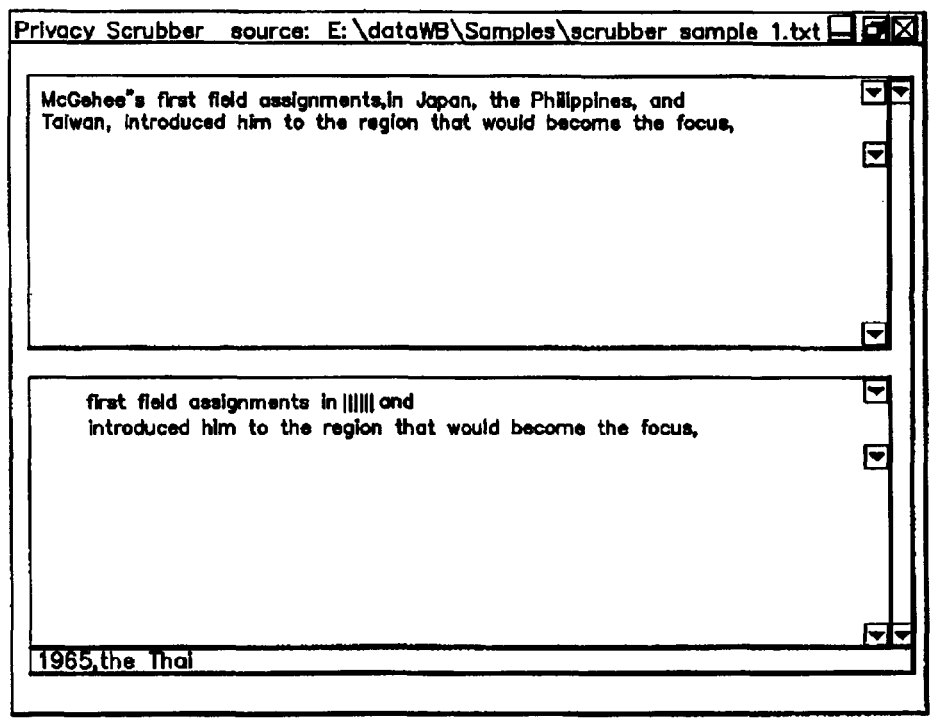
FIG. 69 shows unscrubber results with a default authentication (nothing reconstituted).
Figure 70:
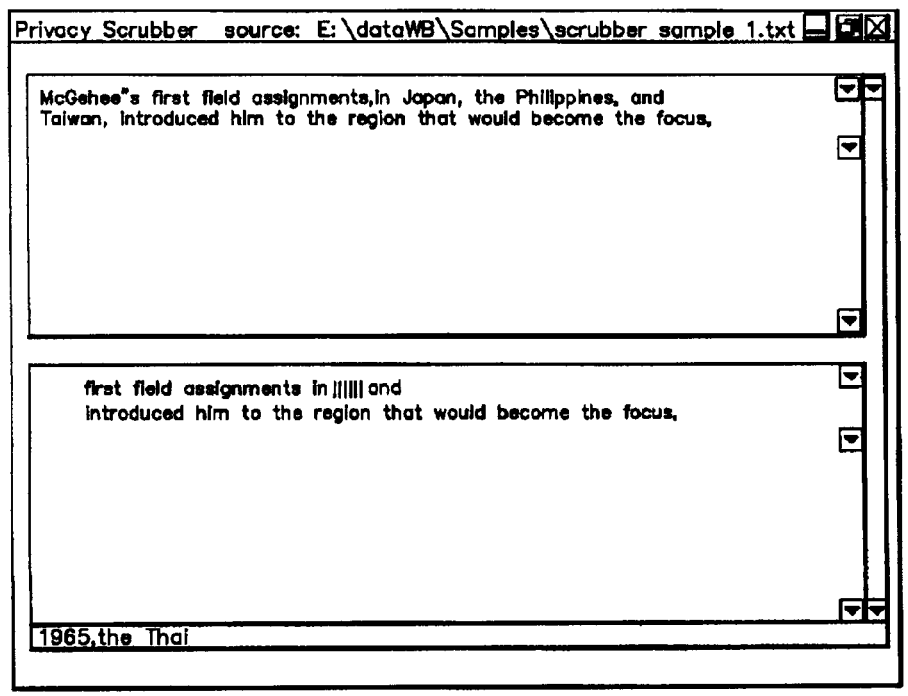
FIG. 70 shows unscrubber results with full authentication (all reconstituted).
Figure 71:
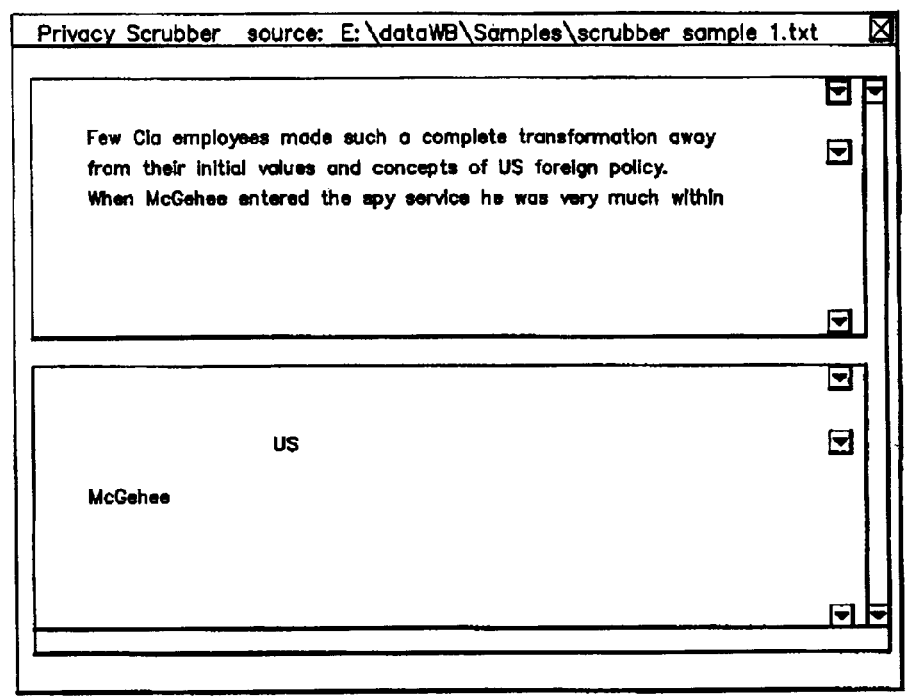
FIG. 71 shows attempts to copy from the screen result in the loss of the data and purge of the clipboard.
Figure 72:
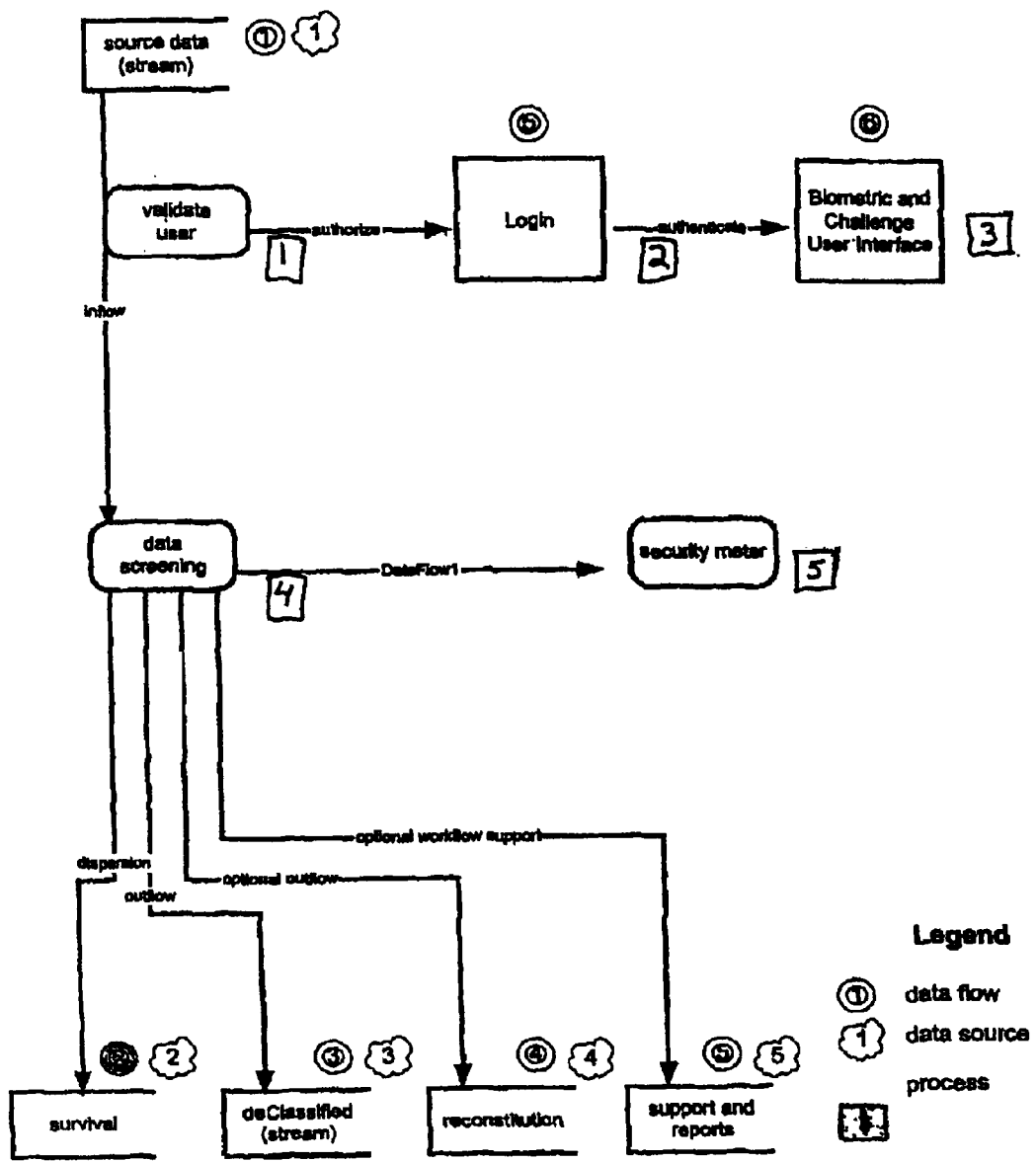
FIG. 72 shows Digitaldoors process & data flow.
Figure 73:
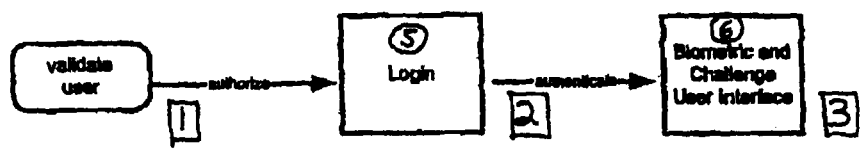
FIG. 73 shows the process of validating the user is multi-level security. This includes username and password entry, but also vetting with arbitrary selection of biometric devices, external monitoring, and friend or foe identification.

FIG. 50 diagrammatically illustrates a basic flow chart for the portable security system program in accordance with the basic principles of the present invention.

DIGITAL DOORS Defenses in Depth

DIGITALDOORS is an automated security risk management system that creates in-depth security defenses at the semantic-level as well as creation of controlled-release mechanisms at the storage-level with significantly reduced performance overhead requirements.

The DIGITALDOORS system delivers the highest-grade security through new methodologies for risk mitigation and hindrance of attacks. It introduces new technologies for defenses. The system automatically responds to attacks by matching the defense level to the level of threat. The DIGITALDOORS system can adjust its defenses to accommodate the performance needs of a network and is transparent to the user The Figures which illustrate the concepts of DIGITAL DOORS Defenses in Depth are as follows:

FIG. B1 shows Digitaldoors automatic defenses matrix

FIG. B2 shows regular work mode

FIG. B3 shows threat mode

FIG. B4 shows attack mode

FIG. B5 shows sample transmission—top secret-display of a document with validated password authorization and/or biometric identification FIG. B6 shows extraction of critical and important data—dispersal of critical and important data encrypted to distributed storage locations with substitution by placeholders FIG. B7 shows extraction of critical and important data—dispersal of critical and important data encrypted to distributed storage locations with substitution by leveled-access placeholders FIG. B8 shows extraction of critical and important data—dispersal of critical and important data encrypted to distributed storage locations with substitution by leveled-access placeholders FIG. B9 shows extraction of critical and important data—dispersal of critical and important data in plain-text to distributed storage locations.

FIG. B10 shows selection of critical and important data.

FIG. B11 shows applications.

FIG. B12 shows new technology for security based on data semantics, extraction, hiding, dispersion, and delivery that replaces or augments the tradition encryption methods.

FIG. B13 shows single file delivery.

FIG. B14 shows survivability and security technologies for the new century.

FIG. B15$a$ shows encryption.

FIG. B15$b$ shows ciphering.

FIG. B15$c$ shows steganography.

FIG. B15$d$ shows winnowing.

FIG. B15$e$ shows chaffing.

FIG. B15$f$ shows data hiding.

FIG. B15$g$ shows firewall.

FIG. B15$h$ shows arranged key encryption.

FIG. B15$i$ shows public key encryption.

FIG. B15$j$ shows trusted $3^{rd}$ party key encryption.

FIG. B15$k$ shows key escrow encryption.

FIG. B15$l$ shows data dispersion.

FIG. B15$m$ shows data sharing.

FIG. B15$n$ shows diasporagraphy (a).

FIG. B15$o$ shows diasporagraphy (b).

FIG. B15$p$ shows diasporagraphy (optional tracks).

FIG. B16 shows atomic time.

FIG. B17 shows zone alarm.

FIG. B18 shows encryption creates a copy for subsequent processing leaving the source as a potential security breach.

FIG. B19 shows unscrubber results with a default authentication (nothing reconstituted).

FIG. B20 shows unscrubber results with full authentication (all reconstituted).

FIG. B21 shows attempts to copy from the screen result in the loss of the data and purge of the clipboard.

Technical Background

The DIGITAL DOORS system automatically extracts critical and important content from documents. The extraction process downgrades and declassifies the documents so that they are useless to unauthorized parties. Presentation by a user of a valid password, in addition to optional biometrics, enables instant seamless reconstitution of that critical and important content. The system is automatic and transparent to the user. The system secures structured and transactional documents (for example, database records or XML) as well as unstructured and freeform (for example, e-mail, instant messaging, or Word documents).

The technology conforms and answers specifically each of the four demands set by the Committee on Information Systems Trustworthiness. The National Research Council reported in Trust in Cyberspace (1999) security paradigms needed for a safe future. The report states, "The substantial commercial off-the shelf (COTS) makeup of a network information systems, the use of extensible components, the expectation of growth by accretion, and the likely absence of centralized control, trust, or authority demand a new approach to security: Risk mitigation rather than risk avoidance; Technologies to hinder attacks rather than prevent them outright; Add-on technologies and defense in depth; Relocation of vulnerabilities rather than their elimination." (Trust in Cyberspace, Chapter 7, Conclusions page 241).

None of the existing or proposed security technologies addresses these needs in whole, The DIGITALDOORS technologies breakthrough this barrier by providing a single system which implements each one of those four elements in a unified way. The technologies control information flow in centralized and decentralized environments, through controlled-release of information within distributed systems. The security technology is designed to create "digital doors" which are entry points for automatic real-time content-dispersal management and controlled-release of data and specifically granular data. The objective is to empower the user with the highest security, while enabling him maximum sharing and delivery flexibility. The technology incorporates unique methods of information dispersal to distributed storage locations, controlled-release from storage, reconstruction, and granular release to different users according to their access levels.

Automatic Responsiveness to Threats

The technology introduces breakthrough flexibility into security management, risk management of data, data storage, and data flows by the capabilities of automatic response to actual attacks. DIGITALDOORS technology enables automatic response to security challenges and threats. A key innovation to this technology is that it can create, maintain, upgrade and downgrade the levels of security through implementation of a leveled granular extraction process and a controlled-release mechanism. Attacks trigger a response in the form of higher extraction levels, expanding the type of content extracted, and decreasing the release of critical and important data control from storage. How much and what to extract depends on the level of threat or perceived risk. In same manner, the amount and type of content released from storage and reconstituted depends on the level of threat or risk perceived by the system. The system delivers a level of security protection specifically matched to meet security needs as dictated by the changing security threats, environment, policy and organizational needs.

Highest Security Level through Extraction

It is common knowledge that the highest security is delivered through total separation. Whereas this concept has only been implemented physically or by isolating computer environments, we are now able to achieve this concept within open and networked computer environments. DIGITAL DOORS implements this level of highest security by automatically locating the critical and important data within documents or transactions, and extracting it. It locates the critical and important information, categorizes each into one of forty plus content categories, extracts it, encrypts it, and transports it to a controlled storage on-line or off-line, from where it is released under specific rules and controls. Extraction is by word, words, numbers, currency, phrases, lines, paragraphs, or entire documents. This same technology is also effective for sounds and images. Categories include surnames, locations, currency, defined terminology, and unknown words or phrases. DIGITALDOORS enforces a total physical and logical separation of critical and important data from its context and precludes access to that information without that needed granular authorization. Furthermore, the technology enables nearly instantaneous reconstruction subject to the rules set for a controlled storage release process.

Variety of Defenses

This breakthrough technology delivers the following options for higher security:

1. Plain-text extraction and dispersion of critical and important content
2. Targeted extraction and encryption of only critical and important contents
3. Encrypting document or its extractions with multiple encryption types These processes are described in the next three sections.

Plain-Text Extraction and Dispersion of Critical and important Content

Maximum security with traditional methods encumbers free flow of information and business efficiency. Encryption burdens computer systems with high performance overhead, and its use is limited to the parties who have decryption capabilities (through decryption built into their workflow and access to keys). DIGITALDOORS technology offers a new solution. It enables leveled security in plain-text format, in addition to none, some, or all of pre-existing encryption, decryption, firewalls, and other security infrastructure. The level of security is determined by:

The extent of the critical and important content selection and extraction process.

The extent of dispersal to various distributed storage locations

The rules for controlled-release from storage.

The access rules governing the reconstitution of extracts into the secured document The extractions are dispersed to distributed storage on a granular level. The rest of the document can be stored at its original location and/or other storage locations. Dispersal of extractions introduces new barriers not existing in current security. The attacker has first to find the (encrypted) map to the locations, then locate and access the distributed storage, get the data released from the controlled-release storage, and finally somehow reintegrate the extracts into the appropriate documents.

If additional incorporation of encryption is not possible for overhead performance reasons or other reasons, the system creates high level security in plain-text as follows:

Secure more information with more extractions

Release fewer extracts from storage locations and reconstitute less

Limit access to various parties

Display the reconstituted extractions for shorter period

When a higher level of security is needed, the system automatically encrypts the critical and important data or dispersed it more widely.

Targeted Extraction and Encryption of Only Critical and Important Contents

The extraction capabilities of the system enable different workflow modes. The system enables extraction and encryption of critical and important content. In essence, only the critical content is extracted and/or encrypted, whereas the rest of the document remains as plain-text. This capability enables the important advantages and flexibility; the ability to share the document within the organization or transmit it to outsiders while still maintaining security over the most critical and important content of the document. This is an automatic process for controlling the content of outgoing e-mail. The document owner releases the critical and important content by enabling access to it to defined parties at defined.

When a higher level of security is needed, the system automatically encrypts extractions with multiple encryption methods and can also encrypt the rest of the document in an additional encryption method.

Encrypting Document or Extractions with Multiple Encryption Types

DIGITALDOORS attains the highest level of security by using multiple types of encryption (and/or multiple keys) for one document. Maximum security is delivered through automatic selection of critical and important data, encrypting these extractions with one or more types of encryption. The non-prioritized data is optionally encrypted with another type of encryption. The critical content is encrypted separately from the encryption of the remainder non-critical content of the document.

Multiple encryption types within one document statistically frustrates deciphering that document regardless of the available computer power. In our view, common encryption methods are vulnerable through existing technologies, social engineering methods, carelessness, and workflow habits. Furthermore, simple encryption becomes more vulnerable (including triple DES) assuming future mathematical breakthroughs or quantum computing. Existing methods to crack block ciphers are being improved to compromise the future AES Rinjdael standard. The DIGITALDOORS method, incorporating different encryption methods within one document, precludes unauthorized exposure.

Low Performance Overhead

Existing security technologies overburden the computing environment in terms of computational overhead, labor, and training requirements. A skilled or motivated adversary can turn even the best security systems against the very networks that they are protecting. A skilled or motivated adversary can initiate an attack against traditional security systems triggering a response that drains performance from the mission-critical activities of the very networks they are protecting. The DIGITALDOORS system is both versatile and flexible, to accommodate network performance bottlenecks and needs. The system changes modes of operation to accommodate the need for lower performance overhead in the system and tune the level of activity. The following defines specific CPU performance statistics for system performance with DIGITALDOORS.

The core process of DIGITALDOORS is extraction and dispersion. We define extraction as an automatic process of linguistically reading a data stream and selecting and parsing the critical elements from the non-critical parts. The initial parsing (word, number, record, line, image, and structure etc.) is linear and efficient. This part of the process requires 0.03% of the CPU overhead (Intel VTune benchmarks). The following parts of the process: 1. data matching; 2. categorization; and 3. decision-making can be done through parallel processing or using same CPU. The said three parts of the process have higher overhead and are processed as separate threads (Win 32 architecture) delivered to subordinated processors or run remote procedure calls. A delivered system will incorporate parallel processing. If the client's requirement is to run all processes on one CPU then its overhead will be high. We are continuing to focus on reduction of overhead in situations when client wants all four functions to take place in one CPU rather than parallel processing.

We define dispersion as the transportation of the extractions to distributed storage. This process is merely a network delivery and disk I/O activity that performs at the existing network performance levels. Additional overhead is consistent with the levels of document extraction, empirically determined at 6%, and even this additional overhead can be diverted to separate channels to eliminate. loading on mission-critical activities.

Network performance depends on the different storage options, SAN, NAS, or backplane architecture. Performance with LAN and WAN is currently being addressed by various testing.

Reconstitution of extracted critical data is immediate upon validation of authorized user. It requires minimal CPU overhead.

Content Dispersion

The DIGITALDOORS system enables control over specific critical and important content items within the general contents of documents or digital files in a computer or within a network. The immediate controlled-release of those important content items according to specific identification and access criteria proactively safeguards the security+ and the value of documents or digital files. The content control enables broad dissemination of the digital files in closed networks, as well as open networks including the Internet, without compromising the security of the critical and important information in the digital file. The dispersal channels can include any of all the of the following: Networks; Internet; Virtual Private Channels; Telephone lines; Optical lines; Wireless; Fax; Document; Verbal communication.

The Internet and communication advances have opened up many new markets but the opportunities are constrained by known and as yet unknown security threats. The DIGITAL DOORS system maximizes this new revolutionary connectivity by enabling the general content of a document or digital file to be distributed throughout an organization, its employees, partners, suppliers and customers while securing and controlling the most important content. The system enables the release of the important contents only to the validated authorized parties through an automatic and manual controlled-release mechanism. The DIGITALDOORS system disperses data groups to different storage locations. This avoids storage in one vulnerable location, thereby eliminating single points of failure. Dispersal is automatically and manually controlled. Dispersal is effected according to categories, by users, or by document types. For example, one distributed storage can store credit cards numbers, another names, while a third stores addresses or social security numbers. Distributed storage can include any or all of near-line storage devices, removable storage, Internet storage, ASP services, RAID arrays, and other remote storage options. Note that once extractions are stored remotely, the placement of these extracts can be moved from one storage location to another, like musical chairs or mobile targets, to thwart unauthorized access.

Dispersal Mapping

The map is the most sensitive part of the system. The dispersal map to storage locations is duplicated and stored in other different storage locations to avoid one point of failure. The map is encrypted with very strong encryption. Each map is independent from other maps, thereby providing no access to other documents. The key to the encryption of the map can be split according to a secret sharing scheme. Accessing the map is conditional on combining two or more pieces of the split key, in the presence of two or more people on the system at the same time. Furthermore, in-older to avoid performance overload, the map could be split and stored in plain-text in various distributed storage locations without the need for encryption. Location and access to the map can also be by personal knowledge only.

Multiplatform Integration

DIGITALDOORS is designed to integrate with different mainstream software and hardware systems. It is an add-on 'application and will function within the structures created by mainstream programs and applications. DIGITALDOORS technology functions at a deep micro level. It can enable protection of the critical contents of a specific document after it has been classified and routed by other programs, including document management systems. The system complements other applications. It continues on with specific document content management on a granular level, in order to give protection at the core. Usually the documents are grouped in file cabinets, folders and binders. That is macro-management while the DIGITALDOORS technology conforms to a micro-level of document organization and management.

Innovations of the DIGITALDOORS Technology

The innovation of the DIGITALDOORS technology is in its being an efficient and multipurpose security risk management technology. The DIGITALDOORS technology enables different levels of security according to the users and network's changing security and work needs. The security levels are adjusted through a controlled-release process, which reconstitutes extracted content to the users based on users access criteria and other criteria. During normal course of work, the extracted data will be reconstituted instantly upon valid verification of user. In situations of threat of an attack or an attack, the system manages the risk by limiting the release of extracted content, as well as securing more content by executing more extensive extractions. The innovations include these nine items:
  1. Enabling security solution against insiders damage
  2. Enabling survivability
  3. Enabling security for closed network connecting to the Internet and open networks
  4. Controlling Information flow in decentralized environments
  5. Implementing of multiple encryption types within one document
  6. Compartmentalization of documents with leveled access to users
  7. Enabling distributed and granular storage
  8. Enabling lower storage costs
  9. Regaining control
These nine innovations are described in detail in the following sections.

Security Solution Against Insiders Damage

Studies shows that insiders cause 70 to 80% of all security damage. DIGITALDOORS technology enables insiders and employees to work with documents while managers and owners control the release of the critical prioritized information. The control is granular, thereby enabling continued work with the rest of the content in the document. The objective is to empower the user with the highest security while enabling him maximum sharing and delivery flexibility. This enables free flow of information between closed networks and public networks, such as the Internet, without compromising the security through extraction of critical and important content. The user can transport documents through various networks and e-mail services knowing that the critical information, which is still under control, and is not compromised.

Survivability

If networks get damaged, the decryption capability, for example with PKI, are likely to be compromised, or at a minimum, suspended until the network is reestablished and validated. In such instances, DIGITALDOORS technology enables continuation of work on channels, which need not be secure. In addition, the dispersion of information guarantees maximum partial reconstitution to documents and transactions, or total reconstitution to documents and transactions benefiting from backup at distributed storage facilities.

Security for Closed Network Connecting to the Internet and Open Networks

The Internet infrastructure and open networks are not secure. Even secured closed networks, such as VPNs, are not secured enough. The critical content of documents is the critical asset of the organization and must be highly secured, with maximum reliability, full transparency, and instant accessibility. To remain competitive, organizations must maximize utility of the critical data within their documents, files, databases and servers. The securing of such documents must not be at the expense of compromising the access or processing speed of such documents. The DIGITAL DOORS technology enables work in plain-text, as well as with optional encryption. Working in plain text reduces the computing performance overload.

Information Flow Control in Decentralized Environments

Protection of privacy and confidentiality of information represents a long-standing challenge, which DIGITALDOORS solves. The challenge has become much bigger with the expansion of the Internet, which has created decentralized networks. Parties, who do not know or trust each other, have to exchange information. This technology enables free flow and sharing of information between parties by removing burdening security restrictions and creating top security with a controlled-release of the critical content in the documents. The technology, enables top security through introduction of user and organization's ownership and control of the critical granular data in documents.

The system introduces an additional layer of access controls at the granular level of the user document. In order to view the reconstructed critical information the user would need to be verified by additional access controls at the data storage level. The user access code or a physical key enables release of data from the storage. Today's access controls do not stop the user from distributing documents to other parties. DIGITAL DOORS technology includes a fined grained controlled-release mechanism to distribute the critical information only under a required set of circumstances and access validation. The system enables the user ownership of critical data and conditions for its release and dissemination. The user has the option to hide the critical data through declassification process and release through a reclassification process in which the critical data would be reconstituted in the document.

Implementation of Multiple Encryption Types within One Document

DIGITALDOORS creates the highest security using only traditional technology by applying multiple encryption types per document, as previously explained.

Compartmentalization of Documents with Leveled Access by Users

DIGITALDOORS creates leveled sharing of information, for example such that persons with level 3 access will have keys for encryption type RSA persons with level access 2 will have access to Blowfish encryption within one document.

Enabling Distributed and Dispersed Storage

There is a major human tendency to refrain from sending important documents to web storage locations because of potential security breaches. This cultural issue is both driven by psychological issues and well-founded security concerns. The retention of those documents as is in physical proximity or locked security, provides actual security but precludes gaining any utility from those documents in a functional business setting. Instead, DIGITAL DOORS enables functional distribution of those documents without the critical and important data, and a controlled-release of some or all of the extractions in a granular way in order to support business activities while retaining security.

Enabling Lower Storage Costs

DIGITALDOORS extraction process declassifies and downgrades mission critical documents. The downgrading and transformation of a critical document into a non-critical document enables storage in less secured and lower cost storage. Taking advantage of this security-initiated, extraction process can yield substantial storage cost savings. The storage cost savings can cover costs related with implementation and maintenance. In another white paper, we discuss the high return on investment ROI of the DIGITALDOORS system for system storage cost arbitrage. Splitting the data into critical and non-critical enables 20 to 70% savings on storage costs. Current storage for 200 GB at $40/GB equals $8000. DIGITALDOORS storage costs with 5% critical content equals 10 GB at $40/GB costs $400. The 95% non-critical storage at 195 GB at $10/GB costs $1950. Total DIGITALDOORS storage costs are only $2350 in direct comparison to the original $8000 storage costs, saving $5650 with tiered storage costs.

Regaining Control

DIGITAL DOORS enables organizations to regain control of their assets in terms of content, risk, distribution, and security. A separate white paper discusses the issue of maintaining and regaining corporate control through the usage of the DIGITAL DOORS system.

Conclusion

The DIGITALDOORS system delivers the highest-grade security through new methodologies for risk mitigation and hindrance of attacks. It introduces new technologies for defenses in depth at the semantic level as well as contents and controlled-release methods, at the storage level. The system automatically response to attacks by matching the defense level to the level of threat. The system adjusts its defenses to accommodate the performance needs of a network and is transparent to the user.

Technical Background

DIGITALDOORS represents a protective broad spectrum cloak of technologies, services, processes, workflows, and solutions for implementing security, confidentiality, anonymity, pseudo-anonymity, survivability, and privacy. It addresses needs for risk mitigation after security failures. It also enables metadata extraction through a redaction process. This application suite runs on desktops, servers, distributed networks, hpst mainframes, and supercomputers. DIGITALDOORS is a composite security solution based on data hiding, binary data storage and delivery than can be used instead or, or in conjunction with, system security, encryption, firewalls, and intrusion detection systems; DIGITAL DOORS is also a content management and distribution filtering system for Web pages, sales literature, and other outbound information, such as e-mail messages.

Technical Overview

DIGITALDOORS desktop applications are built with a mix of Visual Basic, Visual Basic for Applications, VBScript, Unix regular expressions, C, C++, a rules engine, Prolog, regular expressions, and the MS JET/ODBC engine. Distributed server and network applications are built with a mix of Visual Basic, Visual Basic for Applications, C, C++, Prolog, Regular Expressions, and the MS JET/ODBC engine and MS SQL.Host and mainframe applications apply PL/1 and reference DB2 databases with JCL control decks. We have some Java conversions that prove cross-platform functionality. Platforms include 32-bit Windows, OS/390, and some Linux and Unix. DIGITALDOORS is the umbrella suite of primary components that include:

Command & Control: network, system, and data management with a control panel to access all functions, log events, review and report on modes.

DIGITALDOORS data extraction (also called "scrubbing").

DIGITALDOORS: UnScrubber, data reconstitution.

Administration: user access control through identification, authorization, and biometrics and configuration User Login: user access and authentication control

Application Utility

The core concept is based on the automated extraction of critical and important information from a data stream and the subsequent layered reconstitution of that original data stream. Please see the Glossary for explanation of that and other terms. Reconstitution is driven by user authorization levels, threat modes, subject to both internal and external conditions. By analogy, DIGITALDOORS performs digital surgery on data streams, by slicing it, dicing it, mixing it with other data, and then finally ¢storing to original form, subsets of that original form, or formats altered for disinformation. Reconstitution is driven by a desire to produce altered results with embedded notes, footnotes, commentary, search results, links, and amalgamations of other data sources. It can also produce misinformation or disinformation. This provides a wide range of privacy, security, anonymity, data mining, confidentiality, and security services. Specifically, the paradigm is useful for data protection, anonymous data delivery, delivery of pay for view services with trailers, and content with imbedded advertisements. In addition, it opens new methods for thwarting competitive intelligence. On the other hand, when DIGITALDOORS is applied to internal data, the extraction lists can be then used to enable effective, focused, and devastating business intelligence gathering, since these keyword and phrase lists are often targeted precisely to competitive intelligence needs.

Other applications of DIGITALDOORS includes business intelligence (BI), strikeback through false information, misinformation and disinformation. Also, DIGITALDOORS is adept at data mining by methods which are converse to the usual technologies. Specifically, while most data mining techniques are driven by lists of relevant topics, terms, and phrases or keys, these technologies search for things which do not explicitly match, linguistically match, or apply loosely to semantic trees.

Security Technology

DIGITALDOORS security technology is represented by several techniques. This includes everything from:
  Making the process complicated in some way
  Encryption
  Ciphering (non-character substitution)
  Data compression and other encoding
  Data hiding (or data masking)
  Steganography (the process of hiding a messaging within the content of a more obvious one)
  Winnowing (validating integrity and non-repudiation)
  Access control
  Biometric access control
  Situational access control
  Data Hiding
  Data Sharing
  Remote monitoring
  User identification
  Remote visual identification
  Identification of friend or foe
  User authorization
  Cascade of authentication
  Chaffing (injection of rubbish)
  Winnowing (checksum compression)
  Secure maintenance
  Firewalls (or moats)
  Data dispersion (storage and delivery)
  Binary (ternary and et cetera) information delivery DIGITALDOORS applies all of these techniques in one form or another, but primarily focuses on the two core techniques of data hiding, and binary storage with delivery. Note that process times are at least comparable to encryption—in fact, several magnitudes faster—plus provide some other functional and workflow benefits. Specifically, while security might be the primary focus for these technologies, DIGITALDOORS are enables survivability (risk mitigation), privacy, confidentiality, and anonymity under the same umbrella.

Other security techniques which are not explicitly used (or used yet) by DIGITALDOORS include:
  Virtual private networks (VPNs)
  Intrusion Detection
  Firewalls
  Proxy servers
  Encapsulation
  Convolution encoding (taken to an extreme by Rinjdael)
  Obfuscation
  Forensic control
  Strikeback Encryption and Security History The earliest recorded history of message encryption and message hiding (steganography) goes back at least to the failure of Persians to conquer Greece. The Persians had expected to surprise the Greeks, but the tide and trapped the Persian fleet in a confined bay. Advanced warning delivered as a message on a wooden board obscured by a layer of wax from a Greek expatriate spurred the Greeks to build up their munitions and surprise the Persians instead.

So-called "unbreakable" encryption unraveled by code breakers lead to the loss of her head by Mary Queen of Scots, the German U-Boat fleet, the Japanese Navy Admiral Yamamoto, and many others. No encryption has proven secure in actual. use. No method has been mathematically proven beyond doubt to be undecipherable. In fact, even the best of the modem algorithms rely on the difficulty of locating prime numbers, which are now under pressure from faster CPUs and new technology based on quantum mechanics. Some encryption methods require a trusted third party, which in the past has shown itself to be untrustworthy, susceptible to bribery, and even been the puppet (CryptoAG) for an unfriendly spy agency. The unmitigated audacity to presume encryption is unbreakable has been the downfall of many individuals, organizations, and governments. The presumption that encryption is sufficient for to enabled security for transactions of a short-term value ignores the risk of new stealth technology and patience, perseverance, and social engineering skills of would-be decrypters. The germinating philosophy is to address the damage and risk through mitigation rather than presumption of insurmountable barrier-based security.

Cipher Science

Lengthening the encryption key is a false effort to improve security because the distribution of prime numbers is asymptotically logarithmically decreasing rather than exponentially increasing. A 56-bit key creates a number that is 22 digits in length with 612489549322870 prime numbers. A 112 bit key is 46 digits in length with 4309606392583910000000000 prime numbers. In other words, while the key space is 72057594037927900 times larger, the prime number space is only 70362121237035500 times larger, by direct prime number generation and counted enumeration. Approximation methods other than enumeration (impractical as the key gets larger) to count primes include the Gauss's empirical postulate, von Mangoldt value, Chebyshev's 9 function, Perron's formula, Dirichlet series, and Reimann's Zeta function.

There are 2.4% fewer prime numbers between the 56-bit and 112-bit space, representing an 11% asymptotically logarithmic distribution of prime numbers. This slight reduction might seem inconsequential, but as the key size is doubled and doubled again, the loss is non-linear (−2.7 and −3.4%). This undermines the potential for prime numbers as encryption keys and increases the effectiveness of brute force prime number factoring in decryption. Although the key sizes and the sizes of prime number sets are enormous (103 digits at 256 bits and 206 digits at 512 bits), Moore's Law wins on computational deciphering. A Swedish team cracked 512-bit DES (4×3DES) in 14 hours in 1999. Besides, unauthorized prime-number decryption has a non-linear 2 to 7% helper in the form of that asymptotically decreasing distribution. This is a particular warning for PKI. Also note that factoring of public keys creates private keys very easily; the mathematics have developed since the time when the concept of PICT was first introduced. Note that the AES replacement for DES and Triple-DES is Rinjdael. Because it is a block dislocation cipher, Rinjdael is at first glance immune to brute force factoring. However, Rinjdael (and any other encryption method) will succumb to modified cracking efforts and sophisticated manual or automated pattern matching. The government analysts for the AES group in charge of selecting from the five encryption process finalists in fact cite the following:

"The standard techniques of differential and linear cryptanalysis can be adapted to be used against Rijndael. Because of the way matrix multiplication works, and because in GF(2"8), all the coefficients of the Mix Column matrix (as indeed all numbers from f to 255) have reciprocals, a specific attar, originally developed for use against its predecessor Square, called the 'Square attack' can be used as well .... This interesting property, although not trivial to exploit, can be used to impose certain conditions on the key when one additional round, before or after the two rounds involved, is present. The possibility of this attack was first noted by the developers of Square and Rijndael themselves, and was noted in the paper that initially described Square."

Encryption only provides protection point-to-point, so long as all information is contained within the encrypted container. If security needs require only point-to-point, virtual private networks are faster, more efficient, and less prone to complications. This conflicts with normal workflow by impeding the benefits of data sharing, networking, and Internet distribution. Encryption is also order-sensitive, such that any encryption applied to a previously encrypted container must be decrypted in the reverse order. DIGITALDOORS is not order-dependent, unlike encryption and other security algorithms. The many features and concepts of DIGITAL DOORS bypasses the conflicts between information delivery and the business workflow needs of openness and information dispersion. Furthermore, it can always be applied, not only to protect against external attacks but also against internal subversion. Encryption can be applied as delivery encapsulation, if so desired, but for practical reasons must be the last security step.

Evolutionary ... Not Revolutionary

DIGITAL DOORS applies methods and technologies borrowed from other endeavors and solutions in information technology. The implementation is revolutionary, but the core is derived from the prior knowledge of other disciplines. As one example, the disassembly of information into small pieces and restoration of that information is based on theories of data packet communication. Ethernet chops data into 1512 byte segments, wraps this data into a packet, and sends these packets in arbitrary order, via paths that are arbitrarily defined by routers, into a temporary buffer where packets are received in arbitrary order, sometimes a few missing packets are requested to be redelivered, in order to recreate the original data at a new location. This is implemented with a wizard that assigns file mobility to such dispersed storage locations as XDrive, Idrive, hosts, ISPs, web sites, and other networked resources. Remote access is also enabled easily to such devices through drive mapping and network volume mounting. We have successfully tested this with Xdrive, and its like. In a corresponding way, DIGITALDOORS creates controlled chaos within rigorously defined parameters, data redundancy, and a carefully orchestrated process to restore the original data in part or completely. DIGITALDOORS chops the data in more meaningful and contextual segments—by meaning and for many different application purposes—but nonetheless the technology is evolutionary.

Network virtualization is supported through the DIGITALDOORS code base to support any-to-any methods of computing, network processing, distributed storage, and arbitrary co-location or relocation of process and data. NAS, SANs, and extended Internet models for storage are transparently supported.

The strength of DIGITALDOORS extraction and dispersion is based on the law of large numbers. The process breaks the context between the original information and the extractions, and the apparent random storage of the extractions precludes any single document restoration. As the density of the extractions in storage increase, so does the level of security. Also, because extractions are independent, as are dispersions, any successful attack against one transaction or data file provides no access to any other. Because extraction is contextual in nature, it is also proof against brute-force or mathematical attacks. The only known way to, defeat DIGITALDOORS is through analysis of time and date stamps, buffers and cache values, access to the extraction map or recovery file, or a transaction log. Of course, there are ways to overcome even these concerns, and they are built into the system as processing options.

Invention Requirements

DIGITALDOORS has no rival or known prior art for the core technology and workflow implementations. There are several military- and spy-agency-built systems, which for obvious reasons, haven't been disclosed but suggest certain solutions resembling DIGITALDOORS. It was designed from nothing as a solution to address security, encryption, anonymity, and privacy failings with a completely different paradigm. As an aside, it fulfills the four critical needs as defined by the NRC to win the infowar, as explained elsewhere in this paper and in the white paper. The DoD mentality has shifted from absolute perimeter defense against external violation, which they acknowledge is impossible to prevent, to mitigation and continuity.

We wanted to create a means to freely distribute information without releasing identifying content. Indeed, once material is released, it is for all practical purposes made public, thus published, particularly with the speed and efficiency of the Internet. And since encryption contains the very machinery for its own solution within each and every message, it is clear that a different paradigm was required. In addition, the security technology of today is based on two metaphors, that of perimeter defense and encryption, and has been unquestionable proven untrustworthy.

Perimeter defenses fail against internal attacks, fail when penetration occurs in one area with connectivity to another, and fail against over, under, around, and other bypasses or simple failures of the fences.

Encryption fails for a number of reasons, not the least of which is that any encryption method can be broken by random accident or by application of sufficient calculations, keys can be stolen or socially engineered, and many systems contain trap doors by design. Also, encryption fails because it is an end-to end process, so that before information is encrypted and after it is unencrypted, it is vulnerable. Furthermore, once information has been made accessible, security is not longer in force, and its reapplication becomes moot.

Since perimeter defense and encryption are ultimately fallible—there is no security—1213rrAt Dawes represents a new paradigm that keeps the information out of the wrong hands through data hiding and binary distribution. The prior art includes encryption, data hiding, chaffing, and winnowing. The literature includes widespread reference to encryption, and a plethora of personal, system-based, a third-party, and trusted-key products. Benefits, problems, and complexities are well known. Data hiding is technique where parts of keys are given to different individuals to prevent any one person from access the encrypted sources with unanimity with other partial key holders; access to a bank vault is controlled by such a dual key holder method. Chaffing is a method to intersperse important data with an inconsequential data stream. It often is implemented as noise within data files or random data, which looks like valid data. Steganography is another method similar to chaffing where the carrier data stream is also of value. For example, a copyright, watermark, or other ownership certificate is interspersed within a picture and remains intact despite copying and other processing, and is invisible without the correct tools to extract it, display it, and thus prove ownership. Winnowing is venerable technique in computer technology; data files on disk and packets sent via a, network are currently winnowed through validation with a cyclic redundancy check (CRC). Binary distribution is a form of data hiding for two or more parts of the information are separated such that each part by itself is useless without the other. DIGITALDOORS combines that bank vault dual key holder technology with distributed network communications to make a logical dual key accessible by remote control virtually anywhere. Note that the DIGITALDOORS bank vault key is not only dual; it could be unlimited in scope.

Extraction

Extraction, also called "scrubbing," is complex, but works reliably given the advances in computer science, telecommunications, and experience with mission-critical technologies. It overcomes a number of misconceptions in the scientific literature that have plagued winnowing and chaffing concepts, and other non-cipher data protection schemes, such as obfuscation, convolution, or unit substitution. Extraction works quickly, accurately and efficiently. DIGITALDOORS easily removes 99% of target critical (positive) and important information on the first pass with 2% excessive rate (false positive) of removal on non-critical data. In others words, DIGITALDOORS extracts all of the right words and few of the wrong ones. Please test your document libraries and experience this remarkable success.

With extraction different rules and alternative dictionaries, it is as effective in other languages (in addition to several variants of English). There are some minor bugs that come to light when DIGITALDOORS is run against libraries of documents in different organizations. However, these are minor and have been resolved quickly. When first and surnames are the same as common words, as in Jon and John, the semantic typing sometimes forces the user to amend the core or supplemental dictionaries to include or exclude extraction. This is often a situational decision for each user. Development is working on improving semantic differentiation and our artificial intelligence rule base to make DIG/-At DOORS even better, but also to maintain a competitive product advantage. Note that a reduction in dictionaries and extraction logic often applied with structured data reveals wire speed processing times.

For most extraction errors, words are extracted (false positive) or ignored (false negative) when they should not be, are easily resolved by the user adding the words in the extracted or ignored lists to the user dictionaries. A second pass with extraction with correctly process these "override" selections. In other cases, errors or categorization within the dictionaries will create process problems. The dictionaries can be altered, amended, or customized for most any need. However, user customization by the user with the override lists is generally effective.

Extraction is driven by parsing technology, dictionary lookups, and a rigorous understanding of semantics. We are adding Bayesian inferences to improve extraction and increase the sophistication level. Several processes run concurrently, and if there are problems with extraction, it will occur because of precedence. In other words, does the phrase "Chief Engineer, Junior Grade" which is specifically supposed to be scrubbed get scrubbed when "Chief" and "junior" are explicitly added to the non-scrub list. There are a number of other order-related conflicts driven by the complexities of language syntax and style, such as extraction of parenthetical, footnoted, and quoted materials. Development is working on improving semantic differentiation and our artificial intelligence rule base. These will be released in future upgrades.

Extraction and reconstitution is based on relative paths to information. In order to implement greater dispersion in the form of multiple storage for each scrubbed stream, the concept of the URL as a universal linkage will need extension. The current state of the art is based on a uniform rather than universal pointer. However, XML has defined the Xpointer and the corresponding language definitions as a powerful and sweeping method to target any types of resources anywhere. We are expanding the processing to include the Xpointer and extended links.

Reconstitution

One interesting question that keeps coming up is what happens when the reconstitution doesn't work. That hasn't actually been a design, development, implementation, testing, or runtime concern. See the Frequently Asked Questions document for details. Once the reconstitution was coded and tried, it worked the first time, and has worked since. Failure has not been an issue. It comes up in conversation, however. And, for good reason; we are taking a critical document and extracting the material inside that is critical and important and throwing it up in the air, as it were, like confetti. That potentially makes users and managers nervous. However, the structures are simple and redundant with a minimum of overhead; in contrast to encryption. To address this primal concern, DIGITALDOORS includes backup options with default emphasis on executing a remote backup. Furthermore, the scrubbed document and the "positive" documents can be overlaid (that is, "OR"ed) to reconstruct the original. Failure is simply not an issue—anymore than users are now concerned about the reliability of their number and character being converted into sectors and clocks of bits and bytes and stored on magnetic media or deliver in packets through space.

The extraction process creates source data files and stream checksums (winnowing) and also generates checksums after the process for all parts of the process. If checksums fail, users are notified. The only possible reasons for such failures are disk failures, other application software failure, or purposeful damage to the files and data streams. You might note that one extraction option actually assumes and allows for editing changes within a document and puts the document back together correctly even after the positions for the extracted data are moved around. This presupposes that the user or editor does not alter the numerically coded anchors. Anchors are numbered (sequentially at current time although random numbering is under implementation), but order is not important for reconstitution.

Performance Issues

DIGITALDOORS extraction performance exceeds that of encryption and decryption by three magnitudes (1×IO fl). D/G/TALDOOR5 processes structured documents and database records at high speed with minimal; performance overheads and processes unstructured documents faster than encryption methods with reasonable performance overheads. Performance is enhanced with parallel processing.

DIGITALDOORS performs as fast as wire speed for financial transactions and structured data sets. Its slowest configuration—for unstructured documents (such as legal brief, messages, and e-mail)-performance is comparable to encryption; speed is traded for precision to minimize false positive and false negative extractions with complex linguistic elements and formats. Reconstitution always approaches wire speed, so performance issues are traditional disk I/O bottlenecks and network transmission latencies. All performance statistics were gathered using VTune, while latencies were calculated from IP monitor statistics and frame protocol analyzers.

Overhead breaks down into about 12% for a GUI interface, 5% for ongoing login (access and authentication) services overhead, 0.02% for data stream parsing,) Overhead is 0.03% for extraction of unstructured data. This is 55% for data matching and I/O, and 18% for decision making for handling each parsed unit in unstructured data. Stream outputs account for the remaining 9%. When the business rules for data matching and decision making are relaxed with structured data, the processing overhead is recovered. When output is offloaded to storage and/or immediately transmitted to destination, that overhead is also recovered. When the GUI interface is terminated, that overhead is recovered although 4 to 7% is reallocated to pipes, process management, and remote process control.

Latency on processing is either negligible (initial delay of 200 ms and 950 ms thereafter when processing is configured as a piped stream), or the entire duration required to process a data file as a block, just as with encryption. Note that most processing can be configured for piped streams; only two-pass extraction and substitution (advertising and. numbering) require sequential file completion.

Performance is critical in the security field because any additional overhead can halt critical operations or slow it down so much that the added security breaks the infrastructure. Also, security has been perceived as sunk cost, a nuisance, and a performance hog, and rightly so in many cases. Overhead for firewalls are ordinarily high, as high as 42% on CPU and storage resources, which is why most firewalls are implemented as separate hardware. Firewall process latencies approach 1700 ms, another problem not resolved to date, and in fact exacerbated by the very firewalls themselves. In spite of that architecture, false positive filtering, time outs, packet losses, and retransmissions plague firewall performance, still adds an overhead feedback effect of 17% to the primary hosts and server farms despite the separate firewall hardware. Encryption and public key infrastructures create an administration nightmare too. Encryption can represent as much as 34% of the overhead for each transaction, sometimes at both ends of the transaction. Security is perceived as an unwanted necessity given the protection levels of current technologies.

In addition, identification, authentication, and access control is perceived as a workflow hurdle and administrative nightmare, even in the best of circumstances. Lost passwords consume some 20% of network administration. Lost encryption keys will rival that, should encryption ever catch on. Firewall maintenance is a tug-of-war between effectiveness and available time, with the time-consuming patch management a catch up game at best. The imposition of overhead is certainly true for encryption, firewalls, and multi-network logins. We see bandaid solutions to these problems with new technology as it evolves from the traditional forms, but for the most part, security is a necessary counteragent to the evils of the world. Because that traditional security is so monolithic and yet porous despite the money and efforts applied to improve it, DIGITALDOORS represents a fundamental security initiative at the data and workflow level that overcomes cost, administration, performance, and value-added concerns.

Security with DIGITAL DOORS does diminish performance drain simply because there is processing and data I/O. The performance drain is different from traffic filtering and encryption, and provides several degrees of freedom for optimizing extraction performance. Extraction imposes different performance penalties, often with substantially less performance and labor overheads than traditional technologies. Its overhead can be offloaded to remote processors. It is eminently suitable for parallel processing, unlike encryption, which is characteristically a single continuous process. Block ciphers, such as Rinjdael, were intended to have multi-computational aspects, but the prospects for cracking such methods through transforms remain high. Extraction performs in the background, offline, in parallel, during idle times, and otherwise withdrawn from the resources of bound and critical transaction processing paths, on separate, parallel on shared CPUs or coprocessors, or on other linked resources.

DIGITALDOORS also exists as an access control and authentication infrastructure for a symmetric or asymmetric extraction and reconstitution process. It is basically a stream input/output process. Extraction is a data stream with output branched via different delivery channels (or storage units). Subsets of this technology as currently implemented provide near-line-speed, as discussed later in this section. The extreme implementation of extraction will only become more resource-bound and computational-intensive as we enhance the technology, add more artificial intelligence, and increase the support for data types to include more unstructured streams, more structured formats, sound, image, and multimedia filtering.

However, in contrast, Reconstitution is a trivial process where the performance concerns are only storage and network latencies and reliabilities.

CPU

It is important to differentiate DIGITALDOORS as desktop process for unstructured documents from an in-process server of structured documents with a subset of rules. The server processes items at the rate of 1403 item per MIPS, whereas the extractions rules and artificial intelligence engine must sort through and resolve conflicting assessments, processing items at the rate of 1 item per 12 MIPS.

Item, word, phrase, line, and paragraph extraction requires overhead comparable to encryption. This includes CPU processing and data retrieval, although note that the actual CPU resources are about 5% of the mathematically-complex requirements for encryption. About 95% of the effort is applied to categorization and the decision to retain or extract. In addition, reconstitution (to extraction what decryption is to encryption) requires 0.05% of the overhead of decryption. Extraction and reconstitution performance is therefore profoundly asymmetric in the worst case, and qualified to the write-once, read many asymmetry in data transaction processing. Furthermore, extraction overhead is highly scalable, responsive to nearly 100% linear parallel processing since the categorization process is fully independent.

Performance in certain environments increases from 600 to 9700 percent with fewer decision branches, reduced or eliminated dictionary matching, reduction in dictionary size, and optimization for the particular data environment. Currently, DIGITALDOORS extraction is "optimized" for freeform, generic, and multilingual documents rather than specific data or transactional formats and types. Keyword, numeric field, or typical database syntactic strictness simplify the extraction process, lending credibility to these assertions for dramatic performance improvements. Since CPU overhead for reconstitution is negligible, performance issues for reconstitution are irrelevant at this time, although there are known optimization tracks for optimizing storage requirements and network latencies described in later sections.

Storage

The extraction and reconstitution process is remarkable efficient. Extraction percentages can range from 0 to 100 percent. On average with our sample documents, we see extractions hovering around 6%, a number sufficient to create independence, statistical randomness, loss of context, and a highly functional security that is immune to external and internal attacks. At no time are storage requirements increased by more than 100% (that is, doubled), where on average overhead is retained at about 6% for both recovery streams and auxiliary (that is, optional) mapping data sets. Additional optimization of extraction output and recovery streams could achieve an ultimate efficiency of 100% with no increase in storage requirements, although we are unlikely to implement this technology until later releases. Disinformation and misinformation options implemented through extraction with substitution incur no storage overhead penalties.

However, note that backup, redundancy, and auxiliary options increase storage requirements. Each backup version, each duplication (one or more) will require linear increases in storage. This true for both local, networked, online, or near-line backup storage. Note that there can be extraordinary decreases in storage requirements and costs through the DIGITALDOORS process through the arbitration of non-critical data to less costly storage facilities and a reduction of about 94% in mission-critical data storage costs. Extraction creates this efficiency by partitioning data streams into non-critical and critical components that usually are stored separately.

The current extraction process implementation is coded to handle the generic unstructured text file with least amount of human interaction and the fewest number of problems. It is designed with massive language dictionaries, support for many languages and cultures, enhanced for many types of test data, and full coverage of linguistic complexities. Such all-purpose success does not optimize DIGITALDOORS for structured databases, small dictionaries, or simpler requirements. When DIGITALDOORS is optimized for financial transactions, for example, near-line speeds in software have been achieved. Storage or network data delivery latency reverts to the critical path. Solid state disks, Enhanced SCSI, FireWire, and network switching can bypass latencies inherent in deterministic FDDI, Token Ring, IP, and SONET infrastructures. When storage and network latencies are reduced to the point where optimized in-memory software becomes too slow, specialized DIGITALDOORS chips or USB Version 2.0 devices will provide gigabit wire speeds.

Network

Network performance issues depend on storage and delivery options. At no time are network overheads increased by more than 100%. More often, network traffic is increased by 6% in parallel with storage overheads. However, it is important to understand when and where extraction takes place, whether inline to transaction processing or after-the-fact. This prescribes data delivery paths and overheads, hence network loading. Note that parallel processing enabled through RPCs (described in a later section) will increase network overhead by up to 300%. However, segmented, switched, segregated, SAN, NAS, or backplane architectures will isolate the differential load from local network or WAN traffic.

Parallel Processing

Extraction is the process of linguistically reading a data stream and dividing it into critical and non-critical parts. The initial parsing (record, line, paragraph, word, sound, image, structure, etc.) is linear and efficient. This part of the process requires 0.03% of the CPU overhead (Intel CPU benchmarks), is and is not amenable to parallel processing. However, the data matching, categorization, and decision-making is independent for each parsed unit; these three steps (taken together for each unit) are structurally independent, and require nearly 100% of the DIGITALDOORS CPU overhead. These three steps are easily processed as separate threads (enabled already in the Win32 architecture), delivered to subordinated processors, or run as remote procedure calls. Note that non-isolated RPCs are likely to increase common network loads unless segregated with special network architectures. Predictions for performance range upward from 72% for each added thread, RPC, or processor, and remain linear except for data streams that exceed 1 GB in size.

Administrative Labor

DIGITALDOORS requires administrative labor. Sorry, there is no way around this one, except to make the pain as little as possible with as many options as desirable. It is equivalent to password administration within the typical host or network environment with change, add, move orders and lost, forgotten, or retiring passwords. We have created defaults where secure, established default values where feasible, and minimal levels of access control and authentication as normal, but the security reality requires some administrative setup and ongoing maintenance. We have included a ring-like group infrastructure to aggregate administration chores.

The administrative labor is comparable to ID and password control, as that is what it is. It is also comparable but not as complex and arcane as firewall filter configuration. Whereas ID and password control curtail access to most unwanted users and firewalls protect against known attack methods, in contrast DIGITALDOORS provides granular, mitigated, and stop-loss protection against known and unknown attacks because it is protecting the critical data.

Future releases of DIGITALDOORS will integrate directly with native ID and password controls, that single sign-on product vendors will seek to create hooks to DIGITALDOORS, and that biometric products will improve to a point where false positives, false negatives, and fraud methods make these viable alternatives to IDs and passwords for typical users.

User Workflow Disruption

User workflow control is the point of DIGITALDOORS. We try to make the process as unobtrusive as possible, but intrusiveness is the point to minimize unauthorized security intrusion. While biometric authentication is better in some ways to password entry, it does not solve all the necessary problems to ID and authorization control. Until biometrics become passive and continuous, we hope you will want our initial and ongoing ID and authentication control to protect your data from intruders, insiders, and acts of God.

Overall Performance Wrap Up

Worst-case performance is better than a magnitude (10×) faster than encryption, and better than 4 magnitudes (10,000) faster than asymmetric or symmetric decryption. We estimate that delivery of a data stream, web image, or document file will not require processing about 60% of the time, partial reconstitution about 30% of the time, and the remaining 10% will require complete reconstitution. Nonetheless, performance is rapid, on par with the simple delivery and display of a data stream, web image, or document file. Delays in accessing and reconstituting are 5 usec on 3 usec delivery and display of a 3460 byte data stream, creating an overall performance overhead of just under 4% for the end-to-end average workflow. In other words, the overall task requires a cumulative time of 81 usec to complete, with DIGITALDOORS adding just 5 usec overall.

While DIGITALDOORS is intensively logic-driven with character and string manipulations, the core technology is efficient and scales well and benefits proportionately from faster CPUs. In addition, although Visual Basic is interpreted, and thus is slower than machine or compiled programming languages, 85% of DIGITALDOORS processing is disk-bound. Shaving 0.3 usec on faster string processing is irrelevant in the face of multi-user shared disk conflicts which cycle times in the range of 500 usec. As a result, performance is not based on choice of the programming language, but rather on core system functions, API calls, and disk access. Faster databases, faster disk I/O, and caching result in proportionately better performance than reduction of code to C, C++, or otherwise. While we are interested in porting DIGITALDOORS to Java, Java is 14 times slower in basic tests than the Visual Basic DIGITALDOORS code. The reason for porting to Java is not performance-related, and in fact Java is likely to require new solutions to provide adequate performance in extreme service. The reason for porting to Java is to create a multi-platform distribution based on a single write-once/run-anywhere unified code source. Java runs across a wider range of platforms than Visual Basic at this time, thereby representing a better platform for' supercomputers, mainframes, and networked ASP services in use by spy agencies, large corporations, specialized military and governmental operations, and ISPs.

While MS Access is suitable for single user distribution (as with the shrink-wrapped version), it is a performance problem in multi-user environments. However, SQL and other previously mentioned databases provide simple upscaling and also distributed network access for paid online content distribution, data mining, and other applications of the DIGITALDOORS technology. In fact, in-memory databases or solid state storage provide performance enhancements in the range of 1200% to 38000%, in line with other TPC benchmarks for data-bound processing upgraded to cached, in-memory, or solid state storage. In fact, this technology provides additional benefits where simultaneous requests are made against the same data sources, as is typical in web-based HTTP delivery.

Platform

The DIGITALDOORS platform is 32-bit Windows. Windows has wide exposure, relatively open support, widespread usage, low cost, and support for a range of development tools. We have tested Linux and have ported some source code into Java for platform testing in both Windows and Linux. Java supports a significantly more robust distribution platform than Windows; it is important for our Department of Defense activities and obligations. Unix and Linux represent almost 100% of ISP and ASP platforms, and thus is an important market. At the present time, Windows represents nearly a 96% share of the desktop computing and corporate market, so Windows also is an important if not convenient platform. We have run end-user applications in Windows 95, Rev A and Rev B, Windows 98 Release 1, Release 2, Window NT 3.51 Workstation and Server, Windows NT 4.0 workstation and server, Windows Me, Windows 2000 Professional, and Windows 2000 workstation, Advanced Server, and Transaction Server.

The core DIGITALDOOR engine exists as an in-process application, as an out-of-process function, as a remote procedure call performed on another host, server, coprocessor, networked desktop machine, or appliance, and even as a separate networked processor unit. It, can work as an application, device driver, service, or other add-in. Input is basically a data stream where output is branched via different delivery channels. Latency on processing is either negligible (initial delay of 2000 ms and 950 ms thereafter when processing is configured as a piped stream), or the entire duration required to process and complete a datafile. Note that most processing can be configured for piped streams; only two-pass extraction and substitution (advertising and numbering) require sequential file completion.

The black box DIGITALDOOR engine can be configured for queue initiation, semaphores, HTTP, FTP, SMTP, or other non-state operation. It is not a difficult processor to create specialized CMOS chips with the engine and logic. USB coprocessors (USB release 2.0 not the current 1.1 version) promise another plugand-play option, as does a FireWire NAS or SAN connection.

Development Environment

Because we are breaking new 'ground', developing new algorithms, and creating new workflows, we selected the highest level of development tool we could find. Visual Basic (VB) was selected as the primary tool. VBScript and also Unix regular expression code libraries are used extensively. We selected MS Access and SQL as the basic database because it supports ODBC, JDBC (with third-party add-ins), and connects with most desktop applications including Microsoft Office. Access and SQL also represents a transition to more powerful multi-user relational and object relational database management systems through the SQL upscaling kit. It scales to Oracle, DB2, Progress, and other production databases including in-memory ones.

We chose Visual Basic for its speed of development, simplicity to test and try new workflows, its speed to market for both production and end-user shrink-wrapped applications, and its core support within the MS Office environment. Visual Basic also bypasses some of the many problems inherent in system stability with C and C++ applications. We selected Visual Basic for its ability to absorb code errors, to support complex rules, to reference external neural network tools including Prolog artificial intelligence libraries, to link to external rule databases and processing engines, and call other third-party controls. Visual Basic minimizes' coding errors, simplifies debugging, supports modules for extensibility of our own code and distributable third-party controls, and includes a wide range of our .DLL or .00Xcomponents to reduce code duplication and application size. In addition, since VB is the superset of VBA (Visual Basic for Applications), where VBA is the core development and customization language for the MS Office suite (96% market share), including Word, Excel, Access, PowerPoint, Explorer, Visio, CorelDraw, and Outlook. VB thus provides economies for development for MS Office integration.

This homogeneity also simplifies subclassing our core components and integrating the functionality within these and other standard applications. We have tried to conform to the component model of the Mozilla XUL in order to create a library of functions for extended usage and multiplatform redeployment. VBA is important to the development effort (as opposed to Java and most other languages except for C++ and C#) for embedding the Extraction functionality within the MS Office suite applications. Since Word 97, VBA—rather than the Word Macro programming language—Ins been the choice of macro development within MSOffice. With the release of the Office 2000 suite, the unification of development (such as resolving the slightly different CommandBars and the availability of different native functions in each application) means that anything developed for one application works with minor modification for the others within the MS Office suite.

Our technical team might have preferred TCL, PERT, Snobol, or Java. However, management decisions enforced uniformity of prototyping in Visual Basic, with emphasis toward CDO, VB.NET, and the unification in the runtime environment of Win 2000. Some Prolog was used for artificial intelligence and semantic parsing. The push toward rapid prototyping obviated some of the problems with C++, the conflicting MFC and ATL libraries, and the inherent memory release and garbage protection problems endemic with the IDE and programming environment. We have experienced similar problems with VB, in spite of its better memory management, but have worked around them, in order to create tools that will work in a production server environment using EXE, OCX, and DLL packages.

Visual Basic provides open access to COM, COM+, MTS, SOAP, XML, ActiveX, Java, and core Windows APIs. We used this liberally to solve a wide range of technical, performance and workflow problems. We have validated conversion to C, C++, J++, C#, and other development languages under the new .NET initiative (an as-yet-unproven resolution to bundling and DLL-Hell compatibility issues), but foresee only conversion to Java for complete network and host markets. There is a security concern with Java because a number of effective tools provide decompilation of the object code into source; this undermines our trade secrets. We are exploring obfuscation of Java source code, but haven't reached a decision. Discompilation of Visual Basic was formerly a problem with VB version 3, but strides in P-code complexity and the complexity of our structures have made this a moot point.

Visual Basic, like true object-oriented programming languages, is driven both by program flow, logic, interrupts, and events. As such, external and internal events can create unanticipated cascades that create flow of control or process problems. We are aware of this, and have endeavored to avoid these bugs and test for them in depth.

We have tested in-memory databases, solid state storage devices, and other performance-enhancing technologies with success and a clear view to high-performance requirements. The core DIGITAL DOORS technology also enhances the somewhat monolithic security services of Java, and as such, represents a significant marketing opportunity in RollCall, friend or foe identification, and multi-tier authentication. We expect to port the login, challenge, biometric, and identification friend DIGITALDOORS was designed as a networked process, so performance and scaling is not likely a limiting factor. Its applications are designed for distributed processing, upsizing, and multithreading. And remote procedure calls. Command & Control is a single administrative application, but it calls, threads, and invokes other applications and modules until it reaches the limit of RAM and swap space. Performance in a high-demand environment would not be compromised since extra hardware, hardware acceleration, I/O tuning, and even extraction in specialized hardware is feasible. One design issue potentially might present a performance limitation; the choice of how data (files or streams) are buffered for extraction is limited by available RAM and cannot reliably page to a swap file. We anticipate that we will address this known shortcoming within the .NET development environment and the Java and Unix structures have been designed to avoid any such repetition.

DIGITALDOORS is built as an executable with linked components, as an NT service, as OLE and COM services, and as a distributed server. Additionally, we are developing add-in components for various partners under our house label and partnership label to provide inline workflow processing as a seamless part of the parent application. Examples include MS Word, MS Access, and various security firewalls and E-mail clients and servers.

The data model is constrained by document formats. In fact, the data model is based on stream I/O such that applications would not be limited to letters, articles, files, but be extendable to recordsets, objects, Unixstream I/O, piped results, and even digitized data flows consistent with Internet, VPN, or wireless applications. Because implementation coincided with R&D and development of the security paradigm, at the current time, DIGITALDOORS operates against plain-text documents; this includes text files, E-mail, MIME mail, HTML, XML, and other message or data streams. We have worked with RTF files and tested operations on MS Word .DOC files. We anticipate that the next release of DIGITALDOORS will seamlessly process and perhaps even convert text to RTF, text to DOC, DOC to text, DOC to DOC, and handle other proprietary formats such as Excel spreadsheets, database records, BLOBs and other objects, and an array of inputs—without a need to convert sources through a translation or conversion utility. We have a basic structure for filtering MAPI-compliant E-mail (including attachments) that will integrate with Lotus Notes, Outlook, Groove, and similar workgroup tools.

DIGITALDOORS was designed to support global languages and comply with the Microsoft MLANG resource methodology. However, since Windows 2000, Visual Basic, and the core API is not fully Unicode- or ISO-compliant, and since MS Access, MS SQL, and other leading databases do not completely support linguistic independence, some languages will not be fully supported. Note that Java and JDBC are not fully Unicode compliant. Specifically, left-to-right languages (such as Arabic) and Asian languages will be addressed on an ad hoc basic should we determine that market share requires software development for sales into those markets. DIGITALDOORS, itself, is language-independent. The strings and messages are easily converted into other languages and referenced through the mlang.dll library and language-specific reference libraries. The spelling, language, phrase, and specialty dictionaries require specific translation for each target language and locale. Last count showed some 500+ languages. The American English (United States) dictionary contains 350,000 words, names and addresses, the English (Britain) dialect supplement adds about 4000 words, and the English (Australia) dialect supplement adds about 6700 words.

DIGITALDOORS is multithreading, initiates separate and concurrent processes, and is a good citizen within the Windows environment and Windows networking. It releases all memory upon termination, and frees resources to other prioritized applications during tight string processing loops and while awaiting database queries. DIGITALDOORS is also designed with controls to alter performance level using the Windows API. Priority can be reset from high to low, from foreground to background, and to coexist as an NT service.

Code Base

As previously described, the primary code base has been developed in Visual Basic with anticipation and advanced testing of the Microsoft.NET unified code base initiative and runtime library system. Some code is in C++, Java, and PL/1. Many components are packaged as COM or COM+Active X or DLL libraries in order to create a granularity in module packaging for sales activities and secondary technical consulting engagements. We do anticipate migration to various self-contained environments to support Unix RPC, Linux, OS/370, Java Enterprise and Bean systems.

From an organizational standpoint, the code base itself, consisting of modules, forms, classes, and properties which are overloaded to eliminate multiple code to perform essentially the same task. This minimized design error, coding implementation error, and simplifies the identification and propagation of bug fixes and enhancements throughout the DIGITALDOORS product line, optional modules, and technical licensing.

The single code does create a large memory footprint for the application. However, the distribution is efficient as libraries, dictionaries, samples, and components are not delivered unless necessary. Since many of the optional modules are COM or COM+ objects, the memory footprint is conserved, while integrity and delivery security of the product code and functionality is protected. As more of the code base is restructured as components, the memory footprint will be reduced and marketability of additional components will be enhanced. While this single-source code base does create a complicated make, production, and packaging system, however, the benefits of single source libraries more than outweigh the occasional CD and DVD mastering problems.

Suite Configuration

This material is extensive and contained within a separate paper, called Suite Configuration.

User Configuration

This material is extensive and contained within four separate papers, called Scrubber Configuration, UnScrubber Configuration, Administration, Access and Authentication, and Workflow Issues.

Markers, Fields, Labels, Anchors, Placeholders and Reconstitution

The result of DIGITALDOORS extraction of critical and important information is not a marked, labeled, anchored, or defaced file or data stream. DIGITAL DOORS does not as a rule use fields, anchors, or labels. DIGITALDOORS uses generic and statistically-independent placeholders, not anchors; placeholders formally convey no contextual or functional information. The relationship between the source data stream shell (remaining) and its critical and important information is mathematically random. There are no contextual, fractal, wavelet, or other known relationships or operational dependencies between sources, extractions, or generally within or among the subsets of extractions themselves. A script, recovery file, logs, or other data resources provide redundancy and the methods for enabling reconstitution. This includes:

Reconstitution script (also called a "recovery file")
Extraction database
Extraction log file
Image backup
Positive images (an extraction map)

The extraction results can be empty holes, no holes at all, holes filled with uniform placeholders, holes filled with generic placeholders, holes filled with random placeholders, holes substituted with misinformation, or enlarged with new information. The concept is that the primary file is modified only so as to be a subset of the data stream. A secondary recovery file is created so that the extracted source data stream can be edited, processed, and changed. Placeholders are not anchors. Placeholders or space fillers, but anchors imply some information, information in this case that has no context beyond extraction and data reconstitution. Please see the Glossary for term explanations.

These anchors can be moved, duplicated, or removed and the file will be properly reconstituted in the new order or format. If the anchors are modified, reconstitution will nominally fail. The anchors can also reconstitute that data stream, referenced by specialized file name or the encrypted process log database.

A special two-pass extraction process is used for enhanced applications; only for this enhanced usage are anchors of any sort added into the data stream. Specifically, sequential numeric encoding be used to reference URLs, links, or other external triggers. The anchors contain no contextual or real information; they are referenced by the external recovery script. The anchors "float" within the document allowing the document to be changed, The anchors can be deleted, copied, or moved. They cannot be copied or moved to another file over which a user has higher access and reconstitution rights in order to discern what information was extracted at each anchor. The anchors are in that sense file-specific because the recovery script is file-specific. The anchors can contain or reference misinformation, disinformation, advertising, or banners.

Placeholders and anchors, if used at all under user preference, are random and contain no information. Placeholders are random, lacking external information content whatsoever, whereas anchors have some external reference but no internal meaning or context. Anchors are at most sequential numbers, which repeat in many other files. The anchors thus fulfill mathematically provable theorems that no information content is represented.

Placeholders and anchors are of these types:
Null set (nothing even there)
Extraction indicator
Extraction indicator of extraction size Extraction indicator of random size
Extraction indicator with serialization
Substitution of random information of like category
Substitution of indicated information (misinformation and disinformation)

Under the concepts of Claude E. Shannon, information theory regards information as only those symbols that are uncertain to the receiver.[1] You can request the seminal paper, A Mathematical Theory of Communication, from us or locate it online at Bell Laboratories (Lucent Tech) at http--://cm-.bell-labs/cm/ms/what/shannondat/paper. For years, people have sent telegraph messages, leaving out non-essential words such as "a" and "the." In the same vein, predictable symbols can be left out, like in the sentence, "only informatn esentil to understandn mst b transmitd." Shannon defined that uncertainty is the very commodity of communication, where entropy ($3^{RD}$ Law of Thermodynamics) defines uncertainty. DIGITALDOORS exploits this signal to noise ratio theory by adding to the uncertainty through the increase of information entropy. This enables security, privacy, confidentiality, and anonymity; in contrast, it also enables survivability and makes risk mitigation possible by exploiting certainty with extractions. A. N. Kolmogorov, generalized Shannon's ideas, and put them on a slightly more rigorous mathematical basis. These ideas had a great influence in a wide range of mathematical fields, among which is the new field of the entropy theory of abstract dynamical systems. In concise view, both placeholders and anchors contain no informational content, even when substitutions are made with false or misleading content:

Placeholders and anchors are not useful as a route to compromise security

Placeholders and anchors contain no information content

Substitutions contain no information content

Substitutions are only misinformative to people by providing a false certainty

[1] A unifying theory known as information theory was developed and became the subject of Intensive research. Claude E. Shannon, whose initial ideas appeared in the article The Mathematical Theory of Communication" in the Bell System *Technical Journal* (1948) defined information to include the messages occurring In any of the standard communications media, such as telegraphy, radio, or television, and the signals involved in electronic computers, servomechanism systems, and other data-processing devices. The theory is even applied to the signals appearing In the nerve networks of humans and other animals. The signals or messages do not have to be meaningful in any ordinary sense.

The chief concern of information theory is to discover mathematical laws governing systems designed to communicate or manipulate information. It sets up quantitative measures of Information and of the capacity of various systems to transmit, store, and otherwise process Information. Some .of the problems treated are related to finding the best methods of using various available communication systems and the best methods for separating the wanted information, or signal, from the extraneous information, or noise. Another problem is the setting of upper bounds on what it is possible to achieve with a given information-carrying medium (often called an information channel). While the central results are chiefly of interest to communication engineers, some of the concepts have been adopted and found useful in such fields as psychology and linguistics. The boundaries of information theory are quite vague. The theory overlaps heavily with communication theory but is more oriented toward the fundamental limitations on the processing and communication of Information and less oriented toward the detailed operation of the devices employed Logic defines the assertion that the anchors contain little or no information. The null set-is not ascertainable in the scrubbed data and it is not obvious except by context (of the missing words and phrases) that the data is defective. The extraction indicator only indicates that something has been extracted; this does not increase the informational content of the scrubbed data and only confirms that the data is defective. It does not add to the certainty of the data content, only to the certainty that it is incomplete (defective). When the extraction indicator represents the size of the extraction, it cannot provide information within context. The scrubbed data itself contains no more information without the application of external data. Therefore, even though the data, scrubbed and replaced with extraction indicators showing extraction length, contains no additional information.

In contrast, even when the anchors are random in length, the informational content is not decreased because no additional information has been taken away, no certainty of information content is added, because by the last assertion, none was provided by extraction anchors with size. We have included this option. only because the market fallaciously thinks it adds security. However, in a practical environment, people do bring a sense of context and external information in memory to the scrubbed data, so in that sense, and that sense only, is the value of the information reduced. Information content is not affected within the large scope of digital information processing and networking. By the same logic, when serialized anchors, such as [000000089], are used instead by two-pass extraction to create advertising, linkages, and other ancillary applications of DIGITALDOORS, no additional content is added or removed from the data. Likewise, the difference between random substitution of words and phrases is immaterial. While something has been added to the scrubbed data, it has no truthful content and does not generally add to uncertainty; however, it does adds uncertainty to the mix—if it externally known that the substitutions could be misinformation or disinformation.

The initial concept for the recovery script of file was as a single file with all the extraction and placement information. Indeed, this represents the major implementation efforts to date. Access, authentication, and various databases defining levels drives the reconstitution process. However, security can be increased and the degrees of freedom for distribution can be increased by creating levels of recovery files. This would preclude reconstitution with "basic" files beyond certain limits no matter what without access to the additional levels of recovery files. This is being implemented during the first quarter of 2001.

Reconstitution removes all reference to the anchors and reference to recovery files, if any as is the case. The reconstitution represents the complete or partial subset of the original source stream. Reconstitution is a one-pass process for both the simple and two-pass extraction, and usually proceeds at 10,000 times faster than decryption, at the rates of 230 words/s on Pentium 90 MHZ, 890 words/s on a Pentium II 200 MHZ, and 3589 words/s on a Pentium III 500 MHZ. Quad-CPU platforms provide linear performance improvements when balanced with SCSI-III or Firewire storage area networks.

The recovery file optionally contains reference information to the source data stream. Generally, the recovery file contains only extracts. The recovery file becomes a useful data mining result in its own right for other applications. However, the recovery file lacks links, context, or reference to the source data stream. An encrypted database, accessible only with multi-tier authentication, contains the contextual reference between source, scrubbed distributions, and extractions. Note that process output files or data streams can be randomly designated so as to preclude any reasoned or even accidental linkages between source data streams, scrubbed results, recovery files, and other data records or log entries.

Chain of Custody

The chain of custody defines a process where data and evidence is controlled by one or more people and processes beyond reproach. In the case of DIGITALDOORS, this chain describes control of the data streams, extracts, scrubbed skeletons, the recovery scripts, and log files. In general, the DIGITALDOORS controls and manages this entire chain without disclosure. However, this chain of custody fails without property consulting and integration for Internet- and web-enabled distribution. Web-enabled displays, such as the HTTP and XML protocols are open and accessible, provide a ready means to copy the source, copy the screen, or cut and paste. 'Certain ASP, HTTPS, and scripting in conjunction with DIGITALDOORS provide web and Internet security when implemented correctly. Process, workflow, and display must be analyzed to preclude gaps in the custody chain of an open and distributed environment.

Unique Architecture

The current security paradigms include access control and encryption. Access control implemented through passwords, authentication, biometric authentication, and physical certification is recognizable as username and password pairs and firewalls. Usernames and passwords are breached through a number of workflow complications, active demon dialing (brute force), adventitious mistakes, failure to enforce basic procedures, and social engineering. Firewalls are breached by brute force, implementation errors, software bugs, design flaws, new combinations of multi-pronged attacks, as well as adventitious mistakes, failure to enforce basic procedures, and social engineering. It is also important to recognize that firewalls do not protect against internal attacks or external attacks aided by internal help.

Access control, while widely implemented, is seen as a necessary evil that complicates workflow. Few applications enforce or include random or spot security checks. The number of physical or logical bypasses limits the effectiveness of access control. In addition, the massive workflow shifts attributable to E-mail, shared application access, application sharing, data sharing, networks of business functionality shared with partners and even competitors, exchanges, data distribution, web hosting, and wireless enablement severely compromises the effectiveness of current access control methodologies. Specifically, access is no longer physically controlled or actual location(s) even known. It is often mobile too. Distributed information extends the time frame for its accessibility to an unlimited interval, through screen shots, ongoing access, or downloads.

Encryption, variously implemented through obfuscation, ciphering, table lookup substitutions, or mathematical processing, suffer from a number of flaws. The most obvious is its lack of mathematical integrity. No encryption method has been proven. Ever. The core problem with security is that the current paradigms cannot be proven, only disproven. Dispersion is provable subject to some constraints of independence, workflow, and storage, as defined by the various proof papers. Realize that all historical obfuscation, ciphering, and substitutions have been broken. The strength and protection from mathematical encryption, based on symmetric, public key, asymmetric, shared key, and others are subject to faster computers, parallel processing, new algorithms, and even new technology such as quantum mechanics. Despite the well-publicized flaws, failures, and breaches of encryption, the workflow and implementation problems with encryption are actually superincumbent. Hence, this is reason for the new-found emphasis on network resiliency and data mitigation instead of barrier- and encryption-based security.

The most undermining actuality of encryption is that the seeds of its own decryption are embedded within the data and encryption encapsulation. Statistical analysis is often applied to rapidly decipher the data contents and brute force is also a solution with sufficient time or improve algorithms. Brute force is not necessary exponential either. Content analysis of the decryption of partial results streamlines rejection of unlikely keys. In addition, since most modem encryption is based on paired prime numbers, prime number factoring also streamlines deciphering. Prime number lookup tables and prime number factor tables reduces the set space for decryption keys. Note that the distribution of prime numbers decreases by Reimann's Zeta function as the size of the key increases. When the key size is doubled (100%), the number of prime numbers only increases by about 2%. In other words, as keys get longer as they inevitably must, given Moore's Law and development of new technology and better algorithms, the keys become easier to guess . . . let alone factor.

The new US encryption standard will eventually use Rinjdael. As a block cipher dislocation, it is as previously explained subject to the Square attack methods. RSA applies prime number generation and is subject to prime number solution. Consider also prime number searching using harmonic analysis described in the September 1988 German issue of the *Scientific American, Sepktrum der Wissenschaft*. The article on number theory briefly mentions Stanislaw Ulam's Spiral, which is a way of mapping the set N of natural numbers onto the grid N×N. Marking all prime numbers black, Ulam saw patterns emerge providing useful technology for mapping and locating prime numbers based on Hough's Transform.

Specifically, encryption is slow, even with supplemental, external, or coprocessor technologies. The increases in key bit size from 56 bits to 256 bits imposed a 64-fold increase in processing overhead. As it has become clear that even 512-bit and 1024-bit keys can be defeated within hours by corporate hackers and minutes by government agencies, the orders of magnitude required to apply more complex and longer encryption will slow encryption to a crawl. Although computing capacity has doubled every 18 months (in harmony 'with' the principles of Moore's Law), the pressure on key length has outstripped that pace. Furthermore, computing capacity has doubled on the desktop and server end; supercomputer capacity has not kept pace, even with the parallel and scalar designs.

Encryption sluggishness is a two-way street. Encryption time is symmetric with decryption time. This is fundamentally true with both asymmetric and symmetric methods, private and public key methods, and most escrow and third party methods. As data access shifts from screen display to shared processing metaphors, the process latency times and cumulative queuing delays will represent times in excess of routing and network delays, undermining effective real-time operations.

Of even more concern are the complications encryption imposed on workflow. Although encryption can be implemented at both ends of a process (or multiple steps in a process) technically as an inline piped procedure, there are fundamental security and distribution control problems with keys. Specifically, the two parties or multiple parties must agree on the symmetric or asymmetric encryption keys. The key, whether symmetric or two part must somehow be delivered to the recipient. Keys can be intercepted, copied, and redistributed. Distributions of a single source to multiple recipients increases the workflow complexity in that either multiple unique keys mast be distributed or partially compromised by the single key. SSL and similar technology ships the key in the same time window as the delivery of the data thereby creating a very viable interception possibility. Interception has been demonstrated in the press.

Although the interception of encrypted information is supposedly protected by the encryption wrapper, encryption can fail with some social engineering. Specifically, a hacker or unintended recipient can participate in the distribution of keys by posing on the intended recipient, and thereby defeat all security whatsoever. Although encryption is in place, the hacker or unintended recipient has the key anyway.

Encryption keys have other social engineering problems. Alternatively, keys can be issued by key escrow agents or third party trusted vendors. As has been evidenced by many such similar episodes as the CryptoAG debacle, there is no guarantee that the encryption technology, the key issue, key escrow, or even implementation is free from trap doors, Trojan horses, and secret back entries. In addition, in spite of any trust assured or guaranteed through third party agents, there are no guarantees that keys will not be released by insiders, moles, paid informants, or under duress of court orders.

Encryption and convolution encoding also presupposes buffer space sufficient to contain the entire stream during the process of encryption and description. Large data streams and documents can overrun the available space, thus limiting these technologies. This is particularly the case as prime-number Triple-DES encryption gives way to convolution schemes such as the new AES encryption code based on Rinjdael. Blocks are literally reorganized in relation to other blocks and all are in-memory units until encryption completion.

Encryption is also order-sensitive. If a data object is encrypted by one method and set of keys, then encrypted again by other methods or keys, recovery can only be effected by the reverse application of method and keys. As encryption proliferates inside of workflows, maintaining this order is not always feasible, or possible, acid decryption failures are becoming more frequent. When processing is combined with encrypting as part of workflow, the stepwise failure to decrypt and then process renders not only the encrypted message irrecoverable, but is also likely to abend the data processing operations with flawed "data." Note that knowing whether to use DES, Triple-DES, or how to handle multipart keys as part of an automated workflow is also important because the use of the wrong method will merely pipe gibberish into the step in the process.

Failure to recover encrypted data often entails complete data set loss or a complex process beyond the capabilities of most organizations to recover or reconstruct the sources. Lost encryption keys, damaged encryption containers, and process order failures render encrypted data irrecoverable. This could require a process restart at best or require data regeneration from the start.

DIGITAL DOORS is designed to address and overcome the flaws in existing data security technologies. It resolves a number of problems in security, survivability, privacy, anonymity, and confidentiality. The DIGITAL DOORS paradigm is based on compartmentalization, dispersion, and chaos theory. It describes a condition of security based on the absence of critical and important information, the diffusion of critical information and components, and entropy to distort context and reference with information scattering and increase complexity or entropy within the data information system (as defined by Jeremy Campbell in the Grammatical Man, Simon & Schuster, 1982). This technology has been replicated from agency, military, historical, and theoretical work by such as Sun Tzu, Ron Rivest, George Patton, etc. . . .

Data Types

DIGITAL DOORS can comprehend most data types, such as documents, databases, audio, and video. Currently, the primary support is all plain-text data types. This includes ASCII text, UTF text, Unicode text, HTML, and XML. DIGITAL DOORS can process rich text format (RTF) as input and output, a useful functionality as it retains the color coding of the extraction process. We convert among plain-text, HTML, XML, and RTF. We currently read DOC and output to these other formats. We have tested with streams and file sizes exceeding 8 MB. We have experimented with Corel WordPerfect, Microsoft Word, MS Excel, MS PowerPoint, and various data record formats, all with encouraging results. We have worked with record sets, memo and long binary fields, and BLOBs. Graphics processing and object recognition awaits completion of partnership negotiations. We have processed MIME-encoded data and other E-mail formats, noting the attachments and processing these attachments (singular or multiple) in some cases when they conformed to the plain text support. Full .DOC and .WPS support is under development, as is inbound and outbound E-mail filtering and dispersion. Of course, complete E-mail support and processing of attachments of any type represents and integration of those two separate development tracks.

The problem of .DOC, .WPS, and E-mail data is that the information is embedded within a structure that provides not only the contextual meaning, but also various presentation and processing content. In other words, for example, the MS Word document contains the text and the formatting within the same file. This complicates extraction. The content must be scrubbed apart from the structure and the formatting, returned to within that structure and formatting for seamless workflow. In addition, all editing changes, redlining, summary information, and ownership is part of a collection within the document header. This material is not part of the document as it is usually seen. However, it can and does compromise security unless scrubbed. We are working on developing methods to process and extract this information. Plain ASCII text (which does not embedded format codes as high-order bytes) suffers none of these complications.

Of course, HTML does not suffer these same problems either since the formatting is for the most part simple. XML separates the template and the formatting in the document type definition (a "DTD" file) and the style sheets. However, this raises second order problems as the style sheets and definitions are likely to contain identifying information. Tags could include names or other information. Furthermore, paths, links, and URLs also may indicate ownership, storage locations, passwords, and other compromising information. This is similar to the MS Word document summary and editing collection problem. It is serious, but we are serious about solving it, too.

DIGITALDOORS supports HTML and XML in context; it is not merely a flow-through of plain-text. The HTML 3.2 specification is supported with a complete dictionary of HTML keywords. In addition, the user can always add missing or new keywords to the exclusion dictionary. Since XML uses only a handful of predefined keywords and the rest are defined with document type definition files, the process parses keywords against the standard XML markup pattern.

We anticipate adding support for filtering against the DTD file, and after processing, checking the results for well-formedness and validity with a XML syntax checker. Although the extraction process creates a restitution file that will restore the source verbatim, it is also important for functional workflows that the scrubbed XML files also function correctly.

The extraction process uses sophisticated pattern matching and context searching to match not only individual, specialized, and dictionary words, but also linguistic parts of speech. Emphasis is on English syntax, but support for other languages is also improving. The tools support recognition of arbitrary addresses, phone numbers, dates, e-mail addresses, and URLs. For example, not only is the standard URL address http://www.companyname.comrecognized but most other master domains, ftp addresses, arbitrary paths such as w3.org/master, specified addresses with ASP and search parameters, and also the abbreviated ones are recognized as well.

DIGITALDOORS uses databases in a number of capacities. A database stores linguistic structures. A database contains a sizable dictionary of categorized words and phrases. There are also supplemental dictionaries for professions, government activities, English dialects, and foreign languages. There is a dictionary for user-specified code words, relevant in many military, governmental, and operative functions. There is a special list of terms and forms for complex searching and parsing. DIGITAL DOORS maintains a number of databases detailing its own state and process in the form of action logs, process reports, and scrubbed file histories. Although most of these dictionaries are stored in first-normal ODBC form, some are stored as .INI files. We have experimented with XML structures and XML hierarchies for storage. However, the standard relational ODBC format provides higher performance by several orders of magnitude.

Development Process Enhancement

Product design has been and remains iterative. Developers and beta users often stumble on new metaphors and new applications for the extraction technology, and these get incorporated or are added to our wish list of new features (about 400 strong as of December 2000). We have added 3 wizards to streamline the user interface for Scrubber. The most pressing dilemma are threefold; simplifying the user interface (that is, the "GUI"), enhancing and making the workflow very plain and obvious, and matching the operations of the diasporagraphy process with how people and organizations do business.

Multiple Tier Authentication and Access

DIGITAL DOORS applies a multistage authentication process. It applies traditional 1-stage authentication, and augments that with a newer Internet-required 2-stage authentication implemented with at least 256-bit CryptoAP1. The encryption engine is interchangeable with many others, including, Blowfish, DSS, and Rinjdael. In addition to this established process, DIGITALDOORS adds 7 additional layers of validation. The first is random two-stage relogin. The second is the random presentment of challenge questions. The third is random biometric authentication by a wide choice of technologies. The fourth method is the challenge of a friend or foe question, posted internally and changed daily to ascertain access currency to overcome the traditional system administration failure to invalidate 1-stage authentication of terminate, retired, and resigned employees. The fifth and sixth stage validations actively and instantly disable access based on group settings, time parameters, and threat modes. The seventh mode relies on local certification or remote viewing by another validated party to corroborate identity and access. This validated party might be the system administrator, a manager, or a random peer to constrain collusion. Note that the chain of custody is always preserved. The AntiCopy function and the time-limited release mechanisms additionally provide a means to retract and limit the risk exposure. Details are available in Frequently Asked Questions and Multitier Access and Authentication white papers.

Workflow

Workflow represents QUI, simplicity, and integration with how people accomplish work. Most encryption technologies are neither simple nor address the complexities of the workflow process. While DIGITALDOORS makes great strides in integrating security, privacy, confidentiality, survivability, and anonymity into the normal workflow, we are still discovering how different users and organizations operation. As such, the workflow is still developing. Implemented, but most technical description is forthcoming.

Internet Model

The software can exploit internet interfaces. Implemented, but most technical description is forthcoming. The tools for extraction and web search (several hundred engines) has been partially implemented. This process makes it possible to submit extracts for data mining and Internet-enabled exploration.

Network Model

The software can exploit network interfaces. Implemented, but most technical description is forthcoming.

Server Model

Designed and partially implemented, but DLL, RPC, and ActiveX server not completed. Most technical description is dependent on deliverables.

Desktop Model

Implemented (Dw!TALDooR5 and Basic Scrubber), but most technical description is forthcoming.

Add-in Model

Partially implemented and technical description is forthcoming.

Filter Model

Partially implemented and technical description is forthcoming.

Source File to Target File

Implemented (D/G/TALDODR5 and Basic Scrubber), but most technical description is forthcoming.

Source Data Stream to Target Data Streams

Implemented (D/G/TALDa0RS and Basic Scrubber), but most technical description is forthcoming.

MS Word (Office) Add-in

Partially implemented and technical description is forthcoming.

E-mail Filter for SMTP

Partially implemented and technical description is forthcoming.

E-mail Filter at Firewall (for Outbound)

Partially implemented and technical description is forthcoming.

MS Windows GUID Tagging

Not implemented; under, Windows. The GUID random number generator is quasi-random. This presents numerous problems in terms of cracking any tags generated by a known and flawed system. Secondly, duplicate sags are possible and this would create a number of potential reconstitution problems.

Components

The DIGITALDOORS process comprises 30 separate components mapping to five primary umbrella modules. The modules include:
  Command & Control: network, system, and data management with a control panel to access all functions, 'log' events, review and report on modes
  DIGITALDOORS: data extraction
  DIGITALDOORS: UnScrubber, data reconstitution
  Administration: user access control through identification, authorization, and biometrics and configuration
  User Login: user access control These modules (described in functional, design, and implementation detail) map into the following workflow procedure components in multiple ways:
  Administration
  User Logon
  RollCall
  User Access
  User Challenge
  User Biometric Authentication
  Identification Friend of Foe
  Atomic clock time setting (for security and authenticity)
  Command and Control
  Extraction
  Extraction (Basic Version)
  Reconstitution
  Substitution
  Remote Storage Dispersion
  Dictionary Maintenance
  Reporting
  Logging
  File Erasure and Removal
  Backup
  Time-limited Exposure
  AntiCopy
  Distributed Path Delivery
  Distributed Path Display
  Checksum
  Encryption
  Process Priority Control
  MS Office Add-in ***
  OS hook and I/O intercept
  MAPI E-Mail Add-in ***
  Macro and Hot key functions to process files ***
  Operation System intercept of file operations through filter ***

Administration

This module establishes administrator rights, sets an encryption key for the enterprise, adds, changes, and otherwise modifies user access to the functional suites. Other functions include configuration of login frequencies, login attempts before users are locked out from additional tries, friend or foe authentication, challenge, and biometric setup, and similar RollCall functions. Specifically, user rights are established per function, by time of day, by threat mode, by document type, by word categorization, what and when they can see reconstituted documents, whether reconstituted results can be restored to a file, copied, or widely disseminated, and by personalized challenge and biometric patterns.

User Logon

User logon is different from user access in that login is controlled not only by the usual identification and password pair but also by other elements. Specially, login is limited by time, location, and threat mode. The login is also time limited. A random but timed dialog will require a repeat of the user login. A failed user login may not necessarily terminate user access; instead, a security officer or administrator might be notified of repeated login failure.

In addition, timed (RollCall) challenges personalized to each user are initiated at random intervals. Similarly, biometric checks are initiated at random intervals. The friend or foe challenge question (Identification of Friend of Foe OFF)) requires the appropriate daily answer, thereby assuring authenticity and authorization to prevent former employees from gaining current access to information and resources. A failed challenge, biometric test, or friend or foe identification may not necessarily terminate user access; instead, a security officer or administrator might be notified of secondary login failure. Idle is also automatically logged off after a time as determined by administrator configuration. The timed login challenge is random but the framework for the challenge is adjustable by the administrator in the administration module.

Technically, messages of functional requests, user login status, user rights, and threat modes are relayed between Digital Door modules by IP messaging through the WIN-SOCK library. These are directed with a high degree or security since application handles, times, and checksum information is generated on fly to prevent hacking, counterfeiting, or faking. Protocol analysis is not useful because the sockets and context change with each call.

RollCall

RollCall consists of two major features. First, logon, authentication, biometric identification, challenge questions, and identification of friend or foe are randomly asserted. This provides certification that the user at a system or process is the same as that which initiated the process, that the system or process has not gone idle and unattended, and that forged access will be detected. Forged access can be terminated at will, or maintained with notification and onsite confirmation, trace, route trace, or retaliation.

The second feature of RollCall is as a virtual or physical authentication of the user by authenticated parties. This means that while a forged access or fraudulent logon (one create by unintended access to administrative network, system or DIGITAL DOORS maintenance) is challenged and certified by other authenticated parties. In order to limit collusion, challenge and certification is not always by the same, known, or controllable parties.

User Access

This module is the entry into the DIGITALDOORS system. A login is necessary prior to access to most functionality within DIGITAL DOORS. The exception is that a "default" user is allowed to create and view scrubbed data flows with limited access to reconstitution functions. This allows creation of secure documents (that can be restored by anyone with suitable authority) and the ability to view documents without selected and identifiable information. The concept is that documents, files, data sets, and other data streams can be delivered to a public audience without fear of interception, decryption, or understanding. In fact, with sufficient context and appropriate extraction levels, the broadcast documents might represent sufficient information for general purposes without any reconstitution. Access can be controlled by distribution location, time of day, user, threat mode, type of document, word context, and functional parameters. This is also initiated by RollCall.

User Challenge

This is an optional module for user identification and authorization. A user challenge is a question with answers previously established by the user and the administrator. Many such questions are established. One of these questions are randomly asked at random intervals. Answers can be entered precisely or selected from a multiple choice list. The administrator sets the options of fixed answers, multiple choice selection, or a random selection of fixed answers and multiple choice ones. A failed challenge may not necessarily terminate user access; instead, a security officer or administrator might be notified of secondary login failure. Idle is also automatically logged off after a time as determined by administrator configuration. For example, the administrator might query a user as to a favorite food and expect a correct answer within 50 seconds, allowing for typing errors and such. Failure is adjustable so that one failure might be forgiven, but several will initiate a need for security measures or forced logout. This is also initiated by RollCall.

Questions are maintained within a database. Answers are encrypted. Both questions and answers are changeable. Different users can get the same or different questions with obviously different answers. The user challenge timing of each question is random but the framework for the challenge is adjustable by the administrator in the administration module.

Technically, messages of functional requests, user login status, user rights, and threat modes are relayed between Digital Door modules by IP messaging through the WINSOCK library. These are directed with a high degree or security since application handles, times, and checksum information is generated on fly to prevent hacking, forgery, or fakery. This is also initiated by RollCall.

User Biometric Authentication

This is an optional module for user identification and authorization. A biometric challenge is posed to the user. The challenge could consist of a single biometric test or one randomly selected from a list or possible and configured tests. A failed challenge may not necessarily terminate user access; instead, a security officer or administrator might be notified of secondary login failure. Idle is also automatically logged off after a time as determined by administrator configuration. For example, a test might require a voice print, a handwriting signature, a thumb print, or an eye scam. Failure is adjustable so that one failure might be forgiven, but several will initiate a need for security measures or forced logout.

Biometric metric tests are maintained within a database. Patterns are encrypted. Both questions and patterns are changeable. Different users can get the same or different tests. The test timing is random but the framework for the challenge is adjustable by the administrator in the administration module.

Technically, messages of functional requests, user login status, user rights, and threat modes are relayed between Digital Door modules by IP messaging through the WINSOCK library. These are directed with a high degree or security since application handles, times, and checksum information is generated on fly to prevent hacking, counterfeiting, or faking new IP addresses and access rights. This is also initiated by RollCall. Protocol analysis is not useful because the sockets and context change with each call.

Identification of Friend or Foe (IFF)

This is an optional module for user identification and authorization based on the concept that each user needs to know the daily password. This is implemented by challenging each user with the daily question and matching the wording, spelling, and punctuation of the appropriate response. A failed IFF may not necessarily terminate user access; instead, a security officer or administrator might be notified of this failure, although any such failure should be taken very seriously because the failure indicates intrusion, failure to check the daily challenge, or a terminated employee or business partner 1FF questions and answers are maintained within a database. Answers are encrypted. Both questions and patterns are changeable, and forced to change on a daily basis. Different users get the same tests each day. The IFF challenge timing of each question is random but the framework for the challenge is adjustable by the administrator in the administration module.

Technically, messages of functional requests, user login status, user rights, and threat modes are relayed between Digital Door modules by IP messaging through the WINSOCK library. These are directed with a high degree or security since application handles, times, and checksuim information is generated on fly to prevent hacking, forgery, or faking. This is also initiated by RoilCall. Protocol analysis is not useful because the sockets and context change with each call.

Atomic Time Setting

It is necessary for most aspects of DIGITALDOORS that file access timings, reports, output files, log entries, and other process records have and retain proper dates and times. To this end, the system date and time is checked against various external automatically-set time servers. The choice of the time server is randomized so that time settings cannot be altered, allowing something to be processed, and then the time settings reset without anyone being the wiser. The time service call is performed invisibly, logged, and randomly. The technical background is a TCP/IP request to an Internet time server using the Network TimeProtocol (NTP). While it is possible to track and perhaps intercept the protocol request with a protocol analyzer, this represents an effort to undermine DIGITALDOORS at a secondary level that is unlikely to be effective. Failed NTP calls not only are logged, but synchronization failures and clock resetting also initiates a message to the system administrator (via messaging, e-mail, pager, phone, or other configured and supported mode). This is also initiated by RollCall.

See FIG. B16 for atomic time setting and FIG. B15 for Zone Alarm.

The atomic clock function applies the NTP protocol; as such, like other Internet access functions, it must pass through any routed security or firewalls. You can configure most firewalls to allow either the port, specific IP or NTP address, or the application name to have priority and allowance to function through the firewall. The IP and NTP addresses vary by installation. The application handle is variously ATOMIC TIME .EXE, ATOMIC-.EXE, or ATOMTIME.EXE. Below is an example of the security firewall ZoneAlarm (available for individuals or sites) establishing allowance for the time set function, A New Approach to Security and Survivability DIGITALDOORS technology helps organizations safeguard their critical data against security vulnerabilities and insider threats. The technology addresses the four critical security demands, as adopted in 1999 by the National Research Council, Trust in Cyberspace, Committee on information Systems Trustworthiness. The DIG!TALDOORS technology conforms to the committee's following criteria:
1. Risk mitigation rather than risk avoidance
2. Technologies to hinder attacks rather than prevent them outright
3. Add-on technologies and defense In depth
4. Relocation of vulnerabilities rather than their elimination DIGITALDOORS technology is designed to automatically select, protect, and release under (access and multi-tier authentication control) critical information to ensure its survivability and security. Critical information is defined as specific granular data within a document, data stream, piped process output, file, database, server, or data center, which might possess economic, strategic, or any other value essential to continuing vital missions.

DIGITALDOORS technology addresses the Achilles' Heel of security, the threats initiated by insiders, and attaches a deterrent to activity against data storage and operations. The technology offers the highest security levels by creating an independent separation between the critical and non-critical data, while retaining a unified display for authorized, authenticated, and validated patties. The technology offers the major advantage of the ability to transfer and share data between closed and open networks while maintaining top security through controlled release of the critical data.

DIGITALDOORS security differs substantially from encryption and existing commercialized technologies. It can be used Instead of, or as an add-on to, existing security technologies. The technology was developed initially for defending against national security information Warfare (Infowar) vulnerabilities and providing organizational survivability capabilities that surpass existing rollback and recovery practices. Applications include E-commerce, E-mail, web-based transaction processing, and workflow privacy.

The Security Environment

The recently released report of the U.S. Department of Defense Science Board Task Force on Information Warfare Defense (1996) includes these excerpts, and the previously listed four critical needs, define a new security solution: "There is a need for extraordinary action to deal with the present and emerging challenges of defending against possible information warfare attacks on facilities, information systems, and networks of the United States which would seriously affect the ability of the Department of Defense to carry out its assigned missions and functions." "Security is certainly important (with some data indicating that the number of attacks is growing exponentially and anecdotal evidence suggesting that attackers are becoming more sophisticated every day) but it is not all that is important. The substantial commercial off-the-shelf (COTS) makeup of an MS, the use of extensible components, the expectation of growth by accretion, and the likely absence of centralized control, trust, or authority demand a new approach to security." Chapter 7, Conclusions and Research Recommendations. page 241.

The DIGITALDOORS vision is the widespread implementation of our new broad-spectrum technologies for survivability, security, control and management of critical data. Specifically, it transforms any computer data stream or document into an instant digital information and e-commerce platform and it enables a free flow of digital information between closed networks and open networks using the highest standard of security, It addresses not only security but also as co-resident functions, survivability, privacy, confidentiality, and anonymity, precisely defined and described later in this paper. It provides coverage of the four NRC criteria presumed necessary to effectively combat the new infowar.

Various government agencies and the military are skirting US laws with the approval of the US Department of Justice in order to test system security, hold people accountable for losses, and train people to identify problems and trace perpetrators. Various aspects of the DIGITALDOORS vision and actual implementation enable legal testing, mitigation of loss, and automation of disinformation for tracing and identifying hackers, crackers, spies, and other perpetrators.

The Technology

The DIGITALDOORS system and method creates a high-level of security by automatic selection and removal of critical and important contents from a digital data, document, or file. The system enables a controlled release of the extracted data contents back into the source skeleton at any time. This enables instant display of the instantaneous returned contents, contingent on verification of user identity and access rights. The system and method delivers security by removal of the selected prioritized content from computer memory and storage. The copies and traces of the selected extracted contents are eradicated from memory while the separated data stream extracts are transferred for safety to a removed storage (might be multiple locations). The extracted content, or any part thereof, will be transferred back to user display as soon as his identity is validated and his access rights are authorized. Validation is instantaneous by password, challenge questions, or biometrics methods. For addition technical details, please see the Technology Background white paper or specific explanations in Frequently Asked Questions document.

A New Paradigm

DIGITALDOORS security differs substantially from encryption and existing commercialized technologies. It can be used instead of, or as an add-on to, existing security technologies. The technology was developed initially for defending against national security vulnerabilities and providing organizational survivability capabilities that surpass existing rollback and recovery practices. Just as public key encryption represented a leap in distributed multipart keys, this technology extends this metaphor by distributing data rather than the keys or parts of keys. In addition, this technology does not require a broad deployment in order for it to be useful and successful, as is the case for public key encryption and digital certificates. The secured documents can be processed, distributed, posted, hosted, and readjust as with any original document and without the need for any new client software.

The recent convergence of Internet, wireless, and broadband enabled the development of the DIGITALDOORS security and survivability technologies. The new paradigm is that security technology should be the basis for all computer applications instead of an add-on and see as a necessary evil. DIGITALDOORS security and survivability technologies enable the leveraging of interconnectivity for doing more business and providing security and privacy for E-commerce, legal, and medical. Health Insurance Portability and Accountability Act of 1996 (HIPAA) and the Gramm-Leach-Bliley Act of 1999 mandate guidelines for personal privacy starting Jul. 1, 2001, and Feb. 1, 2003. These regulations will have an enormous impact on providers, hospitals, but mostly insurers, which are the primary generators and consumers of privileged paperwork. This will require enormous efforts to automate and filter, technologies which are already available with DIGITALDOORS. The same convergence also enables the implementation of DIGITALDOORS technologies and strategies for mobility and dispersion of data, thereby providing maximum data security based on age-old military strategies.

DIGITALDOORS goal is to make that paradigm shift. This shift will include the following elements:
1. A security technology making computer applications and usage substantially safer
2. Enable free flow of information within networks, and between closed and open networks, while maintaining the highest level of security
3. Automatic creation of critical data backup, risk mitigation, and survivability capabilities
4. Other non-security functions, including data mining, data inventorying, and data management Invention Requirements DIGITALDOORS has no rival or known prior art for the core technology and workflow implementations. There are several military- and spy-agency-built systems, which for obvious reasons, haven't been disclosed but suggest certain solutions resembling DIGITALDOORS It was designed from nothing as a solution to address security, encryption, anonymity, and privacy failings with a completely different paradigm. As an aside, it fulfills the four critical needs as defined by the NRC to win the infowar, as explained elsewhere in this paper and in the white paper. The DoD mentality has shifted from absolute perimeter defense against external violation, which they acknowledge is impossible to prevent, to mitigation and continuity in order to create the concept of indestructible networks.

We wanted to create a means to freely distribute information without releasing identifying content. Indeed, once material is released, it is for all practical purposes made public, thus published, particularly with the speed and efficiency of the Internet. And since encryption contains the very machinery for its own solution within each and every message, it is clear that a different paradigm was required. In addition, the security technology of today is based on two metaphors, that of perimeter defense and encryption, and has been unquestionable proven untrustworthy.

Perimeter defenses fail against internal attacks, fail when penetration occurs in one area with connectivity to another, and fail against over, under, around, and other bypasses or simple failures of the fences. Encryption fails for a number of reasons, not the least of which is that any encryption method can be broken by random accident or by application of sufficient calculations, keys can be stolen or socially engineered, and many systems contain trap doors by design. Also, encryption fails because it is an end-to-end process, so that before information is encrypted and after it is unencrypted, it is vulnerable. Furthermore, once information has been made accessible, security is not longer in force, and its reapplication becomes moot. Another problem with encryption, by definition, is that the contents represent an alternative key to its own failure; it is like DNA with a faulty gene that will eventually cause cancer.

Since perimeter defense and encryption are ultimately fallible and defeating currently accepted security procedures— DIGITAL DOORS represents a new paradigm that keeps the information out of the wrong hands through data hiding and binary distribution. The prior art includes encryption, data hiding, chaffing, and winnowing. The literature includes widespread reference to encryption, and a plethora of personal, system-based, a third-party, and trusted-key products. Benefits, problems, and complexities are well known. Data hiding is technique where parts of keys are given to different individuals to prevent any one person from access the encrypted sources with unanimity with other partial key holders; access to a bank vault is controlled by such a dual key holder method. Chaffing is a method to intersperse important data with an inconsequential data stream. It often is implemented as noise within data files or random data, which looks like valid data. Steganography is another method similar to chaffing where the carrier data stream is also of value. For example, a copyright, watermark, or other ownership certificate is interspersed within a picture and remains intact despite copying and other processing, and is invisible without the correct tools to extract it, display it, and thus prove ownership. Winnowing is venerable technique in computer technology; data files on disk and packets sent via a network are currently winnowed through validation with a cyclic redundancy check (CRC). Binary distribution is a form of data hiding for two or more parts of the information are separated such that each part by itself is useless without the other.

DIGITALDOORS combines that bank vault dual key holder technology with distributed network communications to make a logical dual key accessible by remote control virtually anywhere. Note that the DIGITALDOORS bank vault key is not only dual; it could be unlimited in scope. By the way, this dual key concept as implemented in DIGITALDOORS is both inclusive and exclusive. In other words, if there are a set of keys, you can require from one to all the keys to unlock the data, or sets of keys that unlock only subsets of the data. In addition, remote and centralized functions provide a time limit to access and along with the AntiCopy™ technology, released and reconstituted documents are recallable. This is not an all of nothing process as with encryption, but rather a flexible protection and access program with infinite points of distribution and control.

Concepts Versus Real-World Applications

It is necessary for the reader to differentiate between the DIGITALDOORS paradigm, technology, implementation, and product. Ideas can exist without the technology, without an implementation, and without a product. DIGITALDOORS exists as all of these. The paradigm describes a new principle for applying data security providing risk mitigation, survivability, and viable methods to resolve the oft written needs but to date unfulfilled need for privacy, confidentiality, and anonymity in transaction processing. The technology exists in many novel inventions, including the display, extraction, mobility, processing, and dispersion components. The implementation consists of modules, data structures, components, and applications that have been designed, coded, built, tested and combined into functional processes and workflows. The product exists as well, well beyond concept stage. In fact, a bundled suite and several existing standalone products currently are packaged for shrink-wrap distribution. This includes Basic Scrubber, DIGITALDOORS Advanced Scrubber, AntiCopy, Command & Control, and the multi-tier authentication cascade represented by access control, user authentication, biometric control, and the friend or foe identification.

The Key to Success

The key to DIGITALDOORS is that it requires no change in culture. Existing metaphors, policies, and workflow apply. "The human culture prefers functionality to security." Trust In Cyberspace, Committee on Information Systems Trustworthiness, National Research Council 1999, Chapter 7, Conclusions and Research Recommendations, page 250. "Social and economic factors that inhibit the deployment of trustworthy technology." Trust In Cyberspace, Committee on Information Systems Trustworthiness, National Research Council 1999, Chapter 7, Conclusions and Research Recommendations, page 251.

The Simplified Application

DIGITALDOORS does two fundamental things; extract critical and important information, and reassemble it all back together later. See the Glossary for explanation of terms. Everything is implementation. For example, it moves the skeleton and the extractions to different locations, keeps moving them around, limits access by multi-tier authentication, and controls what the reassembled document contains. The reassembled document could look more like the skeleton or more like the fleshed out original document.
a. Authorized user with password or biometrics
b. access for all information in files
c. critical information is extracted
d. critical information is reconstructed
e. no culture change
f. unauthorized user without password or biometrics
g. no access to critical/prioritized information in files
h. last and first names extracted
i. credit card numbers are extracted
j. social security numbers extracted
k. addresses extracted
l. e-mail and phone numbers extracted

A Paradigm Based on Lessons of Warfare

DIGITALDOORS applies a paradigm learned from the history of warfare. Specifically, rigid defenses fail. Examples include pickets walls, trenches, nets, moats, redoubts, tank traps, camouflage, fortifications, all of which through history have been-destroyed, bypassed, tunneled under, or undermined by spies and traitors. These include the Maginot Line bypassed by German army which crossed through the Ardennes. Hitler's Atlantic Defenses along the French Normandy coast bypassed by Allied landings in different and less-fortified locations. Also, consider the Berlin Wall, which was bypassed by new technology not anticipated by the Russian siege designers, an airlift; a classic 3-dimensional solution to a mistaken 2-dimensional enigma. The Bar-Lev Line of distributed bunkers was bypassed by the Egyptian forces. They crossed literally unopposed right between the defenses using tanks and foot infantry, even though it was a highly fortified wall with "modern" weaponry, isolated the defenders at their defenses, and nullified these defenses and defenders when it was deemed convenient after their military objectives at the front line. Analogously, firewalls fail under the onslaught of unforeseen technology, gaps in the technology, or by roundabout and shrewd attacks.

Warning systems have also failed at crucial points, as exemplified by Pearl Harbor, Soviet invasion of Czechoslovakia, Argentina's brief conquest of Falkland Islands, and the Iraqi Invasion of Kuwait. Success in these and like instances have been achieved through terrorist, guerilla, or mobile warfare techniques. Specifically, mobility and stealth worked in Hirohito's favor against the U.S. Pacific Fleet, the Soviet overrun of Prague, the swift capture of the Sinai, and the Argentinian surprise invasion against their Malvinas. Mobility was the key focus in modem western armies such as U.S. and Allied forces in the recapture of Kuwait and phase 2 of the Gulf War, in modern guerila warfare, and terrorist activity. Solution is found in the depth of and flexibility in defenses through the disbursement of forces to different locations, ability to hide forces, strength, and assets, sacrifice front line assets, withdraw critical assets to the rear, and retreat. The historical references are intriguing, but this literary reference is most telling. This philosophy has been read and quoted by many since the Venetians, but to date not implemented as a policy and strategy in modern information technology.

"The art of war teaches us to rely not on the likelihood of the enemy's not coming, but on our own readiness to receive him." The Art of War, Sun Tzu Mobility in the digital age means asset dispersion, transportability, and rapid relocation and redeployment of digital assets while still maintaining the capability for ongoing operations.

Survivability, Mitigation, and Continuity

Whereas many security tools are designed to function within an environment defined by 100% control and remediation, DIGITALDOORS is designed to protect with loss. It is not always possible to assume 100% protection with 0% penetration. Information warfare should be perceived as a statistical game environment where losses and casualties are expected. Although information warfare has been mistakenly perceived as clean and precise activity, the reality is much different as recreational and military hackers have created downtime, loss of functionality, partial or total losses in services and data. Total control and remediation even through backup is no longer an acceptable metaphor. Failure of encryption, access control, and firewalls leads to situations of service and data erosion not protected by full backups and emergency hot sites. Instead, DIGITALDOORS assumes partial or total failure and supports guerila-style continuity through mobile services, access control to remote resources, and an infinite hierarchy of dispersion of service and data resources.

Unique Architecture

DIGITAL ODORS security architecture enables data free flow. The DIGITAL DOORS process provides a method for the automatic protection of critical and important digital property within a document, data stream or digital environment. It protects against unauthorized parties or compromising situations within a closed and secured, or open and exposed environments. As previously stated, encryption and cipher technologies are based on the camouflage and suppression of all information, thereby restricting and limiting its use and focusing the thrust of attacks against singular and well-defined targets. DIGITALDOORS scatters those targets and makes them mobile so that attacks must be mounted against numerous dispersed objects and objects in motion and unknown location. DIGITALDOORS is based on securing the critical and important information, within a document, data stream or digital environment while enabling the sharing and the free flow of the rest of the content between different parties and networks. The free flow of content enables continuity of operations and achieving critical missions while the "crown jewels" are secured and released only to authorized and verified parties.

The objective is to create a last line of defense, a mobile guerilla defense, that is as strong as a complete monolithic defense, but dispersed and still coordinated in spite of that dispersion. If the primary defenses fail for any reason and the infrastructure is partially or even fully compromised, the extent of the security breach, the destruction, and any thefts are limited. This is risk mitigation. The objective is to create a major deterrent. If an intruder penetrates firewalls and other security systems, access is useless to scrubbed materials since the critical and important information has been exported to secured storage. Competitors or hackers who learn that a computer and network resources are protected by DIGITALDOORS, might decide to chase an easier target instead. This is comparable to a situation in which a bank robber, who finds out that the bank vault is too difficult to break into, will look for another more attractive target.

The system is simple. It is configured for the typical user. It enables the network operator or end user to understand the process and workflow. The user interface (GUI) is easy, consistent with Windows, consistent with Solaris, K, K+, GNOME, and Sawfish. In this aspect, DigitalDoors is compatible in theory and practice with any desktop or server interface, from the command line invocation, for integration with remote procedure calls, and other graphical interfaces. The DIGITALDOORS engine is not tied to any platform, programming language, API, or methodology. See more information on the technical implementation details in the Technical Background paper. Compatibility is such that the system can be used on all computing systems, across all networks, in any language, dialect, culture, and EBCDIC, ASCII, Unicode, or other. It can be installed as an independent system or add-on to firewalls and intrusion detection systems.

DIGITALDOORS is not order-sensitive, as encryption is. Data processed with DIGITALDOORS is also likely to advance ongoing processing without application or system abend, as an encrypted data set might. Although the loss of the encryption key or damage of the encryption package has both positive security and negative workflow aspects, one of the primary design considerations for DIGITALDOORS is to enable survivability and support business continuity in the event of man-made or natural disasters. While scrubbed documents are not generally self-healing (although it can be under administration configuration) and the multi-tier authentication process encapsulation curtails unauthorized access, the binary dispersion of components provides redundancy and recovery opportunities in the event of serious emergencies.

DIGITALDOORS creates a system of decentralized security over any existing infrastructure. The decentralized security provides layers of protection, means to enable mobility in the event of security threat or active breach, and a distribution of critical and important resources at any point in time to minimize the damage from any attack. The system is based on networking and Internet infrastructure. Whereas, encryption, public key systems, and escrow require substantial investment in workflow and vendor infrastructure to deliver, protect, and maintain keys, DIGITALDOORS requires no such critical mass to achieve applicability. Furthermore, it is not necessary to pick from similar competing vendors and hope that your selection is the winner. DIGITALDOORS coexists with any infrastructure, from small to large, and the Internet open doors to the world. It supports secure multicasting, one of the serious limitations of any key-based cryptosystem implementation. While customers do invest in workflow integration efforts with DIGITALDOORS to get the most from it, the level of commitment is not as skewed up front as with other security techniques, such as firewalls and ciphers.

How does it Work?

DIGITALDOORS, the application suite and the Scrubber applications, locate, categorize, and extract critical and important information. It creates digital doors at those locations. These digital doors are gateways automatically constructed at critical and important junctions in user digital document, digital data streams piped from other processes, and digital environments. These are not URLs, links, anchors, but externally referenced resources, as described in Placeholder and Anchor section of the Technical Background paper. These digital doors are conceptually doorways that allow information to flow into and out from a controlled environment. These doors are the gateways for removing or adding digital streams (of various formats), as defined. These digital doors are positioned in locations within the digital document, digital data streams, and digital environment defined as critical or important by the system. Critical and important is defined by the system as data, which, when removed:

render the digital document, digital data stream, or digital environment useless to users, processes, or workflow create a substantial loss of economic, functional, or strategic value, or any value essential for continuing the vital missions.

Data reconstitution will occur as follows:

Users with password and authorization will be permitted access to the critical information in digital documents, data streams, and the digital environment Users without valid password and authorization will have access to digital documents, data streams, and the digital environment; however, they will not be permitted to view the critical and important information, within those documents and files, or anywhere else The Steps in the Process The DigitalDoors process is defined by ten primary steps:
1. Automatic semantic selection
2. Copy and backup
3. Selection and extraction of critical and important content
4. Erasure and eradication
5. Mapping and substitution with placeholders
6. Transport to remote storage
7. Automatic authentication for release from storage
8. Controlled release from storage 9. Reconstitution and replacement of extracted content
10. Display through separation
11. Foreground, background, automatic threat mode, and screensaver operation These 11 steps are each defined and elaborated in the next sections after a brief explanation of process workflow. The workflow sequence is as follows:

Workflow sequence:
  Copy and backup
  Erasure
  Storage
  Substitution with placeholders
  Release from storage
  Reconstitution
  Display
  Display through physical separation

Automatic Semantic Selection

Selection of critical and important information is through filtering, reverse filtering, dictionary lookup, semantic matching, word and phrase selection, and complex pattern matching. Unlike traditional data mining where data is searched by predetermined or ad hoc keys, DIGITALDOORS primarily searches for information that specifically does not match predefined patterns. This is the converse of most technologies. It searches for unidentified content and makes Bayesian inferences. It can also apply traditional data mining techniques, by optional user configuration. Once data has been defined, it is then categorized, thereby increasing the accuracy and utility of the selection process. The selection technology in its own right is very different from all other existing search and data mining technologies because it focuses on what does match rather than what is specifically found. The creation of collections enables rapid access to like information and provides a new generation of data mining utility.

Other applications of DIGITALDOORS includes business intelligence (BI), strikeback through false information, misinformation and disinformation. Also, DIGITALDOORS is adept at data mining by methods which are converse to the usual technologies. Specifically, while most data mining techniques are driven by list of relevant topics, terms, and phrases or keys, these technologies search for things which do not explicitly match, linguistically match, or apply loosely to semantic trees.

DIGITALDOORS includes optional dictionaries. It enables the user to input lists or build personal dictionaries. The dictionaries extract (include in the process) or ignore (exclude from the process) all with a click of a mouse. Dictionaries can be arbitrarily added for specific functions, industries, or security and privacy needs. The following represents built-in dictionaries:
always exclude
always scrub
location
male name
medical
Military
number
obscene
science
slang
targeted adjective
technical
titles
veterinary
code word
legal
battlefield
business
code
common
word
covert
female name
finance
HTML tag
intelligence
Internet
last name
law In addition, language-specific supplemental dictionaries are available for English idioms, English dialects, and other languages. There are also dictionaries and supplemental entries for search patterns, lexicons, and language and/or cultural semantics.

Copy and Backup

In order to maintain integrity of the whole process, DIGITALDOORS optionally copies and backups the whole initial data stream, document, or file and transfers it to remote storage. The critical system requirement is that the copy/backup be completely separated from ongoing operations. It is not a matter of letting the source stick around inviting problems, but rather a concept of closing doors to penetration. DIGITAL DOORS provides for workflow copy and backup to alternative locations. In order to provide confidence, backups and copies are removed to alternate locations and the source is optionally purged through a staged erasure process (described elsewhere).

DigitalDoors supports manual, timed, or automatic drop of critical and important files. This minimizes exposure through a distributed, dispersed, and survivable infrastructure by applying the core concepts on which DigitalDoors is based.

Extraction of Critical and Important Content

The underlying concept guiding DIGITALDOORS is that the highest level of security is logical and physical separation and dispersion. The DIGITAL DOORS system extracts selected information from data streams, incomputers, computer networks communication devises and networks, as well as electronic mail systems. The extraction of data objects includes words, characters, numbers, images, audio segments, video segments, and selected digital data packets. The extraction is conducted by a process of separating a source (original) data stream into two or more extracted data streams. The different data objects extractions are separated into groups reflecting predefined contextual categories.

The modified source (original) stream typically contains the majority of data objects in the source stream, whereas the extract streams contain a subset of data objects, which represent selected information, and information deemed to be of special importance. The modified source is a "skeleton." The system is primarily designed to extract the selected critical data. However, the following options are presented to the user:
  1. Automatic selection and copy of the critical data, transport to remote storage for backup, and data mining not included directly through extraction
  2. Same as option 1., but im an emergency situation the system will automatically extract the critical data from the source (the ejection seat option)

3. Preferred mode of operation, as an automatic selection and extraction of critical data on a regular basis with transportation to a secured remote storage The basic extraction occurs subject to semantic patterns, extraction rules, categorization, and exclusion and inclusion dictionaries:

Extraction occurs as brute extraction, optionally: every 2nd, 3rd, 4th, 5th, etc, word or character.

Every credit card number, every social security number, etc.

Advanced extraction is selective extraction, using additional filtering methods, including comparison against dictionaries containing 600,000 words and phrases, numbers, reverse filtering against such dictionaries, grammatical analysis, and inclusion or exclusion by regular expression (that is, pattern matching). A partial list is shown below. Note that the granularity of identification is subject to development and enhancements.

Names
Addresses
Telephone numbers
Financial numbers
Word categories
Phrases
Filenames
Internet and e-mail address
Corporate or organizational names Eradication Eradication means the copies of the extract and source traces which were not transported to a remote storage are erased, deleted from the recovery bin, and purged from RAM, disk sectors, buffers, and caches.File fragments are also overwritten. DoD, and other standards for file erasure, are employed to remove all traces of the data within the erased file, disk sectors, cache, buffers, and other storage and RAM that could compromise security and ongoing operations. Erasure goes well beyond deleting the source file. In other situations, deleted files continue to exist as marked files and are intact but for directory entries under Windows, Unix, Linux etc. The system's erasure and eradication process is designed to avoid such incomplete "deletions."

Mapping and Substitution with Placeholders or Anchors

The mapping process enables documentation of the location of the extracts. It is the road map for the future reconstitution or it provides a location for the Digital Door. The mapping consists of various placeholders, adding serial numbers or other identifying anchors, but the mapping in no way discloses the substance of the extracts.

Substitution with placeholders maintains the operational integrity and structure of the original data stream, document, or file. Placeholders are not traditional anchors or field markers which might contain description, URL links, file references, or other inferences into the substance and context of the extractions. Rather, placeholders are independent fillers exactly and only indicating the extraction. Not that operational placeholders can be selected as null sets or nothing, which means the extraction is removed and the space were it was is also removed. Placeholders can be symbols, random words, words similar in category to the extracted words, or underscores. Placeholders can be designated substitutions for misinformation and disinformation efforts. Chaffing is the padding or insertion of additional material (more than the size of the extracted material) to confound and confuse, and also represents a placeholder option. Please see the Technical Background paper for additional details. Substitution occurs as any and all of:

generic placeholders
XXX
11111
2139874947
customized placeholders
replacement content
customized messages
customized advertisement
disinformation
misinformation
chaffing Transport to Remote Storage The extracted categorized data objects are combined into one or more contiguous data streams. The extracted data stream or streams are scattered to one or more storage devices. The extracted data can be transported and shuttled among different storage devices and locations or projection apparati, as directed automatically by various constraints including security risk criteria of threats and attacks and the actually of such ongoing attacks. Data mobility can be compared to existing operations of the Trident submarine, truck-mounted antiaircraft batteries, and the Delta Force, all examples where success is based on rapid delivery, dispersion, and stealth. The extracted data is ordinarily transported to an online removed storage and under extreme security threats it will be transported to an off-line, off-network vaulted storage. The automatic selection of storage devices and locations are triggered by security alert. Storage occurs as any and all of the following options: online, local and remote; off-line; local and remote, The system is configured to automatically select the appropriate storage according to threat level. Automatic selection of storage takes into account the level of security of the each optional storage, and its ability to stop and hinder penetration by maximizing barrier strategies.

The dispersion of forces to remote safe locations is a historical military strategy. DIGITALDOORS implements the same analogous strategy by utilizing the latest developments in technology through the convergence of Internet, wireless, and broadband. Each of those technologies create anew choice and selection of different storage devices and location. Local, removable, remote, Internet, and hot-site storage is perceived to be the same thing to DIGITALDOORS. Obviously, it knows the difference between them, but it can extract, transport, and reconstitute to and from any storage device. This is a logical view of workflow in contrast to older and more limiting physical ones.

Automatic Authentication for Release from Storage

A chain of custody is maintained for all extract and process files. In order to access the extract file or view the process files and database records, a user (or process) must obtain authorization for this. Authorization is effected by multiple tier authentication process, detailed in the Frequently Asked Questions and also the Technical Background. The multi-tier authentication process not only controls access to reconstitution, it also controls access to file storage archives (local and remote). This maintains the integrity of the process files and security of the data. Access to remote, backup, unmounted, hot site, and other storage resources is uniform. Only access and response times differ, and of course, performance and accessibility is contingent on availability. For information about reconstitution and multistage authentication, please see the Technical Background or the Frequently Asked Questions papers.

Controlled Release from Storage

The DIGITALDOORS system releases extracted data stream subject to a controlled release mechanism. This process is contingent on various parameters, including user logon, rights to access specific contents, timing criteria, security restrictions, and preset policies. The release of the extracted data objects permits recreation of the source data stream or various full, partial, or modified, representations of the source data stream, while maintaining a desired level of separation between the modified source data stream and the extracts data stream. Timed released enabled limited exposure after a predetermined period.

The DIGITAL DOORS system implements an across-the-board concept of security second to none through physical separation and dispersion defined in concept by Claude E. Shannon in his seminal paper, A Mathematical Theory of Communication. You can read details of how this theory applies to DIGITALDOORS or find links for resources in the Technical Background paper. In line with his general concept, the release of data from dispersed storage depends on a multi-tier release mechanism. The user or process provides passwords, biometric IDs, and responds to challenges. Such controlled release occurs as any and all of the following scenarios:

to authorized parties only upon verified identification
to authorized parties only upon time validation
to authorized parties only upon location validation
to authorized parties only based on device by type
to authorized parties only subject to threat mode For additional information about reconstitution and multistage Authentication, please see the Technical Background or the Frequently Asked Questions papers.

Reconstitution and Replacement of Extracted Content

Reconstitution is the process of merging the scrubbed original streams, documents, and files with the extracts released from storage. Reconstitution provides the identical or a partial subset of the original data stream, document, or file. Reconstitution is based on a sliding scale from no restoration to complete restoration, driven by administrator or user settings, and actual authentication of user at the time of reconstitution and display. The following illustrations show extreme levels of reconstitution, none to all.

FIG. B19 shows unscrubber results.
FIG. B22 shows unscrubber results with full authentication.
Secured display through delivery separation.
The use and release of the extractions is controlled by a set of rules or organizational policy which includes the following options among others:

A vaulting of all or specific data object extractions
Release of extractions (none, some, or all) with scrubbed source data skeleton into a display
Release of extractions (none, some, or all) with scrubbed source data skeleton into a projection display, while maintaining complete separation of the modified data stream and the extracts data object stream
Release of extractions (none, some, or all) with scrubbed source data skeleton into a projection display
In situations of high security threats, release of extractions (none, some, or all) with scrubbed source data skeleton into another projection display, PDA, floppy disk, a paper document, a wireless display, a overlay transparency The system enables the implementation of topmost security by allowing projection of a visual merger of said different data streams, while in reality maintaining a strict physical and logical separation between the data streams. DIGITALDOORS supports three distinct technologies that enhance security and maintain the chain of custody.

The first is delivery of scrubbed streams and extract streams via separate hardware channels for maximum security through total logical and physical separation. This is effective for wireless, mobile, and presentation requirements, where delivery of critical extractions is by a channel or method separate from the delivery of the scrubbed source data stream, document, or file. One implementation includes video delivery enabled in hardware for cyan and magenta streams to prevent copying. The sync signal provides alignment. This method precludes interception or copying with standard NTCS, PAL, or SECAM video equipment. Display occurs as any and all of merger of data streams into display, or the physical separation between data streams. This is pertinent as a CYMK monitor cable separation or as a mobile and wireless separation.

The second method prevents screen copying through font and contrast control. This feature, called AntiCopy™, is a series of controls and configurations that alters image resolution, image contrast, text font display, and other properties to obscure or mask display. It is described in greater detail within the Frequently Asked Questions and Technical Background papers.

The third method is effected through control over access to and release of reconstituted materials. Generally, restored data streams are not released to users; they are reconstituted only for display purposes. Note that configurable time limits for display also prevent extended visual exposure at unattended web sites, network stations, and user desktops. Data streams are piped to applications, but only predefined chains of custody. Documents are not normally reconstituted and placed on disk without appropriate administrative control.

FIG. B21 is a sample of a public scrubber.

Foreground, Background, Automatic Threat Mode, and Screen Saver Operation

Scrubbing times are asymmetric; it requires about 100,000 times as long to validate and extract images, words, and phrases as to reconstitute the file. DigitalDoors includes CPU prioritization that is both automatic and manual. Threats, real and active, perceived but imagined, or external triggers (from firewalls or other security services alter CPU usage prioritization to counter these threats. Idle CPU time is allocated to scrubbing, validation, and maintenance operations through the MS Windows screensaver mechanisms. The following screen shot shows the CPU utilization configuration utility.

Access to and use of idle network, host, ISP/ASP, or Internet CPU resources is also foreseen. It is also possible (but not currently implemented) to locate available idle CPU resources in the SETI-at-Home (http--://setiathome.ssl.berkeley.edu/) metaphor to redistribute background scrubbing operations to idle machines. The Microsoft application and clustering server enables load-sharing directly. However, because the source documents, data streams, or transactions are sensitive in DigitalDoors, unlike with the SETI data, point-to-point security potentially over a public network is critical and we have delayed implementation of RPC and remote service until we resolve the security risks involved. The next image shows the DigitalDoors Screensaver in operation supporting background scrubbing.

Lines of Products

The DIGITALDOORS lines of products includes the DIGITALDOORS; Advanced Scrubber Suite, Basic Scrubber, AntiCopy, and Multistage Authentication. The DIGITALDOORS semantic library includes: pattern lexicon libraries, language databases, idiom databases, cultural databases, and specialty databases (such as agency, defense, medical, etc.). Other modules and components that can be contracted under house, private label, or specific project basis, include:
  Data mining
  Data mobility
  AntiCopy
  RollCall
  Identification Friend or Foe
  Access Control
  Biometric Access
  Cascading Authentication,

Applications

The primary use for DIGITAL Doors is the protection of information by partitioning data streams into two or more subordinate streams and delivering these streams to different displays, storage devices, processes, or users. Of course, the focus is on security, privacy, confidentiality, anonymity, and survivability. The secondary use for DIGITALDOORS is as an information-mining tool, either to redact data into a reduced and concentrated form or as a method to link related data together. Specific applications include these listed below, but not limited only to this, as the applications continue to grow as we learn more from our customer base:
  1. Hardened data centers
  2. Automatic outbound E-mail filters
  3. Add-in for MS Word and other MS Office Suite applications
  4. Support for Government agencies that must comply with the Freedom of Information Act (1996)
  5. Infusion of linked digital data for enhancement of information and content
  6. Infusion of linked data for communication purposes, including messaging and E-mail
  7. Infusion of digital data for transactional purposes, including payment for services or merchandise
  8. Infusion of linked digital data for commercial purposes, including externally-linked advertisements and banners
  9. Infusion of linked digital data for in document audio, video, and videoconferencing
  10. Web content management

Taxonomy of Threats

Recent government security reports describe the environment as follows: "HACKERS DRIVEN BY TECHNICAL CHALLENGE"; "Disgruntled employee SOUGHT revenge"; "Crooks Find Personal Financial Gain Stealing Services"; "Organized Crime Operations Interested in IT Financial Gain"; "ORGANIZED TERRORIST GROUP INFLUENCE US. POLICY BY ISOLATED ATTACKS"; "Foreign Espionage Agents Exploit Information for Economic, Political, and Military Purposes"; "Tactical hacker attack disrupts U.S. Military command"; "INFORMATION WARFARE UNDERMINE US. MILITARY MISSION"; "Nation-States Intent On Overthrowing Information Infrastructure".

Information Technology has become a digital battleground for many reasons. Interconnectivity exposes data and operations to threats, attacks are from near and far, including countries without extradition treaties. Technology, used for mundane purposes, is equally effective for the forgery of digital information or its destruction. Consider the implications of a hacker attack, security breach, or inside job that disrupts an entire infrastructure. Consider the ramifications of a failure in the FAA Air Control System, failure the sanitation system, loss of the electricity grid, the downing of the telephone switching network, or disruption of emergency medical systems. The digital battleground is one where the goal is the disruption of processing and communication systems and the loss of confidence in data and operations. In spite of the daily published reports of another major security failure, note that most attacks (98%) are not exposed in the media to maintain damage control.

Features of DIGITALDOORS

The advantages for DIGITALDOORS are:
  Cannot be cracked, hacked, or exploited
  Automatic
  Multi-platform
  Web-enabled
  Configurable to different needs
  Enables tracing
  Access is controlled, authenticated, and validated
  Analogous and based on traditional and time-proven physical defense strategies
  Overcomes back doors in software or hardware
  Unsusceptible to interception
  Immune to eavesdropping
  Immune to deciphering
  Immune to decryption
  Immune to modification
  Protection for content integrity
  Immune to signal compression algorithms
  Lower costs
  No need to trust a key issuer
  No need to trust a third party key escrow
  No need to trust a third party
  No trap doors possible
  Language-independent
  Culturally-independent
  Lower CPU requirements
  Faster processing
  Protects against internal attacks
  Efficient (limited overhead)
  Multi-tier layered disclosure (no either/or as in encryption)
  Delivery through public channels
  Delivery through covert channels
  Supports point-to-point delivery
  Supports multipoint delivery
  Controlled distribution
  Support for deception, disinformation, and misinformation
  Supports controlled release of critical and important information
  Enables copyright protection
  Enabled tamper-proofing
  Defends against the unknown
  Does not require widespread distribution for effectiveness (as with PKI and digital certificates)

DIGITALDOORS is also applicable in providing outbound protection in peer-to-peer networking, collaboration, white boarding, and filtering of data delivery during conference calls by filtering critical and important information in real-time.

Conclusion

DIGITALDOORS security differs substantially from encryption and existing commercialized technologies. It can be used instead of, or as an add-on to, existing security technologies. The technology was developed initially for defending against national security Information Warfare (infowar) vulnerabilities and providing organizational survivability and mitigation capabilities that surpass existing rollback and recovery from backup practices. The DIGITAL DOORS technology addresses the Achilles' Heel of security, the threats initiated by insiders. It provides risk mitigation and also boosts ongoing efforts for survivability and operational continuity. In conjunction with this core applicability, DIGITAL DOORS also addresses the needs for privacy, confidentiality, and anonymity using the same workflows and paradigms employed for security and survivability, as outline in this white paper, to find, extract, and distribute or not distribute critical and important information.

The features discussed above are shown in FIG. B22 which shows Digitaldoors process & data flow and FIG. B23 which shows the process of validating the user is multi-level security. This includes username and password entry, but also vetting with arbitrary selection of biometric devices, external monitoring, and friend or foe identification.

The Security of Location Map and Recovery File

DigitalDoors security is enabled through the overriding technology of data sharing and data dispersion. DigitalDoors enables infinitely strong security through a hierarchy of critical and important information extraction and the dispersion of that extracted information. Authenticated or unanticipated (by attackers and hackers) reconstitution is enabled through the location map, a recovery file, and many dispersion files. The main security is afforded by the hierarchy of reconstitution and diffusion of dispersion files, randomness, and open camouflage in data-based steganography, but also supplemented by encrypted links within the hierarchy. Knowledge of any single link is statistically insufficient to defeat identification and authorization, initiate automated reconstitution, or provide a chain to manually reconstitute the protected data.

Security

Breaching security requires: Stepwise: Accidental:

The "location map" is an indicator to the location for the recovery file. The "recovery file" is the collection of instructions and actual extractions, used to reassemble whatever critical and important information has been extracted and optionally diffused to one or many dispersion files. The "dispersion file" contains the actual extracted information necessary for reconstitution. The location map, recovery file, or dispersion file can be plain-text or encrypted in entirety. The contents of the location map, recovery file, and dispersion file can be stored within plain-text or partially encrypted, stored as a plain-text record or field within a database or encrypted within the database.

Clearly, the security and integrity is important not only for recovery but also to protect against unwanted attacks against the location map and hacks with misuse of the location map, recovery file, or dispersion file(s). However, although DigitalDoors employs a multi-level security system, the reconstitution workflow and the data dispersion create the fiction of an inherent safety concern for the DigitalDoors system. In fact, DigitalDoors can and does create security that is so strong that without recovery information, the source cannot be recovered.

Location maps are independent of each other, distributed widely precluding association of extraction results with the associated recovery map, can be partitioned in an unlinked independent hierarchy of maps, and hidden within a virtual steganography of themselves. The lack of referenced storage for recovery maps is perhaps one of the strongest forms of misinformation, decoys, and confusion, one that in fact increases non-linearly as the number of recover maps increases within a single storage volume. Realize that dispersion is inherently stronger than encryption-because lacking a starting point to a map, there is no method to locate a map or unravel the randomness of storage volume with large numbers of recovery maps. The Law of Large Numbers (a mathematical theorem) states that a pattern-of regularly emerges in any process which is useful for masking the uniqueness any single recovery map.

Specifically, we address these concerns directly and clearly:
 1. The map represents both a description and a process
 2. The description and process or independent
 3. The map need not indicate a starting point or reference
 4. The process need not indicate a starting point or reference
 5. The extracted file need not be associated with a specific recovery map
 6. Duplicates and prior (and since outdated) maps create chaff, if so desired
 7. The recovery map can exist as a series of step-wise maps without reference A recovery map can exist in various logical formats that include:
 1. A series or instructions for re-assembly (such as a macro, add-in, or application)
 2. A recovery script for re-assembly
 3. A reference indicator to the recovery information
 4. A list of recovery information including positional details and extractions
 5. A list of recovery information including positional details and pointers to the extractions
 6. A reference within the extracted file to the recovery information
 7. A database of recovery information including positional details and extractions
 8. A database of recovery information including positional details and extractions
 9. A negative intage of the extracted information For reasons outlined here, DigitalDoors does not apply methods 1, 2, 3, 6, or 9, but does apply methods 4, 5, 7, and 8. Methods 4, 5, 7 and 8 are optionally used together or individually. Methods 1, 2, 3, 6, and 9, as well as other undefined methods, could be used in the future, if so needed.

The reasons we avoid methods 1, 2, 3, 6, and 9 are described here. Method I requires the use of macros or applications, which represent an unwarranted opportunity for viral attacks. Method 2 represents a similar breach of security, although it relies on a preexisting scripting engine on the host. Method 3, including recovery information within the working data with in-situ extractions, represents a breach of security and prevents normal usage of the data within applications and transactions because of the inclusion of foreign data types. Method 6 represents an open doorway which an enterprising hacker can explore data resources. Method 9 works well, except that the source, extracted file, and the positive file would share file sizes, access dates and times, thereby creating an apparent solution. In addition, the positive and negative files are easily overlaid by simple programming techniques, a method too simple and primitive for reasonable security. Also, such a recovery method precludes dispersion or granularity.

The reasons we apply methods 4, 5, 7, and 8 are described here. Method 4 is simple to apply. It minimizes CPU and disk resources, and enables a wide range of secondary security features such as encryption, MultiCryption, dispersion, and granularity. Optional headers, links, reports, and supplemental files provide management information, backup, and analysis for the DigitalDoors process. However, without these optional attributes, recovery
Location of Map Even when the location of the recovery map can be discerned, dispersion of the map or its recovery entities or encryption of that map prevents its utility. Whereas the source is clear-text and useful in processing, information sharing, or distribution, the map need not be.

Multicryption

Traditional encryption techniques require excessive infrastructure and administration while allowing security gaps to remain throughout the process. There is also some question as to the reliability of any single encryption technique against social engineering or cracking. Key generation, key delivery, and key recovery represent nightmarish administration. Furthermore, traditional encryption does not provide one to many distributions or abstract delivery without additional manual Intervention. Partial encryption, mixed encryption, and mixed key encryption with partial encryption and dispersion provides advanced workflow solutions to these problems with simple and redundant methods that enhance security, mitigation, and both Internal and external terrorist activity. It also enables the free flow of Information without secondary process steps.

MultiCryption is our terminology for partial encryption, mixed methods of encryption, and mixed key encryption. MultiCryption differs from multiple encryption in a number of significant ways. We do not use multiple encryption. Not all words, phrases, lines, or paragraphs are encrypted, thereby leaving a contextual template, and keys and encryption tags can be dispersed for additional protection. Furthermore, recovery information, analogous to encryption keys, can be generated for one-time usage and widely dispersed to prevent catastrophic unanticipated access to a data repository.

Multiple encryption (which we do not provide) describes various methods of encrypting plain text with one method and one key, and then serial encrypting that result with the same encryption method and a different key. It could also apply to encrypting plain text with one key, and then encrypting that result with a different method and same key. There are several flaws in multiple encryption. First, serial encryption is statistically less secure by up to 99% than a single encryption method as the combination actually reduces the encryption strength by introducing key weaknesses and result-based patterns. Second, multiple encryption must be decrypted in a precise symmetric sequence that represents a workflow nightmare. Third, multiple encryption increases the complexity of an already complex key management problem yet more with 100% overhead increase. Fourth, more keys mean more avenues of exposure. Fifth, public key methods introduce mathematical weaknesses into encryption inversely proportional to key size.

Although MultiCryption appears to represent a nightmarish application of multiple encryption with mixed methods and new keys, it actually is statistically sound, a simplification in workflow overheads, statistically secure in contrast to any single encryption method, enables mass distribution, abstract delivery, and a hierarchy of secured access to documents and transactional workflows. Encryption keys can be static for each user, or dynamically generated as a one-time pad for each and every identified extraction. Selection of the encryption method can be static, fixed within a hierarchy by job level or by extraction categorization, or dynamically and randomly selected. Job-level and/or extraction category encryption allows, for example, access by manager level I to credit card numbers and expiration dates but denies access to data entry clerks to that information without specific one-time authorization by a level 1 manager for each instance.

Since encryption keys are randomized, access to one document, class of information, or even singular elements is controlled at a granular level. Random encryption keys, in spite of the apparent complexity of the system, actually simplifies key generation and administration. Backups of recovery maps, whether centralized or decentralized (and both simultaneously), provide for document recovery. The issue is no longer one of key recovery and possible backdoors but one only of document recovery.

MultiCryption improves security and workflow in a number of obvious methods. Partial or selective encryption means that a document or transaction skeleton provides useful context for recipients. Infinite control over encryption selection provides abstract generation control. Partial encryption reduces the statistical ability to decipher the encryption method or the key by pattern analysis as a factor of the encryption selection density and the lack of patterns inherent within the partial encryption selection. Mixed methods of encryption reduces the statistical ability to decipher the encryption method or the key by pattern analysis because it introduces another plane of pattern erasure. Mixed key selection reduces the statistical ability to decipher the encryption method or the key by pattern analysis because it introduces another plane of pattern erasure; this is in direct comparison to multiple encryption because both encryption and encryption keys are statistically independent. The combination of mixed encryption methods and mixed encryption keys is basically immaterial to improvements in statistical security. It is not an issue of increasing security since the judicious application of encryption already provides integrity, but rather one of increasing workflow flexibility. By increasing the granularity, MultiCrypted documents or transactions provide element-wise access to each encrypted element by job-levels, categories, locations, times, threat modes, and/or by future designations.

Dispersion of recovery information, that is analogous to the security of encryption keys, provides another layer of granular protection. No single exposure of encryption methods or user encryption keys and passwords can undermine security. Each encrypted element is thus unique and independent from all others. This creates a rip-stop protection from intrusion, inside espionage, and site-wide or network-wide terrorism. Limitation in access to dispersed data repositories and recovery information provides an additional layer of security. Network links, NAS, SAN, hosted storage, and removable storage can be controlled at a granular level. Backups provide mitigation and recovery in the event of site failures or other foreseen or unanticipated disasters.

The inherent overhead in public key infrastructures, symmetric key distributions, key access control, key renunciation, lost keys, and key data entry is resolved by this system in a number of ways. All keys are randomized for one-time use. Loss of key is limited to each individual encryption, not system-wide, or by individual. This does not protect against total failure and backup failure; this risk is identical to any system and backup failure and introduces no new risks as the system runs within standard database or file management technologies. Key generation is automatic, and key recovery is also automatic. Note that recovery information is associated to each document or transaction, by job level, by category of encryption, and not by individual or process. The risk is wholly in the file system. However, since recovery potentially could be compromised by insider data diddling, backups and checksum technology is employed to prevent and indicate tampering.

There are new and different overheads, but these can be integrated into existing identification and password control systems. Access and password control can be enabled at all levels by single or combined biometric methods. This resolves lost IDs, passwords, and encryption keys, problems typical with traditional security systems but avoided through MultiCryption.

DDOS and DOS Attacks Additional Benefits

Tradition security methods protect against single known methods. This technology was designed to create an umbrella of protection against unknown and known problems . . .
Elements Necessary to Secure
Processing Data Streams The DIGITALDOORS process is designed for generalized data streams, such as messages, objects, pointers to data, database records, transaction sets, and other arbitrary data formats. This enables DIGITAL DOORS to process any type of data within any type of environment on most any computing platform. This allows the technology to be called as a remote process call, an Active-X control (DLL, EXE, or OCX), or a CORBA process as part of generalized data stream processing. This is useful when interfacing with database transactional processing, E-Mail, HTML and XML processing, security for point-to-point transmissions, and most dedicated workflows. Data files are merely a special case of the generalized data stream stored as an entity on a storage medium. Note that data files often are defined by a specialized layout or mixed structure (such as a MS Word, a data record, or and EDI dataset), which DIGITALDOORS filters for proper extraction, dispersion, and subsequent reconstitution.

The DIGITALDOORS toolkit is the preferred method for inline processing of streams, whereas the DIGITAL DOORS desktop applications are generally easier to implement for end-user file processing. The remainder of this support document focuses primarily on file activity, although data stream processing is really the simpler abstraction.
File Source Locations DIGITAL DOORS accesses source data through standard URL, file path, X-pointer, and standard mapping. Files can be selected for individual, queued, or triggered processing through all the standard windows (X-Windows, MS Windows, and other Unix and Linux textual and graphical user interface shells). Access control security provided with volume mapping functions exclude or limit access to read, write, or view files through standard system methods.

File Storage Locations

Storage of DeClassified files, databases, data maps, recovery files, and supporting reports are controlled to preclude threats, attacks, invasion, and defeat of the dispersive security system.

Administrator and User Functions

The functions of the administrator and user are separated. The administrator cannot perform user functions, nor can any user, even one established by the administrator, have administrator privileges. Administrator access can be enabled so that it requires countersign of from another one to unlimited people to preclude collusion (430). In addition, newly created users are not activated without countersign from another party (431). Image recognition technology precludes one person from assuming all these roles (432).

The administrator (one access only) establish users, access rights, storage repository locations and access rights, feature settings, as well as user access, identification, and authorization rights.

The user (unlimited entries) can DeClassify and ReClassify documents, and with explicit permission of the administrator set Declassification options, view dictionaries, and establish or choose storage locations.

Mapping of Storage Locations

The administrator defines the set of available local and remote (networked) drive storage locations. The administrator can also determine whether users can define which of those storage locations they can choose or define them for each user set or specific user. There are valid security concerns over whether the administrator, the administrator along with the user, or the user alone can determine locations for dispersed information. Note that enabling a cascade of storage locations allows for survivability but also potential for external attacks.
Administrative and User File Storage Location Configuration By default, the set of all possible storage locations are defined by the administrator. The set of all possible storage locations can be defined uniquely for each user from within that subset; overlap of storage locations by user is allowable, but defined by the administrator. Users, may, only by specific allowance of the administrator, be permitted to choose storage locations, but then only within the set of all predefined possible storage locations.
Creation of DeClassified (Downgraded) Data Streams This is a user function only. The user selects a file; it is automatically is activated by workflow, as with an e-mail process. DeCassification, creation of map and recovery file, and specific usage of dictionaries and options will have been' previously defined.

Options for Data Streams

The DeClassified document can be downgraded or decoyed with various options. The map and recovery file can be encrypted, encrypted with mixed encryption methods and keys, and dispersed to an arbitrary level of redefined storage locations.

The Database

The database (of which there are actually many) record logs, event histories, and contain paths to recovery files. The database with recovery file locations can be disabled; this precludes reconstitution without known recovery file paths.

The Recovery Map

The recovery map is a text file that contains offsets and lengths of extractions, plus recovery information. The recovery file can be encrypted through an administrator-only accessible option. The recovery information itself can be in situ, encrypted in situ, or dispersed in plain text to one or many instance recovery files, or reference a single file, two files, three files or one to three for each extraction instance recovery files with encryption method, encrypted extraction, and/or on-time encryption key.

Creation of Extracted Data Streams

The recovery map represents the critical and important data which has been extracted from the original classified document. (Various optional reports could also include the extracted data.) The recovery map is encrypted in full, dispersed, and/or encrypted in part Extraction of Data Streams Extraction of critical and important information occurs as an automated stream input/output process or as a file operation. Extraction of critical and important data occurs through an exclusive process of matching data within the stream to dictionaries of words, phrases, sounds, images, and other multimedia patterns. Not all matches are extracted; most are' categorized and retained. Extraction of critical and important data also occurs on a non-exclusive basis; those data which are unknown, unmatched, and uncategorized can also be extracted. Also, random, sequential, and additional user specifications or manual efforts augments the aforementioned automatic targeting of critical and important data. Dictionaries and data patterns therefore do not represent a necessary and sufficient basis for human intelligence reconstruction of documents downgraded with DIGITAL-DOORS.

Encryption of Data Streams

All output data streams (and/or files) can be encrypted with any supported encryption methods, keys, or compound methods. Generally, the DeClassified file is not encrypted as part of the core workflow benefits. However, the DeClassified file can include in situ encryptions each one encrypted with any supported encryption methods, keys, or compound methods. The in situ encryptions can also represent decoy information. One time encryption/decryption keys are stored in a database (optional) or the hierarchy of recovery maps.

Encryption methods include symmetric and asymmetric (public key) methods. At present,- distributions include up to 10 different NIST encryption methods. Note that we are adding new methods as they become available and can integrate other methods as requested by customers. Wherever possible we seek to use one-time keys to bypass the inherent operational complexity and administration overhead of PICI methods.

Note that DIGITALDOORS encryption (and multicryption) is performed only on a single word or phrase, thereby yielding linear performance unlike with the round-oriented 3DES or Rinjdael algorithms that require non-linear increases in memory, disk space, and processing time as the data file increases in size.

Dispersion of Data Streams

Any data stream can be delivery literally anyway on a local, remote, removable, Internet-accessible, or VPN storage repository. It is only a matter of mapping the volumes and paths into each users' neighborhood (MS Windows terminology) or establish a fully-qualified path. These paths map with the administrator-configured paths, and are configurable on an ad-hoc or aggregated basis for each user. Generally, we suggest single repositories for each data stream type for simplicity. Also, all data streams can be disabled, although there are some safeguards to preclude total loss of important and critical information. It is possible for the administrator to override these safeguards with a secondary control.

Data streams can be dispersed to an unlimited number of locations. This is merely a matter of establishing an unlimited number of full-qualified paths. On a practical basis, we suggest single repositories for each data stream type. All network access control, authentication, and barriers are also enforced for dispersion. Hence, a user not granted privilege to a repository will be nominally unable to access that storage even though they may have a correct path to a recovery map. This is one of the beaurocratic securities supported by DIGITAL-DOORS.

MultiLevel Security

DIGITALDOORS provides an unmatched level security through granular control of individual documents, file streams, extractions, categorization of extractions, location, time, threat modes, users, encryption matrixes, encryption keys, and access to storage locations. Other concepts include: Hierarchy of Storage Access—Hierarchy of ReClassification, Cascade of User Access, Authentication, and Authorization, Controlled Release Parameters, Trigger or Authorization Control for ReClassification, Decryption of Data Streams, Reconstitution of Data Streams.

The data stream can exist anyplace. The reconstitution process is uniform no matter whether the DeClassified data is a data stream, a transaction, database set, e-mail, or other specialized format.

Dictionaries

Extraction of critical and important information is primarily but not entirely affected against dictionaries. Because, extraction solely by dictionary match provides a means to reverse-engineer the dictionary, thereby exposing an exploitable weakness, DIGITALDOORS employs a complete pattern matching algorithm, from within which matches are categorized and extracted or retained based on other built-in and administrator- or used-defined parameters. A number of pattern-matching and syntax-matching methods outlines within the DIGITALDOORS patents enhance recognition of complex data types unlikely to be found within a dictionary. Non-matches are typically extracted, thus extended the complexity of human intelligence exploitable a dictionary restoration of a DeClassified document. Replacement of extractions with decoys, random words, nonsense, and random characters obfuscates the apparent exploitable dictionary attack weaknesses.

The dictionary is also not one but several dictionaries (unlimited in number). A core dictionary provides language-specific common words for categorization. Supplemental dictionaries provide industry-specific words and terms to preclude excessive extractions that would render the DeClassified document useless. Two specific dictionaries provide additional filtration for user-selected terms and phrases to be specifically extracted when matched and to be specifically retained when matched. Supplemented words and phrases are easily added or deleted with a click of the mouse; typing not required.

User additions are supported at a global, workgroup, or user level. In other words, additions can be created a user-level to override workgroup or system dictionaries. This is both a useful functionality but also a security risk (which the administrator can monitor) should a user seek to undermine the system.

User additions are optionally masked to preclude dictionary attacks. Any or all dictionaries can be encrypted or masked to preclude dictionary attacks. These are administrator-only configuration issues.

Inclusionary

This is a supplemental dictionary used to override what has NOT been extracted for known or unknown reasons. When added to the inclusionary list, it is always targeted and extracted and/or encrypted.

Exclusionary

This is a supplemental dictionary used to override what has been extracted for known or unknown reasons. When added to the exclusionary list, it is always categorized but retained.

Phrases

This is a supplemental dictionary used to override what has NOT been extracted for known or unknown reasons. Often, critical and important information may consist of common words, which by themselves, would not be targeted, but as a phrase becomes a known concept. When added to the phrase list, it is always targeted and extracted and/or encrypted.

Sound Bytes

This is a supplemental dictionary used to override what has NOT been extracted for known or unknown reasons. Often, critical and important information may consist of common sounds, which by themselves, would not be targeted, but as a sound phrase becomes a known concept. When added to the sound list, it is always targeted and extracted and/or encrypted.

Image Subsets

This is a supplemental dictionary used to override what has NOT been extracted for known or unknown reasons. Often, critical and important information may consist of common images, which by themselves, would not be targeted, but as a image phrase becomes a known concept. When added to the image list, it is always targeted and extracted and/or encrypted.

Video Clips

This is a supplemental dictionary used to override what has NOT been extracted for known or unknown reasons. Often, critical and important information may consist of common videos, which by themselves, would not be targeted, but as a video phrase becomes a known concept. When added to the video list, it is always targeted and extracted and/or encrypted.

Why do Traditional Security Methods Disappoint?

Traditional methods of security based on barriers and encryption prove sufficient for a single skirmish. In contrast, adversaries defeat any barrier- and encryption-based defense during prolonged warfare. Traditional barrier-based and encryption do not withstand direct assault, insider subversion, or brute force. Successive predatory adaptations over a sustained period detect and capitalize on exploitable weakness. Ciphers are camouflage. They fail when attacked by means that see through the concealment. The methods to defeat these methods are never readily apparent until that inevitable failure. Furthermore, camouflage is protection only for a large group where it provides visual confusion, as adversaries evolve methods to distinguish and isolate individuals in a focused encounter. By analogy, encryption fails under adaptive attack.

Although data might appear as a fixed asset because it resides in one place most of the time and thus needs a fixed defense system, an analysis of successful attacks shows that the successful attacks have not occurred as anticipated or within the predetermined battle lines. The unsuccessful attacks are easily repelled. It is the surprise, unforeseen, unexpected, and unanticipated attacks that succeed. Furthermore, stealth increases the chances to succeed. Attacks could occur against anywhere, from anywhere, at any time, using any known or unknown assault methods. Fixed security failure is thus inevitable.

While it conceivable to continuously enhance a firewall and encryption to stay ahead of hacker and information warfare (infowar) assaults, inevitably, there will be patch and upgrade failures, newly detected flaws, and maintenance deficiencies undermining traditional barrier-based and encryption security. Furthermore, distributed technologies, mobility, and wireless anywhere/anytime implementations create a widely separated, amorphous, and perforated infrastructure defying the deployment of useful barriers. The scattering also precludes the workflow necessary for the useful implementation of distributed encryption. Whereas foregoing security attacks have been initiated within predefined battle lines, mobility enhances the opportunity for random attacks from unknown quarters. Future attacks will be fierce, ending suddenly with limited opportunity to counterattack an invisible assailant and Mice back, as is one of the newer-employed security philosophies. It is not a question that barrier security will work. It eventually fails under sustained siege and subtle exploration of systemic and exploitable weakness.

How and why does Dispersion Work?

Dispersion is a sustainable offensive and defensive security, survivability, privacy, confidentiality, and anonymity measure. Dispersion works as a security method because no attack, accident, or failure can totally destroy a diffuse and heterogeneous population. There are always survivors; dispersion provides natural survivability and a functional method to reduce infrastructure risk. This contrasts to barrier-based security where a breach not only allows penetration and an entrance route but concentrates the defenders and assets now ironically trapped within the same barriers meant to protect them. This permits total annihilation and asset plunder. Dispersion and magnitude (protection by large numbers and corresponding increase in chaos or entropy) mirror nature's own security. Dispersion is both a capable defense and also an offensive method. Dispersed attacks thin the depth of the defenses in any one place or even in multiple locations. While military attacks against concentrated defenders have inevitably succeeded in history, no method, formula, technique, or policy has been successfully deployed against a dispersed guerilla offensive on a sustained basis. The only successes against guerilla warfare have been achieved either by total systemic infrastructure destruction or by appeasement through compromise.

Systemic infrastructure destruction usually undermines benefits in victory to the "winning" side, so it is a Pyrrhic victory at best, and rejected in sanity. Appeasement and compromise usually create stability and productivity to provide a sustainable and effective defense and offense. A security concept based on guerilla warfare tactics pushes the envelope from historically inevitable failure to a realm defined by compromise, appeasement, and survivability. The DoD calls this consequence "survivable networks" and "data mitigation." Skirmishes are won or lost with traditional barrier-based efforts but wars are always won or pacified through sustainable offensive and defensive measures. In general, though, that attitude creates a workable security.

DIGITALDOORS applies guerilla tactics to disperse data resources and sustain a workable security. This is not redundancy or redistribution of data sources but the dispersion of critical and important data elements that can be as small as numbers, credit card information, or names. Even a failure in dispersive security avoids catastrophe with rip-stop of self-limiting protections. The DIGITALDOORS security effort need not rely only on such guerilla tactics; it coexists with the additional barrier and encryption defenses proven effective in the single skirmishes. DIGITALDOORS provides a security that in aggregate raises the bar for protection.

The mathematical proof for the Security Theory is available as a .pdf file. The Dispersive Protection Theorem Proof is available as a .pdf file. The Anchor Independence and Entropy Theorem Proof is available as a .pdf file, although in part it is based on prior theories. You can request the seminal paper, A Mathematical Theory of Communication, available from us or locate it online at Bell Laboratories (Lucent Tech) at http--://cm.bell-labs.com/cm/ms/what/shannondat/paper.htmlas a .pdf file.

What is DIGITALDOORS Performance, Overhead, and Storage Loads?

Less than firewalls and encryption, sometimes very much less, providing security processing (both scrubbing and unscrubbing) at wire speed. Note that unscrubbing, that is, source reconstitution, is always performed at wire speed. Any latencies or performance lags are subject to core infrastructure inefficiencies unrelated to DIGITALDOORS Scrubbing can be optimized for speed of performance, accuracy in syntactical parsing and categorization, or somewhere in between. Some data requirements yield both accuracy in processing and speed of performance.

Realize that DIGITALDOORS is optimized for unstructured and freeform documents, such as text files, and the performance is enhanced for accuracy without human intervention. However, DIGITALDOORS is easily optimized for speed of performance with structured data, such as databases, transactions, or XML files. By eliminating access to dictionaries, extraction rule bases, and artificial intelligence decision-making (such as understanding if John refers to a specific person, a class of person, or an object), extraction of fixed record layout data or other defined transactions can be processed at wire speed without remote or coprocessor reinforcement. When performance-is thus optimized, CPU, I/O, disk access speed, or network delivery speeds and latencies revert to standard bottlenecks.

Overhead is consistent with a simple text processing thread. Storage loads typically increase 6%, but the dispersion of data to tiered cost data storage often yields storage costs decreases of 30 to 72%. Network loads tend to increase by 6% with extra overhead for access and authentication of about 5%. Some of the scrubbing overhead can be switched to side channels so as not to effect critical paths. On the other hand, increased reliance on DIGITALDOORS can diminish the need for encryption and firewalls, adding back as much as 28% performance lost to those traditional technologies.

What is a Useful Metaphor to Describe DIGITALDOORS?

Nature is the metaphor for the success of dispersive defense technologies. In fact, there are relevant proverbs and adages. Eggs placed in a single basket is foolish, as Don Quixote declares in his aphorism. Eggs placed in multiple baskets, then concentrated within a single location by firewalls and other barriers is still insufficient, although it is the current technological security solution. In contrast, no attack, accident, or failure can totally destroy a dispersed and heterogeneous population, as there are always survivors. By analogy, when you put all your eggs in one basket, even if you watch that basket relentlessly, any protection failure is catastrophic. In fact, once the protection is breached, panic usually occurs augmenting the damage. For example, chickens flee from the fox, trampling their own eggs; network and system administrators disable access and features, halting services, inconveniencing users, run validation programs to search for damage stealing CPU time, and delete files with indicated damage whether actual or not.

Any lack of safety or breach in security is mitigated through complexity, separation, sheer numbers, and inaccessibility when dispersing the eggs and keep them moving ahead of predators. Nature implements such security measures as evidenced by seeds floating on the wind and diffusion in vast numbers. Nature also enables survivability procedures, enabling seed access (viability) only after a fire; that access is not otherwise openly available. Natural security is effected by changing gene codes (like passwords and multi-stage authentication), protection within large schools to preclude complete access by overwhelming predators, scattering the schools when a predator attacks, and multiple schools that travel to different places and by different paths.

6. Do I Get My Extractions Back?

A fundamental value in the design and implementation of DIGITALDOORS was that scrubbing would work, and so would unscrubbing reconstitution, without question or qualification. The process as implemented for scrubbing/unscrubbing is simple so that little can disrupt it. Only overt effort or system operation failures potentially can cause problems. However, even under those scenarios, standard system maintenance and recovery tactics are sufficient for continuity. In fact, during the design cycle, the possibility to create scrubbed data that could be altered and then restored in a logical way was considered, seen as marketable and thus implemented. There are two ways to a restore scrubbed data. The first Is to return the data to Its existing state In terms of form, format, and content, as with a data backup and restoration. This Is already handled by operational technology. The second is to logically restore data to reflect alterations, time, and authorize phased-stages. DIGITALDOORS sustains this latter craft. The extractions are always available BUT reconstitution is always qualified based on authentication, time frames, and threat modes. This is similar to encryption—if you lose the encryption key—decryption is complicated, perhaps forever, but DIGITAL DOORS Supports transitional results with phased-level reconstitution and delivery.

You Will Get the Extracts Back

The extractions are always preserved somewhere. However, protections in the release authorization system preclude wholesale and insecure reconstitution. The data is always safe, and fully recoverable with authentication. Redundancies protect your critical and important data and enable its reconstitution. These redundancies are configurable under user and administration control; all or some may be engaged or disabled, as demanded. These redundancies include:

Reconstitution script (also called a "recovery file")
Extraction database
Extraction log file
Image backup
Positive images (an extraction map)

Note that no links, anchors, markers, fields are dependent references are preserved in the scrubbed data stream for security, safety, operation, or production reasons. The scrubbed data represents a similarity with the original. The external recovery file and other resources provide the methods to restore the original data stream identically or in part. This is defined in greater detail in the Technical Background white paper.

It Will not Break

The system is redundant although secured. In other words, the data is there, the scripts for reconstitution are there, but the security authentication must be there. Almost anything can go wrong in computer operations. Under such conditions, most exigencies can be mended assuming that standard system administration has been performed with sufficient skills and tools available to repair network, hardware, and system failures.

Redundancy (on a Administration-selected Sliding Scale) . . .

Circumstances are rare, and rarer still under proper system administration, to lose your data. However, these circumstances are the same as any other existing catastrophic failure, with or without security measures in place. Under normal operations, the process is redundant and resistant to failure. It is possible for the administrator to disable log, database, backup, and extraction mapping to disable redundancy. The reconstitution script (or recovery file) cannot be disabled. However, if this file is corrupted, deleted, lost in a network, lost in the Internet, or 'stored on a device which is no longer available or accessible, reconstitution (without the redundancy) will be incomplete.

Reconstitution Really Works

The only deficiencies were observed during development when new features were added. Core functionality was and remains robust. Even those early observations were not catastrophic, rather limited in the form to that displacement errors. In other words, reconstitution worked, but the placement was off by one or a few blank spaces or characterized by extraction overlaps. Known failures have been repaired to date. Failure is unlikely in any form, and generally limited to appearance.

"Failure" of any type is more likely observed during scrubbing when complex mathematics, odd or unusual punctuation and semantics are employed in the source data streams, or the wrong language or dictionaries are selected by the administrator or users. Even when data is extracted which the users deem should not be or is not extracted when it should, this data can be automatically added to the exception dictionaries so that it is always scrubbed, or always not scrubbed. Complexities in data streams can be simplified for successful scrubbing or alternatively, you can contact DigitalDoors Inc, and Network Performance. Inc. for customized solutions to properly process your unusual data streams.

"Failure" driven by security and authentication prerogatives is a different matter, as it is not failure but rather a complete success in DIGITALDOORS Lost passwords, failures in validation or user authentication, and active threats will properly preclude reconstitution until those conditions are resolved.

What Happens if DIGITALDOORS Scrubs Too Much or Misses Words?

That is very easy. You can change the category options, and select less of them. If that does not work to your satisfaction, then after the document has been scrubbed once, open the extraction list and the ignored list windows. Words that were scrubbed and should not be scrubbed will appear in the extraction list. Select each word and click on it. Each word will be moved into your personal, system, or networked list of words that should not be scrubbed in the future. Words that should be scrubbed but were not scrubbed will appear in the ignored list. Select each word and click on it. Each word will be moved into your personal, system, or networked list of words that should always be scrubbed in the future. If you cannot find your word, click the checkbox for sort and the words will appear in alphabetical order. If you want to find words in process order, uncheck those boxes. A second scrubbing pass of the document with the words and phrase override additions usually solves any problems of scrubbing too much or too little.

In some cases, words will be extracted (scrubbed) or ignored because they are in the dictionary and categorized in standard ways different from your specialized needs. It is difficult to alter the dictionary, so such words are best added to the always scrub or always ignore user dictionaries. However, if you find that your organization applies names and words in ways different from standard idiom, we can build specialized core dictionaries for you.

Is there Security Available in Extracted Dispersed Data?

Yes. DIGITALDOORS targets data streams and separates that data into a context skeleton and the extractions. Firstly, dispersal of scrubbed data streams is statistically sound. See the Technical Background for the explanation of Shannon's informational approach to entropy. Secondly, access to skeleton and extraction detail are protected by multi-stage authentication. Thirdly, the binary separation of skeleton and extracts precludes useful invention, comprehension, or even the legal definition of information to legal act.

The context skeleton is devoid of details and only provides context. The extractions exist as the recovery file, database records, or within a positive stream skeleton. The skeleton only establishes the purpose, structure, application, or intent of the data stream. If extraction was completed correctly, there is no sufficient reference or statistical dependency to reconstruct or comprehend the original data stream. The extraction, however, provide reference and dependency. In some cases, the extractions in the recovery file provide sufficient and necessary data to undermine security. In direct contrast with common sense, small recovery files provide more insight into the context. It is the large extract and recovery information that are cloaked in chaos; technically, this process has been termed the increase in entropy in the communication system by experts in information and signal theories. Because the scrubbed data stream is the intended distribution to users, Internet storage, and applications, security is provided by loss of detail.

The recovery file, maps, or database records—if optionally configured for publication—contribute to a security risk, although in almost all cases, a substantially reduced security risk. As the size of the recovery file becomes large, the context is blurred under the Theory of Large Numbers. This represents chaos lacking a context or skeleton. Consider all the private data in the world, all the facts in the world, and government spy data blended like confetti . . . enticing, but totally useless. In some environments, access and distribution to large number of scrubbed data streams with the recovery files will not compromise security. It is viable if only because the statistical chaos is great. Note well, that it is inappropriate to distribute scrubbed and positive data streams together because file sizes and date stamps provide sufficient cue to efficiently decipher chaos. Dispersion, cache, buffer, recycle bins, date stamps, file sizes, registry entries, deleted but not erased data, and other tracks can be cleared with optional functions.

Is there Independence and Security in Distribution?

Yes. The chain of custody is preserved, and is also recoverable after the fact. The best way to comprehend data independence and the effective of the simplest form of DIGITAL DOORS security is to review our sample library of scrubbed data streams. The samples are all files rather than intermediate piped results, as might be desired in host, server, or network processes. There are several variants, as defined below:
Sample source documents
Sample scrubbed documents
Sample extraction files (recovery scripts)
Sample positive files
These files are available on distribution CD of DIGITAL DOORS, available on media by request, and delivered by formal written request over the Internet. The distribution on the installation CDs can be found in the samples subdirectory on the Windows, Solaris, AP/L (volume samples), and Linux versions.

Is the Skeleton Template Independent from the Data?

Yes. Independence of data from one stream with data from other stream (data may be similar in form and format), but the extraction sets should be nominally independent. Any dependence is accidental, as when a division of one corporation is related to a different division within the same corporation. Such dependence is only incidental and cannot be reliably exploited, which is adds to the basic security and trust.

The skeleton defines what should be expected in the extraction or recovery files, but does not presuppose it. The skeleton does not define the actual contents any more than a blank form might. The extracted data does define and presuppose the form but does not define the context, thereby achieving data independence necessary to enable security on a mathematically-provable basis.

Are the Extracts Independent from Other Extracts?

Yes, and no. The data itself is independent by definition. The data is usually independent from other data, except that most organizations have particular goals and processes; in that regard, data sets will share content. However, as the number of data sets becomes large, the data will achieve statistic independence under the Law of Large Numbers. Since such chaos or randomness is insufficient for encryption and is insufficient for DIGITAL DOORS, we have separated the extracts and suggest that they not be made publicly available. Specifically, a catalog of extracts can be used to define a context; this exposure is best avoided to maintain security. So the extracts are statistically independent, but not sufficiently random to guarantee general public release.

Is there Strength in Coordinated But Distributed Resources?

Yes. It is important to realize that the extractions are not randomized (although they can be with certain administrator or user configuration) and the extractions are not divorced from the skeletons. DIGITALDOORS can reconstitute any, some, or all of a data stream from any location assuming authenticated access to the binary components. DIGITALDOORS provides strength in unity even though the pieces are infinitely dispersed. In this way, the parts of your information army can be mobilized and realigned against any necessary enemy or to support any business partner.

Is Single (1-Stage) Authentication Sufficient?

No. DIGITAL DOORS does not support this as the necessary and sufficient access method. Single stage, one-stage, or 1-stage authentication is based on username and password. This is a reasonable method for local access control (of a single physical accessible computer) but is insufficient for network access. All pairs of usernames and passwords must be delivered by plain text thereby creating a significant window of opportunity for any hacker with protocol analysis tools. Once the username and password pair is exposed, other security barriers can compromised, including \etc\hosts lists, RPC calls, services and data repositories, and firewalls.

Is Double (2-Stage) Authentication Sufficient?

No. DIGITAL DOORS does not support this as the necessary and sufficient access method. Double stage, dual-stage, two-stage, or 2-stage authentication is based on username and password. It differs from single authentication by delivering username and password pairs as encrypted objects. This is a reasonable method for local access control (of a single physical accessible computer) but is insufficient for network access. Remote protocol capture and analysis (packet "sniffing") defeats 2-stage authentication. Although usernames and passwords are encrypted, the encryption method and encryption keys must be sent during the login session or negotiated in advance. If they are sent during the login session, sufficient information is available to decipher the password pair or counterfeit of it. If the encryption keys are negotiated in advance, the workflow is simple enough that a few captured sessions provide enough statistical information to decipher the keys. This is in addition to any weaknesses that exist in the encryption methods. Furthermore, it is also possible to counterfeit the username and password pair for access without deciphering them. In effect, a hacker can make a copy of a username and password pair, even if encrypted, and have a copy of the access key.

Once the username and password pair is exposed, system and network access is available, and then other security barriers can sequentially compromised, including \etc\hosts lists, RPC calls, services and data repositories, and firewalls.

What Type of Authentication can be Found in DIGITALDOORS?

DIGITALDOORS applies a multistage authentication process. It applies traditional 1-stage authentication, and augments that with a newer Internet-required 2-stage authentication implemented with at least 256-bit CryptoAP1. The encryption engine is interchangeable with many others, including, Blowfish, DSS, and Rinjdael. In addition to this established process, DIGITAL Dawes adds 7 additional layers of validation. The first is random 2-stage relogin (through RollCall). The second is the random presentment of challenge questions (through RollCall). The third is random biometric authentication by a wide choice of technologies. The fourth method is the challenge of a friend or foe question, posted internally and changed daily. Identification of friend of foe to ascertains access currency and thus overcomes the traditional system administration failure to invalidate 1-stage authentication of terminate, retired, and resigned employees. The fifth and sixth stage validations actively and instantly disable access based on group settings, time parameters, and threat modes. The seventh mode relies on local certification or remote viewing by another validated party to corroborate identity and access (through RollCall). This validated party might be the system administrator, a manager, or a random peer to constrain collusion. Note that the chain of custody is always preserved. The AntiCopy function and the time-limited release mechanisms additionally provide a means to vet, retract, and limit the risk exposure. These authentication methods are listed here:

Traditional 1-stage authentication
2-stage authentication implemented with at least 256-bit CryptoAP1
Random 2-stage relogin (through RollCall)
Random presentment of challenge questions (through RollCall)
Random biometric authentication
Challenge of a friend or foe
Disable access based on group settings
Disable access based on time parameters
Disable access based on threat modes
Local certification
Remote viewing by another validated party to corroborate identity
AntiCopy function
Time-limited release mechanisms to vet, retract, and limit the risk exposure

What Protects Extracts and Reconstitution in DIGITALDOORS?

The DIGITALDOORS access and authentication system is the customary means to prevent access to extraction materials or view a document in reconstituted form. In addition, normally, extracts are not published. That is another level of protection. Furthermore, the process to match up scrubbed files and extracts or recovery scripts precludes most efforts to compromise the system. Remote storage, supplemental extraction file encryption, and mobility of extractions adds the added dimension of location dispersion to this critical and important information. Also, traditional access control and firewalls provide ad hoc defense against the usual skirmishes. If you had faith, and best you didn't, you would not need DIGITALDOORS if traditional methods worked. However, they have been repeatedly and universally defeated.

Is Multi Encryption the Same as Multiple Encryption?

No. Multiple encryption means that a document is encrypted with one method and a define key and the encrypted document is then used as the source for a second stage of encryption using the same method and a different key. This results in weaker encryption, and we do not use it. Rather, DIGITAL DOORS uses MultiCryption, which is the random application of one encryption method (e.g. AES, DES, 3DES, etc) with a one-time random encryption key for each element within a document to be encrypted. The resulting encrypted document incorporates ten different encryption methods, which cannot be determined from the result, an infinite number of random keys, and mathematical independence between methods and keys. This is infinitely more secure than single or multiple encryption methods.

Engines are: Target, Extraction, Substitution, Encryption and Dispersion

FIG. B24 shows hardware processing.

FIG. B25 shows extraction-dispersion-encryption multicryption.

Process in hardware includes platforms (sell phone, wireless, PDA, laptop, server, RPC) and format (PCI, smartcard, RAM cards, PCMCIA, USB and appliance. Data streams include signal, sound, video, image, text and data.

Location-Based Access Security Conception

During the process of developing security technologies for defending critical infrastructure, we discovered the complexity of the business model and the obvious need to redefine and create new systems and methods for doing business. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.

Purposes and Advantages of Invention

The invention is a machine and process and its main purposes and advantages are as follows:
Limit access to facilities, service, data, equipment, weapons, and other resources based on location
Internally
Externally
Indicate to others violation of location restrictions
Track activities of violators upon indication of location restriction
Terminate events upon intrusion within a region
Initiate events upon intrusion within a region
Provide granular data access security and granular data reconstitution based on location The technology assumes use of satellite GPS, ground-based GLS services, SMSR, cell towers, cellular, and other radio frequency services to triangulate, generate a way point location, and establish access or security internal to or external from a location range. For example, we perceive the extension of the ability to use 802.1 1x series local area networking protocols to triangulate position for a mobile computer or other smart device, thereby establishing location without more sophisticated devices or in conjunction with these devices in order to authenticate position.

This concept is a location (GPS, GLS, or other location-defining technology)-based access-oriented security, such as an automated trigger; an automated safety; a trip wire; an interlock; a method to disable systems, activity, or access; a means to limit functionality or access in whole or in granular parts. Security access limited by a location waypoint or calculated range (using satellite GPS, high altitude services, or earth-based range finding GLS) about a waypoint with physical means or mathematical calculations to define a rectangle, rectangular solid, cube, circle, oval, spherical region, or other areas definable by equations or aggregated ranges. Physical and logical access or entry control to weapons, devices, vehicles, computers, equipment, tools, data, networks, local access, remote access beyond physical location, which is generally a prior logically known, can be enabled or disabled with this technology. Regions can consist of complex definitions of three dimensional areas of arbitrary shape and sizes. The only known limitations are location determination resolutions and access to location signals. A region can be defined as an area circumscribed internally by a perimeter or an area external to that perimeter. Note that the region is a three dimensional space arbitrarily defined by a mathematical or physical set of dimensions, and regions can be defined by multiple areas to include off shapes such as interconnected and overlapping ranges or ranges with internal holes.

Description

The machine consists of the following elements for automatically determining the access to or denial of service, or automatic activation of a service based on a location, and may include:
1. Data formatting
2. Data encryption
3. Data delivery
4. Validation of time with one or more multiple alternative time servers
5. Establishment of location range perimeter
6. Internal confinement
7. External within no man's zone
8. Logging of location and access results
9. Retain property within location range
10. Retain people within location range
11. Retain application operation with location range
12. Retain data storage with location range
13. Retain data files, streams, records, units with a location range
14. Asset tracking
15. Software registration/anti-pirating/a real site licensing scheme by GPS
16. Location not primary or backup
17. Location moved since last use
18. Local data collection
19. Remote data collection
20. Local challenge
21. Remote challenge
22. GPS Time Stamp validation
23. Set GMT offset to longitude and handle +1-error
24. Local data challenge (database is local)
25. Remote data challenge (database is remote)
26. Combined internal/external ranges
27. Lookup of waypoint to address, location, relevance, proximity, geocode zone, census block and match between data coordinate systems
28. Granularity of location range definition
    A. global
    B. per user
    C. Use some, not all The invention is a multilevel security system that among other things enables parties to control release the electronic data and the electronic granular critical data into the documents they are sharing with other parties.

In general, this aspect of the invention may cover the following elements. Reference to the "above in item s" below is simply made for relation back purposes.

1. A computer software product for securing data having one or more security sensitive words, characters or icons in a computer system with memories designated as a remainder store and an extract store, the computer product having instructions for a computer system for: extracting said security sensitive words, characters or icons from said data to obtain extracted data and remainder data therefrom; storing said extracted data and said remainder data in said extract store and said remainder store, respectively; and, permitting reconstruction of said data via said extracted data and remainder data only in the presence of a predetermined security clearance.

2. A computer software product for securing data as above in item 1 operative on an email program or a browser program and including instructions for facilitating said storage of extracted data rather than storing said extracted data, forwarding said remainder data to an email addressee or a targeted destination and permitting retrieval of said extracted data only in the presence of said predetermined security clearance prior to reconstruction.

3. A computer software product for securing data as above in item 2 wherein said product operates in conjunction with the email program and includes instructions for encryption and decryption of one or all of the email, extracted data and remainder data.

4. A computer software product for securing data as above in item 3 including encrypting said extracted data and either appending or including said encrypted extracted data with said remainder data to form a composite email; and emailing said composite email to an addressee.

5. A computer software product for securing data as above in item s 1 for transparently establishing and managing the separation of user-based communities of interest based upon crypto-graphically separated security levels, said user-based communities of interest representing a plurality of users having a corresponding a plurality of security levels each with a respective security clearance, the computer product having instructions for the computer system for obtaining subsets of extracted data and remainder data; storing said subsets of extracted data and said remainder data; and, permitting reconstruction of some or all of said data via one or more of said subsets of extracted data and remainder data only in the presence of a predetermined security clearance of said plurality of security levels.

6. A computer software product for securing data as above in item 5 including encrypting said subsets of extracted data with said plurality of encryption types to obtain multiple level encryption in one document or data object; and, decrypting all or portions of said one document or data object with multiple level encryption only in the presence of a predetermined security clearance of said plurality of security levels.

7. A computer software product for securing data as above in item 1, the data being secured against a plurality of computer events and used in connection with an electronic attack monitor generating a corresponding plurality of attack warnings, a plurality of users having a corresponding a plurality of security levels each with a respective security clearance, the computer product having instructions for the computer system for: extracting data dependent upon respective ones of said plurality of attack warnings to obtain the extracted data and remainder data, the degree of extraction dependent upon respective ones of said plurality of attack warnings; storing said extracted data and said remainder data based upon respective ones of said plurality of attack warnings; and, permitting reconstruction of some or all of said data via said extracted data and remainder data only in the presence of a predetermined security clearance of said plurality of security levels.

8. A computer software product for securing data as above in item 7 wherein said plurality of computer events includes hacking attacks, power loss, environmental conditions adverse to said computer network, said electronic attack monitor including sensory systems responsive to said plurality of computer events to generate said plurality of attack warnings, and the filtering and storing responsive to said plurality of computer events which include said hacking attacks, power loss, environmental conditions adverse to said computer network.

9. A computer software product for securing data as above in item 1-8 wherein said computer system is one of (i) a data input device interconnected and operable with another computer system having a processor and a memory having distributed memory segments; (ii) a single personal computer, (iii) a network of computer linked together, (iv) a plurality of computers operative over the global computer network or Internet.

10. A computer software product for securing data as above in item 1-9 wherein said data is an electronic document, image, email, data from a browser program, audio or video file or a combination thereof.

11. A computer software product for securing data as above in item 1-10 wherein said memories are floppy discs, flash memories, hard drive memories, ROMs, RAMS, CD ROM memories, integrated circuit memories, client computer memories, server memories, computer memories coupled to client computers, computer memories coupled to server computers, or distributed memory systems in an interconnected communications network.

12. A computer software product for securing data as above in item 1-11 wherein said software product is deployed over a client-server computer system and said server stores one or both of said extracted and remainder data and permits reconstruction only in the presence of a predetermined security clearance as a download to the client computer.

13. A computer software product for securing data as above in item s 1-12 wherein the extracting operates on credit card data, financial data or account data.

14. A computer software product for securing data as above in item 1-13 implemented on an information processing system.

15. A computer software product for securing data as above in item 1-14 wherein the extraction utilizes a parsing algorithm without designation of said security sensitive words, characters or icons and said parsing algorithm based upon one or more of a bit count, a word, a word count, a page count, a line count, a paragraph count, an identifiable document characteristic, an identifiable word characteristic, an identifiable letter or number characteristic, an identifiable icon characteristic, an identifiable data object characteristic, capital letters, italics, and underline.

16. A computer software product for securing data as above in item 1-15 including establishing a plurality of security levels each with a respective security clearance for subsets of said security sensitive words, characters or icons and including permitting either full or partial reconstruction in the presence of respective ones of said plurality of security clearance levels.

17. A computer software product for securing data as above in item 1-16 including encrypting one or both of said extracted data and remainder data and decrypting during reconstruction as necessary and permitted based upon said security clearance.

18. A computer software product for securing data as above in item 1-17 including instructions for deleting data, input into the software product, from a data input device after storing.

19. A computer software product for securing data as above in item 1-18 including mapping said extract store and remainder store or plurality of extract stores, storing said map in a map store, and permitting access only in the presence of predetermined security clearance.

20. A computer software product for securing data as above in item 1-19 including identifying said sensitive words, characters or icons prior to extraction.

21. A computer software product for securing data as above in item 1-20 including utilizing placeholders in said remainder data representing non-reconstructed, extracted data during full or partial reconstruction, said placeholders being one from the group of characters, icons, substitute words, data objects, underline and blank space.

22. A computer software product for securing data as above in item 1-21 including the use of one of an inference engine, neural network and artificial intelligence process to extract, store or permit reconstruction of said data.

23. A computer software product for securing data as above in item 1-22 including one or multiple types of encryption and decryption of one or all of the extracted data and remainder data relative to the degree of security of said data.

24. A computer software product for securing data as above in item 1-23 wherein the extraction and storing represents granular deconstruction and dispersal of said data.

25. A computer software product for securing data as above in item 1-24 including displaying a vendor's advertisement prior to one or the other or both of said steps of extracting and permitting reconstruction and optionally displaying a link to a vendor's web site with said advertisement.

26. A computer software product for securing data as above in item 1-25 including associating a monetary charge for one or more of said extracting, storing or permitting reconstruction.

27. A computer software product for securing data as above in item 1-26 including displaying said security sensitive words, characters or icons in a distinguishing manner prior to extracting.

28. A computer software product for securing data as above in item 1-27 wherein said software product is stored in a computer readable medium, CD ROM, in a network or in a singular or a distributed computer system.

29. A computer software product for securing data as above in item 1-27 wherein said computer system operable with the reconstruction portion of said software product includes a display fed from video memory having a plurality of frame memory segments, the reconstruction including interleaving extracted data and remainder data into respective ones of said plurality of frame memory segments.

30. A computer software product for securing data as above in item 1-27 wherein said computer system operable with the reconstruction portion of said software product includes a data display system with at least two separate but visually overlaid displays, the reconstruction including displaying said extracted data on one of said at least two displays and displaying said remainder data on another of said at least two displays.

31. A method of securing email data having one or more security sensitive words, characters or icons, the method used in conjunction with an addressee email device having a decryption routine, the method comprising: extracting said security sensitive words, characters or icons from said email data to obtain extracted data and remainder data therefrom; encrypting said extracted data and either appending or including said encrypted extracted data with said remainder data to form a composite email; and entailing said composite email to an addressee.

Sketches

See Building and Testing for samples and marketing collateral.

Ramifications

The invention is a system and a method for location (UPS, G LS, or other location-defining technology)-based access security (a trigger, a safety, a tripwire, an interlock, an automatic trigger, a method to enable or disable a device, a means to limit functionality or access in whole or in granular parts). This makes it possible to provide mobile security, such as vehicles, computers, weapons, data access, electronic leash which is more robust and different from anklet systems as it provides an event trigger with other devices. For example, a vehicle, man trap, or other services can be disabled after roaming from a given range.

Possible novel features first and foremost pertain to the access to or denial of service for data resources based on location. This prevents internal or external access to critical and important data sources or the facilities for data processing. Possible novel features include a biometric-like method of security based on location, either within a range or external to range, or within a compound internal and external range, such as within Metro-Washington D.C. but not within or near the Iraqi embassy, or within the NSA complex, but not within Building A or Building B, but within floors 7, 10, and 11 of Building D, as a means to disable, disarm, or render harmless any device, service, function, vehicle, weapon, etc. when removed from the field of battle, abandoned when a territory has been taken, or captured and used by hostile forces.

Building and Testing

The screen images in the figures section demonstrate the machine and process in action. The details in this section were described in the software and hardware development.
1. DigitalDoors Architecture
2. DigitalDoors Defenses in Depth
3. Samples Extraction and Reconstitution
4. Samples multi typo encryption in one document
5. Technical Background: DigitalDoors
6. DigitalDoors: A New Approach To Security And Survivability
7. DigitalDoors Architecture Process & Data Flow
8. The Security of Location Map and Recovery File
9. DigitalDoors Elements Necessary to Secure DigitalDoors Frequently Asked Questions
10. DigitalDoors Engines, CPU, Hardware Processing
11. Drawings of the Architecture

Previous Disclosure of Conception

See prior provisional patent or patent applications for description of data security technology. This is an additional but separate technology based on access or denial based on location, albeit used as an adjunct for establishing validation to data. This technology is conceivable useful in other applications, including the trigger lock, trigger interlock, trigger safety, or automatic detonation. Provisional patent application: Secured Sharing of Information with dispersed data Mining and searching capabilities, Jul. 16, 2002; Data security system and method with parsing an dispersion techniques, May 23, 2002 Data security system and method adjunct to e-mail browser or telecom program, May 23, 2002; Data security system and method for separation of user communities; Data security system and method responsive to electronic attacks; Data security system and method Jul. 27, 2001.

GPS and GLS Security Granularity Access

DigitalDoors provides granular security access by location range. The levels include administrator access, user access, document access, and location. A location is defined as a GPS or GLS coordinate point (that is, a-waypoint), delineated by a latitude, longitude, and optionally an altitude.

Location range is defined to be that point within the error margin of SiRF Start 1, SiRF Start 2 or military GPS accuracy, and the area bounded by a latitude, longitude and altitude perimeter configured for that location or more specifically for that location for each defined user. GPS accuracy is 60 meters for selective acquisition civilian use, 2.5 meters for SiRF 2 with selective availability disabled, and within 1 meter for military receivers.

The location can be inclusive or exclusive; this means access can be granted at the location and within its perimeter or access can be granted only when external to that location and its perimeter. Location ranges are described.

Multiple inclusive locations can be configured for access, or combined with multiple exclusive locations. Overlapping inclusive locations can be configured effectively to create complex shapes and ranges. Note that access is granted when a user is at least within any one internal location range and does not violate any external location zones. Conflicting inclusive zones within exclusive ranges are identified by the DigitalDoors and cannot be created. Conflicting ranges are described.

Access control is specifically defined for:
A. Administrator and administration functions can be locked to a specific location range(s).
B. User access can be limited to specific location range(s).
C. Each document, data stream, or other resource can be accessed only by conforming to specific location range(s).
D. Each document, data stream, or other resource can be accessed only by specific user(s) within specific location range(s).

Granular Access Control is Illustrated

GPS access is such that a GPS receiver receives satellite signals, converts these into NMEA positions. These NMEA positions in turn are converted into latitude, longitude (and optionally altitude) information, which is then matched against the location ranges to establish access rights. Data can be encrypted for local (GPS) or remote processing (GLS). Altitude is necessary to establish office building floor position. GPS time signatures are applied to validate data. GPS motion and speed vectors can determine location with additional accuracy and can be used to enable or prohibit access within moving vehicles.

Since it is feasible to falsify GPS data by-storing it to a data file, the GPS data can also be validated against external time servers, or encrypted and delivered for remote processing. In addition, the validity, of GPS, information can be processed through an external connection (Internet or VPN, for example) for an additional layer of security. For ad hoc access or remote confirmation, GPS information can be distributed in the form of GLS services, which in turn, can be applied for remote access control.

GPS and GLS services can be combined with commercial smartcard identification, voiceprint of fingerprint biometrics, atomic time stamping, time of day access controls, the DigitalDoors Friend or Foe Challenge security system, and remote sensing security applications.

Location-Based. Security Granularity Access

DigitalDoors provides granular security access by location range The levels include administrator-access, user access, document access, and location. A location is defined as a GPS, GLS, or 'triangulated wireless network coordinate point (that- is, a waypoint), delineated by a latitude, longitude, and optionally an altitude. Location range is defined to be that point within the error margin of SIRF Start 1, SIRF Start 2 - or military GPS accuracy, and the area bounded by a latitude, longitude and altitude perimeter-configured for that location or more specifically for that location for each defined user. GPS accuracy is –60 meters for. selective acquisition civilian use. 2.5 meters fee SW-2 with selective availability disabled, and within 1 meter for military receivers.

The location can be inclusive or exclusive this means access can be granted at the location and within its perimeter or access can b-e granted only when external to that location. and its perimeter. Location ranges are described.

Multiple inclusive locations can be configured for access, or combined with. multiple exclusive locations. Overlapping inclusive locations can be configured effectively to create complex shapes and ranges. Note that access is graded when a user is at least within any one internal location range and does not violate any external: location zones. Conflicting inclusive zones, within exclusive ranges are identified-by .the DigitalDoors and cannot be created. Conflicting ranges are described Access control-is specifically defined for A. Administrator and administration functions can be locked to a specific location range(s).
B. User access can be limited-to specific location range(s).
C. Each document, data stream, or other resource can be accessed only by conforming to specific location range(s).
D. Each document, data stream, or other resource can be accessed only by specific use(s) within specific location range(s).

Defense against Viruses by Data Extraction,
Dispersal to Storage, and Controlled Release for
Reconstitution During the process of developing security technologies for defending critical infrastructure, we discovered the complexity of the problems and the obvious need to redefine and create new systems and methods for solving such problems. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.

Purposes and Advantages of Invention

The invention is a method and process to defend against and overcome virus attacks by locating the important and critical content in a document, file, data stream etc., extracting the elements to various secured storage locations. The extracts may be controlled-released from storage for reconstruction after validation that there are no viruses worms or threats to the content. The invention can be implemented as an automatic system without human intervention, a manual process or integration of both. Virus scanning mechanisms would be integrated into the invention.

Currently new viruses are discovered on a daily basis; commercial vendors and companies update their antivirus software. The explosive use of the Internet creates an environment where the daily growth of viruses is becoming substantial and the challenge increases to discover the viruses. Furthermore, the sophistication of the viruses complicates the efforts of the defenders and probabilities in defeating the viruses. Another major challenge facing the defenders is the time lag until they can implement anti-virus capabilities. According to research studies, new viruses will be created and spread at a higher pace than humans can handle and control. What is needed is an automated system that can serve as an in-depth line of defense or perhaps the last line of defense.

The invention presents solutions to those problems. In cases where a virus, or a new virus, is not detected by the anti-virus mechanisms the virus would not be able to infect the important and critical data in a document, file, data stream because that data was removed to remote or local secured storage locations.

The invention enables users to protect their "Crown Jewels" while maintaining regular usage of their documents. Furthermore the invention enables sending of information to others and enabling a controlled release process of parts of the document after verification that the "area is clear".

An integral part of the invention includes a virus scanning and analysis module. The virus scanning and analysis module may determine the scope of the virus, how fast it spreads how deadly it is. Such input may trigger various types of responses such as:

1. Commands for more extractions of important and critical information
2. Commands for less release of extracts from storage locations and other commands.

The invention can also enable controlled-release of important and critical information into a document after the cure to a virus has been created. Since it might take time to deliver a cure or the invention secures the critical content until the cure is delivered.

One of the advantages of the invention is the users' capability to continue on working with his document although there is a looming virus threat. The invention may include a pre defined matrix which will coordinate what responses will be triggered in response to which virus and its intensity.

The invention is designed to defend against various types of attacks including those, which spread very quickly. Specifically the invention is capable among other things to counter attacks by viruses like the Internet Worm that in 1998 infected many Unix machines around the world. Furthermore it is designed to defend also against viruses, such as the Mellisa Virus which used and effected E-mails and attachments.

Each one of the storage locations within the invention may incorporate an anti-virus scanner and defender. Information or virus samples detected by the scanner may be related to other storage locations, or to other modules of the invention or to an administrator. The invention is a machine and process and its purposes and advantages may be as follows:

To automatically control selection of data objects within a data stream and release them in a controlled method only to authorized parties. The controlled release process may be triggered by Input such as anti-virus scans results. In such situations after the relevant platforms, files, documents, have been found safe from viruses only then, a release of data will be permitted.

To automatically separate data objects within a data stream into two or more digital data streams according to the importance and categorization of contents, through extraction and removal of the prioritized content and its replacement by appropriate placeholders.

To automatically control selected contents in E-mail, and enable its release in a controlled method only to authorized parties.

To enable users to leverage the growth In computer and telecommunications connectivity and electronic commerce by reducing security risks.

To enable users to release documents, digital files, and data streams Into dosed and opened digital networks with the confidence that important, Identifying, and critical contents In that documents, digital files, and data streams is secure and will be seen only, by authorized parties.

To enable real time simultaneous customization and personalization of selected contents within a data stream to different parties, allowing Instant display of the selected content or part of It based on, and tailored made to the status of the user or receiving party.

To secure the Important and critical contents of a document or digital file by transporting said contents into a separated data stream and removing said data stream to a removed storage memory, while eradicating any copies, temporary caches, or traces of the removed extracts on the original computer or machine.

To enable instant return transfer to the display or to another display all or part of extracted content instantly with verification of authorized user.

To create a projection of the original document, digital file, data objects within a data stream, or variations of it through combined projection of the splinted data streams, while maintaining separation between the data streams.

To create an alternative method for security, instead of encryption, which is secure, cost effective, less time-consuming, and flexible.

To enable automatic timed removal of specific content items, automatically or manually selected from a document, digital file, or data objects within a data stream.

To enable an automatic timed reconstruction (reconstitution) of the said document, digital file, or data objects within a data stream.

The system and method creates a high level of security by automatic selection and removal of critical and prioritized contents from a data objects stream, whether it be a digital document, digital file, database, sound bite, video clip, other structured, or streaming data formats. The system and method enables a controlled release of the extracted data objects, enabling instant display of the instantaneous returned contents, contingent on verification of user identity, access rights, time of operation, location of source and or user, destination of source and or user, and determine threat modes. The system and method delivers high security by removal of the selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract can also be substituted on-the-fly to provide updated results, misinformation, dis-information, messages, alerts, links (to reports, data mining, search engines, web sites, and hyperlinks understood in the current art), advertisements, and personalization and customization. The said validation can be done instantly by password, challenge questions and answers, remote verification (phone, video, or personal contact with user), or by biometrics means.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including: security risk criteria of threats and attacks, sources, targets, users, policies, time of day; and threat modes.

The extracted data is transported to an online removable storage and under extreme security threats to an offline/off-network, digital or physical vaulted storage. Transport and shuttle is based on the level of security alert. The use and release of the vaulted extractions is controlled by a set of rules or organizational policy which includes the following options among others:

1. A vaulting of some, all, or specific data object extracts for long or short periods of time.
2. Release of extractions into a display, in which the extracted data objects will reconstitute with the modified original data stream, the original data objects stream or original document
3. Release of extractions into a projection display in order to project with the modified data stream, the original document while maintaining complete separation of the modified source data stream (the source modified by the extraction of data objects and insertion of placeholders) and the extracted data object streams.
4. Release of extractions into a projection display in order to project a reconstitution of the original document, in other words to create altered versions of the original document, while maintaining complete separation of the modified data stream and the extracted streams.
5. In situations of high security threats, release of extractions into another projection display, PDA, floppy disk, paper document a wireless display, an overlay transparency while maintaining logical and physical separation delivery. This will enable working with a representation of the initial source, but not the initial source itself, while understanding the prevalent, critical extracted information without comprising security to the initial source material by exposing sensitive, identifying, or critical information.
6. The distribution of sources, modified sources, or extracts to remote and distributed viewing devices.
7. Enable the ongoing operation of information delivery and display in defiance of known ongoing or unknown security flaws, breathes, or events compromising the general state of security.
8. The delivery of distinct and separate data streams, delivered on the same or different channels and media, each with minimal, limited, or even substantial usefulness in and by itself, that can be overlaid logically or physically to reconstitute the identifying data stream and display. Separate display devices can be used to create a composite image or they can be overlaid to physically separate display devices to reconstitute a useful composite display.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted storage. Competitors or hackers, who learn that a computer or network is protected by the system and method, might decide to attack another target instead. This is comparable to a situation in which a bank robber, who funds out that the bank vault is empty, will most probably look for another bank: The system and method has a menu of different options including the ability to extract All existing databases on the computer or network.

All newly loaded, mounted, or integrated data to the computer or network.

All plug-in memory devices (temporary or permanent) containing data.

All new and imported data to the computer or network

All new work and output created by the computer or network.

All data being transported in/out oldie computer or network including electronic mail.

All data being transmitted in/out of the computer or network including electronic marl.

The system and method releases the extracted data streams, subject to a controlled-release mechanism and process. The release mechanism is contingent on parameters including; rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or hinder intruders. The system and method is very adaptable and flexible to provide additional layers of security, privacy, anonymity, redundancy, and backup through the selection, a nation, and reconstruction processes. The dynamic architecture of the invention enables it to conduct an automatic real time configuration of its extraction/transport/recovery activities, in response to the challenge of attacks.

The invention's survivability modes enable:

Presetting of rules for computer or network functioning under attack or alert.

An automatic assessment of damage and automatic reaction to enable functionality of critical missions.

Another object of this invention is as a system and method for automatically creating customized and personalized versions of a document, data object, or data stream. In real time, simultaneous versions of the original are created and altered, then disseminated based on the status of the different users and their access privileges. The system and method enables content management and control by automatically locating content items prioritized by importance, transporting them to a secure memory, and releasing them under explicit controls or preset rules.

Another object of the invention is as a system and method for control, analysis and management of important and prioritized information within documents, files, data object, and data streams. The system and method, enables the processing of all data objects at the time in which they are created or imported into the system. The said early stage processing, enables early stage inventorying of prioritized contents as well as early stage pattern recognition. Extracting critical information, such as credit card numbers, last names, first names, social security numbers, phones numbers, transaction dollar amounts and addresses, enables the system and method to aggregate data in categories and analyze the data in different optional methodologies including pattern recognition.

Another object of the invention is as a system and method for comprehensive monitoring of various activities including business activities in real time. With this level of detail, the system and method becomes a management information tool and information/data command and control center. The said system and method can include an alert system, which in effect creates a real time apparatus for command and control of the systems activities. In real time, and at any point in time, the user can get a comprehensive view of different activities including:

How many transactions are being processed, their content, their context, identity of the involved parties identity, their profiles, and the personnel involved.
How much money is being transacted.
When, in terms of dates, relevant to the transaction:
Where, in terms of geographical location, the transactions are taking place.
Where, in terms of geographical location, monies or goods are being transferred.
Which departments in the organization are involved.

Description

The invention is a method and process to defend against and overcome virus attacks by locating the important and critical content in a document, file, data stream etc., extracting them to various secured storage locations. The extracts may be controlled-released from storage for reconstruction after validation that there are no viruses worms or threats to the content. The invention can be implemented as an automatic system without human intervention, a manual process or integration of both.

An integral part of the invention includes a virus scanning and analysts module. The virus scanning and analysis module may determine the scope of the virus, how fast it spreads how deadly it is. Such input may trigger various types of responses such as:

1. Commands for more extractions of important and critical information.
2. Commands for less release of extracts from storage locations and other commands.

The invention may include a pre defined matrix which will coordinate what responses will be triggered in response to which virus and its intensity. In general the invention may cover the following elements. Reference to the "above in item s" below is simply made for relation back purposes.:

1. A computer software product for securing data having one or more security sensitive words, characters or icons in a computer system with memories designated as a remainder store and an extract store, the computer product having instructions for a computer system for: extracting said security sensitive words, characters or icons from said data to obtain extracted data and remainder data therefrom; storing said extracted data and said remainder data in said extract store and said remainder store, respectively; and, permitting reconstruction of said data via said extracted data and remainder data only in the presence of a predetermined security clearance.

2. A computer software product for securing data as above in item 1 operative on an email program or a browser program and including instructions for facilitating said storage of extracted data rather than storing said extracted data, forwarding said remainder data to an email addressee or a targeted destination and permitting retrieval of said extracted data only in the presence of said predetermined security clearance prior to reconstruction.

3. A computer software product for securing data as above in item 2 wherein said product operates in conjunction with the email program and includes instructions for encryption and decryption of one or all of the email, extracted data and remainder data.

4. A computer software product for securing data as above in item 3 including encrypting said extracted data and either appending or including said encrypted extracted data with said remainder data to form a composite email; and curtailing said composite email to an addressee.

5. A computer software product for securing data as above in item s 1 for transparently establishing and managing the separation of user-based communities of interest based upon crypto-graphically separated security levels, said user-based communities of interest representing a plurality of users having a corresponding a plurality of security levels each with a respective security clearance, the computer product having instructions for the computer system for: obtaining subsets of extracted data and remainder data; storing said subsets of extracted data and said remainder data; and, permitting reconstruction of some or all of said data via one or more of said subsets of extracted data and remainder data only in the presence of a predetermined security clearance of said plurality of security levels.

6. A computer software product for securing data as above in item 5 including encrypting said subsets of extracted data with said plurality of encryption types to obtain multiple level encryption in one document or data object; and, decrypting all or portions of said one document or data object with multiple level encryption only in the presence of a predetermined security clearance of said plurality of security levels.

7. A computer software product for securing data as above in item 1, the data being secured against a plurality of computer events and used in connection with an electronic attack monitor generating a corresponding plurality of attack warnings, a plurality of users having a corresponding a plurality of security levels each with a respective security clearance, the computer product having instructions for: extracting data dependent upon respective ones of said plurality of attack warnings to obtain the extracted data and remainder data, the degree of extraction dependent upon respective ones of said plurality of attack warnings; storing said extracted data and said remainder data based upon respective ones of said plurality of attack warnings; and, permitting reconstruction of some or all of said data via said extracted data and remainder data only in the presence of a predetermined security clearance of said plurality of security levels.

8. A computer software product for securing data as above in item 7 wherein said plurality of computer events includes hacking attacks, power loss, environmental conditions adverse to said computer network, said electronic attack monitor including sensory systems responsive to said plurality of computer events to generate said plurality of attack warnings, and the filtering and storing responsive to said plurality of computer events which include said hacking attacks, power loss, environmental conditions adverse to said computer network.

9. A computer software product for securing data as above in item 1-8 wherein said computer system is one of (i) a data input device interconnected and operable with another computer system having a processor and a memory having distributed memory segments; (ii) a single personal computer, (iii) a network of computer linked together; (iv) a plurality of computers operative over the global computer network or Internet.

10. A computer software product for securing data as above in item 1-9 wherein said data is an electronic document, image, email, data from a browser program, audio or video file or a combination thereof.

11. A computer software product for securing data as above in item 1-10 wherein said memories are floppy discs, flash memories, bard drive memories, ROMs, RAMs, CD ROM memories, integrated circuit memories, client computer memories, server memories, computer memories coupled to client computers, computer memories coupled to server computers, or distributed memory systems in an interconnected communications network.

12. A computer software product for securing data as above in item 1-11 wherein said software product is deployed over a client-server computer system and said server stores one or both of said extracted and remainder data and permits reconstruction only in the presence of a predetermined security clearance as a download to the client computer.

13. A computer software product for securing data as above in item s 1-12 wherein the extracting operates on credit card data, financial data or account data.

14. A computer software product for securing data as above in item 1-13 implemented on an information processing system.

15. A computer software product for securing data as above in item 1-14 wherein the extraction utilizes a parsing algorithm without designation of said security sensitive words, characters or icons and said parsing algorithm based upon one or more of a bit count, a word, a word count, a page count, a line count, a paragraph count, an identifiable document characteristic, an identifiable word characteristic, an identifiable letter or number characteristic, an identifiable icon characteristic, an identifiable data object characteristic, capital letters, italics, and underline.

16. A computer software product for securing data as above in item 1-15 including establishing a plurality of security levels each with a respective security clearance for subsets of said security sensitive words, characters or icons and including permitting either full or partial reconstruction in the presence of respective ones of said plurality of security clearance levels.

17. A computer software product for securing data as above in item 1-16 including encrypting one or both of said extracted data and remainder data and decrypting during reconstruction as necessary and permitted based upon said security clearance.

18. A computer software product for securing data as above in item 1-17 including instructions for deleting data, input into the software product, from a data input device after storing.

19. A computer software product for securing data as above in item 1-18 including mapping said extract store and remainder store or plurality of extract stores, storing said map in a map store, and permitting access only in the presence of predetermined security clearance.

20. A computer software product for securing data as above in item 1-19 including identifying said sensitive words, characters or icons prior to extraction.

21. A computer software product for securing data as above in item 1-20 including utilizing placeholders in said remainder data representing non reconstructed, extracted data during full or partial reconstruction, said placeholders being one from the group of characters, icons, substitute words, data objects, underline and blank space.

22. A computer software product for securing data as above in item 1-21 including the use of one of an inference engine, neural network and artificial intelligence process to extract, store or permit reconstruction of said data.

23. A computer software product for securing data as above in item 1-22 including one or multiple types of encryption and decryption of one or all of the extracted data and remainder data relative to the degree of security of said data.

24. A computer software product for securing data as above in item 1-23 wherein the extraction and storing represents granular deconstruction and dispersal of said data.

25. A computer software product for securing data as above in item 1-24 including displaying a vendor's advertisement prior to one or the other or both of said steps of extracting and permitting reconstruction and optionally displaying a link to a vendor's web site with said advertisement.

26. A computer software product for securing data as above in item 1-25 including associating a monetary charge for one or more of said extracting, storing or permitting reconstruction.

27. A computer software product for securing data as above in item 1-26 including displaying said security sensitive words, characters or icons ins distinguishing manner prior to extracting.

28. A computer software product for securing data as above in item 1-27 wherein said software product is stored in a computer readable medium, CD ROM, in a network or in a singular or a distributed computer system.

29. A computer software product for securing data as above in item 1-27 wherein said computer system operable with the reconstruction portion of said software product includes a display fed from video memory having a plurality of frame memory segments, the reconstruction including interleaving extracted data and remainder data into respective ones of said plurality of frame memory segments.

30. A computer software product for securing data as above in item 1-27 wherein said computer system operable with the reconstruction portion of said software product includes a data display system with at least two separate but visually overlaid displays, the reconstruction including displaying said extracted data on one of said at least two displays and displaying said remainder data on another of said at least two displays.

31. A method of securing email data having one or more security sensitive words, characters or icons, the method used in conjunction with an addressee email device having a decryption routine, the method comprising: extracting said security sensitive words, characters or icons from said email data to obtain extracted data and remainder data therefrom; encrypting said extracted data and either appending or including said encrypted extracted data with said remainder data to form a composite email; and emailing said composite email to an addressee.

Sketches

See Building and Testing for samples.

Ramifications

The invention presents a solution which will protect the critical plain text against any type of viruses, worms, semantic attacks and whatever types of known or unknown attacks. The total disconnection of the extracted data from the document guarantees the inability of viruses to spread into the important data. In effect the important data is hidden from the attacking viruses. The Invention is the needed solution in an environment where there is no guarantee that new cures will be found to provide defense against new viruses. According to research studies, new viruses will be created and spread at a higher pace than humans can handle and control. What is needed is an automated system that can serve as an in-depth line-of defense or perhaps the last line of defense. The invention introduces such capabilities for defense.

Building and Testing

The screen images in the figure section demonstrate the machine and process in action, automatically, searching and extracting critical and important information to secure storage locations. Based on screening of the various locations for viruses and following a indication that the locations are safe or ready for a controlled release process that will enable the reconstruction of the document with the extracted content.

1. DigitalDoors Architecture
2. DigitalDoors Defenses in Depth
3. Samples Extraction and Reconstitution
4. Samples multi type encryption in one document
5. Technical Background: DigitalDoors
6. DigitalDoors: A New Approach To Security And Survivability
7. DigitalDoors Architecture Process & Data Flow
8. The Security of Location Map and Recovery File
9. DigitalDoors Elements Necessary to Secure DigitalDoors Frequently Asked Questions
10. DigitalDoors Engines, CPU, Hardware Processing
11. Drawings of the Architecture The previous disclosure of conception was Provisional patent application: Secured Sharing of information with dispersed data Mining and searching capabilities, Jul. 16, 2002; Provisional patent application: Controlled release of data into documents to better effect intelligence and security sharing. Jul. 18, 2002; Data security system and method with parsing an dispersion techniques, May 23, 2002; Data security system and method adjunct to e-mail browser or telecom program, May 23, 2002; Data security system and method for separation of user communities Controlled Release of Data and Critical Granular Data into Documents to Effect Better Sharing of Intelligence and Information During the process of developing security technologies for defending critical infrastructure, we discovered the complexity of the business model and the obvious need to redefine and create new systems and methods for doing business. These were neither obvious in the literature or in the business methods of existing competition. We are unaware of prior blueprints for these methods or existing business models. As a result, we built a system and codified the methods and the business process necessary for implementation in the form of this preliminary patent and used this blueprint to structure, implement and test these methods.

Purposes and Advantages of Invention

The invention is a method and process to overcome obstacles for intelligence and data sharing among parties by enabling the parties to control the release of electronic data and the electronic granular critical and important data restored back into documents being shared among the parties. The restoration can be in part or in whole based on the access control and/or security level of the users.

The controlled release process is designed to enable arms-length (local and remote) negotiations between the parties. The invention enables a party to release specific granular data, such as a name, or date, should that party get the consideration seeking for that release. As an example, a local police chief may release granular critical data to a federal agency, when in return the federal authority will release an intelligence document or a granular part of it, or present another consideration.

The rationale behind the invention is that there are many obstacles for sharing intelligence and information. There are even many more hurdles when it comes to sharing of raw intelligence. The invention creates a leveled playing field, in which the different parties must share and exchange information in order to achieve their objectives.

The invention can resolve the major challenges facing government for enabling sharing of information among its different organizations in relationship to fighting terrorism. The invention, for example, can enable organizations connected to the Homeland Security Department to search databases of various other government, state and local organizations, eliminating the fear of the organizations which own the documents that their proprietary data or granular critical data would be released without their specific permission. The invention enables open negotiations among the parties over what data to release and for what consideration. When few organizations are seeking access to a specific document the invention and can allow a controlled release of different granular data to different parties for different considerations and benchmarks.

The invention's mechanism of controlled release of the located document/data enables other parties to search owners' documents without the owners' fear that sensitive information will be released to the searching party. This invention is designed to foster sharing of documentation between different parties, taking into consideration the need to limit the access of other parties to the total content of the owner's document.

The invention is a machine and process and its purposes and advantages may be as follows:

To automatically control selection of data objects within a data stream and release them in a controlled method only to authorized parties.

To automatically separate data objects within a data stream into two or more digital data streams according to the importance and categorization of contents, through extraction and To automatically control selected contents in E-mail, and enable Its release in a controlled method only to authorized parties.

To enable users to leverage the growth In computer and telecommunications connectivity and electronic commerce by reducing security risks.

To enable users to release documents, digital files, and data streams into closed and opened digital networks with the confidence that important, identifying, and critical contents in that documents, digital files, and data streams is secure and will be seen only by authorized parties.

To enable real time simultaneous customization and personalization of selected contents within a data stream to different parties, allowing Instant display of the selected content or part of it based on, and tailored made to the status of the user or receiving party.

To secure the Important and critical contents of a document or digital file by transporting said contents into a separated data stream and removing said data stream to a removed storage memory, while eradicating any copies, temporary caches, or traces of the removed extracts on the original computer or machine.

To enable Instant return transfer to the display or to another display all or part of extracted content instantly with verification of authorized user.

To create a projection of the original document, digital file, data objects within a data stream, or variations of it through combined projection of the splinted data streams, while maintaining separation between the data streams.

To create an alternative method for security, instead of encryption, which is secure, cost effective, less time-consuming, and flexible.

To enable automatic timed removal of specific content items, automatically or manually selected from a document, digital file, or data objects within a data stream.

To enable an automatic timed reconstruction (reconstitution) of the said document, digital file, or data objects within a data stream.

The system and method creates a high level of security by automatic selection and removal of critical and prioritized contents from a data objects stream, whether it be a digital document, digital file, database, sound bite, video clip, other structured, or streaming data formats. The system and method enables a controlled release of the extracted data objects, enabling instant display of the instantaneous returned contents, contingent on verification of user identity, access rights, time of operation, location of source and or user, destination of source and or user, and determine threat modes. The system and method delivers high security by removal of the selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract can also be substituted on-the-fly to provide updated results, misinformation, dis-information, messages, alerts, links (to reports, data mining, search engines, web sites, and hyperlinks understood in the current art), advertisements, and personalization and customization. The said validation can be done instantly by password, challenge questions and answers, remote verification (phone, video, or personal contact with user), or by biometrics means.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including: security risk criteria of threats and attacks, sources, targets, users, policies, time of day, and threat modes.

The extracted data is transported to an online removable storage and under extreme security threats to an offline/off-network, digital or physical vaulted storage. Transport and shuttle is based on the level of security alert. The use and release of the vaulted extractions is controlled by a set of rules or organizational policy which includes the following options among others:

1. A vaulting of some, all, or specific data object extracts for long or short periods of time.
2. Release of extractions into a display, in which the extracted data objects will reconstitute with the modified original data stream, the original data objects stream or original document.
3. Release of extractions into a projection display in order to project with the modified data stream, the original document while maintaining complete separation of the modified source data stream (the source modified by the extraction of data objects and Insertion of placeholders) and the extracted data object streams.
4. Release of extractions into a projection display in order to project a reconstitution of the original document, in other words to create altered versions of the original document, while maintaining complete separation of the modified data stream and the extracted streams.
5. In situations of high security threats, release of extractions into another projection display, PDA, floppy disk, paper document a wireless display, an overlay transparency while maintaining logical and physical separation of delivery streams. This will enable working with a representation of the initial source, but not the initial source itself, while understanding the prevalent, critical extracted information without comprising security to the Initial source material by exposing sensitive, identifying, or critical Information.
6. The distribution of sources, modified sources, or extracts to remote and distributed viewing devices.
7. Enable the ongoing operation of Information delivery and display in defiance of known ongoing or unknown security flaws, breaches, or events compromising the general state of security.
8. The delivery of distinct and separate data streams, delivered on the same or different channels and media, each with minimal, limited, or even substantial usefulness in and by Itself, that can be overlaid logically or physically to reconstitute the identifying data stream and display. Separate display devices can be used to create a composite image or they can be overlaid to physically separate display devices to reconstitute a useful composite display.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted-storage. Competitors or hackers, who learn that a computer or network is attack another target instead. This is comparable to a situation in which a bank robber, who finds out that the bank vault is empty, will most probably look for another bank.

The system and method has a menu of different options including the ability to extract:

All existing databases on the computer or network.

All newly loaded, mounted, or integrated data to the computer or network.

All plug-In memory devices (temporary or permanent) containing data.

All new and Imported data to the computer or network.

All new work and output created by the computer or network.

All data being transported in/out of the computer or network including electronic mail.

All data being transmitted in/out of the computer or network including electronic mail.

The system and method releases the extracted data streams, subject to a controlled-release mechanism and process. The release mechanism is contingent on parameters including: rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or hinder intruders. The system and method is very adaptable and flexible to provide additional layers of security, privacy, anonymity, redundancy, and backup through the selection, extraction, storage, transportation, and reconstruction processes. The dynamic architecture of the invention enables it to conduct an automatic real time configuration of its extraction/transport/recovery activities, in response to the challenge of attacks.

The invention's survivability modes enable:

Presetting of rules for computer or network functioning under attack or alert.

An automatic assessment of damage and automatic reaction to enable functionality of critical missions.

Another object of this invention is as a system and method for automatically creating customized and personalized versions of a document, data object, or data stream. In real time, simultaneous versions of the original are created and altered, then disseminated based on the status of the different users and their access privileges. The system and method enables content management and control by automatically locating content items prioritized by importance, transporting them to a secure memory, and releasing them under explicit controls or preset rules.

Another object of the invention is as a system and method for control, analysis and management of important and prioritized information within documents, files, data object, and data streams. The system and method, enables the processing of all data objects at the time in which they are created or imported into the system. The said early stage processing, enables early stage inventorying of prioritized contents as well as early stage pattern recognition. Extracting critical information, such as credit card numbers, last names, first names, social security numbers, phones numbers, transaction dollar amounts and addresses, enables the system and method to aggregate data in categories and analyze the data in different optional methodologies including pattern recognition.

Another object of the invention is as a system and method for comprehensive monitoring of various activities including business activities in real time. With this level of detail, the system and method becomes a management information tool and information/data command and control center. The said system and method can include an alert system, which in effect creates a real time apparatus for command and control of the systems activities. In real time, and at any point in time, the user can get a comprehensive view of different activities including:

How many transactions are being processed, their content, their context, identity of the involved parties identity, their profiles, and the personnel involved.

How much money is being transacted.

When, in terms of dates, relevant to the transaction.

Where, In terms of geographical location, the transactions are taking place.

Where, in terms of geographical location, monies or goods we being transferred.

Which departments in the organization are involved.

Description

The invention is enables parties to control release the electronic data and the electronic granular critical data into the documents they are sharing with other parties. In general the invention may cover the following elements. Reference to "above in item s" below is only a relation back feature.

1. A computer software product for securing data having one or more security sensitive words, characters or icons In a computer system with memories designated as a remainder store and an extract store, the computer product having instructions for a computer system for:

extracting said security sensitive words, characters or icons from said data to obtain extracted data and remainder data therefrom;

storing said extracted data and said remainder data in said extract store and said remainder store, respectively; and.

permitting reconstruction of said data via said extracted data and remainder data only in the presence of a predetermined security clearance.

2. A computer software product for securing data as above in item 1 operative on an email program or a browser program and including Instructions for facilitating said storage of extracted data rather than storing said extracted data, forwarding said remainder data to an email addressee or a targeted destination and permitting retrieval of said extracted data only In the presence of said predetermined security clearance prior to reconstruction.

3. A computer software product for securing data as above in item 2 wherein said product operates In conjunction with the email program and includes Instructions for encryption and decryption of one or all of the email, extracted data and remainder data.

4. A computer software product for securing data as above in item 3 Including encrypting said extracted data and either appending or including said encrypted extracted data with said remainder data to form a composite email; and emailing said composite email to an addressee.

5. A computer software product for securing data as above in item s 1 for transparently establishing and managing the separation of user-based communities of interest based upon crypto-graphically separated security levels, said user-based communities of interest representing a plurality of users having a corresponding a plurality of security levels each with a respective security clearance, the computer product having Instructions for the computer system for:

obtaining subsets of extracted data and remainder data;

storing said subsets of extracted data and said remainder data; and, permitting reconstruction of some or all of said data via one or more of said subsets of extracted data and remainder data only in the presence of a predetermined security clearance of said plurality of security levels.

6. A computer software product for securing data as above in item 5 including encrypting said subsets of extracted data with said plurality of encryption types to obtain multiple level encryption in one document or data object and, decrypting all or portions of said one document or data object with multiple level encryption only In the presence of a predetermined security clearance of said plurality of security levels.

7. A computer software product for securing data as above in item 1, the data being secured against a plurality of computer events and used in connection with an electronic attack monitor generating a corresponding plurality of attack warnings, a plurality of users having a corresponding a plurality of security levels each with a respective security clearance, the computer product having instructions for the computer system for:

extracting data dependent upon respective ones of said plurality of attack warnings to obtain the extracted data and remainder data, the degree of extraction dependent upon respective ones of said plurality of attack warnings;

storing said extracted data and said remainder data based upon respective ones of said plurality of attack warnings; and, permitting reconstruction of some or all of said data via said extracted data and remainder data only in the presence of a predetermined security clearance of said plurality of security levels.

8. A computer software product for securing data as above in item 7 wherein said plurality of computer events includes hacking attacks, power loss, environmental conditions adverse to said computer network, said electronic attack monitor including sensory systems responsive to said plurality of computer events to generate said plurality of attack warnings, and the filtering and storing responsive to said plurality of computer events which include said hacking attacks, power loss, environmental conditions adverse to said computer network.

9. A computer software product for securing data as above in item 1-8 wherein said computer system is one of (i) a data input device interconnected and operable with another computer system having a processor and a memory having distributed memory segments; (ii) a single personal computer, (Iii) a network of computer linked together; (iv) a; plurality of computers operative over the global computer network or Internet.

10. A computer software product for securing data as above in item 1-9 wherein said data is an electronic document, image, email, data from a browser program, audio or video file or a combination thereof.

11. A computer software product for securing data as above in item 1-10 wherein said memories are floppy discs, flash memories, hard drive memories, ROMs, RAMs, CD ROM memories, Integrated circuit memories, client computer memories, server memories. computer memories coupled to client computers, computer memories coupled to server computers, or distributed memory systems in an interconnected communications network.

12. A computer software product for securing data as above in item 1-11 wherein said software product is deployed over a client-server computer system and said server stores one or both of said extracted and remainder data and permits reconstruction only in the presence of a predetermined security clearance as a download to the client computer.

13. A computer software product for securing data as above in item s 1-12 wherein the extracting operates on credit card data, financial data or account data.

14. A computer software product for securing data as above in item 1-13 implemented on an information processing system.

15. A computer software product for securing data as above in item 1-14 wherein the extraction utilizes a parsing algorithm without designation of said security sensitive words, characters or icons and said parsing algorithm based upon one or more of a bit count, a word, a word count. a page count, a line count, a paragraph count, an identifiable document characteristic, an identifiable word characteristic, an Identifiable letter or number characteristic, an identifiable icon characteristic, an identifiable data object characteristic, capital letters, italics, and underline.

16. A computer software product for securing data as above in item 1-15 including establishing a plurality of security levels each with a respective security clearance for subsets of said security sensitive words, characters or icons and including permitting either full or partial reconstruction In the presence of respective ones of said plurality of security clearance levels.

17. A computer software product for securing data as above in item 1-16 including encrypting one or both of said extracted data and remainder data and decrypting during reconstruction as necessary and permitted based upon said security clearance.

18. A computer software product for securing data as above in item 1-17 including instructions for deleting data, input into the software product, from a data Input device after storing.

19. A computer software product for securing data as above in item 1-18 including mapping said extract store and remainder store or plurality of extract stores, storing said map in a map store, and permitting access only in the presence of predetermined security clearance.

20. A computer software product for securing data as above in item 1-19 including identifying said sensitive words, characters or icons prior to extraction.

21. A computer software product for securing data as above in item 1-20 including utilizing placeholders in said remainder data representing non-reconstructed, extracted data during full or partial reconstruction, said placeholders being one from the group of characters, icons, substitute words, data objects, underline and blank space.

22. A computer software product for securing data as above in item 1-21 including the use of one of an Inference engine, neural network and artificial intelligence process to extract, store or permit reconstruction of said data.

23. A computer software product for securing data as above in item 1-22 including one or multiple types of encryption and decryption of one or all of the extracted data and remainder data relative to the degree of security of said data.

24. A computer software product for securing data as above in item 1-23 wherein the extraction and storing represents granular deconstruction and dispersal of said data.

25. A computer software product for securing data as above in item 1-24 including displaying a vendor's advertisement prior to one or the other or both of said steps of extracting and permitting reconstruction and optionally displaying a link to a vendor's web site with said advertisement.

26. A computer software product for securing data as above in item 1-25 including associating a monetary charge for one or more of said extracting, storing or permitting reconstruction.

27. A computer software product for securing, data as above in item 1-26 including displaying said security sensitive words, characters or icons in a distinguishing manner prior to extracting.

28. A computer software product for securing data as above in item 1-27 wherein said software-product is stored In a computer readable medium, CD ROM, in a network or in a singular or a distributed computer system.

29. A computer software product for securing data as above in item 1-27 wherein said computer system operable with the reconstruction portion of said software product includes a display fed from video memory having a plurality of frame memory segments, the reconstruction including interleaving extracted data and remainder data into respective ones of said plurality of frame memory segments.

30. A computer software product for securing data as above in item 1-27 wherein said computer system operable with the reconstruction portion of said software product includes a data display system with at least two separate but visually overlaid displays, the reconstruction Including displaying said extracted data on one of said at least two displays and displaying said remainder data on another of said at least two displays.

31. A method of securing email data having one or more security sensitive words, characters or icons, the method used in conjunction with an addressee email device having a decryption routine, the method comprising:
extracting said security sensitive words, characters or icons from said email data to obtain extracted data and remainder data therefrom;
emailing said composite email to an addressee.

Ramifications

The invention enables overcoming the obstacles sharing of sensitive data, and granular data between parties with a controlled release mechanism for release of data in an conformance to benchmarks which can include the giving of consideration, submitting of other information, Etc. A major benefit of the invention is the ability of parties to exchange their information for other parties information, in a controlled method that enables implementation of security protection on the sensitive data.

Building and Testing

The screen images in the figure section demonstrate the machine and process in action, automatically, searching different storage locations for critical extracts/key words. The keywords have the identifier of the document they belong to. A user with the appropriate access security level will be able to retrieve based on his security clearance the following: 1. The entire document. 2. A declassified version of the document 1. DigitalDoors Architecture
2. DigitalDoors Defenses in Depth
3. Samples Extraction and Reconstitution
4. Samples multi type encryption in one document
5. Technical Background: DigitalDoors
6. DigitalDoors: A New Approach To Security And Survivability
7. DigitalDoors Architecture Process & Data Flow
8. The Security of Location Map and Recovery File
9. DigitalDoors Elements Necessary to Secure DigitalDoors Frequently Asked Questions
10. DigitalDoors Engines, CPU. Hardware Processing
11. Drawings of the Architecture The previous disclosure of conception was made in the following patent applications filed by inventors: Provisional patent application: Secured Sharing of information with dispersed data Mining and searching capabilities, Jul. 16, 2002; Data security system and method with parsing an dispersion techniques, May 23, 2002; Data security system and method adjunct to e-mail browser or telecom program, May 23, 2002; Data security system and method for separation of user communities. Data security system and method responsive to electronic attacks; Data security system and method Jul. 27, 2001.

What is claimed is:

1. A computerized method of securing data in a plurality of security controlled data stores with access controls thereat, said data potentially having sensitive content such as sensitive words, data objects, characters, images, data elements or icons, comprising:
storing separately sensitive content in secure data stores of said plurality of security data stores, wherein said security data stores are selected in a predetermined manner by random selection, and wherein each said secure data store has a unique access control;
permitting reconstruction of some or all of said data by a requesting party with appropriate access controls applied to respective secure data stores;
the permitted reconstruction limited by (i) the requesting party's permitted login day-and-time permissions; (ii) the requesting party's permitted login time allocation for said respective secure data store; (iii) the requesting party's location; and (iv) the requesting party's audit process results; and
auditing the requesting party's access to said respective secure data stores for a predetermined threat pattern based upon the requesting party's access rights, permitted login day-and-time permissions, login time allocation, the requesting party's location and generating the requesting party's audit process results.

2. A computerized method of securing data as claimed in claim 1 wherein said storing includes at least one or both of filtering or extracting said sensitive content in said secure data stores.

3. A computerized method of securing data as claimed in claim 1 wherein said storing includes at least one or both of removing or copying said sensitive content in said secure data stores.

4. A computerized method of securing data as claimed in claim 1 wherein said storing includes at least one or both of translating said sensitive content in said secure data stores or transforming said sensitive content in said secure data stores.

5. A computerized method of securing data as claimed in claim 1 wherein said storing includes at least one or both of filtering and transferring or extracting and transferring said sensitive content in said secure data stores.

6. A computerized method of securing data as claimed in claim 1 wherein said storing includes at least one or both of transforming or converting said sensitive content in said secure data stores.

7. A computerized method of securing data as claimed in claim 1 wherein said storing includes at least one or more of rendering, archiving and transposing said sensitive content in said secure data stores.

8. A computerized method of securing data as claimed in claim 1 wherein said storing of said sensitive content in said secure data stores includes at least one or both of partially or completely storing said sensitive content in said secure data stores.

9. A computerized method of securing data as claimed in claim 1 wherein said storing of said sensitive content in said secure data stores includes partially or completely storing said sensitive content in said secure data stores with at least one of encryption, data compression, or with parsed transmission of data.

10. A computerized method of securing data as claimed in claim 1 wherein said storing of said sensitive content in said secure data stores includes at least one or more of labeling, or classifying said sensitive content in said secure data stores.

11. A computerized method of securing data as claimed in claim 1 including automatically at least one of:
tagging prior to storing and, at least one or more of labeling, or classifying said sensitive content in said secure data stores; or
tagging concurrent with storing and, at least one or more of labeling, or classifying said sensitive content in said secure data stores.

12. A computerized method of securing data as claimed in claim 1 including at least one of:
tagging prior to storing and, at least one or more of labeling, or classifying said sensitive content in said secure data stores; or
tagging concurrent with storing and, at least one or more of labeling, or classifying said sensitive content in said secure data stores; and wherein
said sensitive content has different levels of sensitive content therein corresponding to respective ones of said secure data stores.

13. A computerized method of securing data as claimed in claim 1 wherein said sensitive content is defined as at least one of security sensitive content, content of significance, trade secret content, personal identifying information, content subject to regulatory provisions, or back-up content and said respective ones of said secure data stores are correspondingly designated as at least one of security sensitive stores, stores for content of significance, trade secret stores, personal identifying information stores, regulatory provision stores, or back-up stores.

14. A computerized method of securing data as claimed in claim 1 wherein said sensitive content is defined as at least one of litigation specific content, aged content, archival content, historical content and said respective ones of said secure data stores are correspondingly designated as at least one of litigation specific stores, aged content stores, archival stores, or historical content stores.

15. A computerized method of securing data as claimed in claim 1 wherein said storing of sensitive content in said secure data stores includes storing data in said security data stores in a predetermined manner with an algorithmic random selection for said data stores.

16. A computerized method of securing data as claimed in claim 1 wherein said storing of sensitive content in said secure data stores includes storing data in optical media data stores.

17. A computerized method of securing data as claimed in claim 1 wherein said storing sensitive content in said secure data stores includes storing data in at least one of non-magnetic media stores or print stores.

18. A computerized method of securing data as claimed in claim 1 wherein storing of said sensitive content is done separately with respect to at least one of remainder data, left-over data, non-sensitive content data, surplus data, residue data, remnant data, or data complementary to sensitive content data.

19. A computerized method of securing data as claimed in claim 1 wherein permitting reconstruction includes at least one of reassembly, reconstitution, regeneration, compilation, reorganization, reclamation or reformation of some or all of said data with appropriate access controls applied to respective secure data stores.

* * * * *